United States Patent [19]

Shinoda et al.

[11] Patent Number: 4,664,496
[45] Date of Patent: May 12, 1987

[54] CAMERA SYSTEM

[75] Inventors: Nobuhiko Shinoda, Tokyo; Nobuaki Sakurada, Yokohama; Masaharu Kawamura, Tokyo; Tadashi Ito; Fumio Ito, both of Yokohama; Hiroyashu Murakami, Tokyo, all of Japan

[73] Assignee: Canon Kabushiki Kaisha, Tokyo, Japan

[21] Appl. No.: 858,902

[22] Filed: Apr. 28, 1986

Related U.S. Application Data

[63] Continuation of Ser. No. 680,366, Dec. 11, 1984, which is a continuation of Ser. No. 216,070, Dec. 11, 1980, which is a continuation of Ser. No. 737,771, Nov. 1, 1976.

[30] Foreign Application Priority Data

Nov. 8, 1975 [JP] Japan .................................. 50-134391

[51] Int. Cl.⁴ ............................................. G03B 15/05
[52] U.S. Cl. ..................................... 354/420; 354/422
[58] Field of Search ................................ 354/420, 422

[56] References Cited

U.S. PATENT DOCUMENTS

| | | | |
|---|---|---|---|
| 3,714,873 | 2/1973 | Ernisse et al. | 354/420 |
| 3,805,278 | 4/1974 | Matsuzaki et al. | 354/420 |
| 3,900,857 | 8/1975 | Tsujimoto | 354/420 |
| 4,199,236 | 4/1980 | Goto et al. | 354/420 |
| 4,509,845 | 4/1985 | Mizokami | 354/420 |

Primary Examiner—Russell E. Adams
Attorney, Agent, or Firm—Toren, McGeady and Goldberg

[57] ABSTRACT

Most of the elements constituting this camera system consists of digital circuits, whereby a central processing unit is built in this camera system in such a manner that various kinds of photographic modes are possible without increasing the number of the elements.

9 Claims, 120 Drawing Figures

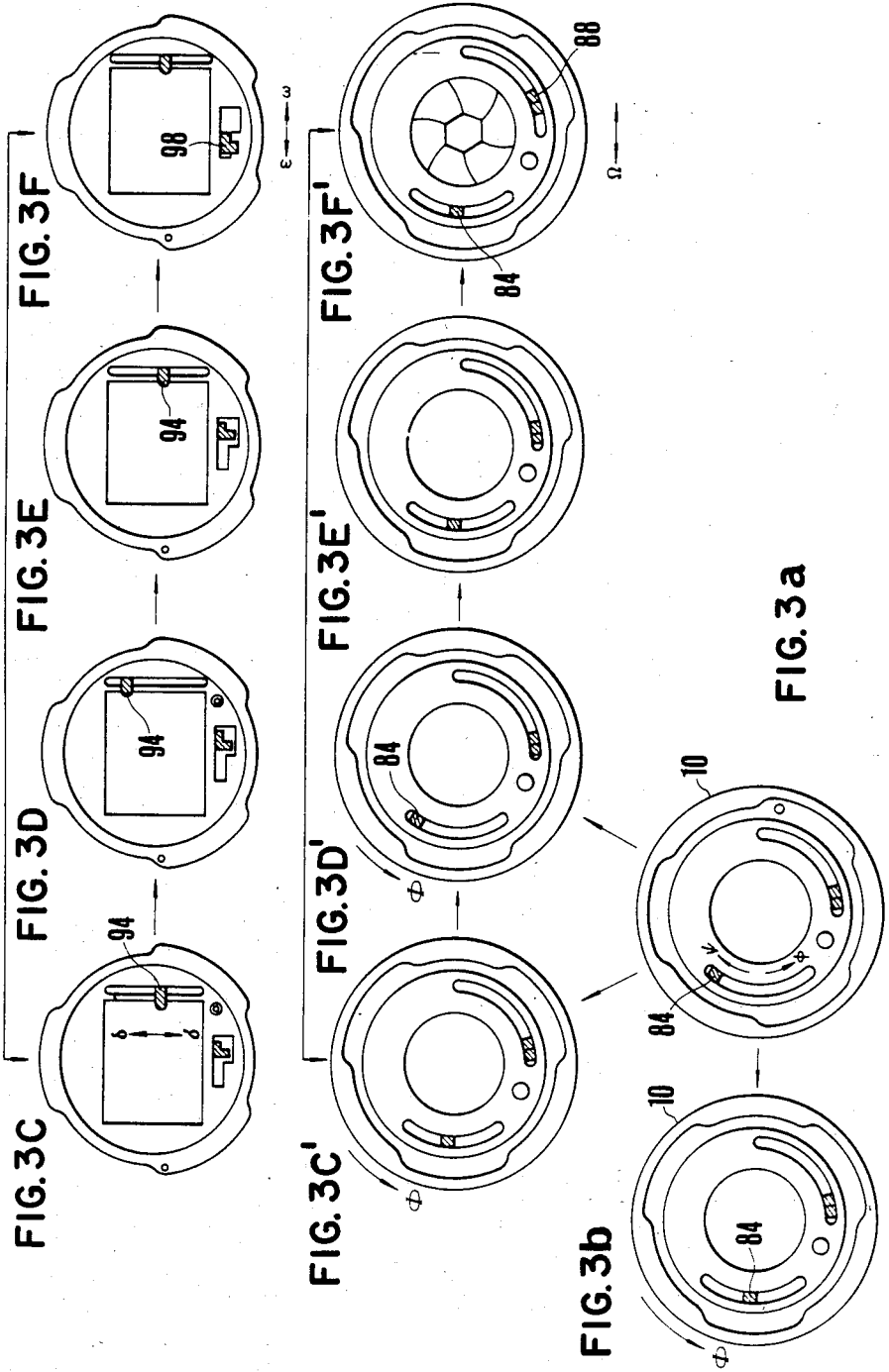

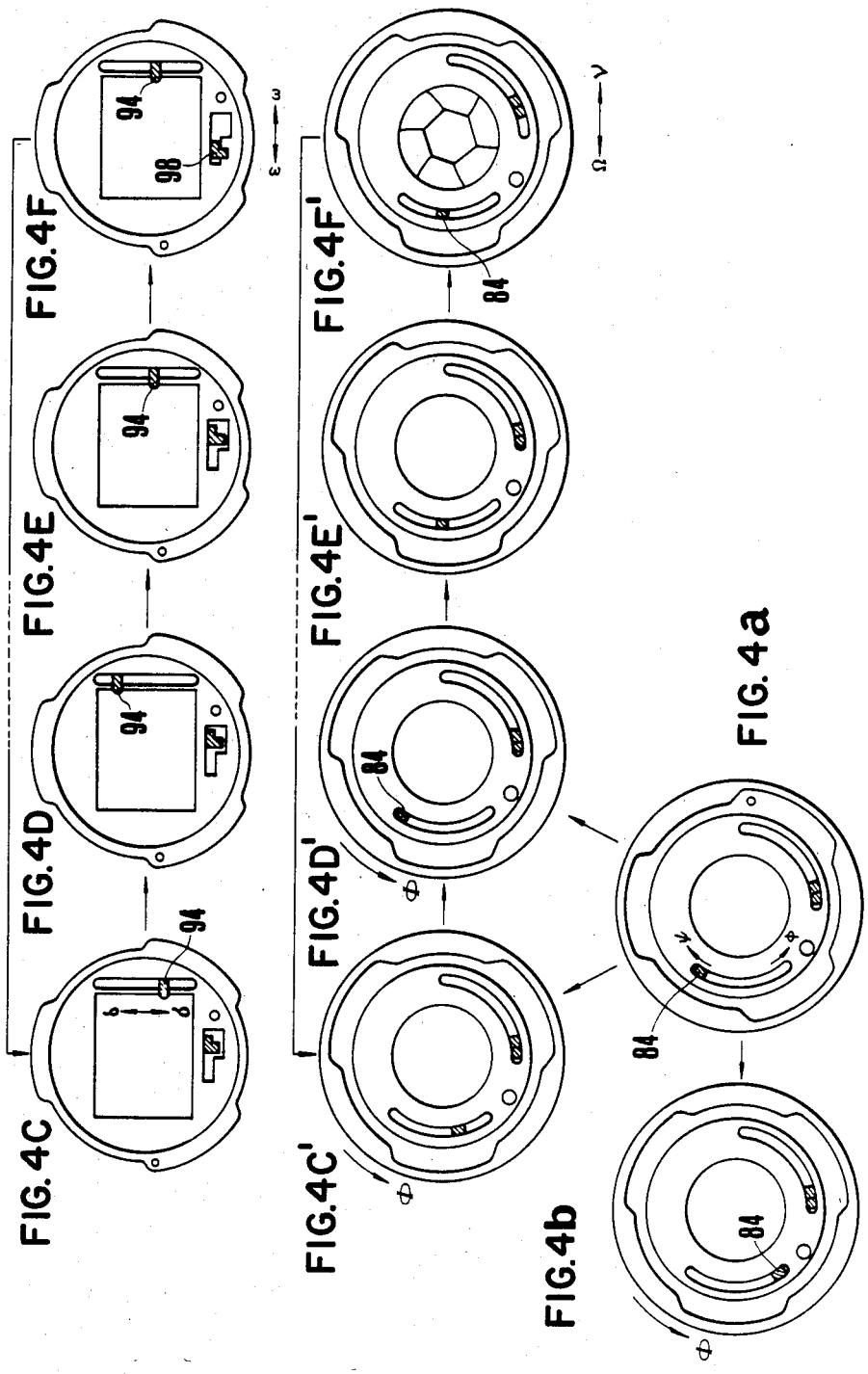

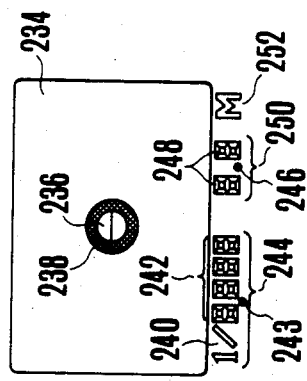
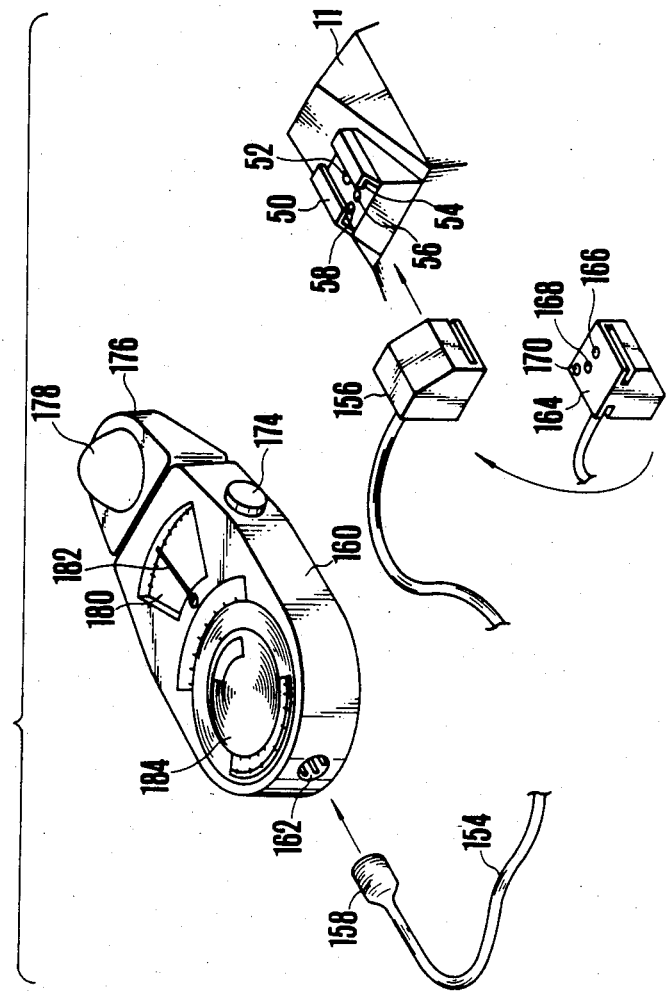

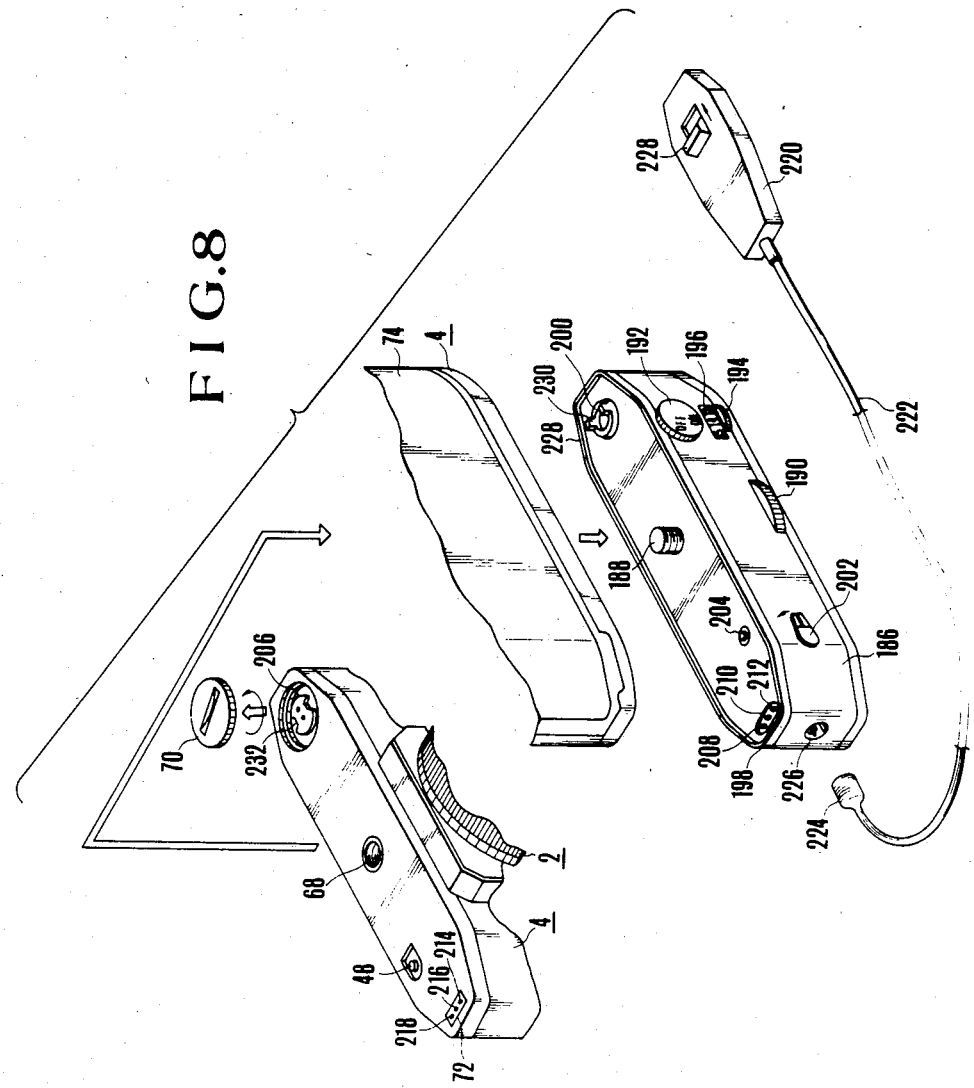

FIG.10(a)

| | ORDINARY DISPLAY | LOW BRIGHTNESS ALARM CLOCK | HIGH BRIGHTNESS ALARM CLOCK |
|---|---|---|---|
| AE PHOTOGRAPHY WITH PRIORITY ON SHUTTER TIME (I) | 1/2000 5.6 | 1/1000 3.4 | 1/15 2.2 |
| AE PHOTOGRAPHY WITH PRIORITY ON APERTURE VALUE (II) | 1/90 8.0 | 50 6.7 | 1/2000 3.5 |
| TOTALLY OPENED LIGHT MEASURING, MANUAL EXPOSURE ADJUSTMENT PHOTOGRAPHY (III) | 30 8.8 M | 1/250 8.2 M | 8 8.8 M |
| CLOSED DIAPHRAGM LIGHT MEASURING, AE PHOTOGRAPHY WITH PRIORITY ON APERTURE VALUE (IV) | 1/250 | 60 M | 1/2000 4.0 M |
| CLOSED DIAPHRAGM LIGHT MEASURING, MANUAL EXPOSURE ADJUSTMENT PHOTOGRAPHY (V) | 1/500 8 M | 1/8500 8 P.M | 1/5 8 L.M |

*-⌘- TWINKLING DISPLAY

FIG.10(b)

| BULB | MARK SELECTED (I) | bulb  1.8 |
|---|---|---|
|  | APERTURE MANUAL (II) | bulb  M |

FIG.10(c)

| SPEED LIGHT DEVICE IN AUTOMATIC LIGHT ADJUSTING MODE | | | | |
|---|---|---|---|---|
| FULL-AUTOMATIC | SHUTTER TIME | MARK SELECTED (I) | 1/60EF | 2.8 |
| | | APERTURE MANUAL (II) | 1/60EF | 4.0 M |
| | BULB | MARK SELECTED (III) | b EF | 5.6 |
| | | APERTURE MANUAL (VI) | b EF | 5.6 M |
| SEMI-AUTOMATIC | SHUTTER TIME | MARK SELECTED (V) | 1/15EF | 2.8 |
| | | APERTURE MANUAL (VI) | 1/15EF | 4.0 M |
| | BULB | MARK SELECTED (VII) | b EF | 5.6 |
| | | APERTURE MANUAL (VIII) | b EF | 5.6 M |

\*  - TWINKLING DISPLAY

FIG.10(d)

| SPEED LIGHT DEVICE IN TOTAL LIGHT AMOUNT ISSUING MODE | FULL-AUTOMATIC | SHUTTER TIME | MARK SELECTED (I) | 1/60EF | |
|---|---|---|---|---|---|
| | | | APERTURE MANUAL (II) | 1/60EF | M |
| | | BULB | MARK SELECTED (III) | b EF | |
| | | | APERTURE MANUAL (IV) | b EF | M |
| | SEMI-AUTOMATIC | SHUTTER TIME | MARK SELECTED (V) | 1/15EF | |
| | | | APERTURE MANUAL (VI) | 1/15EF | M |
| | | BULB | MARK SELECTED (VII) | b EF | |
| | | | APERTURE MANUAL (VIII) | b EF | M |

FIG.10(e)

| APERTURE MISSETTING | SCALE OUT AT SMALLEST APERTURE VALUE SIDE (I) | 1/250 | 8.8~ |
|---|---|---|---|
| | SCALE OUT AT LARGEST APERTURE VALUE SIDE (II) | 1/60 | 8 8 |

FIG.10(f)

| ALARM LOCK | -EEEE--E E- |
|---|---|

FIG.11(A)

| APERTURE SETTING RING 8 OF LENS DEVICE | EXCHANGE SWITCH 146 OF SPEED LIGHT DEVICE 384 | MODE SELECTOR ON CAMERA BODY 4 | MODE | OPERATION |
|---|---|---|---|---|
| APERTURE SETTING DIAL 708 OF SPEED LIGHT DEVICE 384 (APERTURE VALUE SELECTED) | FULL-AUTOMATIC (LIGHT DEVICE PRODUCING AUTOMATICALLY ADJUSTED LIGHT AMOUNT) | PRIORITY ON SHUTTER TIME | FULL-AUTOMATIC, AUTOMATIC LIGHT ADJUSTING, AUTOMATIC MODE | ○ SHUTTER TIME-SPEED LIGHT SYNCHRONIZATION TIME<br>○ SPEED LIGHT DEVICE-AUTOMATIC LIGHT ADJUSTING<br>○ APERTURE VALUE-AUTOMATIC CONTROL |
| | | PRIORITY ON APERTURE VALUE | | |
| | SEMI-AUTOMATIC | PRIORITY ON SHUTTER TIME | SEMI-AUTOMATIC, AUTOMATIC LIGHT ADJUSTING, AUTOMATIC MODE | ○ SHUTTER TIME-SPEED LIGHT SYNCHRONIZATION TIME OR LONGER<br>○ SPEED LIGHT DEVICE-AUTOMATIC LIGHT ADJUSTING<br>○ APERTURE VALUE-AUTOMATIC CONTROL |
| MARK 12 | FULL-AUTOMATIC | PRIORITY ON APERTURE VALUE | FULL-AUTOMATIC, AUTOMATIC LIGHT ADJUSTING, MANUAL MODE | ○ SHUTTER TIME-SPEED LIGHT SYNCHRONIZATION TIME<br>○ SPEED LIGHT DEVICE-AUTOMATIC LIGHT ADJUSTING<br>○ APERTURE VALUE-MANUALLY SET AT THE SIDE OF THE LENS DEVICE |
| | SEMI-AUTOMATIC | PRIORITY ON SHUTTER TIME | SEMI-AUTOMATIC, AUTOMATIC LIGHT ADJUSTING, MANUAL MODE | ○ SHUTTER TIME-SPEED LIGHT SYNCHRONIZATION TIME OR LONGER<br>○ SPEED LIGHT DEVICE-AUTOMATIC LIGHT ADJUSTING<br>○ APERTURE VALUE-MANUALLY SET AT THE SIDE OF THE LENS DEVICE |
| APERTURE VALUE SET (SPEED LIGHT DEVICE PRODUCING TOTAL LIGHT AMOUNT MANUAL SET) | FULL-AUTOMATIC | PRIORITY ON APERTURE VALUE | FULL-AUTOMATIC, TOTAL LIGHT AMOUNT, SMALLEST APERTURE MODE | ○ SHUTTER TIME-SPEED LIGHT SYNCHRONIZATION TIME<br>○ SPEED LIGHT DEVICE-TOTAL LIGHT AMOUNT<br>○ APERTURE VALUE-CONTROLLED TO THE SMALLEST APERTURE VALUE |
| | SEMI-AUTOMATIC | PRIORITY ON SHUTTER TIME | SEMI-AUTOMATIC, TOTAL LIGHT AMOUNT, SMALLEST APERTURE MODE | ○ SHUTTER TIME-SPEED LIGHT SYNCHRONIZATION TIME OR LONGER<br>○ SPEED LIGHT DEVICE-TOTAL LIGHT AMOUNT<br>○ APERTURE VALUE-CONTROLLED TO THE SMALLEST APERTURE VALUE |
| | FULL-AUTOMATIC | PRIORITY ON APERTURE VALUE | FULL-AUTOMATIC, TOTAL LIGHT AMOUNT, MANUAL MODE | ○ SHUTTER TIME-SPEED LIGHT SYNCHRONIZATION TIME<br>○ SPEED LIGHT DEVICE-TOTAL LIGHT AMOUNT<br>○ APERTURE VALUE-MANUALLY SET AT THE SIDE OF THE LENS DEVICE |
| | SEMI-AUTOMATIC | PRIORITY ON SHUTTER TIME | SEMI-AUTOMATIC, TOTAL LIGHT AMOUNT, MANUAL MODE | ○ SHUTTER TIME-SPEED LIGHT SYNCHRONIZATION TIME OR LONGER<br>○ SPEED LIGHT DEVICE-TOTAL LIGHT AMOUNT<br>○ APERTURE VALUE-MANUALLY SET AT THE SIDE OF THE LENS DEVICE |

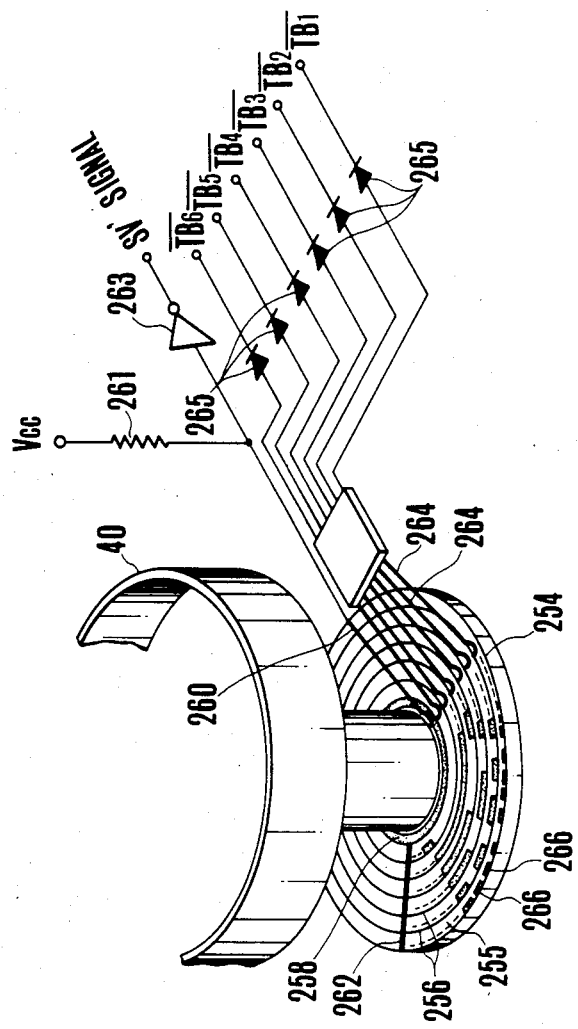

| DECIMAL | GREY CORD | | | | BINARY CORD | | | |
|---|---|---|---|---|---|---|---|---|
| 0  | 0 | 0 | 0 | 0 | 0 | 0 | 0 | 0 |
| 1  | 0 | 0 | 0 | 1 | 0 | 0 | 0 | 1 |
| 2  | 0 | 0 | 1 | 1 | 0 | 0 | 1 | 0 |
| 3  | 0 | 0 | 1 | 0 | 0 | 0 | 1 | 1 |
| 4  | 0 | 1 | 1 | 0 | 0 | 1 | 0 | 0 |
| 5  | 0 | 1 | 1 | 1 | 0 | 1 | 0 | 1 |
| 6  | 0 | 1 | 0 | 1 | 0 | 1 | 1 | 0 |
| 7  | 0 | 1 | 0 | 0 | 0 | 1 | 1 | 1 |
| 8  | 1 | 1 | 0 | 0 | 1 | 0 | 0 | 0 |
| 9  | 1 | 1 | 0 | 1 | 1 | 0 | 0 | 1 |
| 10 | 1 | 1 | 1 | 1 | 1 | 0 | 1 | 0 |
| 11 | 1 | 1 | 1 | 0 | 1 | 0 | 1 | 1 |
| 12 | 1 | 0 | 1 | 0 | 1 | 1 | 0 | 0 |
| 13 | 1 | 0 | 1 | 1 | 1 | 1 | 0 | 1 |
| 14 | 1 | 0 | 0 | 1 | 1 | 1 | 1 | 0 |
| 15 | 1 | 0 | 0 | 0 | 1 | 1 | 1 | 1 |

FIG.17
| J | K | Q |
|---|---|---|
| 1 | 1 | Q̄ |
| 0 | 0 | Q |
FIG.18
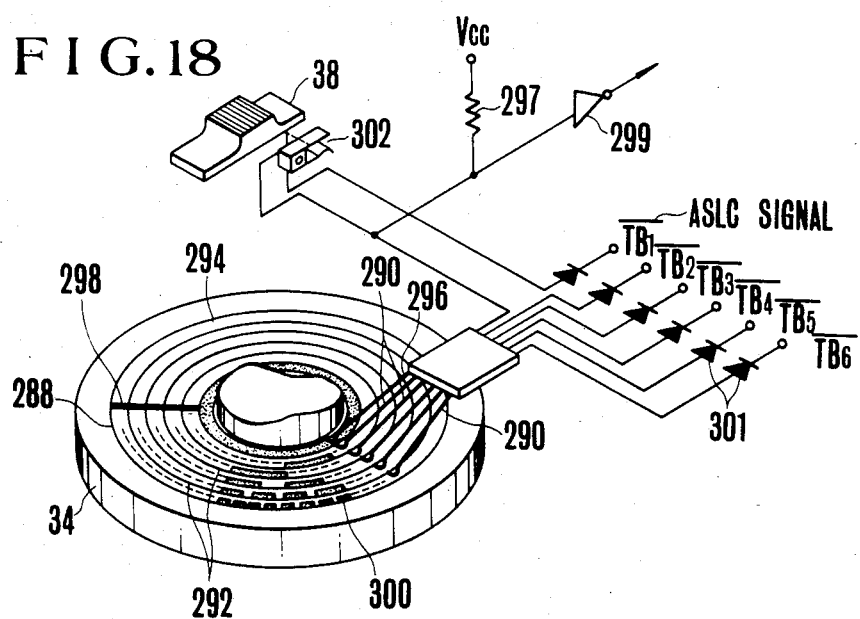
FIG.19
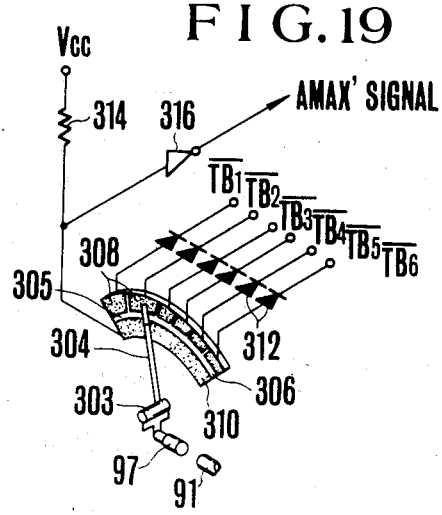

FIG.29

| MODE SELECTOR | APERTURE SETTING OF LENS DEVICE 8 | DIAPHRAGM CLOSING lEVER 64 | LIGHT MEASUREMENT | PHOTOGRAPHIC MODE | OPERATION | ROUTINE |
|---|---|---|---|---|---|---|
| PRIORITY ON APERTURE VALUE | MARK 12 SELECTED | OPENED | TTL | AE PHOTOGRAPHIC MODE WITH PRIORITY ON APERTURE VALUE | BVO+SV+AVO+AVC-AV-TV | FIRST ROUTINE |
| | | CLOSED | EXTERNAL | ALARM LOCK DUE TO THE MISOPERATION | | |
| | APERTURE SET | OPENED | TTL | TOTALLY OPENED TTL LIGHT MEASURING, MANUAL EXPOSURE ADJUSTMENT PHOTOGRAPHIC MODE (APERTURE PRIORITY AE MODE POSSIBLE) | BVO+SV+AVO+AVC-AV-TV | FIRST ROUTINE |
| | | | EXTERNAL | EXTERNAL LIGHT MEASURING, MANUAL EXPOSURE ADJUSTMENT PHOTOGRAPHIC MODE (APERTURE PRIORITY AE MODE POSSIBLE) | BV+SV-AV-TV | |
| | | CLOSED | TTL | CLOSED DIAPHRAGM LIGHT MEASURING AE PHOTOGRAPHIC MODE WITH PRIORITY ON APERTURE VALUE | BVC+SV-TV | SECOND ROUTINE |
| PRIORITY ON SHUTTER TIME | MARK 12 SELECTED | OPENED | TTL | AE PHOTOGRAPHIC MODE WITH PRIORITY ON SHUTTER TIME | BVO+SV+AVO+AVC-TV-AV | THIRD ROUTINE |
| | | CLOSED | EXTERNAL | ALARM LOCK DEU TO THE MISOPERATION | | |
| | APERTURE SET | OPENED | TTL | TOTALLY OPENED TTL LIGHT MEASURING, MANUAL EXPOSURE ADJUSTMENT PHOTOGRAPHIC MODE (APERTURE PRIORITY AE MODE POSSIBLE) | BVO+SV+AVO+AVC-TV-AV | THIRD ROUTINE |
| | | | EXTERNAL | EXTERNAL LIGHT MEASURING, MANUAL EXPOSURE ADJUSTMENT PHOTOGRAPHIC MODE (APERTURE PRIORITY AE MODE POSSIBLE) | BV+SV-TV-AV | |
| | | CLOSED | TTL | CLOSED DIAPHRAGM LIGHT MEASURING, MANUAL EXPOSURE ADJUSTMENT PHOTOGRAPHIC MODE | BVC+SV-TV | FOURTH ROUTINE |

| "0" (G1)<br>IN —⋈— OUT<br>"1" (G2) | "1" (G1)<br>IN —⋈— OUT<br>"0" (G2) |
|---|---|
| LOW<br>IMPEDANCE<br>INPUT — OUTPUT<br>(ON) | HIGH<br>IMPEDANCE<br>INPUT — OUTPUT<br>(OFF) |

FIG.47

| CU | AO | MEASURING | |
|---|---|---|---|
| 0 | 0 | LIGHT MEASURING PHOTOGRAPHY | TTL LIGHT MEASUREMENT |
| 0 | 1 | LIGHT MEASURING PHOTOGRAPHY | EXTERNAL LIGHT MEASUREMENT |
| 1 | 0 | SPEED LIGHT PHOTOGRAPHY | SEMI – AUTOMATIC |
| 1 | 1 | SPEED LIGHT PHOTOGRAPHY | FULL – AUTOMATIC |

| C | B | A | INHIBIT | DISABLE | Z |
|---|---|---|---------|---------|---|
| 0 | 0 | 0 | 0 | 0 | X0 |
| 0 | 0 | 1 | 0 | 0 | X1 |
| 0 | 1 | 0 | 0 | 0 | X2 |
| 0 | 1 | 1 | 0 | 0 | X3 |
| 1 | 0 | 0 | 0 | 0 | X4 |
| 1 | 0 | 1 | 0 | 0 | X5 |
| 1 | 1 | 0 | 0 | 0 | X6 |
| 1 | 1 | 1 | 0 | 0 | X7 |
| φ | φ | φ | 1 | 0 | 0 |
| φ | φ | φ | φ | 1 | HIGH IMPEDANCE |

φ = DON'T CARE

FIG.69A

| OP7 | | OP6 | | OP5 | | INSTRUCTION CODE INSTRUCTION | MEASURING |
|---|---|---|---|---|---|---|---|
| | | | | | | | |
| 0 | OPERATION | 0 | ADDITION | 0 | A REGISTER OFF | NOOP | NOTHING DONE INCLUDING CARRY RESET |
| | | | | 1 | A REGISTER ON | ADD | RESULT OF ADDITION FORWARDED TO A REGISTER |
| | | 1 | SUBTRACTION | 0 | A REGISTER OFF | LT | SUBTRACTION AND CARRY OBSERVED |
| | | | | 1 | A REGISTER ON | SUB | SUBTRACTION RESULT FORWARDED TO A REGISTER |
| 1 | DATA EXCHANGE | 0 | INVALID BY CARRY OFF | 0 | INVALID BY CARRY ON | NOOP2 | CARRY RESET BUT NOTHING DONE |
| | | | | 1 | VALID BY CARRY ON | SWC | DATA EXCHANGE IN PRESENCE OF CARRY |
| | | 1 | VALID BY CARRY OFF | 0 | INVALID BY CARRY ON | SWN | DATA EXCHANGE IN ABSENCE OF CARRY |
| | | | | 1 | VALID BY CARRY ON | SWU | DATA EXCHANGE BOTH IN PRESENCE AND ABSENCE OF CARRY |

FIG.69B

| OP4 | OP3 | OP2 | OP1 | OP0 | OPERAND | MEASURING |
|---|---|---|---|---|---|---|
| 0 (FIXED DATA) | 0 (FIXED DATA (I)) | 0 | 0 | 0 | CSTO | ALL BITS "0" |
| | | 0 | 0 | 1 | CSTC | "11100000" |
| | | 0 | 1 | 0 | CSTD | "11010000" |
| | | 0 | 1 | 1 | CSTE | "00011111" |
| | | 1 | 1 | 1 | CSTF | ALL BITS "1" |
| | 1 (FIXED DATA (II)) | 0 | 0 | 0 | TMIN | MINIMUM SHUTTER TIME |
| | | 0 | 0 | 1 | TMAX | MAXIMUM SHUTTER TIME |
| | | 0 | 1 | 0 | AMAX | MAX. APERTURE VALUE |
| | | 0 | 1 | 1 | TSYN | SPEED LIGHT SYNCHRONIZATION SHUTTER TIME |
| | | 1 | 0 | 0 | CST1 | CONSTANT 1 (ALL BITS "0") |
| | | 1 | 0 | 1 | CST2 | CONSTANT 2 (ALL BITS "0") |
| 1 (VARIABLE DATA) | 1 (INPUT DATA & REGISTER) | 0 | 0 | 0 | DR | CONTENT OF D REGISTER |
| | | 0 | 0 | 1 | DTSV | FILM SENSITIVITY |
| | | 0 | 1 | 0 | DTTV | SHUTTER TIME |
| | | 0 | 1 | 1 | DTAV | APERTURE VALUE |
| | | 1 | 0 | 0 | DTAO | APERTURE VALUE AT TOTALLY OPENED DIAPHRAGM |
| | | 1 | 0 | 1 | DTAC | VIGNETTING ERROR |
| | | 1 | 1 | 0 | BR | CONTENT OF B REGISTER |
| | | 1 | 1 | 1 | CR | CONTENT OF C REGISTER |

| ROM ADDRESS | INPUT ||||||||||| OUTPUT |||||||||||||||
|---|---|---|---|---|---|---|---|---|---|---|---|---|---|---|---|---|---|---|---|---|---|---|---|---|
| | PROGRAM CODE || ADDRESS CODE |||||| PROGRAM | ADDRESS || INSTRUCTION CODE |||||||| OPERAND CODE ||||| CONTENT ||
| | A7 | A6 A5 | A4 | A3 | A2 | A1 | A0 | OCTOMAL | DUOTRIDECIMAL | | OP7 | OP6 | OP5 | OP4 | OP3 | OP2 | OP1 | OP0 | | | | | | INSTRUCTION | OPERAND |
| 32 | | | | | | 0 | 0 | | 0 | | 0 | 0 | 0 | 1 | 1 | 1 | 0 | 1 | | | | | | SWU | DTAV |
| 33 | | | | | | 0 | 1 | | 1 | | 1 | 0 | 0 | 1 | 1 | 0 | 1 | 1 | | | | | | LT | DTAO |
| 34 | | | | | 0 | 1 | 0 | | 2 | | 0 | 1 | 0 | 0 | 1 | 1 | 0 | 0 | | | | | | SWG | DTAO |
| 35 | | | | | 0 | 1 | 1 | | 3 | | 1 | 1 | 0 | 1 | 1 | 0 | 1 | 1 | | | | | | LT | AMAX |
| 36 | | | | 0 | 1 | 0 | 0 | | 4 | | 0 | 1 | 1 | 0 | 1 | 0 | 0 | 0 | | | | | | SWN | AMAX |
| 37 | | | | 0 | 1 | 0 | 1 | | 5 | | 0 | 1 | 1 | 0 | 1 | 0 | 1 | 0 | | | | | | SWU | AMAX |
| 38 | | | | 0 | 1 | 1 | 0 | | 6 | | 0 | 0 | 0 | 1 | 0 | 1 | 0 | 0 | | | | | | ADD | BR |
| 39 | | | | 0 | 1 | 1 | 1 | | 7 | | 0 | 0 | 0 | 1 | 0 | 0 | 1 | 1 | | | | | | ADD | DISV |
| 40 | | | 1 | 0 | 0 | 0 | 0 | | 8 | | 0 | 0 | 0 | 1 | 0 | 1 | 1 | 0 | | | | | | ADD | DTAO |
| 41 | | | 1 | 0 | 0 | 0 | 1 | | 9 | | 0 | 0 | 0 | 0 | 1 | 1 | 1 | 1 | | | | | | NOOP | DTAC |
| 42 | | | 1 | 0 | 0 | 1 | 0 | | A | | 1 | 0 | 0 | 1 | 1 | 1 | 0 | 0 | | | | | | NOOP | * |
| 43 | | | 1 | 0 | 0 | 1 | 1 | | B | | 1 | 0 | 1 | 1 | 1 | 1 | 0 | 1 | | | | | | SWG | CSTF |
| 44 | | | 1 | 0 | 1 | 0 | 0 | | C | | 0 | 0 | 1 | 0 | 1 | 0 | 0 | 0 | | | | | | SUB | BR |
| 45 | | | 1 | 0 | 1 | 0 | 1 | | D | | 1 | 0 | 1 | 1 | 1 | 0 | 1 | 0 | | | | | | LT | TMN |
| 46 | | | 1 | 0 | 1 | 1 | 0 | | E | | 0 | 1 | 0 | 1 | 1 | 0 | 0 | 0 | | | | | | SWG | TMN |
| 47 | | | 1 | 0 | 1 | 1 | 1 | | F | | 1 | 1 | 0 | 1 | 1 | 0 | 0 | 1 | | | | | | LT | TMAX |
| 48 | | | 1 | 1 | 0 | 0 | 0 | | G | | 0 | 1 | 1 | 1 | 1 | 1 | 1 | 0 | | | | | | SWN | TMAX |
| 49 | | | 1 | 1 | 0 | 0 | 1 | | H | | 0 | 0 | 1 | 1 | 1 | 0 | 0 | 1 | | | | | | SWU | BR |
| 50 | | | 1 | 1 | 0 | 1 | 0 | | J | | 0 | 0 | 1 | 0 | 1 | 1 | 1 | 0 | | | | | | SUB | DTAO |
| 51 | | | 1 | 1 | 0 | 1 | 1 | | K | | 0 | 0 | 1 | 1 | 1 | 0 | 1 | 1 | | | | | | SWU | CR |
| 52 | | | 1 | 1 | 1 | 0 | 0 | | L | | 0 | 0 | 0 | 0 | 1 | 1 | 1 | 0 | | | | | | ADD | DTAO |
| 53 | | | 1 | 1 | 1 | 0 | 1 | | M | | 0 | 0 | 0 | 1 | 1 | 1 | 0 | 1 | | | | | | ADD | CR |
| 54 | 0 | | 1 | 1 | 1 | 1 | 0 | | N | | 0 | 0 | 0 | 0 | 0 | 1 | 0 | 0 | | | | | | NOOP | * |
| 55 | 0 | | 1 | 1 | 1 | 1 | 1 | | P | | 0 | 0 | 0 | 0 | 0 | 0 | 0 | 0 | | | | | | NOOP | * |
| 56 | 0 | 1 | 0 | 0 | 0 | 0 | 0 | | Q | | 0 | 0 | 0 | 0 | 0 | 0 | 0 | 0 | | | | | | NOOP | * |
| 57 | 0 | | 0 | 0 | 0 | 0 | 1 | | R | | 0 | 0 | 0 | 0 | 0 | 0 | 0 | 0 | | | | | | NOOP | * |
| 58 | 0 | | 0 | 0 | 0 | 1 | 0 | | S | | 0 | 0 | 0 | 0 | 0 | 0 | 0 | 0 | | | | | | NOOP | * |
| 59 | 0 | | 0 | 0 | 0 | 1 | 1 | | T | | 0 | 0 | 0 | 0 | 0 | 0 | 0 | 0 | | | | | | NOOP | * |
| 60 | 0 | | 0 | 0 | 1 | 0 | 0 | | U | | 0 | 0 | 0 | 0 | 0 | 0 | 0 | 0 | | | | | | NOOP | * |
| 61 | 0 | | 0 | 0 | 1 | 0 | 1 | | V | | 0 | 0 | 0 | 0 | 0 | 0 | 0 | 0 | | | | | | NOOP | * |
| 62 | 0 | | 0 | 0 | 1 | 1 | 0 | | W | | 0 | 0 | 0 | 0 | 0 | 0 | 0 | 0 | | | | | | NOOP | * |
| 63 | 0 | | 0 | 0 | 1 | 1 | 1 | | X | | 0 | 0 | 0 | 0 | 0 | 0 | 0 | 0 | | | | | | NOOP | * |

| ROM ADDRESS | INPUT | | | | | | | | | | OUTPUT | | | | | | | | | | | |
|---|---|---|---|---|---|---|---|---|---|---|---|---|---|---|---|---|---|---|---|---|---|---|
| | PROGRAM CODE | | | ADDRESS CODE | | | | PROGRAM | ADDRESS | INSTRUCTION CODE | | | | OPERAND CODE | | | | | CONTENT | |
| | A7 | A6 | A5 | A4 | A3 | A2 | A1 | A0 | OCTOMAL | DUOTRIDECIMAL | OP7 | OP6 | OP5 | OP4 | OP3 | OP2 | OP1 | OP0 | INSTRUCTION | OPERAND |
| 96 | 0 | 1 | 1 | 0 | 0 | 0 | 0 | 0 | 3 | 0 | 1 | 0 | 1 | 0 | 0 | 0 | 1 | 1 | SWU | CSTF |
| 97 | | | | | | | 0 | 1 | | 1 | 0 | 0 | 0 | 0 | 0 | 0 | 0 | 0 | NOOP | * |
| 98 | | | | | | 1 | 0 | 0 | | 2 | 0 | 0 | 0 | 0 | 0 | 0 | 0 | 0 | NOOP | * |
| 99 | | | | | | | 0 | 1 | | 3 | 0 | 0 | 0 | 0 | 0 | 0 | 0 | 0 | NOOP | * |
| 100 | | | | | 1 | 0 | 0 | 0 | | 4 | 0 | 1 | 1 | 0 | 0 | 0 | 1 | 0 | SWU | BR |
| 101 | | | | | | | 0 | 1 | | 5 | 0 | 1 | 1 | 0 | 0 | 0 | 1 | 0 | SWU | BR |
| 102 | | | | | | 1 | 0 | 0 | | 6 | 1 | 0 | 0 | 0 | 1 | 1 | 1 | 1 | ADD | DTSV |
| 103 | | | | | | | 0 | 1 | | 7 | 0 | 0 | 0 | 0 | 0 | 0 | 0 | 0 | NOOP | * |
| 104 | | | | 1 | 0 | 0 | 0 | 0 | | 8 | 0 | 0 | 0 | 0 | 0 | 0 | 0 | 0 | NOOP | * |
| 105 | | | | | | | 0 | 1 | | 9 | 0 | 0 | 0 | 0 | 0 | 0 | 0 | 0 | NOOP | * |
| 106 | | | | | | 1 | 0 | 0 | | A | 0 | 1 | 0 | 0 | 0 | 0 | 1 | 1 | SWC | CSTF |
| 107 | | | | | | | 0 | 1 | | B | 0 | 0 | 0 | 0 | 0 | 0 | 0 | 0 | NOOP | * |
| 108 | | | | | 1 | 0 | 0 | 0 | | C | 1 | 0 | 1 | 0 | 1 | 0 | 0 | 1 | LT | TMIN |
| 109 | | | | | | | 0 | 1 | | D | 0 | 1 | 0 | 0 | 1 | 0 | 0 | 1 | SWC | TMIN |
| 110 | | | | | | 1 | 0 | 0 | | E | 1 | 0 | 1 | 0 | 1 | 0 | 1 | 0 | LT | TMAX |
| 111 | | | | | | | 0 | 1 | | F | 0 | 1 | 1 | 0 | 1 | 0 | 1 | 0 | SWU | TMAX |
| 112 | 1 | 0 | 0 | 0 | 0 | 0 | 0 | 0 | | G | 0 | 1 | 1 | 0 | 0 | 0 | 1 | 0 | SWU | BR |
| 113 | | | | | | | 0 | 1 | | H | 1 | 0 | 0 | 1 | 0 | 1 | 0 | 1 | SUB | DTAO |
| 114 | | | | | | 1 | 0 | 0 | | I | 0 | 1 | 1 | 0 | 0 | 1 | 0 | 1 | SWU | CR |
| 115 | | | | | | | 0 | 1 | | J | 0 | 1 | 1 | 0 | 0 | 1 | 0 | 1 | SWU | DTAO |
| 116 | | | | | 1 | 0 | 0 | 0 | | K | 1 | 0 | 0 | 0 | 0 | 1 | 0 | 1 | ADD | CR |
| 117 | | | | | | | 0 | 1 | | L | 0 | 0 | 0 | 0 | 0 | 0 | 0 | 0 | NOOP | * |
| 118 | | | | | | 1 | 0 | 0 | | M | 0 | 0 | 0 | 0 | 0 | 0 | 0 | 0 | NOOP | * |
| 119 | | | | | | | 0 | 1 | | N | 0 | 0 | 0 | 0 | 0 | 0 | 0 | 0 | NOOP | * |
| 120 | | | | 1 | 0 | 0 | 0 | 0 | | P | 0 | 0 | 0 | 0 | 0 | 0 | 0 | 0 | NOOP | * |
| 121 | | | | | | | 0 | 1 | | Q | 0 | 0 | 0 | 0 | 0 | 0 | 0 | 0 | NOOP | * |
| 122 | | | | | | 1 | 0 | 0 | | R | 0 | 0 | 0 | 0 | 0 | 0 | 0 | 0 | NOOP | * |
| 123 | | | | | | | 0 | 1 | | S | 0 | 0 | 0 | 0 | 0 | 0 | 0 | 0 | NOOP | * |
| 124 | | | | | 1 | 0 | 0 | 0 | | T | 0 | 0 | 0 | 0 | 0 | 0 | 0 | 0 | NOOP | * |
| 125 | | | | | | | 0 | 1 | | U | 0 | 0 | 0 | 0 | 0 | 0 | 0 | 0 | NOOP | * |
| 126 | | | | | | 1 | 0 | 0 | | V | 0 | 0 | 0 | 0 | 0 | 0 | 0 | 0 | NOOP | * |
| 127 | | | | | | | 0 | 1 | | W | 0 | 0 | 0 | 0 | 0 | 0 | 0 | 0 | NOOP | * |

FIG. 70e

| ROM ADDRESS | PROGRAM CODE A7 A6 | ADDRESS CODE A5 A4 A3 A2 A1 A0 | PROGRAM (OCTONAL) | ADDRESS (DUOTRIDECIMAL) | INSTRUCTION CODE OP7 OP6 OP5 | OPERAND CODE OP4 OP3 OP2 OP1 OP0 | INSTRUCTION | OPERAND |
|---|---|---|---|---|---|---|---|---|
| 128 | | 0 0 0 0 0 0 | 4 | 0 | 1 1 1 | 0 0 0 0 1 | SWU | TSYM |
| 129 | | 0 0 0 0 0 1 | | 1 | 0 0 1 | 1 0 0 1 1 | LT | DTTV |
| 130 | | 0 0 0 0 1 0 | | 2 | 1 0 1 | 1 0 0 1 1 | SWC | DTTV |
| 131 | | 0 0 0 0 1 1 | | 3 | 0 0 0 | 0 0 0 0 0 | NOOP | * |
| 132 | | 0 0 0 1 0 0 | | 4 | 0 0 0 | 0 0 0 0 0 | NOOP | * |
| 133 | | 0 0 0 1 0 1 | | 5 | 1 1 1 | 1 0 1 1 1 | SWU | BR |
| 134 | | 0 0 0 1 1 0 | | 6 | 1 1 1 | 1 1 0 0 0 | SWU | DR |
| 135 | | 0 0 0 1 1 1 | | 7 | 0 0 0 | 0 0 0 0 0 | NOOP | * |
| 136 | | 0 0 1 0 0 0 | | 8 | 0 0 0 | 0 0 0 0 0 | NOOP | * |
| 137 | | 0 0 1 0 0 1 | | 9 | 0 0 0 | 0 0 0 0 0 | NOOP | * |
| 138 | | 0 0 1 0 1 0 | | A | 1 0 1 | 0 1 1 1 1 | SWC | CSTF |
| 139 | | 0 0 1 0 1 1 | | B | 0 1 1 | 1 0 0 0 0 | SUB | CSTZ |
| 140 | | 0 0 1 1 0 0 | | C | 0 0 1 | 1 0 1 0 0 | LT | DTAO |
| 141 | | 0 0 1 1 0 1 | | D | 1 0 1 | 1 0 1 0 0 | SWC | DTAO |
| 142 | | 0 0 1 1 1 0 | | E | 0 0 1 | 1 0 1 0 1 | LT | AMAX |
| 143 | | 0 0 1 1 1 1 | | F | 1 1 1 | 1 0 1 0 1 | SWU | AMAX |
| 144 | | 0 1 0 0 0 0 | | G | 0 0 0 | 0 0 0 0 0 | NOOP | * |
| 145 | | 0 1 0 0 0 1 | | H | 0 1 1 | 1 0 1 0 0 | SUB | DTAO |
| 146 | | 0 1 0 0 1 0 | | J | 1 1 1 | 1 1 0 0 1 | SWU | CR |
| 147 | | 0 1 0 0 1 1 | | K | 0 1 0 | 1 0 1 0 0 | ADD | DTAO |
| 148 | | 0 1 0 1 0 0 | | L | 0 0 0 | 0 0 0 0 0 | NOOP | CR |
| 149 | | 0 1 0 1 0 1 | | M | 0 0 0 | 0 0 0 0 0 | NOOP | * |
| 150 | | 0 1 0 1 1 0 | | N | 0 0 0 | 0 0 0 0 0 | NOOP | * |
| 151 | | 0 1 0 1 1 1 | | P | 0 0 0 | 0 0 0 0 0 | NOOP | * |
| 152 | | 0 1 1 0 0 0 | | Q | 0 0 0 | 0 0 0 0 0 | NOOP | * |
| 153 | | 0 1 1 0 0 1 | | R | 0 0 0 | 0 0 0 0 0 | NOOP | * |
| 154 | | 0 1 1 0 1 0 | | S | 0 0 0 | 0 0 0 0 0 | NOOP | * |
| 155 | | 0 1 1 0 1 1 | | T | 0 0 0 | 0 0 0 0 0 | NOOP | * |
| 156 | | 0 1 1 1 0 0 | | U | 0 0 0 | 0 0 0 0 0 | NOOP | * |
| 157 | | 0 1 1 1 0 1 | | V | 0 0 0 | 0 0 0 0 0 | NOOP | * |

FIG.70f

| ROM ADDRESS | INPUT | | | | | | | | | OUTPUT | | | | | | | | | | | |
|---|---|---|---|---|---|---|---|---|---|---|---|---|---|---|---|---|---|---|---|---|---|
| | PROGRAM CODE | ADDRESS CODE | | | | | PROGRAM | ADDRESS | INSTRUCTION CODE | | | | OPERAND CODE | | | | | CONTENT | |
| | A7 A6 | A5 | A4 | A3 | A2 | A1 | A0 | OCTOMAL | DUOTRIDECIMAL | OP7 | OP6 | OP5 | OP4 | OP3 | OP2 | OP1 | OP0 | INSTRUCTION | OPERAND |
| 160 | 1 0 | 0 | 0 | 0 | 0 | 0 | 0 | 5 | 0 | 0 | 0 | 0 | 0 | 1 | 0 | 1 | 1 | SWU | ISYN |
| 161 | | | | | | | 1 | | 1 | 0 | 0 | 0 | 0 | 0 | 0 | 0 | 0 | NOOP | * |
| 162 | | | | | | 1 | 0 | | 2 | 0 | 0 | 0 | 0 | 0 | 0 | 0 | 0 | NOOP | * |
| 163 | | | | | | 1 | 1 | | 3 | 0 | 0 | 0 | 0 | 0 | 0 | 0 | 0 | NOOP | * |
| 164 | | | | 1 | 0 | 0 | 0 | | 4 | 0 | 0 | 0 | 0 | 0 | 0 | 0 | 0 | NOOP | * |
| 165 | | | | | 0 | 0 | 1 | | 5 | 0 | 0 | 0 | 0 | 1 | 1 | 1 | 0 | SWU | BR |
| 166 | | | | | 0 | 1 | 0 | | 6 | 0 | 0 | 0 | 0 | 1 | 1 | 1 | 1 | SWU | CR |
| 167 | | | | | 0 | 1 | 1 | | 7 | 0 | 0 | 0 | 0 | 0 | 0 | 0 | 0 | NOOP | * |
| 168 | | | | | 1 | 0 | 0 | | 8 | 0 | 0 | 0 | 0 | 0 | 0 | 0 | 0 | NOOP | * |
| 169 | | | | | 1 | 0 | 1 | | 9 | 0 | 0 | 0 | 0 | 0 | 0 | 0 | 0 | NOOP | * |
| 170 | | | | | 1 | 1 | 0 | | A | 0 | 0 | 0 | 0 | 0 | 0 | 0 | 0 | NOOP | * |
| 171 | | | 1 | 0 | 0 | 0 | 0 | | B | 0 | 0 | 1 | 0 | 1 | 1 | 1 | 1 | SWG | CSIT |
| 172 | | | | | 0 | 0 | 1 | | C | 0 | 1 | 0 | 0 | 1 | 1 | 1 | 1 | SUB | CSIZ |
| 173 | | | | | 0 | 1 | 0 | | D | 0 | 0 | 1 | 1 | 0 | 1 | 0 | 1 | LT | DTAO |
| 174 | | | | | 0 | 1 | 1 | | E | 0 | 0 | 1 | 0 | 0 | 1 | 0 | 1 | SWG | DTAO |
| 175 | | | | | 1 | 0 | 0 | | F | 0 | 0 | 1 | 1 | 0 | 1 | 1 | 0 | LT | AMAN |
| 176 | | | | | 1 | 0 | 1 | | G | 0 | 0 | 1 | 0 | 0 | 1 | 1 | 0 | SWN | AMAX |
| 177 | | | | | 1 | 1 | 0 | | H | 0 | 0 | 0 | 0 | 0 | 0 | 0 | 0 | NOOP | * |
| 178 | | 1 | 0 | 0 | 0 | 0 | 0 | | I | 0 | 1 | 0 | 0 | 0 | 1 | 0 | 1 | SUB | DTAO |
| 179 | | | | | 0 | 0 | 1 | | J | 0 | 0 | 0 | 0 | 1 | 1 | 1 | 1 | SWU | CR |
| 180 | | | | | 0 | 1 | 0 | | K | 0 | 0 | 1 | 0 | 0 | 1 | 0 | 1 | SWN | DTAO |
| 181 | | | | | 0 | 1 | 1 | | L | 0 | 1 | 1 | 0 | 1 | 1 | 1 | 1 | ADD | CR |
| 182 | | | | | 1 | 0 | 0 | | M | 0 | 0 | 0 | 0 | 0 | 0 | 0 | 0 | NOOP | * |
| 183 | | | | | 1 | 0 | 1 | | N | 0 | 0 | 0 | 0 | 0 | 0 | 0 | 0 | NOOP | * |
| 184 | | | | | 1 | 1 | 0 | | P | 0 | 0 | 0 | 0 | 0 | 0 | 0 | 0 | NOOP | * |
| 185 | | | | 1 | 0 | 0 | 0 | | Q | 0 | 0 | 0 | 0 | 0 | 0 | 0 | 0 | NOOP | * |
| 186 | | | | | 0 | 0 | 1 | | R | 0 | 0 | 0 | 0 | 0 | 0 | 0 | 0 | NOOP | * |
| 187 | | | | | 0 | 1 | 0 | | S | 0 | 0 | 0 | 0 | 0 | 0 | 0 | 0 | NOOP | * |
| 188 | | | | | 0 | 1 | 1 | | T | 0 | 0 | 0 | 0 | 0 | 0 | 0 | 0 | NOOP | * |
| 189 | | | | | 1 | 0 | 0 | | U | 0 | 0 | 0 | 0 | 0 | 0 | 0 | 0 | NOOP | * |
| 190 | | | | | 1 | 0 | 1 | | V | 0 | 0 | 0 | 0 | 0 | 0 | 0 | 0 | NOOP | * |
| 191 | | | | | 1 | 1 | 0 | | W | 0 | 0 | 0 | 0 | 0 | 0 | 0 | 0 | NOOP | * |

FIG.70g

| ROM ADDRESS | PROGRAM CODE A7 A6 A5 | ADDRESS CODE A4 A3 A2 A1 A0 | INPUT PROGRAM OCTAL | INPUT ADDRESS DUOTRIDECIMAL | INSTRUCTION CODE OP7 OP6 OP5 | OPERAND CODE OP4 OP3 OP2 OP1 OP0 | OUTPUT CONTENT INSTRUCTION | OPERAND |
|---|---|---|---|---|---|---|---|---|
| 192 | | 0 0 0 0 0 0 | 6 | 0 | 1 0 1 | 0 1 1 1 1 | SWU | TSYM |
| 193 | | 0 0 0 0 0 1 | | 1 | 0 0 0 | 0 0 1 0 1 | LT | DITV |
| 194 | | 0 0 0 0 1 0 | | 2 | 1 0 1 | 0 1 1 0 1 | SWU | DITV |
| 195 | | 0 0 0 0 1 1 | | 3 | 0 1 0 | 1 0 1 0 1 | SMS | * |
| 196 | | 0 0 0 1 0 0 | | 4 | 0 0 0 | 0 0 0 0 0 | NOOP | * |
| 197 | | 0 0 0 1 0 1 | | 5 | 0 0 0 | 0 0 0 0 0 | NOOP | * |
| 198 | | 0 0 0 1 1 0 | | 6 | 1 0 1 | 0 0 0 0 0 | SWU | BR |
| 199 | | 0 0 0 1 1 1 | | 7 | 0 0 0 | 0 0 0 0 0 | NOOP | CSTF |
| 200 | | 0 0 1 0 0 0 | | 8 | 0 0 0 | 0 0 0 0 0 | NOOP | * |
| 201 | | 0 0 1 0 0 1 | | 9 | 0 0 0 | 0 0 0 0 0 | NOOP | * |
| 202 | | 0 0 1 0 1 0 | | A | 0 0 0 | 0 0 0 0 0 | NOOP | * |
| 203 | | 0 0 1 0 1 1 | | B | 0 0 0 | 0 0 0 0 0 | NOOP | * |
| 204 | | 0 0 1 1 0 0 | | C | 0 0 0 | 0 0 0 0 0 | NOOP | * |
| 205 | | 0 0 1 1 0 1 | | D | 0 0 0 | 0 0 0 0 0 | NOOP | * |
| 206 | | 0 0 1 1 1 0 | | E | 0 0 0 | 0 0 0 0 0 | NOOP | * |
| 207 | | 0 0 1 1 1 1 | | F | 0 0 0 | 0 1 1 1 1 | LT | CSTO |
| 208 | | 0 1 0 0 0 0 | | G | 1 0 1 | 0 0 0 0 0 | SWH | AMAX |
| 209 | | 0 1 0 0 0 1 | | H | 0 0 0 | 0 0 0 0 0 | NOOP | * |
| 210 | | 0 1 0 0 1 0 | | J | 0 1 1 | 0 0 0 0 1 | SUB | DTAO |
| 211 | | 0 1 0 0 1 1 | | K | 1 0 1 | 0 0 1 1 1 | SWU | CR |
| 212 | | 0 1 0 1 0 0 | | L | 0 1 0 | 0 0 0 0 1 | ADD | DTAO |
| 213 | | 0 1 0 1 0 1 | | M | 0 0 0 | 0 0 1 1 1 | NOOP | CR |
| 214 | | 0 1 0 1 1 0 | | N | 0 0 0 | 0 0 0 0 0 | NOOP | * |
| 215 | | 0 1 0 1 1 1 | | P | 0 0 0 | 0 0 0 0 0 | NOOP | * |
| 216 | | 0 1 1 0 0 0 | | Q | 0 0 0 | 0 0 0 0 0 | NOOP | * |
| 217 | | 0 1 1 0 0 1 | | R | 0 0 0 | 0 0 0 0 0 | NOOP | * |
| 218 | | 0 1 1 0 1 0 | | S | 0 0 0 | 0 0 0 0 0 | NOOP | * |
| 219 | | 0 1 1 0 1 1 | | T | 0 0 0 | 0 0 0 0 0 | NOOP | * |
| 220 | | 0 1 1 1 0 0 | | U | 0 0 0 | 0 0 0 0 0 | NOOP | * |
| 221 | | 0 1 1 1 0 1 | | V | 0 0 0 | 0 0 0 0 0 | NOOP | * |
| 222 | | 0 1 1 1 1 0 | | W | 0 0 0 | 0 0 0 0 0 | NOOP | * |
| 223 | | 0 1 1 1 1 1 | | Y | 0 0 0 | 0 0 0 0 0 | NOOP | * |

FIG.7Oh

| ROM ADDRESS | INPUT | | | | | | | | | | OUTPUT | | | | | | | | | | | | | | |
|---|---|---|---|---|---|---|---|---|---|---|---|---|---|---|---|---|---|---|---|---|---|---|---|---|---|
| | PROGRAM CODE | ADDRESS CODE | | | | | PROGRAM | ADDRESS | | INSTRUCTION CODE | | | | OPERAND CODE | | | | | | CONTENT | |
| | A7 A6 | A5 | A4 | A3 | A2 | A1 | A0 | OCTOMAL | DUOTRIDECIMAL | OP7 | OP6 | OP5 | OP4 | OP3 | OP2 | OP1 | OP0 | INSTRUCTION | OPERAND |
| 224 | | | | | | 0 | 0 | | 0 | 0 | 1 | 1 | 0 | 0 | 0 | 1 | 1 | SWU | TSYN |
| 225 | | | | | | | 1 | | 1 | 0 | 0 | 0 | 0 | 0 | 0 | 0 | 0 | NOOP | * |
| 226 | | | | | 0 | 1 | 0 | | 2 | 0 | 0 | 0 | 0 | 0 | 0 | 0 | 0 | NOOP | * |
| 227 | | | | | | | 1 | | 3 | 0 | 0 | 0 | 0 | 0 | 0 | 0 | 0 | NOOP | * |
| 228 | | | | 0 | 1 | 0 | 0 | | 4 | 0 | 1 | 1 | 0 | 0 | 1 | 0 | 1 | SWU | BR |
| 229 | | | | | | | 1 | | 5 | 0 | 1 | 1 | 0 | 0 | 1 | 1 | 1 | SWU | CSTF |
| 230 | | | | | 1 | 1 | 0 | | 6 | 0 | 0 | 0 | 0 | 0 | 0 | 0 | 0 | NOOP | * |
| 231 | | | | | | | 1 | | 7 | 0 | 0 | 0 | 0 | 0 | 0 | 0 | 0 | NOOP | * |
| 232 | | 1 | | 1 | 0 | 0 | 0 | | 8 | 0 | 0 | 0 | 0 | 0 | 0 | 0 | 0 | NOOP | * |
| 233 | | | | | | | 1 | | 9 | 0 | 0 | 0 | 0 | 0 | 0 | 0 | 0 | NOOP | * |
| 234 | | | | | 0 | 1 | 0 | | A | 0 | 0 | 0 | 0 | 0 | 0 | 0 | 0 | NOOP | * |
| 235 | | | | | | | 1 | | B | 0 | 0 | 0 | 0 | 0 | 0 | 0 | 0 | NOOP | * |
| 236 | | | | 1 | 0 | 0 | 0 | | C | 0 | 0 | 0 | 0 | 0 | 0 | 0 | 0 | NOOP | * |
| 237 | | | | | | | 1 | | D | 0 | 0 | 0 | 0 | 0 | 0 | 0 | 0 | NOOP | * |
| 238 | | | | | | 1 | 0 | | E | 0 | 0 | 0 | 0 | 0 | 0 | 0 | 0 | NOOP | * |
| 239 | | | | | | | 1 | 7 | F | 1 | 0 | 0 | 1 | 1 | 0 | 0 | 0 | LI | CSTO |
| 240 | | | 1 | 0 | 0 | 0 | 0 | | G | 0 | 1 | 1 | 1 | 1 | 1 | 0 | 1 | SWM | AMAX |
| 241 | | | | | | | 1 | | H | 0 | 0 | 0 | 0 | 0 | 0 | 0 | 0 | NOOP | * |
| 242 | | | | | 0 | 1 | 0 | | J | 0 | 1 | 1 | 1 | 1 | 1 | 1 | 1 | SUB | DTAO |
| 243 | | | | | | | 1 | | K | 0 | 1 | 1 | 1 | 1 | 1 | 1 | 1 | SWU | CR |
| 244 | | | | 1 | 0 | 0 | 0 | | L | 0 | 1 | 1 | 1 | 1 | 1 | 1 | 1 | ADD | DTAO |
| 245 | | | | | | | 1 | | M | 0 | 1 | 1 | 1 | 1 | 1 | 1 | 1 | NOOP | CR |
| 246 | | | | | | 1 | 0 | | N | 0 | 0 | 0 | 0 | 0 | 0 | 0 | 0 | NOOP | * |
| 247 | | | | | | | 1 | | O | 0 | 0 | 0 | 0 | 0 | 0 | 0 | 0 | NOOP | * |
| 248 | | | | | 1 | 0 | 0 | | P | 0 | 0 | 0 | 0 | 0 | 0 | 0 | 0 | NOOP | * |
| 249 | | | | | | | 1 | | Q | 0 | 0 | 0 | 0 | 0 | 0 | 0 | 0 | NOOP | * |
| 250 | | | | | 0 | 1 | 0 | | R | 0 | 0 | 0 | 0 | 0 | 0 | 0 | 0 | NOOP | * |
| 251 | | | | | | | 1 | | S | 0 | 0 | 0 | 0 | 0 | 0 | 0 | 0 | NOOP | * |
| 252 | | | | 1 | 0 | 0 | 0 | | T | 0 | 0 | 0 | 0 | 0 | 0 | 0 | 0 | NOOP | * |
| 253 | | | | | | | 1 | | U | 0 | 0 | 0 | 0 | 0 | 0 | 0 | 0 | NOOP | * |
| 254 | | | | | | 1 | 0 | | V | 0 | 0 | 0 | 0 | 0 | 0 | 0 | 0 | NOOP | * |
| 255 | | | | | | | 1 | | W | 0 | 0 | 0 | 0 | 0 | 0 | 0 | 0 | NOOP | * |

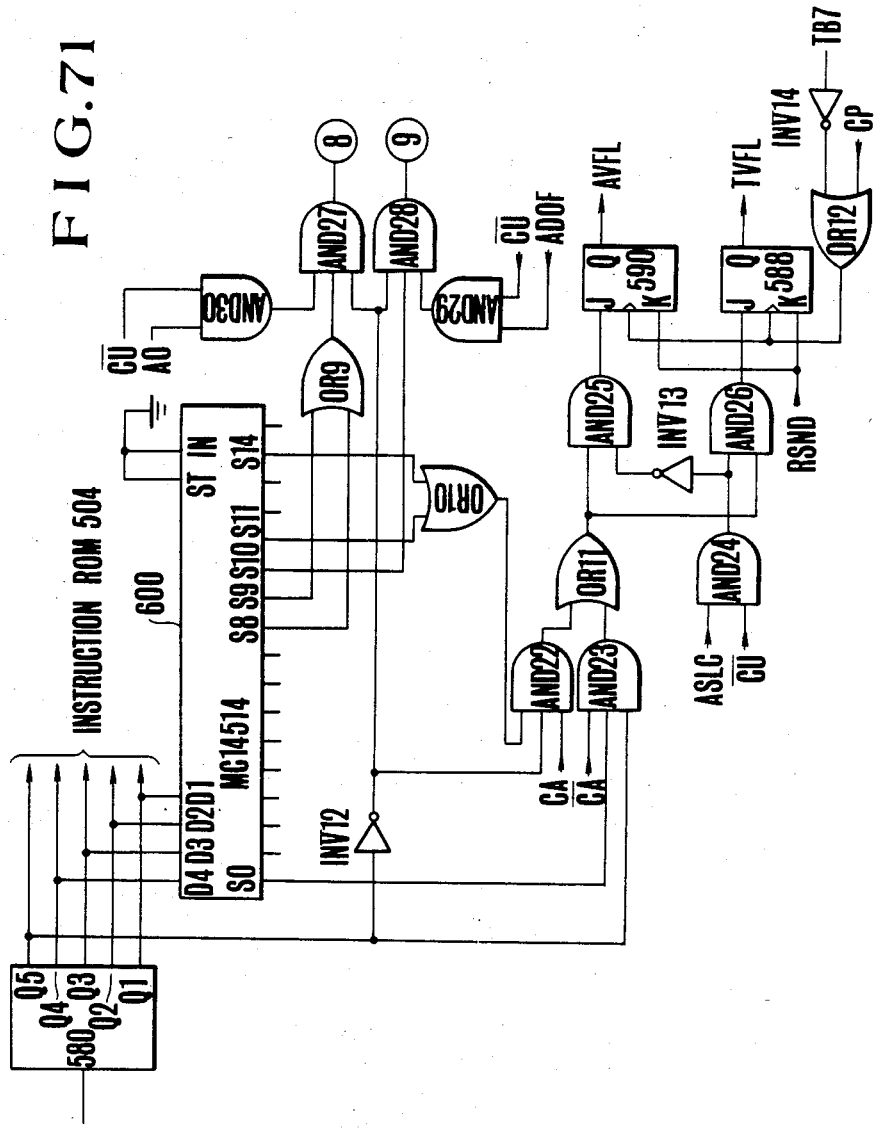

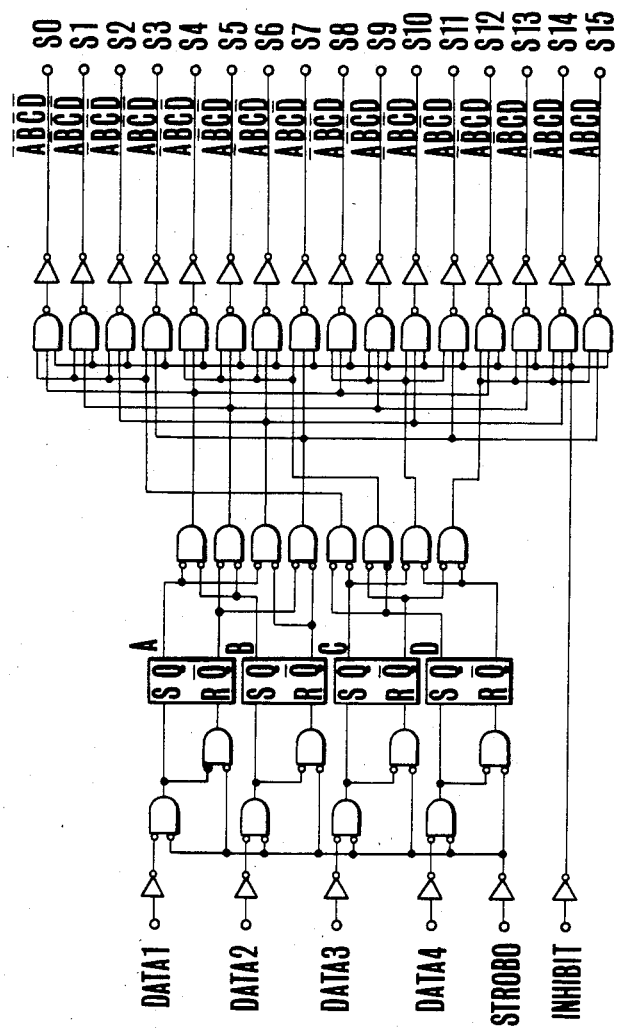
F I G. 73

| TIMING PULSE<br>BAS LINE | TB0 | TB1 | TB2 | TB3 | TB4 | TB5 | TB6 | TB7 |
|---|---|---|---|---|---|---|---|---|
| BAS LINE 366 | 0 | 0 | 0 | 0 | 1 | CALE | ADCE | INTG |
| INPUT BAS LINE 370 | — | ADOF | AELK | AECG | WNUP | A0 | CU | — |
| OUTPUT BAS LINE 374 | — | WNUP | TVFL | AVFL | EDSP | BDSP | EFDS | MDSP |
| TV, AV, AV0, AVs, DD, | 1/8 | 1/4 | 1/2 | 1 | 2 | 4 | 8 | 16 |

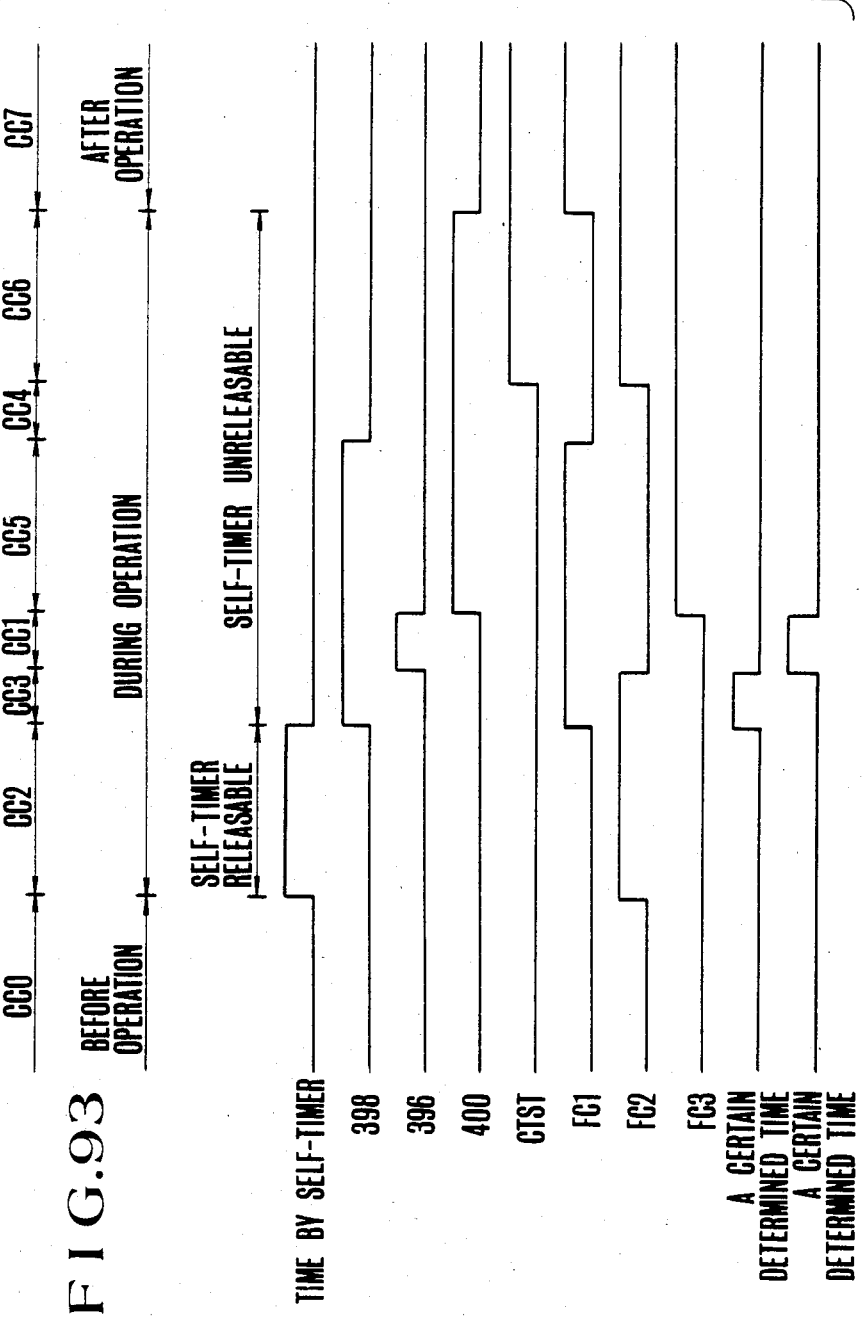

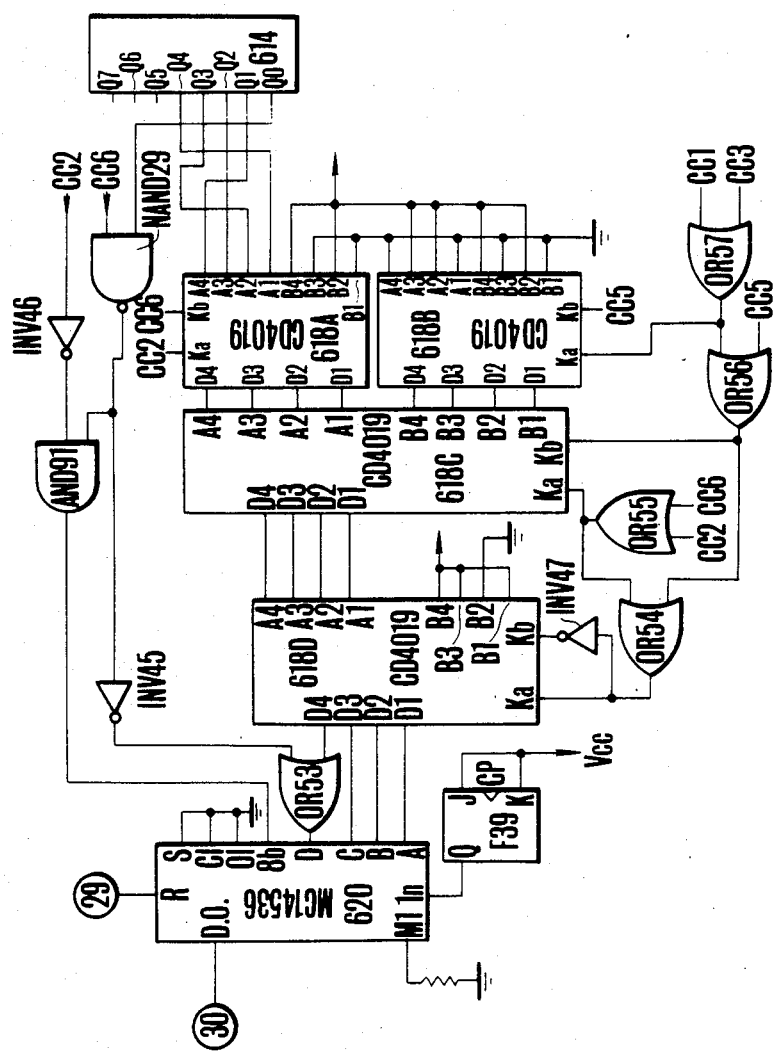
F I G. 94

FIG. 99

| 16 | 8 | 4 | 2 | 1 | 1/2 | 1/4 | 1/8 | BV (APEX) | SV (ASA) | TV (SHUTTER TIME) | AV, AVo AMAX (F-NO.) | EV (APEX) | ADC INPUT (V) | APERTURE VALUE SET FROM SPEED LIGHT SIDE (F-NO.) |
|---|---|---|---|---|---|---|---|---|---|---|---|---|---|---|
| 0 | 0 | 0 | 0 | 0 | | | 0 | | 12 | bulb | □ P | | | |
| 0 | 0 | 0 | 0 | 0 | | | 1 | -8 | | | □ □ | | 2.550 | |
| 0 | 0 | 0 | 0 | 1 | | | 0 | | 24 | | □ □ | | | |
| 0 | 0 | 0 | 0 | 1 | | | 1 | -7 | | | □ □ | | 2.475 | |
| 0 | 0 | 0 | 1 | 0 | | | 0 | | 50 | | 1.2 | | | |
| 0 | 0 | 0 | 1 | 0 | | | 1 | -6 | | | 1.4 | | 2.400 | |
| 0 | 0 | 0 | 1 | 1 | | | 0 | | 100 | | 1.8 | | | |
| 0 | 0 | 0 | 1 | 1 | | | 1 | -5 | | | 2.0 | | 2.325 | |
| 0 | 0 | 1 | 0 | 0 | | | 0 | | 200 | 64 | 2.5 | | | |
| 0 | 0 | 1 | 0 | 0 | | | 1 | -4 | | | 2.8 | | 2.250 | |
| 0 | 0 | 1 | 0 | 1 | | | 0 | | 400 | 32 | 3.5 | | | |
| 0 | 0 | 1 | 0 | 1 | | | 1 | -3 | | | 4.0 | | 2.175 | |
| 0 | 0 | 1 | 1 | 0 | | | 0 | | 800 | 16 | 4.5 | | | |
| 0 | 0 | 1 | 1 | 0 | | | 1 | -2 | | | 5.6 | -5 | 2.100 | |
| 0 | 0 | 1 | 1 | 1 | | | 0 | | 1600 | 8 | 6.3 | | | |
| 0 | 0 | 1 | 1 | 1 | | | 1 | -1 | | | 8.0 | -4 | 2.025 | |
| 0 | 1 | 0 | 0 | 0 | | | 0 | | 3200 | 4 | 9.5 | | | |
| 0 | 1 | 0 | 0 | 0 | | | 1 | 0 | | | 11 | -3 | 1.950 | |
| 0 | 1 | 0 | 0 | 1 | | | 0 | | 6400 | 2 | 13 | | | |
| 0 | 1 | 0 | 0 | 1 | | | 1 | 1 | | | 16 | -2 | 1.875 | |
| 0 | 1 | 0 | 1 | 0 | | | 0 | | 12800 | 1 | 19 | | | |
| 0 | 1 | 0 | 1 | 0 | | | 1 | 2 | | | 22 | -1 | 1.800 | |
| 0 | 1 | 0 | 1 | 1 | | | 0 | | | 1/2 | | | | |
| 0 | 1 | 0 | 1 | 1 | | | 1 | 3 | | | | 0 | 1.725 | |
| 0 | 1 | 1 | 0 | 0 | | | 0 | | | 1/4 | | | | |
| 0 | 1 | 1 | 0 | 0 | | | 1 | 4 | | | | 1 | 1.650 | |
| 0 | 1 | 1 | 0 | 1 | | | 0 | | | 1/8 | | | | |
| 0 | 1 | 1 | 0 | 1 | | | 1 | 5 | | | | 2 | 1.575 | |
| 0 | 1 | 1 | 1 | 0 | | | 0 | | | 1/16 | | | | |
| 0 | 1 | 1 | 1 | 0 | | | 1 | 6 | | | | 3 | 1.500 | 1.0 |
| 0 | 1 | 1 | 1 | 1 | | | 0 | | | 1/30 | | | | |
| 0 | 1 | 1 | 1 | 1 | | | 1 | 7 | | | | 4 | 1.425 | 1.4 |
| 1 | 0 | 0 | 0 | 0 | | | 0 | | | 1/60 | | | | |
| 1 | 0 | 0 | 0 | 0 | | | 1 | 8 | | | | 5 | 1.350 | 2.0 |
| 1 | 0 | 0 | 0 | 1 | | | 0 | | | 1/125 | | | | |
| 1 | 0 | 0 | 0 | 1 | | | 1 | 9 | | | | 6 | 1.275 | 2.8 |
| 1 | 0 | 0 | 1 | 0 | | | 0 | | | 1/250 | | | | |
| 1 | 0 | 0 | 1 | 0 | | | 1 | 10 | | | | 7 | 1.200 | 4.0 |
| 1 | 0 | 0 | 1 | 1 | | | 0 | | | 1/500 | | | | |
| 1 | 0 | 0 | 1 | 1 | | | 1 | 11 | | | | 8 | 1.125 | 5.6 |
| 1 | 0 | 1 | 0 | 0 | | | 0 | | | 1/1000 | | | | |
| 1 | 0 | 1 | 0 | 0 | | | 1 | 12 | | | | 9 | 1.050 | 8.0 |
| 1 | 0 | 1 | 0 | 1 | | | 0 | | | 1/2000 | | | | |
| 1 | 0 | 1 | 0 | 1 | | | 1 | 13 | | | | 10 | 0.975 | 11 |
| 1 | 0 | 1 | 1 | 0 | | | 0 | | | | | | | |
| 1 | 0 | 1 | 1 | 0 | | | 1 | 14 | | | | 11 | 0.900 | 16 |
| 1 | 0 | 1 | 1 | 1 | | | 0 | | | | | | | |
| 1 | 0 | 1 | 1 | 1 | | | 1 | 15 | | | | 12 | 0.825 | 22 |
| 1 | 1 | 0 | 0 | 0 | | | 0 | | | | | | | |
| 1 | 1 | 0 | 0 | 0 | | | 1 | 16 | | | | 13 | 0.750 | 32 |
| 1 | 1 | 0 | 0 | 1 | | | 0 | | | | | | | |
| 1 | 1 | 0 | 0 | 1 | | | 1 | 17 | | | | 14 | 0.675 | 45 |
| 1 | 1 | 0 | 1 | 0 | | | 0 | | | | | | | |
| 1 | 1 | 0 | 1 | 0 | | | 1 | 18 | | | | 15 | 0.600 | |
| 1 | 1 | 0 | 1 | 1 | | | 0 | | | | | | | |
| 1 | 1 | 0 | 1 | 1 | | | 1 | 19 | | | | 16 | 0.525 | |
| 1 | 1 | 1 | 0 | 0 | | | 0 | | | | | | | |
| 1 | 1 | 1 | 0 | 0 | | | 1 | 20 | | | | 17 | 0.450 | |
| 1 | 1 | 1 | 0 | 1 | | | 0 | | | | | | | |
| 1 | 1 | 1 | 0 | 1 | | | 1 | 21 | | | | 18 | 0.375 | |
| 1 | 1 | 1 | 1 | 0 | | | 0 | | | | | | | |
| 1 | 1 | 1 | 1 | 0 | | | 1 | 22 | | | | 19 | 0.300 | |
| 1 | 1 | 1 | 1 | 1 | | | 0 | | | | cL | | | |
| 1 | 1 | 1 | 1 | 1 | | | 1 | 23 | | | | 20 | 0.225 | |

FIG. 100

| APERTURE VALUE OF TOTALLY OPENED DIAPHRAGM AVo | VIGNETTING ERROR AVc IN BINARY CODE | | | | | | | |
|---|---|---|---|---|---|---|---|---|
| | 16 | 8 | 4 | 2 | 1 | 1/2 | 1/4 | 1/8 |
| 1.2 | 0 | 0 | 0 | 0 | 1 | 0 | 1 | 0 |
| 1.4 | 0 | 0 | 0 | 0 | 1 | 0 | 0 | 0 |
| 1.8 | 0 | 0 | 0 | 0 | 0 | 1 | 1 | 0 |
| 2.0 | 0 | 0 | 0 | 0 | 0 | 1 | 0 | 0 |
| 2.5 | 0 | 0 | 0 | 0 | 0 | 0 | 1 | 0 |
| 2.8 | 0 | 0 | 0 | 0 | 0 | 0 | 0 | 0 |

F I G.101

CAMERA SYSTEM

BACKGROUND OF THE INVENTION

1. Field of the Invention

This is a continuation of application Ser. No. 680,366, filed Dec. 11, 1984, which in turn is a continuation of application Ser. No. 216,070, filed Dec. 11, 1980, which in turn is a continuation of application Ser. No. 737,771, filed Nov. 1, 1976.

The present invention relates to a camera system, particularly to a superior camera system which meets various sufficiently high and wide requirements placed to the camera.

2. Description of the Prior Art

When we think of a camera device for taking a picture, the photographic system as total system can not be disregarded. What is called the photographic system here is the combination of the five elements, namely the object system, the projection system, the recording system, the adjusting system and the observation system.

It is well known that each of the above mentioned system makes an important factor for constituting the photographic system. Hereby the object system means the things for making the photographic object, which is generally called the object to be photographed. This includes all of the object field appearing on the picture plane. Further the projection system serves to form the optical image of the above mentioned object system on the next recording system, including the two system, namely the optical system including lenses and the body system including various mechanisms. Then the recording system is the one for recording the optical image formed by means of the above mentioned projection system in a form in accordance with the purpose, whereby in case of the ordinary photographic system the image generally assumes the form of the optical image so as to be visualized, while depending upon the purpose the image assumes, the form of the relief. Further even in case of the visualized image, other light sensing means than the so called photographic light sensitive material participates in many cases so that it is also possible to think of an image system with the recording system as center. The adjusting system means the process for completing the most effective photographic image for the next last observation system out of the recording system, by adding some energy to the fixed image obtained in the above mentioned recording system. Further the observation system means for completing the photographic image obtained through the above mentioned adjusting system as human visual phenomenon.

Hereby the important system for constituting the ordinary camera device is the projection system, whereby the control operation of this projection system has something important to do with the object system, the recording system, the adjusting system and the observation system, being greatly influenced by means of the information or the fed back informations from these systems. In consequence the camera device often means the above mentioned projection system, whereby it would be essential to establish a total system as effective photographic system, taking the connections with other system sufficiently into consideration, in order to constitute the camera device.

When such a camera device is thought of from the view point of the photographic work on the actual spot, the problem of the operability which has one of the most important connection with the photographer who is the subject of the projection system should be pointed out beside the problem of the optical and the mechanical precision, or of the efficiency.

The projection system, namely the camera device can, as has already been explained, be divided into two systems, namely the optical system and the body system, whereby their efficiencies are different in accordance with the kinds of the camera device. Now in case of the ordinary single reflex camera as one example, the optical system includes the focusing efficiency and the aperture adjusting efficiency while the body system includes the shutter efficiency and the finder efficiency. These functions have an important relation with the operability of the camera device with respect to the aperture value deciding operation, the exposure time deciding operation, the focal distance deciding operation, the framing operation and so on.

Out of the above mentioned operations, the operation for deciding the aperture value and that for deciding the exposure time are mutually connected as the operations for deciding the exposure amount, while they have different effects for deciding the exposure conditions so that it is necessary to operate them, selecting them properly. To explain more in detail at the time of taking a picture the shutter is operated after the focusing operation, the framing operation and the exposure deciding operation, whereby it is general to control the aperture value and the shutter speed in order to control the exposure. However, the original purpose for controlling the aperture value is to decide the object field depth, namely the aperture value should be selected in order to obtain the standing out effect of the main object by making use of the out-focusing effect. On the other hand, the shutter speed should be selected to prevent the vibration of the camera or on the contrary to give a proper movement so as to obtain an emotional picture. Namely at the time of taking a picture it is thought that the aperture value and the shutter speed are the variables to be selected independently from each other.

Now let us think of a camera device consisting of the combination of a lens with a diaphragm mechanism whose F-value varies from $F_1$ (APEX value: $AV=0$) to F32 (APEX value: $AV=10$), namely an optical system, with a body with a shutter mechanism whose shutter time varies from 1 sec. (APEX value: $TV=0$) to 1/2000 sec. (APEX value: $TV=11$), namely a body system. Then the control range of the exposure amount covers altogether 22 steps, ranging from the exposure amount $EV=0$ whereby the F-number is 1, while the shutter time is 1 sec. to the exposure amount $EV=21$ whereby the F-number is 32, while the shutter time is 1/2000 sec. On the other hand there are 11 steps in the F-numbers while there are 12 steps in the shutter time so that the number of their combination amounts to 132 altogether. Despite of the 132 kinds of the combination, the variation of the exposure amount is summarized into 22 steps as has already been explained, when only the exposure amount is taken into consideration, whereby, however, in the photographic system the aperture value and the shutter time have an efficiency quite independent from each other especially for the photographic image in the observation system so that they have to be selected in a proper way.

On the other hand, the exposure amount is a factor having a very important relation with all of the systems in the photographic system, more particularly in form of the brightness with the object system, in form of the selection of the aperture value and the shutter speed with the projection system, in form of the sensitivity with the recording system, in form of the increase respectively decrease of the sensitivity with the adjustment system and in form of the tone of the photographic image such as high key tone, low key tone with the observation system.

In consequence it goes without saying that the exposure amount should be considered in connection with the photographic system as a whole. Now let us consider the projection system, namely the camera device only. In case the exposure amount EV=11 is desired to be obtained, there are 11 combinations of the aperture values with the shutter times as follows: (F1: 1/2000 sec.) (F1.4: 1/1000 sec.) (F2: 1/500 sec.) (F2.8: 1/250 sec.) (F4: 1/125 sec.) (F5.6: 1/60 sec.) (F8: 1/30 sec.) (F11: 1/15 sec.) (F16: 1/8 sec.) (F22: 1/4 sec.) and (F32: 1/2 sec.). Theoretically any one of the above combination gives the same exposure amount, whereby, however, as has already been explained, the aperture value and the shutter time does not work only as the factor for controlling the exposure amount and the paerture value directly acts on the object field depth and the image description while the shutter time directly acts on the description of the object in motion and so on. Although they give the same exposure amount, the combination of F1 with 1/2000 sec. gives a photographic effect on the photographic image given by the observation system in a different way from that of F32 with 1/2 sec. when the above mentioned conditions are taken into consideration.

Now let us think of a camera device with the automatic exposure control device, namely an AE (automatic exposure) camera from the above mentioned view point.

The AE camera is a camera device including a mechanism for automatically controlling the aperture value, the shutter time or their combination necessary for obtaining the proper or the desired exposure amount out of the brightness of the object and the sensitivity of the film, whereby in case of the manual camera device it is necessary to take up various photographic conditions, taking various factors into consideration, especially it is necessary for the photographer to select a proper aperture value and a proper exposure time suited for the photographic purpose out of the information of the object brightness measured by means of the exposure meter and the film sensitivity, while in case of the AE camera the photographer can space miscellaneous works at the time of taking a picture so as to enable an efficient and rapid photography so that the camera is becoming widely used.

Further the AC camera can spare complicated operation for obtaining a proper exposure amount by deciding the aperture value and the shutter time in such a manner that the operability of the camera device can be increased largely, while the aperture value and the shutter time to be selected for the same exposure amount are the factors of the characters absolutely different from each other so that much is discussed of the system.

The systems known as the AE camera at present are the following three.

The first one is the so called shutter time priority system for obtaining the proper exposure by way of automatically controlling the aperture value of the photographic lens as the operation result of the brightness of the object, the shutter time optionally decided by the photographer, the film sensitivity, whereby the shutter time, the film sensitivity and so on are given in advance.

The second one is the so called aperture value priority system for obtaining the proper exposure by way of automatically controlling the shutter time as the operation result of the brightness of the object, the aperture value optionally given by the photographer, the film sensitivity and so on whereby the shutter time, the film sensitivity and so on are given in advance.

The third one is the so called program system for obtaining the proper exposure by way of obtaining the necessary exposure amount as the operation result of the object brightness, the film sensitivity and so on so as to select the predetermined combination of the aperture value of the photographic lens and the shutter time for obtaining the above mentioned exposure amount, whereby neigher the shutter time nor the aperture value is decided by the photographer.

Each of the above mentioned system has its own features and has been brought into practice while it is also the fact that each of them has its own shortcoming.

In case of the above mentioned first system, namely the shutter speed priority system there is given a freedom that the shutter time can be optionally selected in advance so that in case of the speedy object such as for the snap photography or of the object in motion or of the telephotography in which there is much possibility for unstable manual holding the shorter shutter time can be selected in such a manner that the movement of the object or the unstable manual camera holding can be taken into consideration, while the object field depth has to be subjected to the aperture value of the photographic lens automatically operated in the camera device in accordance with the shutter time set in advance, so that this can not be said to be a proper exposure control system at the time of taking a picture of a landscape or of a still life whereby the object field depth plays an important part in making a picture or at the time of making use of the object field depth.

Further in case of the second system, namely the aperture value priority system quite contrary to the above mentioned first system for the object of the landscape or of the still life or for the object for which the object field depth is desired to be made use of the object field depth can be taken into consideration while the shutter time can not be selected optionally by the photographer so that in case at the time of taking a picture of the object in quick motion with the manually held camera device the slow shutter time is given as the result of the operation control there is a danger that an unwilling photographic result will be obtained, whereby therefore this can not be said to be a proper exposure control system for the object in quick motion or at the time of taking a picture with the manually held camera device or for the object for which the object field depth effect is desired to be obtained.

Further, in case of the above mentioned third system, namely the program system the combination of the aperture value of the photographic lens with the shutter time is decided unconditionally for a brightness of an object, in such a manner that only the proper exposure is taken into consideration so that the photographic conditions can not be selected optionally by the photography. In consequence the above mentioned program system is applied to the simple middle class camera, whereby this is considered to a remarkably effective system because the exposure amount can automatically be selected for a wide range, while for the aperture value priority system AE camera and the shutter time priority system AE camera much is discussed as to the merits and the shortcomings as mentioned above.

On the other hand for the AE camera it can not be disregarded that there are also the following opinions.

Namely in case of the AE camera the shutter time setting dial is at the position equivalent to the aperture value setting ring, whereby in the APEX system series the shutter time TV and the aperture value AV are in the following relations for the exposure amount;

$$EV = TV + AV \quad (1)$$

so that when the shutter time setting dial is handled the aperture value is varied in order to obtain a certain exposure amount while the aperture setting ring is handled the shutter time is varied. In consequence either the shutter time setting dial or the aperture setting ring is hand the result is the same, namely there is no need for dividing the case into two.

For example the aperture value priority AE camera known at present is surely the aperture value priority AE camera in case the shutter time automatically controlled is not informed of to the photographer at all, whereby in case the shutter time automatically controlled is displayed in the view finder and the exposure is controlled while the eye is put on the view finder, no matter whether the aperture setting ring or the shutter time setting dial is operated the exposure is controlled while the displayed shutter time is observed in such a manner that the effect is same as in case the shutter time setting dial is handled and the camera can be considered to be a shutter time priority AE camera in this meaning.

Namely the aperture value priority system AE camera and the shutter time priority system AE camera are reversible in their position depending upon how to use and how to think.

To summarize the above, the aperture value of the photographic lens and the shutter time are the factors very important for deciding the exposure amount so that when the automatic exposure control efficiency is accorded to the camera device it is necessary to treat the aperture value and the shutter time equally. This is a problem to be especially thought over because the reason for according the automatic exposure efficiency to the camera device is not only for simplification of the camera handling but also for increasing snap photographic efficiency as well as for allowing the photographer to concentrate himself more on the framing at the time of the camera handling.

Further before discusing about the exposure amount, let us consider two systems, namely the object system and the recording system between which the camera device as the projection system is located.

At the time of taking a picture it is necessary for the object system, namely the object field to have its own brightness, called the object brightness and represented BV in APEX system series. Further the recording system, for example the photosensitive film has a sensibility, called the film speed normally represented ASA by SV in the APEX system series.

As is well known, in the APEX system series the object brightness BV and the film speed SV are the factors for deciding the exposure amount EV in accordance with the following relation $$BV + SV = EV \quad (2)$$

Hereby the upper and the lower limit of the EV range settable in the camera device, namely in the projection system, can be made infinite by making the shutter time infinitely long or by providing at the photographic lens for attenuating the light, whereby from the view point of the proper exposure condition there must be the limit.

In consequence, at the time of taking a picture of an object field with the low brightness, namely the BV value is low while the exposure amount is let to be an amount to be decided by the combination of the aperture value with the shutter time for giving a proper exposure condition, it is sufficient to make the film speed SV larger as is clear from the relation (2). On the other hand at the time of taking an object field with the high brightness, naturally it is sufficient to make the film speed SV smaller. This is an important role in the recording system of the photographic system, while, seen from the side of the camera device, the recording system can only participate in the film support, the film exchange or the film feeding and not in the alternation of the sensitivity. The only one that is possible is to prepare a film with ultra high sensitivity and to put film with various permiability selectively into the optical path of the projection system so as to alter the sensitivity of the film in an equivalent way, whereby with the present technical level there is a limit in raising the sensitivity of the film so that it is not easy to apply the above method.

On the other hand, when it is desired to obtain a constant exposure amount while the film sensitivity SV is let to be constant, it is necessary to alter the brightness of the object, which is the well known lighting.

Although various methods for the lighting can be thought of, now let us take the speed light used most generally now in connection with the camera device.

The intensity of the light amount of the speed light device is called the guide number, whereby generally the aperture value of the lens is decided out of the distance up to the object and the above mentioned guide number. However quite recently it is in many cases tried to obtain the proper exposure amount automatically even at the time of taking a picture with the speed light device, whereby a system in accordance with which the light reflected from the object field is detected so as to stop the lighting as soon as the amount of the reflected light reaches a certain determined value or the guide number is variable has recently been brought into practice in order that the application of the camera device is enlarged while the freedom for framing is increased. Although such a speed light device constitutes the object system in the photographic system, it is necessary that the speed light device should operate in close connection with the camera device as the projection system because its lightening time is remarkably short, whereby such a device as never disturbs the operability of the camera device nor decreases the freedom of the framing by the photographer is especially desired.

Below the framing operation and the focusing operation will be discussed among the camera operation.

It is general that with the exception of special cases the framing operation as well as the focusing operation is carried out through the view finder at the time of operating the camera device. Hereby the most basic effect of the so called view finder is to allow the photographer to confirm the image of the object to be projected on the film plane as the view finder image, namely to decide the framing at the time of taking a picture. However, at present it is also general to make use of the view finder as the detector of the focusing of the object.

Further in case of the single reflex camera the efficiency for confirming the out-focusing state of the picture plane as the whole is added, while in case of the camera with a built in light measuring mechanism the element for confirming the measured light amount or the light measuring part is added.

As mentioned above the view finder plays an important part in the camera handling and can be said to have an important relation with the operability of the camera, for the most of the camera operation including the framing and the focussing operation as the basic operation is carried out through the view finder.

In consequence the information centralizing view finder has become widely adopted in such a manner that the photographer can obtain all of the photographic informations through the view finder, whereby these informations have to be displayed in a limited space so that the easiness of the observation and the confirmation of the informations is required.

Further the application of the camera device has been extended into the range of the low brightness so that it has become necessary that the information can be confirmed even in the dark place in the view finder just in the same way as in the bright place.

Among the camera operation, the framing operation and the focusing operation have a close connection with the portability of the camera body and the operability of the parts. Namely at the time of taking a picture it is necessary that the framing is decided through the view finder while the camera body is being held in the hands, while the focusing is carried out by operating the distance ring of the lens and the shutter is released at the desired time point after the operation for deciding the exposure and others, so that it is necessary to arrange the parts in a rational way so as not to prevent the operability of other parts. Although at times this is restricted connected with the mechanical arrangement of the camera device, the improvement of the operability is a problem to be treated with the special case because the subject in the projection system in the photographic system is the photographer.

To speak more particularly as to the operability, the projection system serves to fix a certain moment in the recording system so that it is essential that an absolute counter-measures against the misoperation or the mishandling should be carried out.

As mentioned above, the operability of the camera device can be largely improved by organically combining the basic operations such as the operation for deciding the exposure, the framing operation and the focusing operation with other auxiliary operation.

In consequence what is required for the camera device as the projection system constituting a large system as the photographic system is to constitute a large subsystem capable of realizing the largest efficiency of the projection system basing upon the close connection with other system, whereby for example the automatic exposure control should be realized in such a manner that the efficiency of every parts of the camera device can alway be realized in a sufficient way, while all the other auxiliary mechanism should be able to operate in the best way.

Thus the view point of system has become necessary for the camera device, whereby a new demand takes place for a new camera system capable of meeting the requirement of the system in the total system as the photographic system.

SUMMARY OF THE INVENTION

A purpose of the present invention is to offer a camera system presenting sufficient efficiencies for constituting the sub-system as the projection system in the total system as the photographic system.

Another purpose of the present invention is to offer a camera system capable of securing the sufficient operability for the photographer as the subject and at the same time of realizing the photographer's intention in the picture.

Further another purpose of the present invention is to offer a camera system presenting an automatic exposure control mechanism for automatically controlling the decision of the exposure amount.

Further another purpose of the present invention is to offer a compact and economic camera system presenting the automatic exposure control mechanism with priority on both aperture value and the shutter time, whereby the shutter time priority system or the aperture value priority system can optionally be selected in such a manner that the proper control system can freely be selected so as to meet the exposure condition desired by the photographer.

Further another purpose of the present invention is to offer a camera system presenting the speed light efficiency to be organically combined with the camera body so as to give an efficient and suitable exposure amount.

Further another purpose of the present invention is to offer a camera system presenting an efficiency for effectively displaying to the photographer as many informations as possible in the view finder for the framing and the focusing.

Further another purpose of the present invention is to offer a camera system, whereby the operability as well as the efficiency at the time of taking a picture is greatly improved, by arranging the parts for working at the time of operating the camera device in such a manner that the parts are combined with each other efficiently and the organically.

Further another purpose of the present invention is to offer a camera system applicable to all the types of the cameras, whereby various camera operations are efficiencies peculiar to the camera device can optionally be selected by constituting most of the control parts with the digital electrical circuits which can be integrated and at the same time introducing the sequence controlability.

Further another purpose of the present invention is to offer a compact and economical camera system applicable also to the single reflex camera presenting through the lens measuring system (hereinafter called TTL light measuring system) and suited for the series production.

Further other purposes of the present invention will be disclosed in accordance with the explanations to be made below concerning the embodiments.

BRIEF DESCRIPTION OF THE DRAWINGS

FIG. 3 shows the operation of each lever in the state in which some aperture value is preset at the side of the lens device 2.

FIG. 4 shows the operation of each lever in the state in which no aperture value is preset at the side of the lens device 2.

FIG. 7 shows an incident light exposure meter to be applied to the camera system in accordance with the present invention in perspective view.

FIG. 8 shows an embodiment of the motor drive device to be applied to the camera system in accordance with the present invention in perspective view.

FIG. 9 shows the finder information seen through the finder window 13 of the camera device.

FIG. 10 shows examples of the finder information shown in FIG. 9. the time of the speed light photography.

FIG. 12 shows a concrete disposition for taking up the digital data relative to the film sensitivity out of the ASA sensitivity setting dial 40.

FIG. 17 shows a logical diagram of the operation of the Flip-Flop shown in FIG. 16.

FIG. 18 shows a concrete disposition for taking up the data set by means of the dial 34 and the information as to the state of the mode switching over switch 38.

FIG. 19 shows a concrete disposition to take up the largest aperture value of the lens device 2.

FIG. 29 shows a table for explaining the relation between the various photographic modes by means of the TTL light measurement and of the external light measurement and corresponding operation routines.

FIG. 47 shows a logic diagram for explaining the CU and the AO signal.

FIG. 69 shows charts for explaining the output codes of the instruction ROM504.

FIG. 70 shows comparison tables between the address of the instructions ROM504 and the instructions as well as the operaand codes.

FIG. 71 shows the composition of the output logic circuit of the address decoder 600.

FIG. 73 shows a logic diagram of the I.C. circuit element MC14514.

FIG. 93 shows a sequence explanation chart basing upon the flow chart shown in FIG. 91.

FIG. 94 shows a detailed composition of the shutter time control register 614, the constant generating circuit 616, the select gate 618 and the frequency dividing circuit 620.

FIG. 99 shows a comparison table between the datas and the binary codes.

FIG. 100 shows a comparison table between the input smallest aperture value of the vignetting error ROM 528 and the binary codes of the output vignetting error.

FIG. 101 shows respectively a comparison table between the binary codes and the display codes of the aperture value display decoder ROM 702, the shutter time display decoder ROM 704 and the signal display decoder ROM 706.

Below the present invention will be explained more in detail in accordance with the accompanying drawings.

DETAILED EXPLANATION OF THE DRAWINGS

Figure 1A:
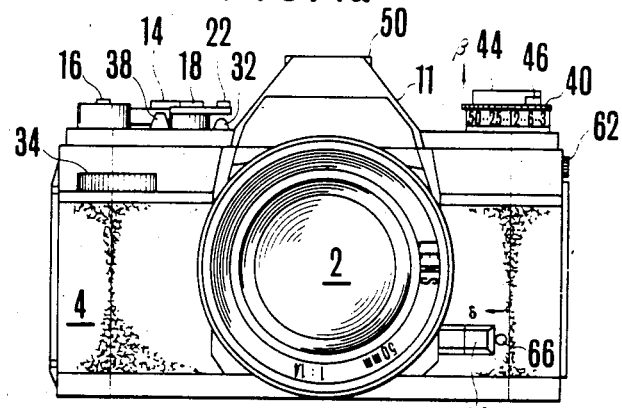
FIG. 1 shows six views of the camera device to be applied to an embodiment of the camera system in accordance with the present invention.
Figure 1B:
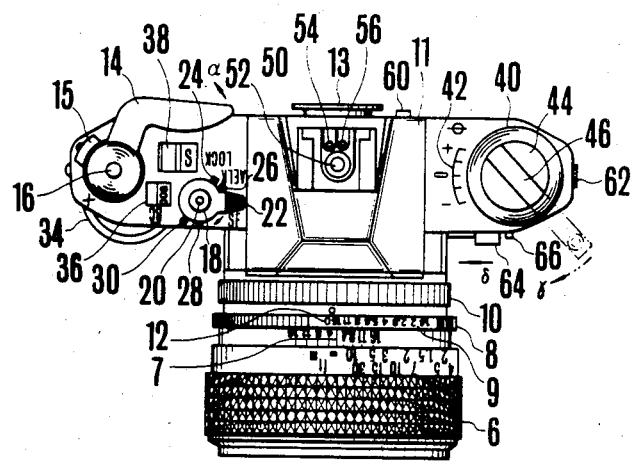
Figure 1C:
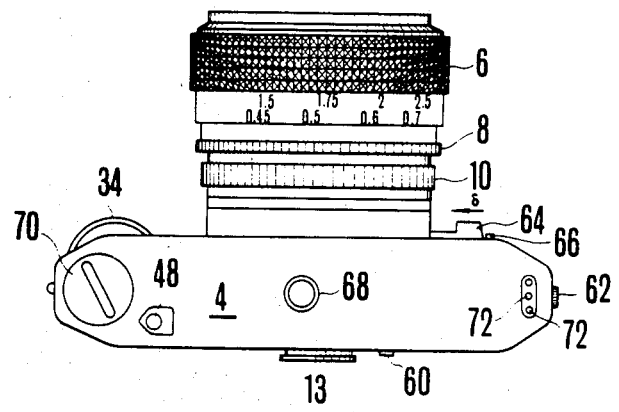
Figure 1D:
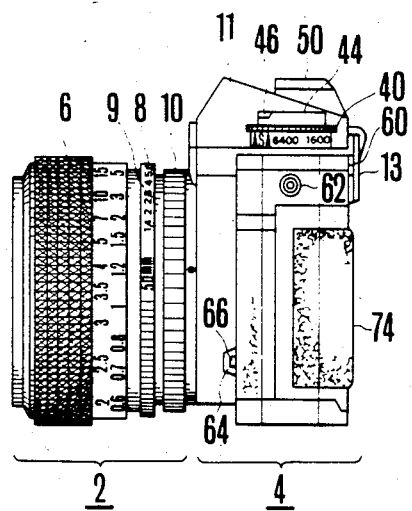
Figure 1E:
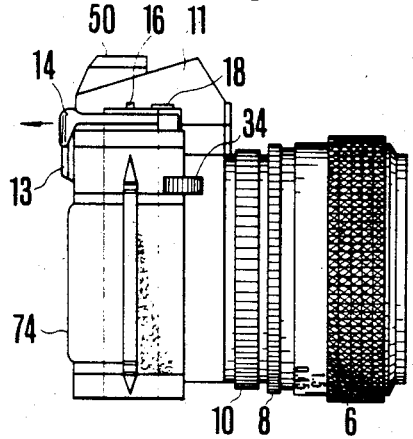
Figure 1F:
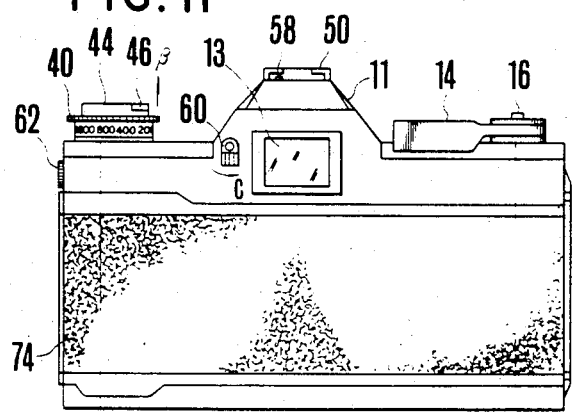

FIG. 1 shows six views of the camera device to which an embodiment of the camera system in accordance with the present invention is applied, whereby;

FIG. 1(a) shows a front view,
FIG. 1(b) shows a plane view,
FIG. 1(c) shows a bottom view,
FIG. 1(d) shows a view seen from the right side,
FIG. 1(e) shows a view seen from the left side,
FIG. 1(f) shows a view seen from behind.

The camera device shown in the drawing relates to a single reflex camera including an automatic exposure control mechanism with priority on both aperture value and shutter time of TTL light measuring system, whereby the components are disposed in such a manner that the weight is put on their operability.

This camera device consists of the lens device 2 as optical system and the body 4 as mechanical system, whereby various combination of different lens devices with the camera system is possible in a similar way to the conventional single reflex camera so as to enable a wide range of photography.

The lens device 2 includes the distance adjusting ring 6 and the aperture adjusting ring 8, whereby the lens device 2 is mounted on the body 4 by means of the clamping ring 10. Hereby the object image forming position of this lens device 2 can be changed by means of the distance adjusting ring 6, namely the focusing operation is possible while the aperture value can be preset by means of the aperture adjusting ring 8. Hereby the preset of the aperture value means the setting of the aperture value indication 9 provided around the aperture adjusting ring 8 at the index 7 provided on the lens barrel of the lens device 2, whereby in this state the lens device 2 is in the totally opened state. In this way the preset aperture value is obtained by closing the diaphragm blades of the lens device 2 down to the preset position by means of the driving power supplied from the camera body 4 at the time of exposure by releasing the shutter. However, in principle the weight of the operability of this camera device is put on the automatic control controlability so that the aperture adjusting ring 8 is so designed that the aperture value can be preset from the side of the body 4 when the mark 12 provided around the aperture adjusting ring 8 is set at the index 7, whereby this mechanism plays an essential part of the aperture control of this camera device. Further this lens device 2 includes a mechanism for transmitting the information such as the aperture value of the totally opened diaphragm to the side of the camera body 4. This mechanism plays an important role for taking up necessary information for the operation device built in the camera body to carry out an operation for the exposure control.

Most basically the camera body 4 constitutes a dark box in which the image of the object to be photographed introduced by the lens device 2 is formed on the film plane, whereby as film a 35 m/m roll film in the patrone is used in such a manner that the roll film is wound up on the winding up spool each time by one frame so as to change the exposure plane. The shutter is the focal plane shutter with two running screens provided on the exposure plane of the film at the side of the lens device 2, whereby as will be explained in detail later the driving power of the two screens is produced by means of the charged spring while the starting time of the two screens is controlled by means of an electrical means. The camera body 4 contains a view finder mechanism mainly consisting of the quick return mirror and the pentagonal prism, whereby the view finder mechanism is so designed that the framing operation and the focusing operation before taking a picture can be carried out through the view finder window 13. This view finder mechanism is same as that of the conventional single reflex camera. The only one difference is the fact that almost all the informations necessary for taking a picture can be obtained through the view finder window 13, which is one of the features of this camera device. Further this view finder mechanism is provided with the TTL light measuring ability for measuring the object brightness introduced through the lens device 2 so as to obtain the object brightness information (APEX value: BV) necessary for the operation for the automatic exposure control.

There is provided a winding up lever 14 for winding up the film for one frame and for charging the springs for driving the necessary mechanical components at the time of releasing the shutter in functional engagement of the film winding up spool on the upper part of the camera body 4. The number of the frames of the film wound up by means of the winding up lever 14 is displayed in the film counter 15. Hereby the button 16 provided at the center of the rotation of the winding up lever 16 is that for the multiple exposure, whereby when the winding up lever 14 is operated while the button is being pushed down, only the necessary mechanical components are charged while the film is not wound up. Further this winding up lever 14 serves as the power source switch for the electrical components in the camera device, whereby the power source is switched on when the lever 14 is moved a little along the direction of the arrow α. This is very profitable for preventing the careless negligence of switching off of the power source for the camera device with automatic exposure control mechanism, because in each case of such kind of camera the power source is consumed so remarkably that there is a large possibility for a grave misoperation.

18 is the shutter release button disposed on the upper part of the camera body 4 in such a manner that the button 18 can be pushed down by the index finger of the right hand in the same way as in case of the conventional camera when the camera body 4 is held in both hands, whereby by pushing down this button 18 all the necessary movements after the shutter release are started. Hereby the hole 20 provided at the center of the shutter release button 18 is for the cable release or the air release. In the neighborhood of the shutter release button 18 a selector lever 22 is disposed, so designed that various kinds of functions can be selected when the selector lever 22 is rotated around the shutter release button 18. This selector lever 22 can be operated by the same finger that operates the shutter release button 18, namely the index finger of the right hand holding the camera body 4.

When now the selector lever 22 is rotated into the position in which the mark 24 is selected, the shutter release button 18 is locked and can not be pushed down any more. This locked state is applicable for keeping the button 18 being pushed down when the mark 24 is selected after the shutter release button 18 has been pushed down so that the long time exposure when the shutter time is set at the bulb position is possible. Namely the selection of the mark 24 by means of this selector lever 22 serves in two ways, namely to prevent the misoperation of the shutter release button 18 and to enable the long time exposure.

Further, when the selector lever 22 is set at the mark 26, AE (Automatic-Exposure) is brought into the locked state. In this locked state of AE the measured light amount is kept fixed in such a manner that the exposure amount (a combination of the aperture value with the shutter time) obtained as the result of the light measurement and the operation is kept at the amount immediately before the selection of the mark 26 during the automatic exposure control operation and after then even if the measured light amount alters the actual exposure is carried out with the fixed exposure amount. This function is very effective especially in case of taking a picture of an object with large difference in brightness, when the frame which is realy desired to be photographed is different from that out of which only the object brightness relative to the light measuring is desired to be obtained, so that this function is essential for a camera with automatic exposure controlability. As this AE locking mechanism, the mechanical clamping mechanism and the electrical one can be thought out, whereby to this camera device the electrical one is to be applied. Hereby the lever 22 selecting the mark 26 is automatically brought back into the initial position, when the shutter release button 18 which was pushed down resumes the initial position, unless such force as to prevent the returning of the lever 22 is exercised from outside.

Further when the selector lever 22 is set at the position at which the mark 28 is selected, the self-timer is brought into the set state. In case of this camera device, different from the case with the conventional camera the self-timer presents a mechanism for counting the time in an electrical way, whereby when the shutter release button 18 is pushed down in the set state of this self-timer, a series of the operation relative to the shutter release is controlled by means of the electrical signal issued after the elapse of a certain predetermined time. Hereby the operation of the self-time is displayed by the twinkling of the illumination diode lamp (LED lamp) 32 hidden under the selector lever 22 provided on the upper part of the camera body 4, in case the selector lever 22 is at the initial position. Further if the selector lever 22 is brought back to the initial position during the operation of the self-timer, the self-timer is released out of the set state, whereby the shutter can be released by means of the shutter release button 18 in a normal way. Further in case of this camera device the once set self-timer mechanism is not released out of the set state even when the shutter release operation has been carried out the self-timer photography is possible repeatedly without repeated setting of the self-timer. This function enables the automatic photography at a certain time interval by combining the self-time with the motor drive device as will be explained later, which is very profitable.

In case the selector lever 22 is set at the position at which the mark 30 is selected, the battery is brought in the checked state. In case the LED lamp 32 twinkles in the checked state of the power source, it reveals that the power source has a sufficient voltage, which when the LED lamp 32 does not light up it reveals that the voltage of the power source is too low for the camera device to exercise a full electrical function. Hereby the selector lever 22 selecting the position of the mark 30 is normally urged by means of a spring so as to return to the position of the mark 28 so that the selector lever 28 resumes the position of the mark 28 when the finger is put off after the battery checking. This function is very profitable, because if it is forgotten to bring back the lever 22 to the initial position after the battery checking not only the camera device does not work properly but also the electrical power is wasted by the twinkling LED lamp 32.

34 is the dial for setting the aperture value or the shutter time out of the exposure informations, whereby the set value is displayed in the display window 36. As has already been mentioned this camera device presents an automatic exposure control mechanism with priority on both the aperture value and the shutter time, whereby the aperture value priority mode and the shutter time can be used selectively instead of the aperture value priority mode only or of the shutter time priority mode. Namely the aperture value priority mode in accordance to which the aperture value is set while the shutter time is automatically operated and controlled and the shutter time priority mode in accordance to which the shutter timed is set while the aperture value is automatically operated and controlled can be selected, whereby, as is clear from the afore mentioned equations (1) and (2), no matter whether the aperture value is selected with priority or the shutter time is selected with priority, the operational process is completely same so that the mechanism is so designed that the desired amount corresponding to the aperture value or the shutter time is set by means of only one dial 34. Hereby whether the amount set at the dial 34 is the apertured value or the shutter speed is determined by means of operating the mode change over switch 38. Hereby with the operation of the mode change over switch 38 the content of the numerical value displayed in the display 36 is changed. Namely the aperture value is displayed in the display window 36 when the mode change over switch 38 is set on the aperture value priority mode, while the shutter time is displayed in the display window 36 when the mode change over switch 38 is set on the shutter time. This mechanism can be such a simple one that either of the aperture value or the shutter time displayed parallel to each other is selectively shaded.

40 is the ASA sensitivity dial, on which the ASA sensitivity of the film to be used is to be set. This dial 40 can be rotated along the direction of the arrow $\beta$ when it is pulled up slightly by the fingers, whereby when it is freed from the fingers after setting the film sensitivity, it returns by means of the strength of the spring along the reversed direction to the arrow $\beta$ in such a manner that the set position is fixed. This mechanism serves to prevent the unexpected rotation of the dial 40 during photographing.

42 is the scale with indexes for obtaining the over-exposure or the under-exposure by displacing the ASA sensitivity setting dial 40 so as to alter the set film sensitivity against the actual film sensitivity when it is desired to photograph with over-exposure or under-exposure under the automatic exposure control. Utilizing the fact that if the set film sensitivity is alter against the actual film sensitivity, as is clear from the afore-mentioned equations (1) and (2) the proper exposure amount in accordance with operation is over or under by the deviation of the set film sensitivity from the actual sensitivity, it can be made possible to obtain over-exposure or under-exposure in an easy way without any alternation of the operation circuit or the operation routine, which is very profitable.

44 is the film winding back knob containing the film winding back lever 46, whereby the exposed film wound up one frame by one frame by means of the winding up lever 14 is wound back into the patrone by rotating the knob. In order to wind back the film, the winding back button 48 provided on the bottom of the camera body 4 is pushed so as to release the film winding up mechanism from the film winding up lever 14, the winding back lever 46 is pulled out of the film winding back knob 44 and rotated along the direction of the arrow $\gamma$. This film winding back is already well known.

In the same way as in case with the conventional camera this camera device is provided with the accessary shoe 50. It goes without saying that the shoe 50 is intended for mounting the speed light device or the flash light device, whereby, as will be explained later in detail, the speed light device included in this camera device in accordance with the present invention is closely related to this camera device. Further, to this camera shoe 50 the external light measuring adapter included in the camera system in accordance with the present invention can be connected. Further this accessary shoe 50 includes apart from the synchronization contact 52 the control terminal 54 for introducing the control informations from the speed light or from the external light measuring adapter, the data terminal 56 for introducing the data and the AE locking terminal 58. Several steps of the level signals are introduced through the control terminals 54 so as to instruct the camera to operate in accordance with different modes while the aperture value set on the speed light or the data relative to the object brightness measured by means of the external light measuring adapter is introduced in digital values through the data terminal 56. The speed light device and the external light measuring adapter will be explained later in detail.

60 is the lever for the eye piece shutter for shading the view finder window 13, being intended to prevent the film from being expired to the light coming through the view finder window 13 when the eye leaves the view finder window 13 for example during the self-timer photograph and at the same time to prevent the object brightness information essential especially for the automatic exposure control from the error due to the light coming through the view finder window 13, whereby the view finder window is closed by operating the eye piece shutter lever 60 along the direction of the arrow C. This mechanism is quite essential for the camera with TTL light measuring mechanism.

62 is the X contact with the same function as that for the conventional camera, constituting a synchronization contact at the time of the speed light or the flash light photography.

64 is the diaphragm closing lever for closing the diaphragm of the lens device when it is pushed along the direction of the arrow δ. In case now the aperture value is preset by means of the aperture adjusting ring 8 of the lens device 2 the diaphragm of the lens device 2 is closed to the preset position by operating the diaphragm closing lever 64 while in case the mark 12 on the aperture adjusting ring 8 is set at the index 7 the operation of diaphragm closing lever 64 is restricted. Although it is possible to set the mark 12 on the aperture adjusting ring 8 at the index 7 while the diaphragm closing lever 64 is being operated into the diaphragm closing position, which is however displayed in the view finder as misoperation. The relation between the state of the aperture adjusting ring 8 of the lens device 2 with that of the diaphragm closing lever 64 on the camera body 4 and of the mode change over switch 38 will be explained later in detail. This diaphragm closing lever 64 is locked in the diaphragm closing position, while this locking is released by pushing the lock release button 66 in such a manner that the diaphragm closing lever 64 is brought back into the initial position.

On the bottom of this camera device a screw hole 68 is provided for securing a tripod, whereby this screw hole 68 can be such for mounting the motor drive device. Hereby in order to mount the motor drive device the cover 70 at the lower part of the shaft of the winding up lever 14 is taken away and the shaft of the winding up lever 14 is adapted to the winding up shaft of the motor drive device so as to obtain a mechanical connection. When the motor drive device is mounted, a control signal is given to the motor drive device through the contact device 72 provided on the bottom of the camera body 4. The motor drive device will be explained in detail later, whereby the device serves to wind up the film and to charge other necessary components by means of the driving power of the motor instead of the film winding up lever 14 after the termination of the whole operation of the camera after the shutter release so that it is made possible to release shutter in a continuous way, making it easy for the photographer to catch the desired shutter chance, which is quite profitable, disregarding the capacity and the weight for the driving motor and its power source.

Hereby when the film winding back knob 44 is pulled up the back cover 74 on the back side of the camera body 4 opens so that the film in the patrone can be exchanged. At the time of opening the back cover 74, the film counter 15 on the upper part of the camera body 4 is reset so as to return the initial position.

So far the composition of each component of this camera device has been explained in a brief way. Below the exchange of the concrete informations between the lens device 2 and the camera body 4 or the aperture control mechanism of the lens device 2 from the camera body 4, the relation of the operation of the speed light device mounted on the accessary shoe 50 or of the external light measuring adapter to that of the camera device, the relation of the motor drive device mounted on the bottom of the camera body 4 to the operation of the camera device and the relation of the information or the data display in the view finder 13 to the operation of the camera device will be further explained more in detail.

Figure 2:
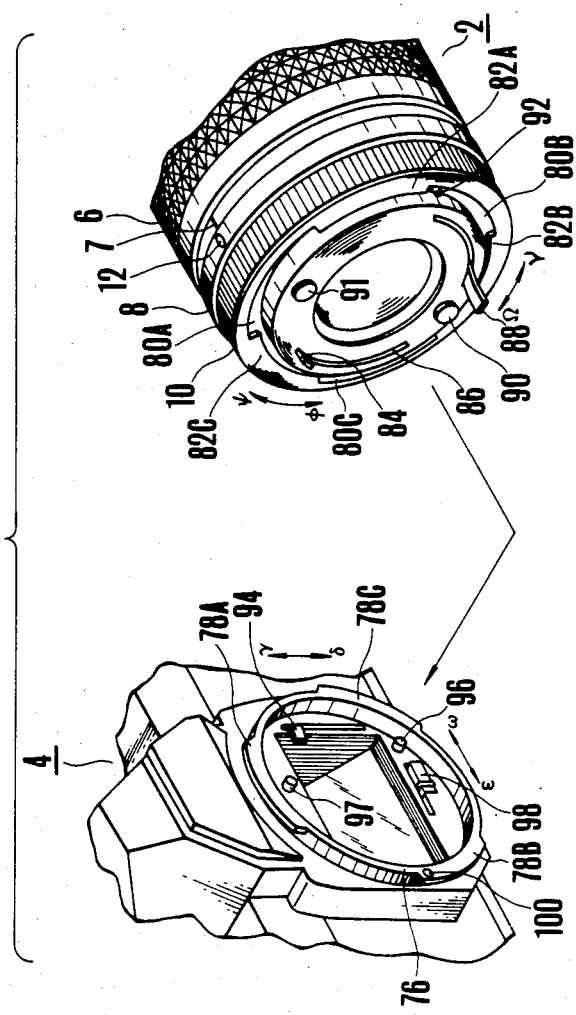
FIG. 2 shows the lens device 2 and the camera body 4 of the camera device shown in FIG. 1 in separated perspective view.

FIG. 2 shows the lens device 2 of the camera device and the camera body 4 taken apart from each other in perspective view, whereby the lens device 2 is combined with the body 4, being displaced along the direction of the arrow λ. The camera body 4 is provided with the mount ring 76 on the mounting plane of the lens device 2, whereby the mount ring 76 presents three independent flange part 78A, 78B and 78C at the end of the circumference. The mount ring 76 is firmly fixed on the camera body so as to surround the optical path, being parallel to the plane perpendicular to the optical path namely the film plane, because the mount ring 76 is the only one member for combining the lens device 2 with the camera body 4 whereby the lowering of the mounting precision due to the aging effect will surely give a inferior influence to the object image formed on the film plane. Accordingly the clamping ring 10 is rotatably provided on the side of the lens device 2, whereby the clamping ring 10 is a circular ring presenting notches 80A, 80B and 80C for allowing the passage of the flange parts 78A, 78B and 78C of the mount ring 76 when the lens device 2 in the showed state is displaced along the direction of the arrow λ so as to be combined with the camera body 4, so designed that by rotating the clamping ring 10 along the direction of ψ after having brought each flange 78A, 78B and 78C of the mount ring 76 through the corresponding notches 80A, 80B and 80C the flange parts 78A, 78B and 78C are engaged with the protruding parts 82A, 82B and 82C of the clamping ring 10 so as to secure the lens device 2 to the camera body 4.

In the mounting side of the lens device 2 to the camera body 4 various kinds of mechanisms are provided for exchanging informations with the camera body 4 or for controling.

84 is the lever relative to the step number of the diaphragm from the totally opened position of the lens device 2, being provided so as to be movable along the ring hole 86 in the direction of the arrows φ and ψ. This lever 84 is urged along the direction of the arrow ψ by means of a strong spring, whereby when the lens device 2 is not mounted on the camera body 4 and the clamping ring 10 is in the ready state as shown in the drawing the ring hole 86 is kept in the state moved along the direction of the arrow φ. This state is released by rotating the clamping ring 10 along the direction of the arrow ψ so as to mount the lense device 2 on the camera body 4. At this time the lever 84 is moved along the direction of the arrow ψ by means of the strength of the spring but only up to a certain determined position which corresponds with the step number of the diaphragm for the preset aperture value of the lens device 2 from the totally opened position, whereby the move the lever 84 is in the direction of the arrow φ the smaller the step number of the diaphragm is while the move the lever 84 is in the direction of the arrow ψ the larger the step number of the diaphragm is. The aperture value can be preset in this lens device 2 by means of the aperture setting ring 8 as had already been explained, whereby the position at which the displacement of the lever 84 is restricted changed in accordance with the preset aperture value and the lever 84 is displaced accordingly and in consequence there is a possibility to transmit the step number of the diaphragm closing corresponding to the preset aperture value set on the aperture setting ring 8 to the side of the camera body 4 by means of the position of this lever 84. The reason why it is written here possibility is that the camera device applied to this embodiment is mainly intended for the automatic exposure control, whereby as will be explained in detail later it is also possible to preset the aperture value from the side of the body of the camera device so that it is not necessary to detect the diaphragm step number preset in the lens device 2 by the aperture setting ring 8 by detecting the position of the lever 84.

When the mark 12 on the aperture setting ring 8 is set at the index 7, this lever 84 is always at the position corresponding to the largest diaphragm step number of the lens device, namely in the state in which the lever 84 is to the utmost in the ring hole 86 along the direction of the arrow ψ by means of the spring. No matter at which position the displacement of the lever 84 along the direction of the arrow ψ by means of the strength of the spring is restricted, it is possible to displace the lever 84 against the strength of the spring along the direction toward the smaller diaphragm step number, namely along the direction of the arrow φ. In other words it is possible to set the desired aperture value by setting the lever 84 at the desired position against the force of the spring, not making use of the aperture setting ring 8. This character is applicable to the so called servo AE camera in which the aperture value can automatically be controlled by controling the position of this lever 84 by means of a servo-motor and has been realized to some extent, whereby there are some shortcomings such as slow responce so that in the present embodiment this character is utilized by means of other process.

88 shows a diaphragm closing lever being normally urged by means of a spring along the direction of the arrow Ω toward the position of the totally opened diaphragm. Further the direction of the arrow ν is toward the position of the closed diaphragm so that by displacing the diaphragm closing lever 88 against the strength of the spring along the direction of the arrow ν the diaphragm of the lens device 2 is closed by the diaphragm step number corresponding to the position of the lever 84 from the totally opened position.

90 shows the opening pin with the projecting length corresponding to the largest aperture value of this lens device 2, for serving to transmit the largest aperture value of the lens device 2 to the camera body 4. This opening pin 90 is of a very important existence in order to carry out various kinds of compensations for calculating the exact object brightness informations in care of the exposure operation basing upon the object brightness informations in accordance with the TTL light measurement.

Further 91 is the smallest aperture value pin with the projecting length corresponding to the smallest aperture value, for serving to transmit the smallest aperture value of the lens device 2 to the camera body 4. This smallest aperture value pin 91 is made use of to detect the controlable limit of the diaphragm of the lens device 2 at the time of the exposure control.

92 is the AE pin which projects when the mark 12 on the aperture setting ring 8 at the index 7, for serving to transmit to the side of the camera body 4 the fact that the aperture value is not preset at the side of the lens device 2.

On the other hand, on the side of the camera body mechanisms to be engaged with the above mentioned various kinds of the mechanisms of the lens device 2 are provided.

94 is the AE lever which operates while the face at the side of the arrow δ is brought in contact with the face at the side of the arrow φ of the lever 84 provided on the lens device 2, whereby the AE lever is normally urged along the direction of the arrow δ by means of a weak spring. The spring urging this AE lever 94 along the direction of the arrow δ is remarkably weak in strength in comparison with the one urging the lever 84 at the side of the lens device 2 along the direction of the arrow φ, so that the strength for displacing the lever 84 along the direction of the arrow φ can not be overcomed. In consequence this AE lever 94 is normally urged by means of the lever 84 at the side of the lens device 2 along the direction of the arrow δ. At the time of the operation of the winding up lever 14, this AE lever 94 is displaced along the direction of the arrow δ against the urging strength accompanying the lever 84 so as to be locked in the shown position. This locking is released at the time of the shutter release, whereby it is natural that the AE lever 94 start to run along the direction of the arrow δ by means of the urging strength of the lever 84. Hereby the camera body 4 present a mechanism for clamping the AE lever 94 at the proper position in accordance with the control aperture value set by means of the dial 34 or obtained as the result of the operation, whereby by means of the operation of this clamping mechanism the AE lever 94 steps at the clamping position. In consequence the displacement of the lever 84 along the direction of the arrow φ is naturally restricted at the position corresponding to the clamping position of the AE lever 94 so as to preset the diaphragm step number. Namely the clamping position of the AE lever 94 is remarkably important for determining the diaphragm step number of the lens device 2 so that a mechanism with very high precision is requested for detecting the clamping position. Such mechanism is preferably so designed as to obtain the desired diaphragm step number by counting the pulse number corresponding to the diaphragm step number while the displacement amount of the AE lever 94 from its locking position as start along the direction of the arrow δ is converted into pulses. Hereby in case it is desired to close the diaphragm of the lens by pushing the diaphragm closing lever 64 provided on the camera body 4 along the direction of the arrow δ, from the constructional reason the locking of the AE lever 94 at the standard position or the clamping thereof at the desired position is released in such a manner that the AE lever 94 start to run by means of the urging strength of the lever 84 along the direction of the arrow δ. In case at this time the aperture value is selected to set by means of the aperture setting ring 8 at the side of the lens device 2, the displacement of the lever 84 is restricted up to the position corresponding to the diaphragm step number for this aperture value and in consequence also the AE lever 94 stops running whereby after all the diaphragm is closed down to the set aperture value, while in case the mark 12 on the aperture setting ring 8 is set, the displacement of the lever 84 is not restricted as far as the position of the smallest aperture value whereby after all the diaphragm is closed down to the smallest aperture value. In consequence the present embodiment is so designed that the diaphragm closing lever 64 is locked so as to be out of operation in case the mark 12 is set on the aperture setting ring 8. However it is possible to lock the AE lever 94 at the standard position in a easy way without feeding film by operating the winding up lever in the pushed state of the button for the multiple exposure in case for some reason the locking of the AE lever 94 at the standard position is released before the shutter release. The fact that the AE lever 94 has been locked at the standard position is said that AE has been charged while the fact that the AE lever 94 is locked at the standard position is said that AE is charged. Further the fact that the AE lever 94 is released out of the standard position is said that AE is discharged.

96 is the total opening input pin for picking up the aperture value of the totally opened diaphragm of the lens device 2, being in contact with the opening pin 90 of the lens device 2 so as to pick up the signal corresponding to the protruding amount of the pin, namely the signal corresponding to the aperture value of the totally opened diaphragm of the lens device 2. Hereby this total opening input pin 90 is connected to a mechanism for converting the displacement amount of the pin 90 into a digital value in such a manner that after all the aperture value of the totally opened diaphragm of the lens device 2 is picked up in the digital value.

97 is the largest aperture value input pin for picking up the aperture value of the most closed diaphragm of the lens device 2, being in contact with the largest aperture value pin 91 of the lens device 2 so as to pick up the signal corresponding to the largest aperture value of the lens device 2, namely the signal corresponding to the aperture value of the most closed diaphragm. Hereby this largest aperture values input pin is connected to a mechanism for converting the displacement amount of the pin 97 into the digital value in such a manner that after all the largest aperture value of the lens device 2 is picked up in the digital value.

98 is the diaphragm driving lever, whereby the surface of the lever 98 toward the direction of the arrow $\epsilon$ is in contact with that of the diaphragm closing lever 88 of the lens device 2 toward the direction of the arrow $\Omega$ in such a manner that at the time of the shutter release the lever 98 is displaced along the direction of the arrow $\epsilon$ before the start of the exposure, driving the diaphragm closing lever 88 along the direction of the arrow $\nu$ so as to close the diaphragm of the lens device 2 down to the closed position determined by the lever 84 from the totally opened state. Hereby at the termination of the exposure this diaphragm driving lever 98 resumes the initial position, being displaced toward the direction of the arrow $\omega$ so as to bring the diaphragm of the lens device 2 back into the totally opened state. This diaphragm driving lever 98 can be displaced along the direction of the arrow $\epsilon$ by operating the diaphragm closing lever 64 of the camera body along the direction of the arrow $\delta$. This mechanism is essential in order to observe the object image through the lens device 2 with the closed diaphragm through the view finder 13.

100 is the AE detecting member opposed to the AE pin 92 of the lens device 2, serving to detect the AE pin 92 protruding in case the mark 12 is selected by the aperture setting ring 8 of the lens device 2 so as to pick up the control signal showing that the mark 12 is selected.

Hereby as is clear from the above explanation it is necessary that the mark 12 of the aperture setting ring 8 should be set at the index 7 in case it is desired to control the aperture value of the lens device 2 from the side of the camera body 4 so that the mark 12 will be called AE mark below.

Below the operations of the lever 84, the AE lever 94, the diaphragm closing lever 86 and the diaphragm driving lever 98 from the mounting of the lens device 2 till the diaphragm closing, namely the shutter release in case the aperture setting ring 8 is set at a certain aperture value will be explained in accordance with FIG. 3, while the case when the aperture ring 8 is set at the AE mark 12 will be explained in accordance with FIG. 4.

FIG. 3 shows the operation of each lever in the state in which as is mentioned afore a certain aperture value is preset at the side of the lens device 2, whereby FIG. 3(a) shows a lens device 2 in the ready state, being mounted on the camera body 4, whereby the clamping ring 10 has not yet been rotated into the mounting position so that the lever 84 is kept in the state displaced toward the direction of the arrow $\psi$ against the urging strength of the spring along the direction of the arrow $\phi$. In case now only the clamping ring 10 is rotated along the direction of the arrow $\phi$, wihtout mounting the lens device 2 on the camera body 4, the lever 84 is displaced along the direction of the arrow $\phi$ into the position determined by the aperture setting ring 8 as is shown in FIG. 3(b). This displacement is motivated by means of the spring urging the lever 84 along the direction of the arrow $\phi$. Now let us suppose that this lens device 2 be mounted on the camera body 4 when AE has not yet been charged or the diaphragm closing lever 64 has not yet been pushed down. In this case the AE lever 94 at the side of the camera body 4 is in the state urged by means of the spring along the direction of the arrow $\delta$ but not in the particularly locked state so that when the lens device 2 is mounted on the camera body 4, the clamping ring being rotated along the direction of the arrow $\phi$, the strength of the spring urging the lever 84 along the direction of the arrow $\phi$ is superior to that of the spring urging the AE lever 94 along the direction of the arrow $\delta$ so that the lever 84 is displaced along the direction of the arrow $\phi$ into the position determined by means of the aperture setting ring 8 as is shown in FIG. 3(C). At the same time the AE lever 94 is brought into the state as is shown in FIG. 3(C), being pushed by the lever 84. Now let us supposed that the winding up lever 14 is operated so as to charge AE in the state in which the diaphragm closing lever 64 of the camera body 4 is brought back into the initial position. Then the AE lever 94 is displaced along the direction of the arrow $\delta$ against the urging strength of the lever 84 so as to be locked at the standard position as is shown in FIG. 3(D). In consequence the lever 84 at the side of the lens device 2 is kept in the state as is shown in FIG. 3(D'), being pushed by means of the AE lever 94. Hereby it is natural that quite in the same way the AE lever 94 and the lever 84 would be kept at the positions as is shown in FIGS. 3(D) and 3(D') in case the lens device 2 is mounted on the camera body 4 in which AE has been charged. When then the shutter is released the lever 84 start to run along the direction of the arrow $\delta$ against the urging strength of the spring of the AE lever 94, because the locking of the AE lever 94 is relaesed, so as to stop at the position determined by the aperture setting ring 8 as is shown in FIG. 3(E'). At this time the AE lever 94 displaced, being pushed by the lever 84 stops at the position at which the lever 84 stops as is shown in FIG. 3(E). When then the diaphragm driving lever 98 of the camera body 4 is displaced along the direction of the arrow ε as is shown in FIG. 3(F), the diaphragm closing lever 88 of the lens device 2 is driven toward the direction of the arrow ν as is shown in FIG. 3(F') in such a manner that the diaphragm is closed down to the position determined by means of the lever 84. In this state the exposure is stated, whereby the state as is shown in FIGS. 3(F) and 3(F') is kept at least up to the termination of the exposure. Hereby when the diaphragm driving lever 98 has returned along the direction of the arrow ω after the termination of the exposure, the lever 84, the diaphragm closing lever 88, the AE lever 94 and the diaphragm driving lever 98 are brought back into the state as is shown in FIGS. 3(C) and (C').

Hereby the above mentioned operations of the lever 84 and of the AE lever 94 are of no particular meaning. The reason is that as explained above the present invention does not present any mechanism for picking up the diaphragm step number information concerning the aperture value which is set by means of the aperture setting ring 8 for the camera body 4 from the lever 84 while the AE lever 94, being clamped at a desired position, serves to prevent the lever 84 from being displaced along the direction of the arrow so as to preset the aperture from the side of the camera body 4 so that the levers 84 and 94 execute no function at all once the aperture is preset by means of the aperture setting ring 8 at the side of the lens device 2. However as is clear from the drawing the levers 84 and 94 have each an independent function while in the mode having nothing to do their function there is no danger for intervention nor interference. This is largely due the arrangement of the AE lever and the lever 84 for a certain lens device composition and to the distribution of the strength of the springs for urging the levers.

FIG. 4 shows the operation of the lever when no aperture value is preset at the side of the lens device 2 as is afore mentioned. FIG. 4(a) shows the lens device 2 mounted on the camera body (4) in a ready state, whereby the clamping ring 10 has not been rotated into the mounting position so that the lever 84 is kept in a state displaced along the direction of the arrow ψ against the strength of the spring urging the lever 84 along the direction of the arrow φ. In case now only the clamping ring 10 is rotated along the direction of the arrow φ without mounting the lens device 2 on the camera body 4 the lever 84 is displaced fully along the direction of the arrow φ as is shown in FIG. 4(b). Hereby this displacement position corresponds with that which is determined in case the largest aperture value is selected by the aperture setting ring 8. Further this displacing strength is produced by the spring urging the lever 84 along the direction of the arrow φ. Now let us suppose that this lens device 2 is mounted on the camera body 4 in which AE has not been charged yet or the diaphragm closing lever 64 is pressed. In this case the AE lever 94 at the side of the camera body 4 is at an uncertain position depending upon the previous photographic mode or the state of the diaphragm closing lever 64. In other words, when the aperture preset is controled from the side of the camera body 4, the AE lever 64 is clamped at the position corresponding to the aperture value, remaining at the position until the next AE charge, while when the diaphragm closing lever 64 is operated, AE is discharged and at the same time the clamping is released. In consequence, when the lens device 2 is mounted on the camera body 4, the clamping ring 10 being rotated along the direction of the arrow φ, the lever 84 is urged by the strength of the spring toward the position shown in FIG. 4(b), whereby in practice the AE lever 94 has been clamped at the position shown in FIG. 4(C) (in practice at an uncertain position) so that the lever 84 is displaced by means of the AE lever along the direction of the arrow φ into the position shown in FIG. 4(C'), whereby further displacement is restricted by means of the AE lever 94. Now let us suppose that AE has been charged, the winding up lever 14 of the camera body 4 being operated. The AE lever 94 is driven along the direction of the arrow δ against the strength of the lever 84 until it is locked at the standard position shown in FIG. 4(D). In consequence the lever 84 at the side of the lens device 2 is kept in the state shown in FIG. 4(D'), being pushed by means of the AE lever 94. Further it is natural that the AE lever 94 and the lever 84 would be kept at the position shown in FIG. 4(D) and 4(D') in the same way when the lens device 2 is mounted on the camera body 4 in which AE has been charged. When then the shutter is released, the locking of the AE lever 94 is released so that the lever 84 start to run along the direction of the arrow δ against the strength of the spring of the AE lever 94. Hereby the AE lever 94 runs along the direction of the arrow δ, being pushed by the lever 84, whereby in the camera device the displacement amount of the AE lever 94 is detected as impulses in such a manner that the displacement reaches an amount corresponding to the diaphragm closing step number for the aperture value set at the side of the camera body or operated the AE lever 94 is clamped so as not to be displaced further. In consequence the AE lever 94 is kept, being clamped at the position shown in FIG. 4(E), whereby at the same time the displacement of the lever 84 is restricted by the AE lever at the position shown in FIG. 4(E'). Through the above mentioned operations the aperture value set or operated at the side of the camera body is brought into the preset state. When then the diaphragm driving lever 98 of the camera body 4 is displaced along the direction of the arrow ε as is shown in FIG. 4(F), the diaphragm closing lever 88 of the lens device 2 is driven along the direction of the arrow ν as is shown in FIG. 4(F') in such a manner that the diaphragm is closed down to the position restricted by the lever 84. In this state the exposure starts whereby the state shown in FIG. 4(F) and 4(F') is kept at least the termination of the exposure. When hereby the diaphragm driving lever 98 has returned along the direction of the arrow ω after the termination of the exposure, the lever 84, the diaphragm closing lever 88, the AE lever 94 and the diaphragm driving lever 98 resume the state equivalent to that shown in FIG. 4(C) and 4(C').

The above mentioned operation is carried out while the light is measured in the totally opened lens device 2 and the automatic exposure control operation with priority on aperture value and that on shutter speed, which is very profitable for controlling the aperture value from the side of the camera body 4 of the camera device.

Figure 5A:
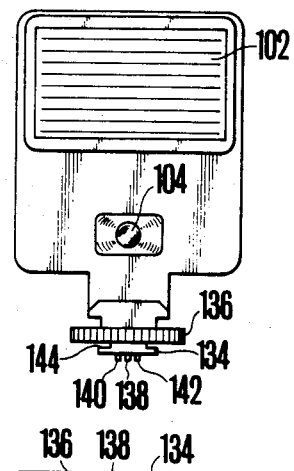
FIG. 5 shows three views of an embodiment of the speed light device to be applied to the camera system in accordance with the present invention.
Figure 5B:
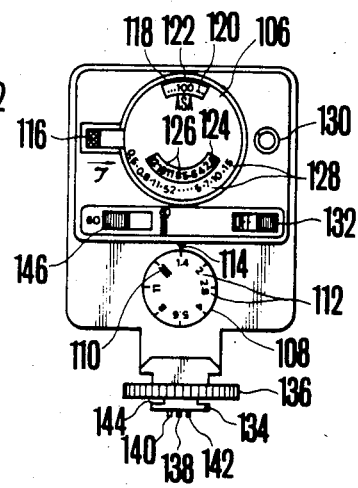
Figure 5C:
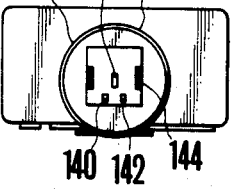

FIG. 5 shows an embodiment of the speed light device applicable to the camera system in accordance with the present invention, whereby FIG. 5(a) shows a front view, FIG. 5(b) a view seen from behind and FIG. 5(c) the bottom view. This speed light device included the well known automatic light adjusting ability but is further characterized in the capability of exchanging information with the camera device.

In the drawing, 102 is the illuminating member for issuing a flash light up to the capacity of this speed light device. Further 104 is the light detecting member for detecting the flash light reflected from the object so as to adjust the flash light of the illuminating member 102. In accordance with the automatic light adjusting system applied to this speed light device, at the time of taking a picture the speed light device is once actuated so as to project a flash light from the illuminating member 102 to the object while at the same time the flash light reflected from the object is measured by the light detecting member 104 so as to stop the operation of the illuminating member 102 as soon as the total light amount of the reflected flash light reaches a certain determined value in such a manner that a proper exposure amount is given to the film. Hereby in order to carry out such automatic light adjustment it is essential that the sensitivity of the film to be used and the aperture value of the photographic lens should be given as the set information in advance and for this purpose the film sensitivity setting dial 106 and the aperture value setting dial 108 are provided. Although hereby it can be thought that the information relative to the film sensitivity and the aperture value can be set through the film sensitivity setting dial 40 provided at the side of the camera device and the aperture value or the shutter time setting dial 34, in this embodiment the input means for the information necessary for the automatic light adjustment is intentionally provided at the side of the speed light device so as to enable the application of this speed light device to other camera system than the present one. Further as to the above mentioned aperture value setting dial 108, the manual mode that the photographer set the aperture value instead of the automatic light adjustment or the mode that a desired aperture value is selected for the automatic light adjustment can be selected. This selection is carried out by setting the manual mode indication 110 or the aperture value indication 112 provided on the above mentioned dial 108 at the index 114 provided on the speed light device body, by rotating the dial 108. Further the above mentioned film sensitivity setting dial 106 can be made rotatable, by displacing the lock lever 116 restricting its rotation along the direction of the arrow δ. This lock lever 116 is normally urged by a spring along the reversed direction of the arrow δ so as to prevent the unexpected rotation of the above mentioned film sensitivity setting dial 106. Further by rotating the above mentioned dial 106 the ASA sensitivity indication 120 is made to appear in the window 118 provided on the dial 106, whereby the film sensitivity setting is completed by setting the desired ASA sensitivity indication 120 at the index 122 provided on the dial 106 in the window. Further this film sensitivity setting dial 106 serves at the same time as the calculator of the guide number, whereby in case the manual mode has been selected by means of the dial 108 this can be made use of in order to set the aperture value of the lens device 2 in a manual way in accordance with the object distance. Namely when the aperture value setting dial 108 is set in the manual mode the speed light device does not carry out the automatic adjustment, issuing the maximum light amount of the speed light device. In consequence it is necessary to select a proper combination of the object distance with the aperture value in order to give a proper exposure amount to the film, whereby the guide number calculator to be used for this purpose is so designed that the combination of the object distance with the aperture value is altered so as to be suited for the guide number of the speed light device in accordance with the film sensitivity. In consequence it can naturally be thought that the film sensitivity setting dial 106 is used as the guide number calculator, whereby, however, the present embodiment is so designed that the proper exposure amount is given to the film while the photographer set the aperture value at the side of the camera device in a manual way from the corresponding aperture value indication 126 and the corresponding object distance indication 128 whereby the series aperture value indication 126 is made in the window 124 provided on the dial 106 while the series object distance indication is made along the circumference of the window 124. Further as is well known many speed light device is of the condenser discharge type, whereby the voltage of the battery or the net voltage is stepped up to a voltage sufficiently high for the Xenon discharge tube to operate and stored in the condenser, the charge stored in which condenser is discharged through the Xenon discharge tube at the time of taking a picture in such a manner that the discharge tube illuminates. In consequence in order that the above mentioned Xenon discharge tube illuminates without fail it is necessary that the above mentioned condenser has been charged up to a certain determined voltage, whereby when a picture is taken before the completion of the charging of the condenser a sufficient exposure cannot be obtained on the film because the speed light device does not operate properly. Thus which is needed in consequence is the charge completion display lamp 130 which illuminates at the termination of the charge so as to tell the photographer the condenser charging. Further this charge completion display lamp 130 serves at the same time as the switch for testing the speed light device, which illuminates when this switch is pushed. This is prite convenient for making an exposure measurement by means of a flash meter or the like. 132 is the power source switch, whereby operating this switch the condenser is started to be charged.

The above mentioned speed light device has almost the same efficiency as that with the conventional automatic light adjusting device, whereby this speed light device constitutes one of the constructional member of the system camera, being combined with the camera device so as to improve the operability of the camera device remarkably.

The speed light device shown in FIG. 5 can be mounted on the accessary shoe 50 of the camera device shown in FIG. 1, whereby the speed light device is fixed by means of the clamping ring 136 after the shoe 134 provided on the lower part of the speed light device is adapted on the above mentioned accessary shoe 50 from the back side of the camera device. Further the speed light device has the synchronization contact 138, the control signal contact 140 and the data signal contact 142 at the bottom of the shoe so as to be electrically connected to the synchronization contact 52, the control terminal 54 and the data terminal 56 of the accessary shoe at the time of mounting the speed light device. Further the shoe has an earth terminal 144 on one part to be earthed to the accessary shoe body in case of mounting the speed light device.

The shutter time with which an exposure synchorized with the speed light can be obtained in case of a camera provided with the focal plane shutter at the time of taking a picture under the speed light, namely the speed light synchronization shutter time (TSYN) is generally shorter than 1/60 sec. or 1/125 sec, whereby the missetting often takes place at the actual camera handling while it disturbs the operability of the camera to reset the shutter time for the speed light photography so that it has been thought that some measures would be necessary. For this purpose in case of the speed light device applied to the present embodiment not the passive method that only an alarm is issued in case of the misoperation but the active method that the shutter speed suited for the speed light photography is controled from the side of the speed light is adopted. What can be thought for the active method is the full automatic system in accordance with which no matter at which shutter speed is set at the side of the camera device the shutter is automatically released with the speed light synchronization shutter time TSYH in case of the speed light photography and the semi-automatic system in accordance with which only when a shutter time shorter than the speed light synchronization shutter time is set at the side of the camera device the shutter is automatically released with the speed light synchronization shutter time while when the shutter speed set at the side of the camera device is larger than the speed light synchronization shutter time (TSYH) the shutter is released with the set shutter time, whereby the present embodiment is so designed so as to be able to select the fully automatic system and the semi-automatic system depending upon the situation. The change over switch 146 provided at the back of the speed light device serves to change over the full automatic system and the semi-automatic system.

The determination signal of the change over position of this change over switch 146 is transmitted as a signal with two informations to the control terminal 54 of the accessary shoe 50 through the control contact 140 together with the signal for showing the termination of the charge of the speed light device. This can be realized by designing in such a manner that the value of the current at the time when a voltage is applied to the control contact 140 at the side of the speed light through the control terminal 54 at the side of the camera differs depending upon the change over position of the above mentioned change over switch 146. There two informations are transmitted to the camera device in accordance with the AND conditions with the information as to the termination of the charge of the speed light device. In consequence no signal is transmitted to the side of the camera device when the speed light device has not been charged yet. In case now the signal showing the termination of the charge of the speed light device is given as the first signal, this signal is taken into the camera device as signal showing the full automatic system, while the signal showing the termination of the charge of the speed light device is given as the second signal, this signal is taken into the camera device as signal showing the semi-automatic system. In accordance with the first and the second information signal through the control terminal 54 the camera device is brought into the speed light photographic mode, whereby as the shutter time the speed light synchronization shutter speed or a longer time than the above (in case of semi-automatic system) is selected while at the same time the data for the aperture value or the total speed light amount is taken up through the data terminal.

The information set by means of the aperture setting dial 108 is given to the data terminal 56 as analog value. Namely as mentioned afore the information as the aperture value is essential in case of the automatic light adjusting mode so that it is so designed that the information can be set at the side of the speed light device, whereby the transmission system is necessary in order to make the set value the aperture control signal at the side of the camera device. The data contact 142 is provided on the side of the speed light device for this purpose, while the data terminal 56 is provided on the side of the camera body for this purpose. When now the charge completion termination signal is put in the camera body, the camera body takes up the analog information concerning the aperture value through the data terminal 56 so as to control aperture in accordance with this information. When the aperture setting dial 108 at the side of the speed light device has been selected in the manual mode, other analog information than that with the level corresponding to the aperture value, for example an analog signal with the higher lever than that of the data showing the aperture value is produced at the data contact 142 in such a manner that a signal showing that the speed light device is in the manual mode well illuminates with its maximum light amount is transmitted to the camera body. At this time the aperture is not controled at the side of the camera device so that it is necessary to set the desired aperture value or the aperture value obtained from the guide number calculator at the side of the lens device 2 through the aperture setting ring 8.

In accordance with the above mentioned composition, it is possible to automatically obtain the proper exposure even in case of the photography under the speed light by means of the present embodiment of the camera system so that although in case of the conventional photography under the automatic light adjusting speed light it is necessary to set the shutter time at the side of the camera device at a time longer than the speed light synchronization shutter time (TSYN), for example 1/60 sec. and at the same time to set the aperture value at a value appointed for the side of the automatic light adjusting speed light device, not only the shutter speed but also the aperture value can automatically be set so that the operability can remarkably be improved while the misoperation can considerably be avoided. Further at the side of the camera device the exposure is controled automatically before the speed light device has not yet been changed so that a picture can be taken with the proper exposure or the nearly proper exposure even when the shutter is released before the speed light device has not been charged fully in such a manner that the probability to obtain superior pictures is increased, which can be said a remarkable progress in comparison with the conventional camera system, whereby in case a picture is taken under speed light when the speed light device has not been charged fully, the speed light device does not illuminate at the time of the shutter release in such a manner that the exposure is under with the shutter speed and the aperture value set for the speed light photography.

Further, in case a picture is taken under the speed light by this camera system no special operation is need at the side of the camera device, whereby the camera device is automatically changed over into the speed light photographic mode when the speed light is mounted at the camera device, the power source switch is closed and the speed light device is fully charged, so that it is sufficient to obtain the object distance and release the shutter, which can be said a remarkable progress in comparison with the conventional camera system in which various setting operation are need in case a picture is taken under the speed light.

One of the most important thing for completing the automatic exposure control efficiency of the camera is the light measuring system. The efficiency of this light measuring system is to take up the object brightness information which is one of the factors for the exposure operation, being mostly so designed that the object brightness is converted into the electrical signal through a photoelectric converting element.

At present most of the exposure meter built in the single reflex camera is of the TTL light measuring system, which is also applied to the single reflex camera with the automatic exposure control efficiency. In accordance with this TTL light measuring system a comparatively precise light measurement is possible because the light beam of the object actually coming through the lens is measured, whereby in case lenses with different focal length are used the system can be adapted in a same way, which is remarkably convenient. Further it is possible to confirm the portion in which the light is measured or the frame through the view finder so that the measured light amount can easily be compensated.

What is discussed about in case of the camera device with this TTL light measuring system is the problem concerning the light measuring range in the frame. This light measuring range is principally devided into the partial light measuring range in what a certain determined portion in the frame, for example the central portion is measured with weight and the mean light measuring range in which the whole portion in the frame is measured in an average way, whereby the combination of the partial light measuring range with the mean light measuring range as well as other exceptional light measuring range such as the division of the mean light measuring range into several ranges in each of which the light is measured with different weight.

In case of the camera device with the automatic exposure control efficiency the mean light measuring range is generally applied because it is more convenient from the view point of the snap shot photography, whereby there still remain some problem.

The largest difficulty takes place when a picture is taken with the wide-angle lens and the like, whereby in case the brightness of the background is extremely different from that of the object to be photographed actually, the automatic exposure control mechanism controls the exposure in accordance with the brightness of the background so that there exists a danger for the extreme under-exposure or the extreme over-exposure for the object desired to be actually photographed. The afore mentioned AE lock mechanism is provided in order to avoid such difficulties. When it is desired to measure the brightness of the object at a certain determined position in the frame in case of the camera device with such mean light measurement, it is necessary to take such troublesome operations that the framing is once made in the neighborhood of the object in such a manner that the position of the determined portion of the object assumes almost all the portion in frame so as to measure the brightness and then the framing and the focusing are made under the operation of the AE lock mechanism at a distance from the object so as to release the shutter. Thus the partial light measurement of the object brightness is preferable in order to avoid such difficulties.

In case of the camera system in accordance with the present invention in order to avoid the above mentioned difficulties the camera device is so designed that another external light measuring meter than the TTL light measuring meter can be mounted on the accessary shoe 50 in such a manner that the automatic exposure control is carried out in accordance with the result of the light measurement by means of this external light measuring meter.

Figure 6:
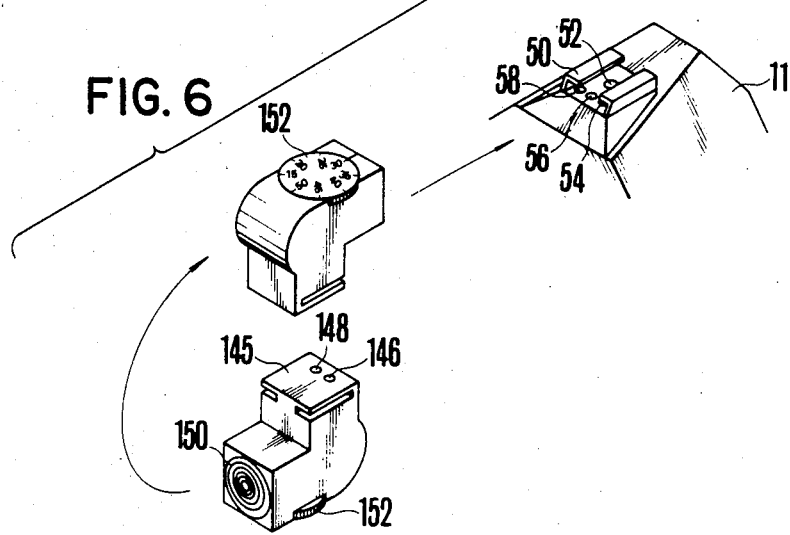
FIG. 6 shows an external light measuring instrument to be applied to the camera system in accordance with the present invention in perspective view.

FIG. 6 shows an external light measuring meter applicable to the camera system in accordance with the present invention in perspective view, whereby the contact 146 provided on the bottom of this light measuring meter can be brought into contact with the control terminal provided in the accessary shoe 50 at the side of the camera device so as to send a signal to the side of the camera that the light measuring meter has been mounted on the accessary shoe 50. This is given to the camera device from the light measuring meter as the third signal which is different from the charge completion signal consisting of the two informations for the full automatic operation and the semi-automatic operation of the speed light device. In the camera device upon receipt of this third information the mode is changed over into the external light measuring mode whereby the analog information put in through the data terminal 56 is taken up as the object brightness information. Hereby the contact 148 provided a the bottom of the light measuring meter can be brought into contact with the data terminal 56 when the light measuring meter is mounted on the accessary shoe 50, producing the brightness of the light beam of the object coming through the light receiving window 150 as analog data to be transmitted to the camera device through the data terminal 56. The light receiving angle of the afore mentioned light receiving window 150 can be fixed correspondingly in accordance with the purpose, whereby the light receiving window 150 is in the present embodiment so designed that, being provided with the zooming efficiency, the light receiving angle is freely variable in accordance with the focal distance of the telephotolens and the desired light measuring range by means of the dial 152 on the upper part of the light measuring meter.

In case of the camera device composed as mentioned above, the mode is automatically changed over into the external light measuring mode when the external light measuring meter is mounted on the accessary shoe 50 in such a manner that the exposure is controlled automatically in accordance with the information coming from the external light measuring meter, whereby the operability of the camera device is further enlarged.

With reference to the TTL exposure meter built in the single reflex camera or the afore mentioned external light measuring meter, the light measuring system is of the so called reflection light system in accordance to which the light reflected by the object is measured so that the measured light amount as the object brightness corresponds with the actual brightness. However, this object brightness is largely influenced by the color tone and the surface condition of the object, so that this system can not be said the proper method for determining an exact exposure free from the color tone and others of the object by measuring the exact brightness, the practicability being hereby put aside. For example when the completely white object and the completely black object are measured under the same illumination by means of the reflection light system, the measured light amounts naturally differ from each other, while when they are measured by means of the incident light system there takes place no difference between the two amounts because the measured light amount naturally depends only the illumination condition for the object. In consequence the incident light system is preferred in case it is desired to obtain an exact exposure amount, whereby in case of the camera device, even in case of the camera device with the automatic exposure control system the automatic exposure control in accordance with the measurement result by means of the incident light system is preferred.

From the above mentioned point of view, the camera system in accordance with the present embodiment further includes the exposure meter with the incident light system as the external light measuring system.

FIG. 7 shows an incident light system exposure meter applicable to the camera system in accordance with the present invention in perspective view, whereby this exposure meter 60 is connected to the camera device by the cord 154. This cord 154 includes a signal line for transmitting various informations or data from the exposure meter 160 to the camera device, whereby the exposure meter 160 is connected to the camera device, the coupler 156 at the one end being mounted on the accessary shoe 50 of the camera device while the plug provided at the other end being fixed on the socket 162 of the exposure meter. The contact 166 provided on the bottom surface 164 of the coupler 156 can be contacted to the control terminal 54 provided in the accessary shoe 50 at the side of the damera device, sending a signal that the exposure meter 160 has been connected to the camera device to the side of the camera in the same way as the case with the afore mentioned external light measuring meter. This signal is given as the third information which is different from the charge completion signal consisting of the two informations for the full-automatic light adjusting operation and for the semi-automatic light adjusting operation of the speed light device. In case of the camera device upon receipt of the third information the mode is changed over into the external light measuring mode whereby the analog information coming through the data terminal 56 is taken up as the illumination information. This illumination information is treated in the exposure operation as a value equivalent to the object brightness put in the aforementioned external light measuring meter. Further the contact 168 provided at the bottom of the coupler 56 can be brought into contact with the data terminal 56 when the coupler 156 is mounted on the afore mentioned accessary shoe 50, serving to transmit the illumination information obtained by the exposure meter 160 to the camera device through the data terminal 56 as an analog data. Further the contact 170 provided at the bottom of the coupler 156 can be brought into the contact with the AE lock terminal 58 of the afore mentioned accessary shoe 50, serving to lock the automatic exposure control mechanism of the camera device especially the measured light amount, being brought into contact with the afore mentioned AE lock terminal as soon as the coupler 156 is mounted. The AE lock is released only while the light measuring button 174 provided on the exposure meter is being pushed. Hereby with the pushing of the light measuring button 174 the exposure meter 160 starts the light measurement and stops it as soon as the button is released.

To explain the exposure meter 160 more in detail. 176 is the light receiving head rotatably provided and covered by the semi-spherical diffusing member 178. At the time of the light measurement, the light measuring button 174 is pushed while the light sensitive part of the light receiving head 176 is directed toward the camera device from the position of the object. With this operation, the AE lock at the camera is released whereby the exposure meter 160 starts the light measurement so as to transmit the data concerning the illumination information measured at the afore mentioned light sensitive part to the camera device through the cord 154 as analog data. Hereby the camera device in which the AE lock is released starts to carry out the operation for the automatic exposure control basing upon the data concerning the illumination. Further at the time of the light measurement the illumination obtained as the result of the light measurement is displayed also by means of the meter 180 at the side of the exposure meter 160. In consequence, the photographer can also learn the combination of the aperture value with the shutter time necessary for attaining the proper exposure out of the display by the finger 182 of the meter 180 through the calculator. By releasing the pushing of the light measurement button 174 at the termination of the light measurement the camera device is brought into the AE locked state while the finger 182 of the meter 180 is clamped. By releasing the shutter when the corresponding handlings such as the framing, the focusing and so on have been carried out in this state after taking the exposure meter 160 out of the light measuring position, the exposure can automatically be controlled basing upon the AE locked operation result so as to obtain the desired exposure.

Hereby the reason why the AE locking efficiency of the camera device is given to this incident light system exposure meter is that it is unavoidable that the incident light system exposure meter should be used in the neighborhood of the object instead of the plate at which the camera is set at the time of taking a picture, namely the place at which the light is measured by the exposure meter 160 is not alway the same place at which the camera device is set for taking a picture so that when the shutter is released while the light is being measured, the exposure meter is also photographed together with the object, which has to be avoided.

Namely the exposure meter 160 carries out the light measurement temporalily in the neighborhood of the object in the same way as the case with conventional incident light system exposure meter as a single body while the AE lock of the camera device is released only during the light measurement so that the operation for the automatic exposure control is carried out in accordance with the light measurement data and after the termination of the light measurement the operation result at the time of the light measurement is locked by the AE locking in such a manner that after then the exposure can be controlled in accordance with the operation result at the time of the light measurement even if the exposure meter 160 is brought out of the place at which the light was measured.

As mentioned above the application field of the camera device can largely be enlarged by giving an automatic exposure control efficiency basing upon the light measurement data by means of the incident light system exposure meter to the camera device with the automatic exposure control mechanism.

The camera system in accordance with the present invention is so designed that the motor drive device is applicable. This motor drive device includes a mechanism for automatically winding up the film after the shutter release, whereby it is very profitable for photographing an object in motion in a successive way or catching a proper shutter chance and moreover the winding up operation of the film is not necessary so that more attention can be concentrated to the framing or the focusing and the catching of the shutter chance so that the photographic possibility can remarkably be enlarged.

It is requested that the motor drive device to be applied to the camera system in accordance with the present invention should be compact and superior in the efficiency in such a manner that the device can be applied quite effectively for taking a picture while the operability of the camera device is not deteriorated in comparison with that before mounting the device.

FIG. 8 shows an embodiment of the motor drive applied to the camera system in accordance with the present invention in perspective view. In the drawing, 186 is the motor drive device body, 188 the camera mounting screw rotatably projecting on the body 186 and engageable into the screw hole provided on the bottom face of the camera body 4 so as to mount the device body 186 on the camera body 4, 190 the mount ring being adapted on the camera mounting screw 188, so as to rotate the mounting screw 188, 192 the power source switch of the motor drive device, 194 the picture number setting gear for setting the photographable number of the pictures of the used film or the numbers of the pictures desired by the photographers by means of the motor drive device, 196 the film counter to display the number of the remaining pictures in the film fed by means of this motor drive device or the number of the pictures set by the afore mentioned picture number setting gear, 198 the contact terminal to be connected to the contact device 72 provided on the lower surface of the camera body 4 when this motor drive device is mounted on the camera device, 200 the winding up coupler to be mechanically connected to the shaft of the winding up lever of the camera device when the motor drive device is mounted on the camera device, 202 the winding back lever provided for operating the winding back button 48 from the side of the motor drive device, because this button can not be operated when the motor drive device is mounted on the bottom surface of the camera body 4 and 204 the winding back button projecting on the device body 186 when operating the afore mentioned winding back lever 202 so as to push the winding back button 48 on the buttom surface of the camera body 4. Hereby in order to mount the motor drive device on the camera device it is necessary to take off the cover 70 on the bottom surface of the camera body 4 and to make exposed the coupler 206 to be mechanically linked with the shaft of the winding up lever 14 of the camera device. When the motor drive device 186 has been mounted on the bottom surface of the camera body 4 after removing the afore mentioned cover 70, the winding coupler 200 at the side of the device body 186 is adapted to the coupler at the side of the camera body 4 so as to enable the film winding up from the side of the motor drive device.

Hereby it is necessary that the motor drive device mounted on the camera device should operate in closure connection with other operations of the camera device, for which purpose some information transmission means is necessary between the drive device and the camera device. The contact device 72 at the side of the camera device and the contact terminal 198 at the side of the motor drive device are provided also for the above mentioned purpose, whereby when the motor drive device is mounted on the camera device the three contacts 215, 216 and 218 included in the contact device 72 on the bottom surface of the camera body 4 are respectively connected electrically to the three contacts 208, 210 and 212 included in the contact terminal 198 of the motor drive device 186. Hereby the contact of the contact 208 with the contact 214 serves as the earthing between the camera device and the motor drive device while the contact of the contact 210 with the contact 216 serves to transmit the signal for driving the winding up motor from the side of the camera device to the motor drive device until the winding up has been terminated since the termination of the exposure. Further the contact of the contact 212 with the contact 218 serves to release the shutter of the camera device by means of the shutter release device provided at the side of the motor drive device.

Hereby 220 is the afore mentioned shutter release device serving to operate the camera device, especially to wind up film by the shutter releasing and the motor drive device from a remote place. This shutter release device 220 is connected to the motor drive device 186 by means of a control cord 222 of a corresponding length by inserting the plug 224 provided at the end of the afore mentioned control cord 222 into the socket 226 provided on the motor drive device 186. This shutter release device 220 includes an operation button 228, whereby by operating this operation button 228 a shutter release signal is given from the motor drive device to the camera device through the afore mentioned contacts 212 and 218. The service of this operation button 228 is quite same as that of the shutter release button 18 provided on the upper surface of the camera body 4. Further the afore mentioned operation button can be locked in the pushed down state, when being displaced along the direction of the arrow while being pushed down.

To explain the motor drive device constructed as mentioned above more in detail, in order to apply the motor drive device to the camera device at first the cover 70 provided on the bottom surface of the camera body 4 is removed and then the bottom surface of the camera body 4 is laid on the upper surface of the motor drive device 186. In this state the winding up coupler 200 is in a position in which the coupler 200 can be adapted to the coupler 206, while the mounting screw is in an engageable position into the screw hole 68. Further the pin 204 is opposed to the winding back button 48. Further it is necessary that the contacts 208, 210 and 212 of the contact terminal should be at the positions at which they can be brought into contact with the corresponding contacts 214, 216 and 218 of the contact device 72 respectively. This positioning can easily and quickly made by holding the bottom surface of the camera body 4 by means of the holding edge 228 provided at the edge of the upper surface of the motor drive device so far as the camera device and the motor drive device are not reversed in the direction. Then being rotated by rotating the mounting ring 190, the mounting screw 190 is engaged into the screw hole 68 provided on the bottom surface of the camera body 4 in such a manner that the motor drive device is secured on the camera body 4. In this state the winding up coupler 200 is adapted to the coupler 206, whereby the contacts 208, 210 and 212 of the contact terminal 198 are brought into the corresponding contacts 214, 216 and 218 of the contact device 72. Hereby the winding coupler 200 and the coupler 206 are adapted to each other by engaging the two claws 230 of the winding up coupler 200 into the two engaging holes 232 of the coupler, whereby depending upon the rotation position of the respective coupler at times the claws 230 of the winding up coupler 200 are not engaged into the engaging holes 232 of the coupler well. In order to avoid such inconvenience, the winding up coupler 200 is so designed as to be retirable along its axial direction, being held protruding by means of a spring. Namely in case the claws 230 of the winding up coupler 200 are not engaged into the engaging holes 232 of the coupler 206, the claws are retired, being pushed by other parts than the engaging holes 232 of the coupler 206, so that it can be avoided that unreasonable strength should be exercised on the couplers at the time of the mounting of the motor drive device. However, when hereby due to the operation of the winding up lever 14 at the side of the camera device or the rotation of the winding up coupler 200 or of the coupler 206 the claws 230 are brought into the position at which the claws 230 can be engaged into the engaging holes 232, the claws protrude by means of the strength of the spring so as to be engaged into the engaging holes 232.

With the mounting of the motor drive device, the film can be wound up automatically after the termination of each photographing at the side of the camera device so as to carry out successive photographing. When the photographer desires to take pictures by means of the motor drive device, the motor drive device is switched in by means of the power source switch 192. When at this time the film has been wound up at the side of the camera device, the motor drive device remains in the waiting state, while the film has not been wound up yet the motor drive device enters into the waiting state, having once wound up the film. Then by operating the shutter release button 18 at the side of the camera device, the film is wound up by means of the motor drive device after photographing. Further by holding the afore mentioned shutter release button 18 pushed, the shutter release and the film winding up are repeated in a successive way. Further every time the film is wound up once, the film counter 196 carries out one subtraction counting until the content of the counter 196 becomes "0", when the motor drive device is restricted in the operation. This is particularly important for protecting the film perforations, preventing the motor drive device from been exposed to the unreasonable strength.

When the film is wound back after the termination of the whole film, the winding back lever 202 is wound back along the direction of the arrow, the winding back pin 48 of the camera device is pushed by the pin and then it becomes possible to wind back the film.

Hereby the shutter release device 220 has the same efficiency as that of the shutter release button 18 provided at the side of the camera side, whereby when the operation button 228 is pushed down the shutter is released and the film is wound up, while when the operation button is kept being pushed or locked, the shutter is released and the film is wound up in a successive way.

Further when the shutter release button 18 is kept in the pushed down state or the operation button 228 of the shutter release device is locked in the pushed down state while the selector lever 22 provided on the upper surface of the camera body 4 is being kept at the position at which the mark 28 is selected, the shutter is released and the film is wound up sepeatedly at a time interval determined by means of the self-timer mechanism.

As explained above the motor drive device to be applied to the camera system in accordance with the present invention contributes much to enlarge the application field of this camera device and to increase the mobility, the snap-shot efficiency and the operability of this camera device.

As explained above the view finder plays a remarkably important role for the camera handling, because almost all of the camera handling including the framing and the focusing constituting basic camera handlings are made through the view finder in such a manner that the view finder has something very important with the operability of the camera, and therefore the operability can further increased remarkably if almost all of the informations necessary for the camera handling can be obtained through the view finder. Hereby it is essential that the photographic informations to be displayed in the view finder should be distributed efficiently in a limited area while the displayed informations could easily be recognized. This is important in order that the photographer can concentrate his attention to the framing and the focusing.

The view finder of the camera device in accordance with the present invention presents a novel information display system by means of which the photographic informations can be efficiently and easily observed while the misoperation of the camera can be avoided, the operability being much improved.

Through this information display system the photographer can obtain various informations such as the shutter time, the low brightness alarm for aperture value, the high brightness alarm for aperture value, the automatic or manual operation, the bulb signal, the speed light device charge completion signal and the alarm of misoperation and so on, so that he is in a position to get all the information for all the situation while he is looking through the view finder.

FIG. 9 shows the view finder information displayed in the view finder window 13 of the camera device, whereby on the focusing screen 234 a split portion 236 and a microprism portion 238 are arranged coaxially in order that the focusing can be carried out preeisely and quickly. This focusing screen is one of the most important part, because the image of the object is formed thereon so as to carry out the focusing and the framing, whereby the photographer can obtain desired informations necessary for taking a picture from a part of the circumference of this focusing screen 234. In order that the photographic informations can be recognized in the darkness for example in the case of the speed light photography or the stage photography, the display consists of illuminating elements such as LED and the like, whereby the present embodiment is characterized in the digital display of the informations. Different from the conventional fixed point system or the conventional follow finger system from which relative photographic informations are obtained, it is possible to obtain objective photographic informations from the present digital display system of the informations, so that the photographer can judge the depth of the object field and the unstable manual holding already in advance at the time of the framing and the focusing operation in such a manner that a more correct photographing becomes possible.

Being provided on a part of the focusing screen 234, this LED display part is composed of a first display part 244, consisting of a numerical figure display part 242 consisting of a figure display part 240 for displaying a reciprocal number and "8" segments for displaying four numerical figures or signs and of a decimal point display part 243 for displaying the decimal point, a second display part 250 consisting of a decimal point display part 246 for displaying the decimal point and of a numerical figure display part 248 consisting of "8" segments for displaying two numerical figures or signs and a third display part 252 for displaying a figure "M" at the time of the manual operation.

The afore mentioned first display part mainly serves to display the shutter time while the second display part mainly serves to display the aperture value, whereby other informations can also be displayed in accordance with the operation mode.

Namely beside the display of the shutter time from 60 sec. to 1/2000 sec. the first display part displays "bulb" when "bulb" is selected as shutter time, "EF" display together with the speed light photographic shutter time so as to tell the photographer that the speed light photography is possible when the speed light device has been charged and "EEEE" twinkling display as alarm so as to tell the photographer that the normal photographing is impossible.

Further beside the display of the aperture value from F1.2 to F22, in case the exposure is manually adjusted by means of the aperture setting ring 8 while the diaphragm of the lens device 2 is being closed, the afore mentioned second display part displays "oP" twinkling display so as to tell the photographer that the manually set aperture value gives the under-exposure, "oL" twinkling display so as to tell the photographer that the manually set aperture value gives the over-exposure and "oo" display so as to tell the photographer that the manually set aperture value gives the proper exposure and further "EE" twinkling display, together with the afore mentioned first display part, as alarm so as to tell the photographer that the normal photographing is impossible.

As explained above, the information displayed in the view finder have a close relation various operation modes of the camera device. Consequently the operation modes of the camera device shown in FIG. 1 will be explained below while the informations displayed in the view finder in accordance with the operation modes will be explained in accordance with FIG. 10.

In case now the automatic exposure control photography (hereinafter called AE photography) is carried out with priority on shutter speed by the camera device shown in FIG. 1, the mode change over switch 38 provided on the camera body 4 is set at the side of the priority on shutter time in such a manner that the set set shutter time can be put in by rotating the dial 34. Further the mark 12 on the aperture setting ring 8 at the side of the lens device 2 is set at the mark 7 in such a manner that the diphagram of the lens device 2 can be controlled, preset from the side of the camera body 4. Now this camera device has been brought into the state in which the AE photography with priority on shutter time is possible, whereby with the rotation of the dial 34 the shutter time displayed in the afore mentioned display part 244 alters. Hereby the shutter time is displayed as is shown in FIG. 10 (a)-(I), whereby the photographer can select and set the desired shutter time by rotating the afore mentioned dial 34, while looking at the shutter time displayed in the first display part 244. At the same time in a not shown operation circuit, an aperture value necessary for the proper exposure, or the over-exposure or the under-exposure designed by the photographer (the over-exposure or the under-exposure can be obtained by selecting (+) or (−) of the scale 42 of the ASA sensitivity setting dial provided on the upper surface of the camera body 4, whereby they are also called proper exposure here), are operated in accordance with the object brightness information corresponding to the brightness of the object (or the illumination) and are displayed in the second display part 250 as is shown in FIG. 10(a)-(I). In consequence the photographer can know the aperture value operated for the shutter time set by himself before the shutter time. When in this state the shutter is released in the camera device, the diaphragm of the lens device 2 is closed down to the operated aperture value and the shutter is released with the set shutter time.

Hereby the aperture of the diaphragm of the lens device 2 to be used has the upper and the lower limit, whereby when the aperture value operated for the set shutter time is smaller than the smallest aperture value of the photographic lens device 2, namely the object brightness is too low, the aperture control with the operated aperture value is impossible. In this case, the second display part 250 displays twinkling the aperture value of the photographic lens corresponding to the controlable aperture value, namely the smallest aperture value so as to tell the photographer the above mentioned fact. Hereby the controlable aperture value of the photographic lens 2, namely the smallest aperture value is taken up from the totally opening pin 90 of the photographic lens device 2 through the totally opening input pin 96 at the side of the camera body 4.

In case hereby the aperture value operated for the shutter time set by means of the dial 34 is larger than the largest aperture value of the photographic lens device 2, namely the object brightness is too high, the aperture control is impossible with the operated aperture value. In this case the second display part 250 displays twinkling the aperture value of the photographic lens 2 corresponding to the controlable aperture value, namely the largest aperture value so as to tell the photographer the fact.

Hereby the controlable largest aperture value of the photographic lens device 2 is taken up from the smallest diameter pin of the lens device 2 through the smallest diameter input pin 97 at the side of the camera body 4.

Hereby even if the smallest or the largest aperture value is displayed twinkling as alarm at the second display part 250 when the object brightness is too low or too high for the set shutter time, the shutter can be released, whereby the aperture value is controlled by the value displayed twinkling at the second display part 250.

In case now the AE photography is carried out with priority on aperture value, the mode changing over switch 38 provided on the camera body 4 is set at the side of the priority on aperture value in such a manner that the aperture value can be set and put in by operating the dial. Further the mark 12 of the aperture setting ring 8 at the side of the lens device 2 is set at the index in such a manner that the diaphragm of the lens device 2 can be preset and controlled at the aperture value set at the dial at the side of the camera body 4. In this state this camera device is in the state in which the AE photography can be carried out with priority on aperture value, whereby with the rotation of the dial 34 the aperture value displayed at the afore mentioned second display part 250 alters. Hereby the aperture value is displayed as is shown in FIG. 10(*a*)-(II), whereby the photographer is in a position to select and set the desired aperture value by operating the afore mentioned dial 34, while looking at the aperture value displayed at the afore mentioned display part 250. At the same time in the not shown operation circuit the shutter time necessary for obtaining the proper exposure is operated in accordance with the object brightness information corresponding to the brightness of the object (or illumination information) and displayed at the first display part 244 as is shown in FIG. 10(*a*)-(II). In consequence, the photographer can learn the shutter time operated for the aperture value set himself before the shutter release. When in this state the shutter is released, in the camera device the diaphragm of the camera device is closed down to the set aperture value and the shutter is released with the operated shutter time.

Further the aperture value of the photographic lens device 2 has the upper and the lower limit, whereby when the aperture value set at the dial 34 at the side of the camera body 4 is smaller than the smallest value of the photographic lens device 2, the diaphragm can not be controlled with the set aperture value. In this case, the aperture value can be said misset, whereby some counter-measure is necessary. For such missetting in this embodiment the smallest aperture value of the photographic lens is treated as set. In case for example the aperture value is set at "1.4" in F-number at the dial 34 at the side of the camera body 4 although smallest aperture value of the lens device 2 is 1.8 in F-number, actually the aperture value is treated as set at "1.8" in F-number in the camera device, whereby the shutter time is operated for this aperture value. At this time independently of the value set at the dial 34 the aperture value and the shutter time for actually controlling the exposure are displayed as is shown in FIG. 10(*e*)-(I).

When on the other hand, the aperture value set at the dial 34 at the side of the camera body 4 is larger than the largest aperture value of the photographic lens device 2, the diaphragm can not be controlled with the set aperture value. In this case, the aperture value can be said misset and some counter measures are necessary. In this embodiment for such missetting the largest aperture value of the photographic lens is treated to be set. In case for example, the aperture value of "22" in F-number is set at the dial 34 at the side of the camera body 4 although the largest aperture value of the lens device 2 is "16" in F-number, in the camera device the aperture value of "16" in F-number is treated to be set actually so as to operate the shutter time basing upon this value. At this time, the aperture value and the shutter time for the actual exposure control independent of the value set at the dial 34 are displayed in the view finder as is shown in FIG. 10(*e*)-(II).

Further the shutter time controllable at the camera body 4 has the upper and the lower limit, whereby in case the shutter time operated for the set aperture value is longer than the shutter speed controllable at the side of the camera body 4, namely the object brightness is too low the shutter time can not be controlled with the operated shutter time. In this case, the first display part 244 displays twinkling the shutter time corresponding to the longest controllable shutter time so as to alarm the photographer.

In case the operated shutter time for the aperture value set at the dial 34 is shorter than the time controllable at the side of the camera body 4, namely the object brightness is too high, the shutter can not be controlled with the operated shutter time. In this case the first display part 244 displays twinkling the shortest shutter time capable of controlling shutter so as to alarm the photographer.

Hereby even if the first display part 244 displays twinkling the longest or the shortest shutter time when the object brightness is too low or too high for the set aperture value, the shutter can be released. In this case the shutter time is controlled with the value displayed twinkling at the first display part 244.

The camera device shown in FIG. 1 is designed so as to be intended mainly for the above mentioned two modes, namely the AE photographic mode with priority on shutter time and the AE photographic mode with priority on aperture value, whereby almost all of the requirements of the ordinary photography are thought to be met with the above mentioned two modes.

However, at the side of the lens device 2 the mark 12 on the aperture setting ring 8 is not always set at the index 7, whereby there is a possibility that at time the aperture value indication 9 on the ring 8 should be set at the index 7. In this case, the camera device is brought into the totally opened light measuring, manual exposure adjustment photographic mode. At this time two modes, namely the mode that the aperture value is manually set at the side of the lens device 2 after the shutter time is set at the dial 34 with priority depending upon the mode selector 38 and the mode that the same aperture value is manually set also at the side of the lens device 2 after the aperture value is set at the dial 34 with priority. In case now the mode selector 38 is set at the side of the priority on shutter speed, the dial 34 serves to set the shutter time, whereby by operating this dial 34 an optional shutter time can be selected. Hereby the selected and set shutter time is displayed at the first display part 244 as is shown in FIG. 10(*a*)-(II). In the camera device, on the other hand, the aperture value of the photographic lens device 2 for obtaining the proper exposure is operated in accordance with the object brightness information obtained through the lens device or the set shutter time and so on and is displayed at the second display part 250 as is shown in FIG. 10(*a*)-(II). Further at this time, the aperture value displayed at the second display part 250 is not controlled from the side of the camera body 4 but is preset at the side of the lens device 2 by setting the aperture value displayed at the second display part 250 out of the aperture value display 9 on the aperture setting ring 8 at the index 7 by means of the aperture setting ring 8 at the side of the lens device 2. Further in order to tell the photographer that is necessary to set the aperture value displayed at the second display part 250 manually at the side of the lens device 2, the letter "M" is displayed at the third display part in the view finder. Further in case the mode selector 38 is set at the side of the priority on the aperture value, the dial 34 serves to set the aperture value, whereby by operating this dial 34 an optional aperture value can be selected and set. Hereby the selected and set aperture value is displayed at the second display part 250 as is shown in FIG. 10(*a*)-(III). On the other hand in the camera device, the shutter time necessary for obtaining the proper exposure is operated in accordance with the object brightness information obtained through the lens device 2 or the set aperture value and so on and displayed at the second display part 244 as is shown in FIG. 10(a)-(III). Hereby the aperture value displayed at the second display part 250 is not controlled from the side of the camera body 4 but preset from the side of the lens device 2 by means of the aperture setting ring 8 at the side of the lens device 2 by setting a value equal to the aperture value displayed at the second display part out of the aperture value indication 9 on the aperture setting ring 8, namely the aperture value set at the dial 34 at the index 7. In this way the letter "M" is displayed at the third display part 252 in the view finder in order to tell the photographer that it is necessary to set the aperture value displayed at the second display part 250 manually at the side of the lens device 2.

As mentioned above by setting the shutter time or the aperture value by means of the dial and manually setting the aperture value at the side of the lens device 2 in accordance with the display at the second display part 250 in the view finder the lens device 2 is closed down to the position manually set in such a manner that in the camera body 4 the shutter is released with the shutter time set by means of the dial 34 or operated, whereby the proper exposure can be obtained.

In case hereby the mode selector 38 is set at the side of the priority on the aperture value even if the camera device is in this totally opened light measuring, manual exposure adjustment photographic mode, the AE photography with priority on aperture value is possible by setting in advance in such a manner that the aperture value set by means of the dial 34 always corresponds with the aperture value to be set at the side of the lens device 2. Namely in case of the AE photography with priority on aperture value the exposure time for the set aperture value is operated and controlled, so that in case the lens device 2 is preset for the aperture value preset in advance, the action of the system must be same no matter whether the presetting is made from the side of the camera body 4 or from the side of the lens device. Nevertheless the aperture value must be set by both of the camera body 4 and the lens device 2 in this case, which is unavoidably a remarkable hindrance for the operability.

Further in case of the totally opened light measuring manual exposure adjustment photographic mode it happens that the aperture value operated for the set shutter time is smaller than the smallest aperture value of the lens device 2 or larger than the largest aperture value, whereby the smallest aperture value or the largest aperture value is displayed twinkling in order to alarm the photographer.

Further in case of this mode it also happens that the shutter time operated for the set aperture value is shorter than the shortest shutter time controllable at the side of the camera body 4 or longer than the longest shutter time, whereby the shortest shutter time or the longest shutter time is displayed twinkling so as to alarm the photographer.

Further especially in case the mode selector 8 is set at the side of priority on aperture value in this mode, the range of the aperture value set at the dial 34 is naturally different from that which can be set at the side of the lens device 2.

In short the aperture value of the photographic lens device 2 to be used has the upper and the lower limit so that when the aperture value set by the dial 34 at the side of the camera body 4 is smaller than that of the smallest aperture value of the photographic lens device 2 the diaphragm can not be controlled with the set aperture value. In this case the aperture value is misset, whereby some counter-measures are necessary. For such a missetting in this embodiment, the smallest aperture value of the photographic lens is treated to be set. This is same as the case with the AE photographic mode with priority on aperture value.

In case on the other hand the aperture value set at the dial 34 at the side of the camera body 4 is larger than the largest aperture value of the photographic lens device 2, the diaphragm can not be controlled with the set aperture value. In this case, the aperture value is misset, whereby some counter-measures are necessary. For such missetting in this embodiment, the largest aperture value of the photographic lens is treated to be set. This is same with the case with the AE photographic mode with priority on aperture value.

In case of the AE photographic mode with priority on shutter speed, the AE photographic mode with priority on aperture value and the totally opened light measuring, manual exposure adjustment photographic mode, the light is measured with the totally opened diaphragm, so that there remains a problem that the effect of the diaphragm closing, especially the object field depth at the time of shutter release can not be confirmed on the focusing screen 234 in the view finder.

Especially in case of the AE photographic mode, the aperture value displayed in the second display part in the view finder is preset only after the shutter release so that before the shutter release the effect of the closed diaphragm can not be confirmed by means of the diaphragm closing lever 64. The reason is that, as is clear from the explanation of FIG. 2, when the aperture setting ring 8 at the side of the lens device 2 is selected and set at the mark □ for the AE photographic mode the AE charge is released by operating the diaphragm closing lever 64 in such a manner that the diaphragm at the side of the lens device 2 can not be controlled from the side of the camera body 4, and therefore as is mentioned afore the diaphragm closing lever 64 is locked so as to be unoperable in such a case.

On the other hand in case of the totally opened light measuring, manual exposure adjustment photographic mode it is possible to close the diaphragm of the lens device 2 down to the position preset at the aperture setting ring 8 at the side of the lens device 2 by operating the diaphragm closing lever 64. Through this operation the photographer can confirm the state of the image on the focusing screen when the diaphragm of the lens device 2 is closed down to the set position. Hereby by means of the diaphragm closing operation at this time the camera device is changed over from the light measurement with the totally opened diaphragm to the light measurement with the closed diaphragm, whereby the control operation in the camera device differs depending upon whether the mode change over switch 38 is at the side of the priority on shutter time or of the priority on aperture value. In case hereby this mode change over switch 38 is set at the side of the priority on aperture value, the camera device is in the AE photographic mode with priority on aperture value with the light measurement through the closed diaphragm, while in case the switch 38 is set at the side of priority on shutter time, the camera device is in the manual exposure adjustment photographic mode with the light measurement through the closed diaphragm.

Below the AE photographic mode with priority on aperture value with the light measurement through the closed diaphragm will be explained. The diaphragm of the lens device 2 is normally in the closed state, whereby the aperture value alters in accordance with the set position of the aperture setting ring 8. On the other hand no matter which aperture value is set at the dial 34 at this time, it is disregarded. In the camera body 4 at this time the object brightness with aperture value taken into consideration is measured through the lens device 2 whose diaphragm is closed down to the position set by the aperture setting ring 8, whereby the shutter time is operated for obtaining the proper exposure at this time. The shutter time operated in this way is displayed at the first display part in the view finder as is shown in FIG. 10(a)-(IV).

When the shutter is released after the above mentioned operation, the aperture value with the diaphragm in the closed state is maintained at the side of the lens device 2 while in the camera body 4 the shutter is released with the shutter time operated and displayed at the first display part 244 so as to obtain the proper exposure.

Hereby in case the shutter time operated from the light measured with the closed diaphragm is longer than the shutter time controllable in the camera body 4 even in the above mentioned mode, the shutter can not be controlled with the operated shutter time. In such a case the shutter time corresponding to the longest controllable shutter time is displayed twinkling at the first display part 244 so as to alarm the photographer.

Further in case the shutter time operated out of the light measured with the closed diaphragm is shorter than the shortest controllable shutter time at the side of the camera body 4, the shutter can not be controlled with the operated shutter time. In such a case the shortest controllable shutter time is displayed twinkling at the first display part so as to alarm the photographer.

Hereby in this photographic mode the aperture value is not displayed in the second display part 250 in the view finder. The reason is that, as is explained in accordance with FIG. 2, the camera body 4 does not present any means for taking up the aperture value set by the aperture setting ring 8, at the side of the lens device 2.

Below the manual exposure adjustment photographic mode with the light measurement through the closed diaphragm will be explained. The diaphragm of the lens device 2 is normally in the closed state, whereby the aperture value varies in accordance with the set position of the aperture setting ring 8. On the other hand at this time the shutter time is set at the dial 34, whereby the set shutter time is displayed in the first display part 244 in the view finder. At this time in the camera body 4 the object brightness with the aperture value taken into consideration is measured through the lens device 2 whose diaphragm is closed down to the position set by the aperture setting ring, whereby whether the proper exposure can be obtained with the set shutter time is judged. In case it is confirmed that with the combination of the then aperture value with the shutter time the proper exposure or the exposure wih a certain determined allowance can be obtained. "00" is displayed in the second display part 250 as is shown in FIG. 10(a)-(V) so as to tell the photographer that the proper exposure or the exposure with a certain determined allowance can be obtained with the then set aperture value and the shutter speed.

When on the other hand it is judged that the exposure is under with the combination of the then set aperture value and the shutter time, "OP" is displayed twinkling at the second display part 250 as is shown in FIG. 10(a)-(V) so as to tell the photographer that the exposure is under with the combination of the then set aperture value and the shutter time. In such a case the photographer can set the shutter time or the aperture value necessary for obtaining the proper exposure or the exposure with a certain determined allowance, by operating the aperture setting ring 8 so as to set the aperture value of the photographic lens device 2 smaller or by operating the dial 34 so as to set the shutter time longer until "00" for the proper exposure is displayed in the second display part 250.

When on the other hand it is judged that the exposure is over with the combination of the then set aperture value with the shutter time, "CL" is displayed twinkling at the second display part 250 as is shown in FIG. 10 (a)-(V) so as to tell the photographer that the exposure is over with the combination of the then set aperture value and the shutter time. In such a case the photographer can set the aperture value or the shutter time necessary for obtaining the proper exposure or the exposure with a certain determined allowance by operating the aperture setting ring so as to set the aperture value of the photographic lens device 2 larger or by operating the dial so as to set the shutter time shorter until "00" for the proper exposure is displayed in the second display part 250.

Further in case of this manual exposure adjustment photographic mode with the light measurement through the closed diaphragm "M" for the manual mode is displayed in the third display part 252 in the view finder.

When the shutter is released after the above mentioned operations the aperture value with the closed diaphragm is maintained in the lens device 2 while in the camera body 4 the shutter is released with the shutter time set by the dial 34, whereby the proper exposure can be obtained.

When then the mode change over switch 38 is set at the side of the priority on shutter time, the bulb mode can be selected by the dial 34. In case the dial 34 is set at "bulb", the shutter is kept opened while the shutter released button 18 is being operated in such a manner that the shutter time can be selected optionally by the photographer, whereby in most cases the bulb is used for the long time exposure.

Further in case of the bulb photographic mode, when the bulb is set by the dial while the mark 12 is set at the index 7 with the aperture setting ring 8 at the side of the lens device 2, the aperture value to be controlled can not be operated because no shutter time is set. In consequence it is desirable that the aperture should be set manually at some value, whereby the present embodiment is so designed that the aperture is controlled at the smallest value in case no special aperture value is set, the fact that the bulb photographic mode mostly used in case of the low brightness. At this time in the first display part 244 in the view finder "bulb" is displayed while in the second display part 250 the aperture value of the photographic lens device 2 to be used where diaphragm is totally opened is displayed as is shown in FIG. 10 (b)-(I).

On the other hand in case of the bulb photographic mode, when the bulb is set by the dial 34 while the aperture value is set at the side of the lens device 2 in accordance with the aperture value indication 9 on the aperture setting ring 8 at the side of the lens device 2, the camera device enters completely into the manual mode. In the view finder at this time "bulb" is displayed in the first display part 244 as is shown in FIG. 10(b)-(II), while in the third display part 252 "M" is displayed. The reason why at this time the aperture value set at the side of the lens device 2 is not displayed in the second display part 250 is that, as already explained repeatedly, the camera body does not present any means for taking up the aperture value set at the side of the lens device 2.

Below the speed light photographic mode will be explained. This camera device, particularly the camera system of this embodiment is so designed that the speed light device shown in FIG. 5 is applicable, whereby the exposure can be automatically controlled by the speed light device.

The speed light device shown in FIG. 5 present an automatic light adjusting efficiency as mentioned afore, being mounted on the camera body 4 by adapting the shoe 134 on the accessary shoe 50 provided at the side of the camera device 4, whereby the synchronization contact 138, the control signal contact 140 and the data signal contact 142 are brought into electrical contact respectively with the synchronization contact 52, the control contact 54 and the data terminal 56 at the side of the camera body 4.

Hereby it is necessary to consider this speed light device, deviding its mode into two cases, namely the automatic light adjustment mode and the total light amount mode.

The above mentioned automatic light adjustment mode is selected when a certain determined aperture value is set by the aperture setting dial 108, whereby, as explained afore, in order to give a proper exposure to the film surface with the set aperture value the flash light is projected from the illuminating part 102 while the light reflected from the object is detected by the detector 104 so as to adjust the amount of the flash light projected from the above mentioned illuminating par 102, whereby the aperture value set by the aperture setting dial 108 is given to the side of the camera body 4 through the data signal contact 142 and the data terminal 56 as an analog signal.

On the other hand the total light amount mode is selected when the mark "M" is set by the aperture setting dial 108 instead of a particular aperture value, whereby the speed light device issues the possible total light amount, the flash light projected from the illuminating part being not restricted at all. Hereby the fact that the speed light device is in the total light amount mode is transmitted the side of the camera body 4 through the data signal contact 142 and data terminal 56 by means of an analog signal at a certain determined level.

Hereby no matter in which of the automatic light adjustment mode or the total light amount mode the speed light device is, it gives to the camera body 4 a signal for controlling the shutter time. The reason is, as is already mentioned, that the now existing focal plane shutter can not be synchronized with the speed light with a shutter time shorter than 1/60 sec. or 1/125 sec., whereby either the full automatic control or the semi-automatic control can be optionally selected. This full automatic control or the semi-automatic control are selected by means of the change over switch 146, whereby in case the full automatic control system is selected, no matter which shutter time is selected by the dial 34 of the camera body 4, at the same time with the charge completion of the speed light device the charge completion signal in delivered as an analog signal at the first level from the side of the speed light device through the control signal contact 140 and control terminal 54 so as to set the shutter time at the side of the camera body 4 at the speed light synchronization shutter time TSYN, while in case the semi-automatic control system is selected, only when a shutter time shorter than the speed light synchronization shutter time TSYN is selected by the dial 34 at the side of the camera body 4 the charge completion signal is delivered as an analog signal at the second level from the side of the speed light device through the control signal contact 140 and the control terminal 54 so as to automatically set the shutter time at the side of the camera body 4 at the speed light synchronization shutter time TSYN, while when the shutter time set by the dial 34 of the camera body 4 is longer than the speed light synchronization time TSYN, the shutter time remain uncontrolled.

Hereby no matter which of the full automatic system or the semi-automatic system is selected by the change over switch at the side of the speed light device, in case the "bulb" is selected by the dial 34 at the side of the camera body 4, the shutter of the camera device operates with the first priority on bulb.

On the other hand the efficiency of the camera device greatly alters in accordance with the position at which the aperture setting ring 8 at the side of the lens device 2 is set, no matter in which state the camera body 4 and the speed light device are, which depends upon whether the mark 12 is set at the index 7 by the aperture setting ring 8.

Further, when the charge completion signal is delivered from the speed light device to the camera body 4 in case of the speed light photographic mode, "EF" is displayed in the last two positions at the first display part 244 in the view finder so as to tell the photographer that the speed light device is ready for operation as is shown in FIG. 10 (c).

Below various kinds of the control or operation systems will be explained, whereby it goes without saying that it is necessary to apply these systems so as to meet the photographic purpose.

The first one is the case when the speed light device is in the full automatic light adjusting mode, the full automatic mode is set for the shutter time and moreover the shutter time is set by the dial 34 and the mark 12 is selected by the aperture setting ring 8. At this time the camera device is in the AE photographic mode with priority on shutter time before the charge completion of the speed light device whereby when the charge completion signal is delivered from the speed light device to the camera device 4 the camera device is brought into the full automatic control, automatic light adjustment, automatic speed light photographic mode. At this time the shutter time at the camera body 4 is automatically set at the speed light synchronization shutter time TSYN, for example at 1/60 sec, whereby the diaphragm of the photographic lens 2 is controlled from the side of the camera body 4 with the aperture value set by the aperture setting dial 108 at the side of the speed light device. At this time the display in the view finder is as shown in FIG. 10 (c)-(I), whereby in the first display part 244 the speed light synchronization shutter time TSYN, for example 1/60 sec, and "EF" for the charge completion signal of the speed light device are displayed, while in the second display part 250 the aperture value set at the side of the speed light device is displayed. Hereby when the shutter is released in this state, the speed light device operates with the automatic light adjustment itself while the camera device is controlled with the same shutter time and the same aperture value as is shown in the view finder.

The second one is the case when the speed light device is in the automatic light adjustment mode, the full automatic control is set for the shutter time and moreover the shutter time is set by the dial, while the mark 12 is not selected by the aperture setting ring 8. At this time the camera device is in the manual exposure control photographic mode with light measurement through the totally opened diaphragm and ready for operation before the charge completion of the speed light device, whereby when the charge completion signal of the speed light device is given to the camera body 4 the camera device is brought into the full automatic control, automatic light adjustment, the manual speed light photographic mode. At this time the shutter time at the side of the camera body 4 is automatically set at the speed light synchronization shutter time, while the diaphragm of the photographic lens 2 is manually set and controlled by means of the aperture setting ring 8. The display at this time is as is shown in FIG. 10 (c)-(II), whereby in the first display part 244 the speed light synchronization shutter time and "EF" for the charge completion of the speed light are displayed, while in the second display part 250 the aperture value set at the side of the speed light device is displayed and in the third display part "M" is displayed so as to tell the photographer that it is necessary to set the aperture by the aperture setting ring 8 manually. In consequence it is necessary for the photographer to set the aperture at the side of the lens device 2 in accordance with the aperture value displayed at the second display part 252 in the view finder, namely the aperture value set at the side of the speed light device, whereby when the shutter is released in this state, the speed light device operates with the automatic light adjustment mode itself, while the camera device is controlled with the same shutter time as displayed in the view finder and the aperture value manually set at the lens device.

The third one is the case when the speed light device is in the automatic light adjustment mode, the full automatic control is set for the shutter and moreover the shutter time is set at the position of bulb by the dial 34 and the mark 12 is selected at the aperture setting ring. At this time the camera device is in the bulb photographic mode before the charge completion of the speed light, whereby the bulb photography is possible with the totally opened diaphragm, while when the charge completion signal of the speed light device is given to the camera body 4 the camera device is brought into the bulb, automatic light adjustment, automatic speed light photographic mode. At this time the shutter time at the side of the camera body 4 is set at bulb with priority and the diaphragm of the photographic lens 2 is controlled from the side of the camera body 4 with the aperture value set by the aperture setting dial 108 at the side of the speed light device. Hereby the display in the view finder at this time is as is shown in FIG. 10 (c)-(III), whereby in the first display part 244 "b" for the bulb photographic mode and "EF" for the charge completion signal of the speed light device is displayed while in the second display part 250 the aperture value set at the side of the speed light is displayed. When the shutter is released in this state the speed light device operates with the automatic light adjustment mode itself while the camera device is controlled with a shutter time optional to the photographer and the same aperture value as shown in the view finder.

The fourth one is the case when the speed light device is in the automatic light adjustment mode, the full automatic control is set for the shutter and moreover the shutter time is set at the bulb position by means of the dial 34, while the mark 12 is not selected by the aperture setting ring 8. At this time the camera device is in the bulb photographic mode before the charge completion of the speed light device whereby the bulb photography is possible with the aperture value set at the side of the lens device 2, while when the charge completion signal of the speed light device is given to the camera body 4, the camera device is brought into the bulb, automatic light adjustment, the manual speed light photographic mode. The shutter time at the side of the camera at this time is set and maintained at the bulb with priority, while the aperture of the photographic lens 2 is manually set and controlled by means of the aperture setting ring 8. The display in the view finder at this time is as is shown in the FIG. 10 (c)-(IV), whereby in the first display part 244 "b" for the bulb photographic mode and "EF" for charge completion signal of the speed light device are displayed, while in the second display part 250 the aperture value set at the side of the speed light device is displayed and in the third display part 252 "M" is displayed so as to tell the photographer that it is necessary to set the aperture by means of the aperture setting ring 8 manually. In consequence it is necessary for the photographer to set the aperture at the side of the lens device 2 in accordance with the aperture value displayed in the second display part 252 in the view finder, namely the aperture set at the side of the speed light device, whereby when the shutter is released in this state the speed light device operates with the automatic light adjustment mode itself, while the camera device is controlled with the shutter time optional to the photographer and the aperture value set at the lens device 2 manually.

The fifth one is the case when the speed light device is in the automatic light adjustment mode, the semi-automatic control is set for the shutter and moreover the shutter time is set by the dial 34 and the mark 12 is select at the aperture setting ring 8, whereby the camera device is in the AE photographic mode with priority on shutter time before the charge completion of the speed light device, being ready for the AE photography while when the charge completion signal of the speed light device is given to the camera body, the camera device is brought into the semi-automatic control, automatic light adjustment, automatic speed light photographic mode. When at this time the shutter time set by the dial 34 at the side of the camera body is shorter than the speed light synchronization shutter time TSYN, the shutter time at the side of the camera body 4 is set at the speed light synchronization shutter time TSYN, while when the shutter time set by the dial 34 at the side of the camera body is longer than the speed light synchronization shutter time TSYN, the shutter time at the side of the camera body 4 is set at the value set by the dial, while the diaphragm of the lens device 2 is controlled from the side of the camera body 4 with the aperture value set by the aperture setting dial 108 at the side of the speed light device. The display at this time is as is shown in FIG. 10 (c)-(V), whereby in the first display part 244 the speed light synchronization shutter time TSYN or the set shutter time and "EF" for the charge completion signal of the speed light device are displayed, while in the second display part 250 the aperture value set at the speed light device is displayed. When the shutter is released in this state the speed light device operates with the automatic light adjustment mode itself, while the camera device is controlled with the same shutter time and the same aperture value as indicated in the view finder.

The sixth one is the case when the speed light device is in the automatic light adjustment mode, the semi-automatic control is set for the shutter and moreover the shutter time is set by the dial 34, while the mark 12 is not selected by the aperture setting ring 8, whereby the camera device is in the manual exposure adjustment photographic mode with the light measurement through the totally opened diaphragm before the charge completion of the speed light device, being ready for operation, while when the charge completion signal of the speed light device is given to the camera body 4, the camera device is brought into the semi-automatic control, automatic light adjustment, manual speed light photographic mode. When at this time the shutter time set by the dial 34 at the side of the camera body 4 is shorter than the speed light synchronization shutter time, the shutter time at the side of the camera body 4 is set at the speed light synchronization shutter time. While the shutter time set by the dial 34 of the camera body 4 is longer than the speed light synchronization shutter time, the shutter time at the side of the camera body 4 is set at the value set by the dial 34, while the photographic lens 2 is manually set and controlled by means of the aperture setting ring 8. The display in the view finder at this time is as is shown in FIG. 10 (c)-(VI), whereby in the first display part 244 the speed light synchronization shutter speed TSYN or the set shutter time and "EF" for the charge completion of the speed light device are displayed, while in the second display part 250 the aperture value set at the side of the speed light device is displayed and in the third display part 252 "M" is displayed so as to tell the photographer that it is necessary to set the aperture by means of the aperture setting ring 8 manually. In consequence it is necessary for the photographer to set the aperture at the side of the lens device 2 in accordance with the aperture value indicated in the second display part 252 in the view finder, namely the aperture value set at the side of the speed light device 2, whereby when the shutter is released in this state, the speed light device operates in the automatic light adjustment mode itself while the camera device is controlled with the same shutter time as is displayed in the view finder and the aperture value manually set at the lens device 2.

The seventh one is the case when the speed light device is in the automatic light adjustment mode, the semi-automatic control is set for the shutter and moreover the shutter time is set at the bulb position by means of the dial 34 and the mark 12 is selected by the aperture setting ring 8, whereby the camera device is in the bulb photographic mode before the charge completion of the speed light device, being in a position to carry out the bulb photography with the smallest aperture value, while when the charge completion signal of the speed light device is given to the camera body 4 the camera device is brought in the bulb, automatic light adjustment automatic speed light photographic mode. At this time the shutter time at the side of the camera body 4 is set and maintained at the bulb with priority, while the photographic lens 2 is controlled from the side of the camera body 4 with the aperture value set by means of the aperture setting dial 108 at the side of the speed light device. The display in the view finder at this time is as is shown in FIG. 10 (c)-(VII), whereby in the first display part 244 "b" for the bulb photographic mode and "EF" for the charge completion of the speed light device are displayed while in the second display part 250 the aperture value set at the side of the speed light device is displayed. When the shutter is released in this state, the speed light device operates in the automatic light adjustment mode itself while the camera device is controlled with the shutter time optional to the photographer and the same aperture value as is shown in the view finder.

The eighth one is the case when the speed light device is in the automatic light adjustment mode, the semi-automatic control is set for the shutter and moreover the shutter time is set at the bulb by means of the dial 34 while the mark 12 is selected by the aperture setting ring 8, whereby the camera device is in the bulb photographic mode before the charge completion of the speed light device, being in a position to carry out the bulb photography with the aperture value set at the side of the lens device 2, while when the charge completion signal of the speed light device is given to the camera body 4, the camera device is brought into the bulb, automatic light adjustment, manual speed light photographic mode. At this time the shutter time at the side of the camera body 4 is set and maintained at the bulb with priority, while the aperture of the photographic lens 2 is set and controlled by means of the aperture setting ring 8 manually. The display at this time is as is shown in FIG. 10 (c)-(VIII), whereby in the first display part 244 "b" for the bulb photographic mode and "EF" for the charge completion of the speed light device are displayed (while in the second display part 250) while in the second display part 250 the aperture value set at the side of the speed light device is displayed and in the third display part 252 "M" is displayed so as to tell the photographer that it is necessary to set the aperture by the aperture setting ring 8 manually. In consequence it is necessary for the photographer to set the aperture at the side of the lens device 2 in accordance with the aperture value displayed in the second display part 252 in the view finder, namely the aperture value set at the side of the speed light device, whereby when the shutter is released in this state the speed light device operates in the automatic light adjustment mode itself while the camera device is controlled with the shutter time optional to the photographer and the aperture value set at the lens device 2 manually.

The ninth one is the case when the speed light device is in the total light amount mode, the full automatic control mode is set for the shutter and moreover the shutter time is set by the dial 34 and the mark 12 is selected by the aperture setting ring 8, whereby the camera device is in the AE photographic mode with priority on shutter time before the charge completion of the speed light device, being in a position to carry out the AE photography while when the charge completion signal of the speed light device is given to the camera body 4, the camera device is brought into the full automatic, total light amount, speed light photographic mode with largest aperture value. At this time the shutter time at the camera body 4 is automatically set at the speed light synchronization shutter time TSYN, for example 1/60 sec, while the photographic lens 2 is controlled with the largest aperture value of the photographic lens device 2 to be used. The display in the view finder at this time is as is shown in FIG. 10 (*d*)-(I), whereby in the first display part 244 the speed light synchronization shutter time, for example 1/60 sec. and "EF" for the charge completion of the speed light device are displayed. Hereby nothing is displayed in the second display part 250 so as to alarm the photographer as misoperation, because the largest aperture value of the lens device does not alway offer the proper exposure.

When the shutter is released in this state, the speed light device issues the total light amount, while the camera device is controlled with the same shutter time as is displayed in the view finder and the largest aperture value of the lens device 2.

The tenth one is the case when the speed light device is in the total light amount mode, the full automatic control mode is set for the shutter and moreover the shutter time is set by the dial 34 while the mark 12 is not selected by the aperture setting ring 8, whereby the camera device is in the manual exposure adjustment photographic mode with the light measurement through the totally opened diaphragm before the charge completion of the speed light device, being ready for operation, while when the charge completion signal of the speed light device is given to the camera body 4, the camera device is brought into the full automatic, total light amount, manual speed light photographic mode. At this time the shutter time at the side of the camera body 4 is automatically set at the speed light synchronization shutter time, while the aperture of the photographic lens 2 is manually set and controlled by means of the aperture setting ring 8. The display in the view finder at this time is as is shown in FIG. 10 (*d*)-(II), whereby in the first display part 244 the speed light synchronization shutter time and the "EF" for the charge completion of the speed light device are displayed while in the third display part "M" is displayed so as to tell the photographer that it is necessary to set the aperture by means of the aperture setting ring 8 manually. In consequence it is necessary for the photographer to set the aperture by means of the aperture setting ring 8 manually by obtaining the aperture value to be set at the lens device 2 basing upon the distance from the camera device to the object by making use of the guide member calculator 106 belonging to the speed light device.

When the shutter is released in this state, the speed light device issues the total light amount, while the camera device is controlled with the same shutter time as is displayed in the view finder and the aperture value manually set at the lens device 2.

The eleventh one is the case when the speed light device is in the total light amount mode, the full automatic mode is set for the shutter and moreover the shutter time is set at the position of bulb by the dial 34 and the mark 12 is selected by the aperture setting ring 8. At this time the camera device is in the bulb photographic mode before the charge completion of the speed light device, being in a position to carry out the bulb photography with the totally opened diaphragm, while when the charge completion signal of the speed light device is given to the camera body 4 the camera device is brought into the bulb, total light amount, largest aperture value speed light photographic mode. At this time the shutter time at the side of the camera body 4 is kept set at the bulb with priority, whereby the photographic lens 2 is controlled with the largest aperture value of the photographic lens device 2. The display in the view finder at this time is as is shown in FIG. 10 (*d*)-(II), whereby in the first display part 244 "b" for the bulb photography and "EF" for the charge completion of the speed light device are displayed.

When the shutter is released in this state, the speed light device operates with total light amount mode, while the camera device is controlled with a shutter time optional to the photographer and the largest aperture value of the lens device 2.

The twelfth one is the case when the speed light device is in the total light amount mode, the full automatic mode is set for the shutter and moreover the shutter time is set at the position of bulb with the dial 34, while the mark 12 is not selected at the aperture value setting ring 8. At this time the camera device is in the bulb photographic mode before the charge completion of the speed light device, being in a position to carry out the bulb photography with the aperture value set at the side of the lens device 2, while the charge completion signal of the speed light is given to the camera body 4 the camera device is brought into the bulb, total light amount, manual speed light photographic mode. At this time the shutter time at the side of the camera body 4 is kept set at the bulb with priority, while the photographic lens 2 is set and controlled manually with the aperture setting ring 8. The display in the view finder at this time is as is shown in FIG. 10 (*d*)-(IV), whereby in the first display part 244, "b" for the bulb photographic mode and "EF" for the charge completion of the speed light device are displayed while in the third display part 252 "M" is displayed so as to tell the photographer that it is necessary to set the aperture value by means of the aperture setting ring 8 manually. In consequence it is necessary for the photographer to set the aperture value by means of the aperture setting ring manually, obtaining the aperture value to be set at the lens device 2 basing upon the distance from the camera device to the object by making use of the guide number calculator 106 belonging to the speed light device.

When the shutter is released in this state, the speed light device operates in the total light amount mode while the camera device is controlled with a shutter time optional to the photographer and the aperture value manually set at the lens device 2.

The thirteenth one is the case when the speed light device is in the total light amount mode, the semi-automatic mode is set for the shutter and moreover the shutter time is set by the dial 34 and the mark 12 is selected with the aperture value setting ring 8. At this time the camera device is in the AE photographic mode with priority on shutter time before the charge completion of the speed light device, being in a position to carry out the AE photography, while when the charge completion signal of the speed light device is given to the camera body 4, the camera device is brought into the semi-automatic, total light amount, largest aperture value speed light photographic mode. When at this time the shutter time set with the dial 34 at the side of the camera body 4 is shorter than the speed light synchronization shutter time TSYN the shutter time at the side of the camera body 4 is set at the speed light synchronization shutter time TSYN, while when the shutter time set with the dial 34 is longer than the speed light synchronization shutter time TSYN, the shutter time at the side of the camera body 4 is set at the speed light synchronization shutter time TSYN, whereby the photographic lens 2 is controlled with the largest aperture value of the photographic lens device 2. The display in the view finder at this time is as is shown in FIG. 10(d)-(V), whereby in the first display part 244 the speed light synchronization shutter time or the set shutter time and "EF" for charge completion of the speed light device are displayed.

When the shutter is released in this state, the speed light device operates in the total light amount mode, while the camera device is controlled with shutter time displayed in the view finder and the largest aperture value of the lens device 2.

The fourteenth one is the case when the speed light device is in the total light amount mode, the semi-automatic mode is set for the shutter and moreover the shutter time is set at the dial 34, while the mark 12 is not selected with the aperture setting ring 8. At this time the camera device is in the totally opened light measuring, manual exposure adjustment mode before the charge completion of the speed light device, being ready for operation, while when the charge completion signal of the speed light device is given to the camera body 4, the camera device is brought into the semi-automatic, total light amount, manual speed light photographic mode. When at this time the shutter time set with the dial 34 at the side of the camera body 4 is shorter than the speed light synchronization shutter time, the shutter time at the side of the camera body 4 is set at the speed light synchronization shutter time, while when the shutter time set with the dial 34 at the side of the camera body 4 is longer than the speed light synchronization shutter time, the shutter time is set at the value set with the dial 34, whereby the photographic lens 2 is set and controlled manually with the aperture setting ring 8. The display in the view finder at this time is as is shown in FIG. 10 (d)-(VI), whereby in the first display part 244 the speed light synchronization shutter time or the set shutter time and "EF" for the charge completion of the speed light device are displayed, while in the third display part 252 "M" is displayed so as to tell the photographer that it is necessary to set the aperture value with the aperture setting ring 8 manually. In consequence it is necessary for the photographer to set the aperture value with the aperture setting ring 8 manually, obtaining the aperture value to be set at the lens device 2 basing upon the distances from the camera device to the object by making use of the guide number calculator 106 belonging to the speed light device.

When the shutter is released in this state, the speed light device operates in the total light amount mode, while the camera device is controlled with the shutter time displayed in the view finder and the aperture value manually set at the lens device 2.

The fifteenth one is the case when the speed light device is in the total light amount mode, the semi-automatic mode is set for the shutter and moreover the shutter time is set at the position of the bulb with the dial 34 and the mark 12 is selected with the dial 34. At this time the camera device is in the bulb photographic mode before the charge completion of the speed light device being in a position to carry out the bulb photography with totally opened diaphragm, while the charge completion signal of the speed light device is given to the camera body 4, the camera device is brought into the bulb, the total light amount, largest aperture value speed light photographic mode. The shutter time at the side of the camera body 4 at this time is kept set at the bulb with priority, while the photographic lens 2 is controlled with the largest aperture value of the photographic lens device 2. The display in the view finder at this time is as is shown in FIG. 10 (d)-(VII), whereby in the first display part 244 "b" for the bulb photographic mode and "EF" for the charge completion of the speed light device are displayed.

When the shutter is released in this state, the speed light device operates in the total light amount mode, while the camera device is controlled with the shutter time optional to the photographer and the largest aperture value of the lens device 2.

The sixteenth one is the case when the speed light device is in the total light amount mode, the semi-automatic mode is set for the shutter and moreover the shutter time is set at the position of the bulb with the dial 34, while the mark 12 is not selected with the aperture setting ring 8. At this time the camera device is in the bulb photographic mode before the charge completion of the speed light device, being in a position to carry out the bulb photography with the aperture value set at the side of the lens device 2, while when the charge completion signal of the speed light device is given to the camera body 4, the camera device is brought into the bulb, total light amount, manual speed light photographic mode. At this time the shutter time at the side of the camera body 4 is kept set at the bulb with priority, while the photographic lens 2 is set and controlled with the aperture setting ring 8. The display in the view finder at this time is as shown in FIG. 10 (d)-(VIII), whereby in the first display part 244 "b" for the bulb photographic mode and "EF" for the charge completion of the speed light device are displayed, while in the third display part 252 "M" is displayed so as to tell the photographer that it is necessary to set the aperture with the aperture setting ring 8 manually. In consequence it is necessary for the photographer to set the aperture with the aperture setting ring 8 manually, obtaining the aperture value set to the lens device 2 basing upon the distance from the camera device to the object by making use of the guide number calculator 106 belonging to the speed light device.

When the shutter is released in this state, the speed light device operates in the total light amount mode, while the camera device is controlled with the shutter time optional to the photographer and the aperture value set at the lens device 2 manually.

When the mode change over switch 38 at the side of the camera device 4 is selected with priority on the aperture value in case of the above mentioned speed light photographic mode, the aperture value set with the dial 34 is completely disregarded, whereby the aperture is controlled with the value set at the side of the speed light or the value set with the aperture setting ring 8 at the side of the lens device 2 or the largest value.

When now the speed light device is in the full automatic mode the shutter time is automatically set at the speed light synchronization shutter time, for example, 1/60 sec., while when the speed light device is in the semi-automatic mode, there is a danger that the shutter time longer than the speed light synchronization shutter time could not be controlled in case no shutter time is not set at the side of the camera body 4. In consequence each of the above mentioned mode is effective only when the mode change over switch 38 is at the side of the priority on the shutter time, whereby at times there is a possibility that the semi-automatic speed light photography is carried out while the above mentioned mode change over switch 38 remains set at the side of the priority on aperture value. Thus in order to avoid the above mentioned shortcoming, in case of the camera system in accordance with the present invention the shutter time is set at the speed light synchronization shutter time regardless of the state of the change over switch 146 even if the semi-automatic mode is set at the side of the speed light device in case the mode change over switch 38 is set at the side of the priority on aperture value in case of the speed light photographic mode as if it were controlled in the so called full automatic mode. The reason is that the semi-automatic mode is used only when there is something intended to with reference to the shutter time so that the semi-automatic mode is never used with priority on aperture value.

The above mentioned photographic modes at the time of the speed light photography are shown in FIG. 11 (A) schematically, whereby the case with the bulb photography is not shown particularly because the same thing can be said of when the shutter time is replaced with the bulb.

Below the counter measures against misoperation of the camera system in accordance with the present invention will be explained.

Originally the camera system basing upon a synthetic and rational system should be so designed that there could be no room for mishandling or misoperation, whereby so far as we know the exposure control means, such as the shutter mechanism or the diaphragm mechanism by means of which the best and most precise picture can be obtained at present consists mostly mechanical components while their operation is controlled by means of remarkably complicated mechanical sequence mechanism. On the other hand in order to apply a rational control to the camera device as a synthetic system it is necessary to introduce electrical control mechanism on a large scale, whereby it is considerably difficult to design the system completely free from the mishandling or the misoperation, handicapped by the interface of the electro-mechanism or the complicated mechanism of the camera device. In this respect in the present embodiment a system for telling the photographer his mishandling and for locking the shutter release so as to avoid the misoperation due to the mishandling is adopted.

What is considered as mishandling in the camera device in the present embodiment will be explained below in accordance with the logic diagram shown in FIG. 11 (B). Hereby the mishandlings to be mentioned have a close connection with the operation characteristics of the lever 84 of the lens device 2 and the lever 94 of the camera body 4 as is explained in accordance with FIG. 2. Namely the case when the mark 12 is selected and set at the aperture setting ring 8 at the side of the lens device 2 is considered to be equivalent to the case when the largest aperture value is selected at the side of the lens device 2, so that in case not aperture control is made by means of the AE lever AE at the side of the body 4 at all the lens device is to be controlled with the largest aperture value unconditionally, which is uncontrollable. Further when the AE lever is not charged in case of the AE photography the aperture control of the lens device 2 from the side of the camera body 4 is impossible. In the present embodiment the above two cases are considered as misoperation and the alarm lock is made, whereby these cases corresponds to the states shown in FIGS. 11 (B)-(I), (II), (III), (IV). Hereby the states shown in FIGS. 11 (B)-(III), and (IV) are these after the film has been wound up by means of the winding up lever 14. The reason is that before the AE charge due to the film winding up the AE lever 94 is in the AEdischarge state without any particular operation, which state is not always the misoperation state. Hereby there exist no AE charge state in the state in which the diaphragm of the lens device 2 is closed by means of the diaphragm closing lever 64, as is clear from the explanation made in accordance with FIG. 2. This the corresponding space is blank in FIG. 11 (B).

Now let us consider in which case the misoperation states shown from FIG. 11(B)-(I) to FIG. 11(B)-(IV) will take place.

In case now the mark 12 is selected with the aperture setting ring 8 at the side of the lens device 2 the camera device is either in the AE photographic mode with priority on shutter time or in the AE photographic mode with aperture value depending upon the state of the mode change over switch, whereby the display in the view finder is as is shown in FIG. 10 (a)-(I) or (II). Even if the photographer tries to confirm the object field depth on the finder screen in this state by actually closing the diaphragm of the lens device 2 down to the aperture value displayed in the second display part 250, it is impossible in the AE photographic mode to close the diaphragm of the lens device 2 down to the aperture value set at the side of the camera body or operated due to the construction of the AE lever 94. If in spite of the above mentioned situation the diaphragm of the lens device 2 would be closed by means of the diaphragm closing lever 64, the diaphragm of the lens device 2 should be closed down to the largest aperture value, because the position set with the mark 12 of the aperture setting ring 8 corresponds to the position of the largest aperture value of the lens device 2. These states correspond to there shown in FIGS. 11 (B)-(I), (II) and are apparently mishandling, whereby in case of the present embodiment it is prevented that such situation should take place because as is already explained the diaphragm closing lever 64 is restricted in its operation so far as the mark 12 is selected at the aperture setting ring of the lens device. On the other hand, in order to confirm the object field depth the photographer can at first release the selection of the mark 12 with the aperture setting ring 8 of the lens device 2 as the first step, set the aperture value to be manually confirmed at the side of the lens device 2 and then operate the diaphragm closing lever 64 so as to close the diaphragm down to the position set at the side of the lens device 2, whereby the camera device is in the manual exposure adjustment photographic mode with light measurement through the closed diaphragm or in the AE photographic mode with priority on aperture value with light measurement through the closed diaphragm in such a manner that the object field depth can be confirmed. In this state, as is clear from FIG. 2, the AE lever 94 is in the AE discharge state.

However, in case the photographer resets the mark 12 of the aperture setting ring 8 of the lens device 2 out of the above mentioned state, the state as is shown in FIG. 11 (B)-(I) or (II) is affirmed, which is, as explained afore, apparently a mishandling, whereby the alarm lock "EEEE EE" is displayed twinkling as is shown in FIG. 10 (f) so as to prevent the shutter release.

Figure 11B:
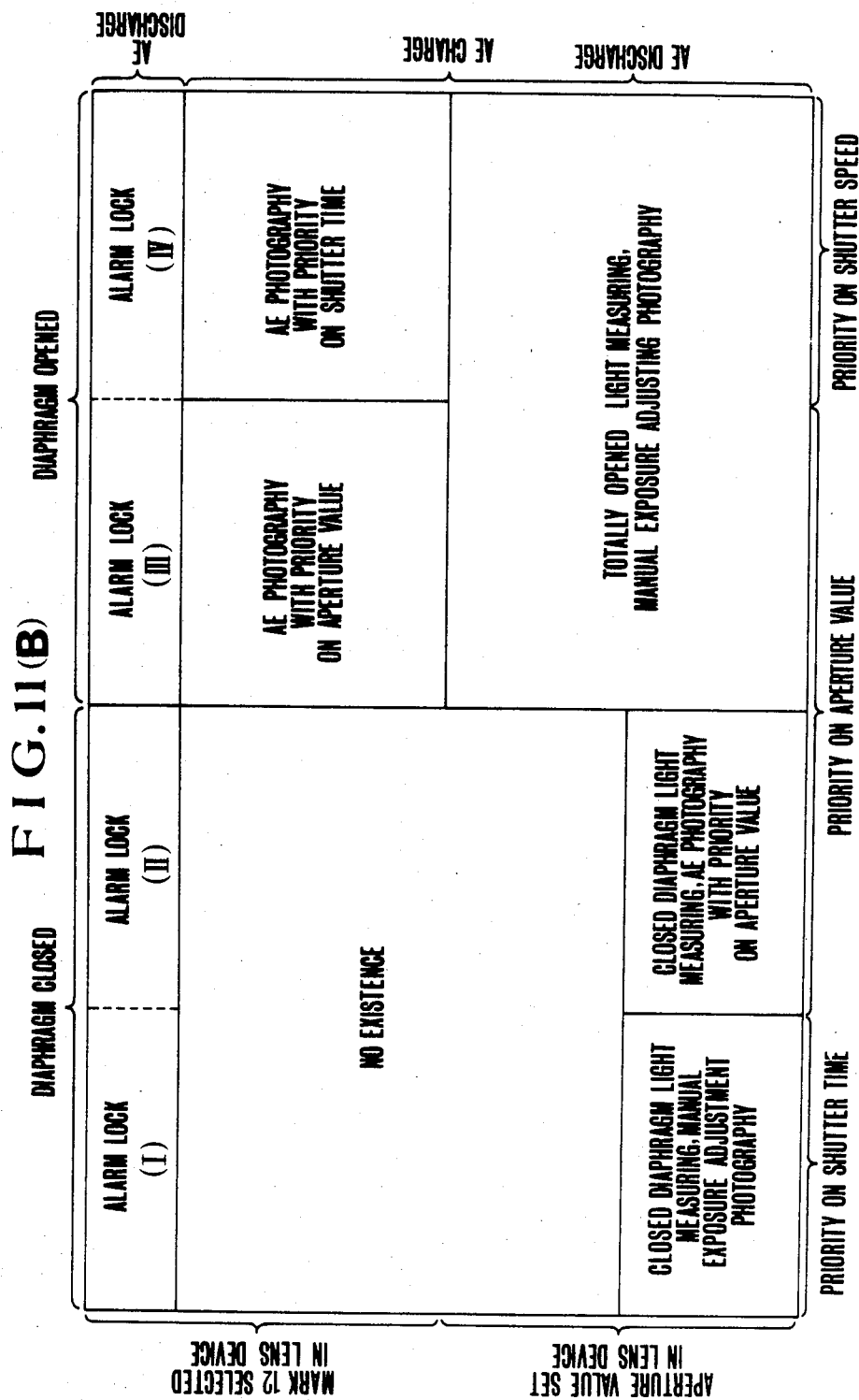
FIG. 11(B) shows a logical diagram of the relation between the photographic modes of the camera device.

Further in case the photographer releases the closed diaphragm of the lens 2 by means of the closed diaphragm releasing button 66 out of the state shown in FIG. 11 (B)-(I) or (II), the AE photographic mode is resumed while the AE lever 94 remains AE discharged as is shown in FIGS. 11(B)-(III), (IV), which is also a mishandling, the AE photography being impossible, whereby in the view finder the alarm lock "EEEE EE" is displayed twinkling as is shown in FIG. 10(*f*) so as to prevent the shutter release.

Hereby by releasing the mark 12 from the aperture setting ring 8 of the lens device 2 in the state shown in FIGS. 11 (B)-(I), (II), the photographer alerted to the mishandling as is shown in FIG. 10(*f*) becomes able to carry out the manual exposure adjustment photography with the light measurement through the closed diaphragm or the AE photography with priority on aperture value with the light measurement through the closed diaphragm and also becomes able to carry out the manual exposure adjustment photography with the light measurement through the totally opened diaphragm by opening the diaphragm of the lens device 2 by means of the closed diaphragm releasing button 66. Further by setting the mark 12 at the aperture setting ring 8 of the lens device 2, the above mentioned state is again brought into the alarm lock state as is shown in FIGS. 11 (B)-(III), (IV), which alarm lock state can be released as follows.

By releasing the mark 12 from the aperture setting ring 8 of the lens device 2 in the state shown in FIGS. 11 (B)-(III), (IV), the photographer alerted to the mishandling as is shown in FIG. 10 (*f*) becomes able to carry out the manual exposure adjustment photography with the light measurement through the totally opened diaphragm. Apart from the above by operating the film winding up lever 14 while the multiple exposure button 16 provided on the upper surface of the camera 4 being pushed down, the AE lever 94 is recharged so as to enable the AE photography with priority on shutter time or the AE photography with priority on aperture value.

Hereby the state shown in FIGS. 11(*b*)-(III), (IV) is judged as the mishandling only after the film winding up and treated as the AE photographic mode with priority on shutter time or the AE photographic mode with priority on aperture value before the film winding up, while the state shown in FIGS. 11 (*b*)-(I), (II) is judged as the misoperation before as well as after the film winding up.

As explained above in case of the camera system in accordance with the present invention the improvement as well as the amplification of the efficiency is tried by positively by providing for various kinds of restrictions likely between the mechanical composition or the composition of the conventional lens device and various kinds of control mechanism introduce for the sake of the improvement of efficiencies, while for the unavoidable mishandlings and misoperations alarms are displayed in the view finder so as to alert the photographer to the mishandling and misoperation, while locking the shutter mechanism.

Below the concrete compositions for realizing various efficiencies rendered to the camera device shown in FIG. 1 will be explained.

The conventional camera device comprises the diaphragm control mechanism for determining the aperture of the lens device and the shutter mechanism for determining the time of the exposure to the film, whereby these two mechanisms generally will comprise mechanical control mechanism in the future as in the past. However, quite recently compositions added with the electrical control mechanisms are proposed and realized for various control mechanism constituting a camera system. The compositions with such electrical mechanism are mostly those of the exposure control mechanisms including the light measuring system of the camera device, the reason for which is that generally the light measuring system takes the informations as to the object bright and so on into the camera system as the electrical signal by means of the photoelectric converting efficiency so that it is essential to go through the interface between the electrical means and the mechanical means in order to execute the automatic exposure control.

As such an interface a simple mechanism suffices in order to realize a simple efficiency in the camera system and its concrete composition has long been well known, whereby with the increase of the efficiency requested for the camera system its composition tends to become complicated. On the other hand a comparatively simple analog electrical control system is applied to many camera systems known at present, the reason for which is that such control system is so designed as to operate with priority on shutter time or with priority on aperture value, which is realized by means of a comparatively simple and economical circuit composition.

However in case of a camera system such as that in accordance with the present invention which includes various judging and determining efficiencies beside those with priority on shutter speed and with priority on aperture value, it can be predicted that the composition would be remarkably complicated, whereby it is not only problematic to apply purely electrical circuit to such composition but also the composition itself will be come so much complicated that not only the economy is decreased but also the device can not be made compact, which is not profitable.

On the other hand the system which is through out is to compare the most part of the control circuit with the digital electrical circuit which can be integrated, which method can be said to be a considerably rational one for realizing the camera device with various efficiencies such as the camera system shown in FIG. 1. This digital electrical circuit is quite suited for being applied to the devices presenting various judging and determining efficiencies, measuring and display efficiencies such as the camera system because it is easy in the system design in comparison with analog electrical circuit, various control modes can be realized in an easy way and it can instantly be modified for the alteration of the specifications.

In consequence most of the control systems applied to the camera system in accordance with the present invention are composed of the digitalized electrical circuit so as to improve the reliability as well as the economy.

Below how the light measurement data, the set data, the operation condition, the operation state and so on are taken into the camera device shown in FIG. 1 will be explained, before the systems for operating the camera device shown in FIG. 1 is explained. It is a comparatively important problem for the composition of the digital system, particularly of the camera system in which various mechanical moving members are to be built in a small space in a compact way to think over the adoption of such various informations.

Principally the above mentioned camera device includes a TTL light measurement system, whereby as light sensitive element a photoelectric transducing element such as cds or cilicone light sensitive element is adopted. The above mentioned photoelectric transducing element produces analog signals, which is later compressed in a logarithmic way, namely converted into an APEX value and then converted into digital information by means of the A-D converter. Now let the informations obtained from the light measurement system BVo in APEX value in case of the light measurement with the totally opened diaphragm and BVs in case of the light measurement with the closed diaphragm, so we obtain the following relations.

$$BVo = BV - AVo - AVc \qquad (3)$$

$$BVs = BV - AV - AVc' \qquad (4)$$

whereby AVo corresponds to the smallest aperture value of the lens device 2, AV corresponds to the actual aperture value with the closed diaphragm, AVc corresponds to the vignetting error of the lens device 2 with totally opened diaphragm and AVc' corresponds to the vignetting error with the closed diaphragm. Hereby it is necessary to obtain the vignetting errors AVc and Avc' from the calculation basing upon the aperture value of the lens device 2 at the time of the light measurement, whereby the vignetting error with the totally opened diaphragm can easily be calculated out because the smallest aperture value is introduced from the side of the lens device 2, while it is impossible to calculate out the vignetting error with the closed diaphragm because there is no means for transmitting the actual aperture value with the closed diaphragm from the side of the lens device 2 to the camera body. In consequence in case of the camera system in accordance with the present invention the vignetting error with the closed diaphragm is disregarded so as to obtain the following relation.

$$BVs = BV - AV \qquad (5)$$

As is clear from the above explanation, the data obtained from the light measurement system is that relative to the object brightness represented by the above mentioned relation (3) or (5).

Hereby the above mentioned data is later converted into digital data of 8 bits by means of the A-D comparator, whereby this digital data is a binary one, the last bit having a weight of "$\frac{1}{8}$", while the first bit having a weight of "16". Namely the light measurement data is converted into the digital data having a precision of $\frac{1}{8}$ step in the APEX value.

Hereby to the TTL light measurement system a conventional circuit for compressing the analog voltage signal proportional to the received light amount into an analog signal corresponding to the APEX value in a logarithmic way is applied.

Further as is explained above, the ASA sensitivity setting dial 40 for the photographic film is provided on the upper surface of the camera body 4. This ASA sensitivity setting dial 40 serves to set the ASA sensitivity of the photographic film to be used, whereby the present tendency of the photographic film on the market is that the ASA sensitivity is set by $\frac{1}{3}$ step in APEX value. In consequence by means of the ASA sensitivity setting dial 40 the ASA sensitivity is set with the precision of $\frac{1}{3}$ step in APEX value as follows:

ASA 16, 20, 25, 32, 40, 50, 64, 80, 100, 125, 160, 200, 250, 320, 400, 500, 640, 800 . . .

However it goes without saying that the film sensitivity data set by means of this ASA sensitivity setting dial 40 is taken up as digital value, whereby it is impossible to take up a value corresponding to $\frac{1}{3}$ in decimal by means of binary code. In this respect it can be so designed that the weight of the bit corresponding to a figure smaller than "1" in binary code is treated as value corresponding to "$\frac{1}{3}$" and "$\frac{2}{3}$", whereby all other data is treated with the precision of $\frac{1}{8}$ step in binary system in this camera system so that no matching can be taken for the digital operation with other datas in such a manner that complicated operations including multiplication or division becomes unavoidable. When on the other hand the operation result for the actual control is obtained with the precision of $\frac{1}{8}$ step in binary value, such complicated operation as mentioned above becomes nonsense. In consequence in case of this camera system the data concerning the film sensitivity with the precision of $\frac{1}{3}$ step is taken up in approximation with the data with the precision of $\frac{1}{8}$ step.

Namely "$\frac{1}{3}$" and "$\frac{2}{3}$" can be approximated with the precision of $\frac{1}{8}$ step as follows.

$$\tfrac{1}{3} \approx \tfrac{1}{4} + \tfrac{1}{8} = 0.375 \qquad (6)$$

$$\tfrac{2}{3} \approx \tfrac{1}{2} + \tfrac{1}{8} = 0.625 \qquad (7)$$

whereby the error taking place is ±0.042 step, namely within a sufficient allowance in comparison with $\frac{1}{8}$ step, namely 0.125 step. In consequence the film sensitivity set by means of the ASA sensitivity setting dial 40 is directly taken up with the precision of $\frac{1}{8}$ step. Hereby in this camera system the film sensitivity is treated as a digital data with seven bits in binary system, whereby the last bit has a weight of "$\frac{1}{8}$" while the first bit has a weight of "8". It goes without saying that this binary data is the approximated one with the precision of $\frac{1}{8}$ step of the film sensitivity with precision of $\frac{1}{3}$ step as is represented by the relations (6) and (7). Further as is clear from the relations (6) and (7), beside the bit with the weight of "$\frac{1}{8}$" of the binary data including an approximated data with the precision of $\frac{1}{8}$ step corresponding to "$\frac{1}{3}$" or "$\frac{2}{3}$", "1" appears either in the bit with the weight of "$\frac{1}{4}$" or in the bit with the weight of "$\frac{1}{2}$". In consequence it can be so designed that when "1" appears either in the bit with the weight of "$\frac{1}{4}$" or in the bit with the weight of "$\frac{1}{2}$" without particularly putting in the information relative to the bit with the weight of "$\frac{1}{8}$" at the time of taking up the data concerning the film sensitivity of seven bits. "1" can be made to appear in the bit with the weight of "$\frac{1}{8}$" so that the camera system in accordance with the present invention is so designed that from the ASA sensitivity setting dial 40 the data relative to the ASA sensitivity is taken up as a binary code with six bits and later converted into a data with seven bit.

FIG. 12 shows a concrete composition for taking up a digital data relative to the film sensitivity out of the ASA sensitivity setting dial, being so designed that the digital data is obtained from the digital data setting disc 254 linked with the ASA sensitivity setting dial so as to be rotated with the dial in accordance with the rotation position of the dial. The digital data setting disc 254 consists of a plural number of conductor rings 256 concentrically arranged on the insulated base plate so as to correspond to respective bits of the film sensitivity setting data and of a common ring 258 keeping electrical conductivity with all of the above mentioned conductor rings 256 through a conductor 262 extending along the radial direction of the data setting disc 254. Hereby the above mentioned common ring 258 is normally in contact with the brush 260 which is connected to the power source Vcc through a resistance 261 and also to the inverter 263. Further there are arranged data tracks between the above mentioned conductor rings 256 so as to correspond to respective bit of the film sensitivity setting data, whereby six brushes corresponding to respective bits of the data are in contact with respective track. The above mentioned tracks include conductive parts 266 extending from the above mentioned conductor rings 256 to the parts in contact with respective brushes 264 along the radial direction in such a manner that an electrical contact is established between the above mentioned conductor rings and the brushes 264 corresponding to the weight "2" of the bits of the digital value of the set data so as to correspond to each of the setting position of the ASA sensitivity setting dial 40 for setting the film sensitivity by $\frac{1}{3}$ step.

Figure 13:
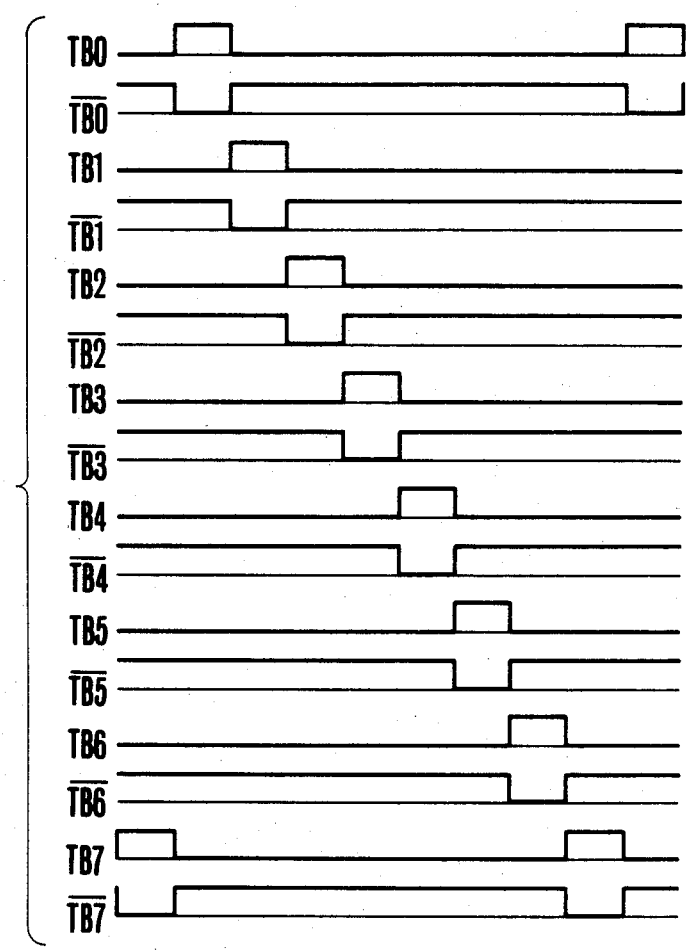
FIG. 13 shows a time chart for explaining the state of the timing pulses $TB_1$-$TB_6$.

As will be later explained in detail, this camera system is controlled by eight timing pulses $TB_0$–$TB_7$ as is shown in FIG. 13. The camera system is also controlled in this way also in case of taking up the film sensitivity data, whereby for taking up various setting data or setting conditions six timing pulses shown in FIG. 13 are used.

The composition shown in FIG. 12 is so designed that the above mentioned timing impulses $TB_1$–$TB_6$ are applied to respective brushes 264 through respective diodes 265, whereby in case the brush 264 to which a timing pulse is applied is not in contact with the conductive part 266, the inverter 263 delivers a low level output because the power source voltage Vcc is applied to the inverter 263 through the resistance, while in case the brush 264 is in contact with the conductive part 266, the inverter 263 delivers a high level output, because the input of the inverter 263 is induced to be at low level through the conductor rings 256, the brushes 264 and the diode 265. Namely the above mentioned inverter 263 delivers a digital value of six figures corresponding to the APEX value of the ASA sensitivity set by means of the above mentioned ASA sensitivity setting dial 40 from the last bit in sequence in synchronization of the timing pulses $TB_1$–$TB_6$. This data of six bits is the one whose last two bits are "$\frac{1}{2}$" and "$\frac{1}{4}$", whereby as explained after "1" is made to appear in the bit with the weight "$\frac{1}{8}$" when "1" appears either in the bit with the weight "$\frac{1}{2}$" or in the bit with the weight "$\frac{1}{4}$" in such a manner that after the data with six bits is converted into a data with seven bits including an approximated data of "$\frac{2}{3}$" or "$\frac{1}{3}$". As mentioned above, the data Sv (APEX value) relative to the film sensitivity is taken up as a digital value of seven bits with the precision of $\frac{1}{3}$ step after all.

By means of the above mentioned composition, the camera device shown in FIG. 1 takes up the sensitivity of the film to be used in a digital value corresponding to the APEX value.

As explained afore, this camera device is so designed as to take up the smallest aperture value (APEX value) of the photographic lens device 2 to be used in digital value. As has clearly been explained in accordance with FIG. 2 the lens device includes a diaphragm opening pin 90 presenting a protruding amount corresponding to the smallest aperture value AVo of the lens, while the camera body 4 includes the smallest aperture value input pin 96 for detecting the protruding amount of the above mentioned diaphragm opening pin 90. This diaphragm opening pin 90 is connected to a mechanism for detecting the displacement amount of the pin 96 so as to take up the smallest aperture value AVo of the lens device 2 in a digital value. Such mechanism is shown in detail in FIG. 14, whereby the smallest aperture value input pin 96 is displaced in accordance with the protruding amount of the above mentioned diaphragm opening pin 90, while the one end of the pin 96 is in contact with the pin 90, whereby this displacement amount is converted into the rotation amount around the shaft 270 of the rotary lever 268 in contact with the above mentioned smallest aperture value input pin 96.

In order to take out the above mentioned rotation amount converted into a digital value of four bits in accordance with its magnitude a fan shaped smallest aperture value detecting disc 272 with the shaft 270 as center is provided. This smallest aperture value detecting disc 272 comprises four conductor rings 274 concentrically arranged around the shaft 270 so as to correspond to respective bits of the digital data of the smallest aperture value AVo and a common ring 276 arranged concentrically to the conductor rings 274 and connected to the power source Vcc through the resistor 275 and further connected to the inverter 279. Further there are provided data tracks corresponding to respective bits of the smallest aperture value AVo of the lens device 2 between the conductor rings 274, whereby the four brushes 280 provided at the one end of the above mentioned rotary lever 268 correspond to respective data tracks. The above mentioned brush 280 is in electrically conductive state with the common brush 282 provided parallel to the brush 280 and normally in contact with the common ring 276.

The above mentioned conductor rings 274 include extended conductive portions in contact with the respective brushes 280 on the data tracks in accordance with the rotation amount of the rotary lever 268 in such a manner that the above mentioned conductor rings make an electrically closed circuit with the brush corresponding to the data track corresponding to the bit with the weight "1" of the bits of the smallest aperture value AVo, whereby the digital value corresponding to the APEX value of the smallest aperture value of the lens device set from the diaphragm opening pin 90 of the lens device 2 through the smallest aperture value input pin 96 of the camera body 4 is replaced with the selective contact of the above mentioned brushes 280 with the above mentioned conductive portion 282. Further at the time of taking up the smallest aperture value AVo of this lens device 2, the timing pulses shown in FIG. 13 play a part. Hereby for taking up this smallest aperture value AVo, the four timing pulses $TB_3$–$TB_6$ are used.

Figure 14:
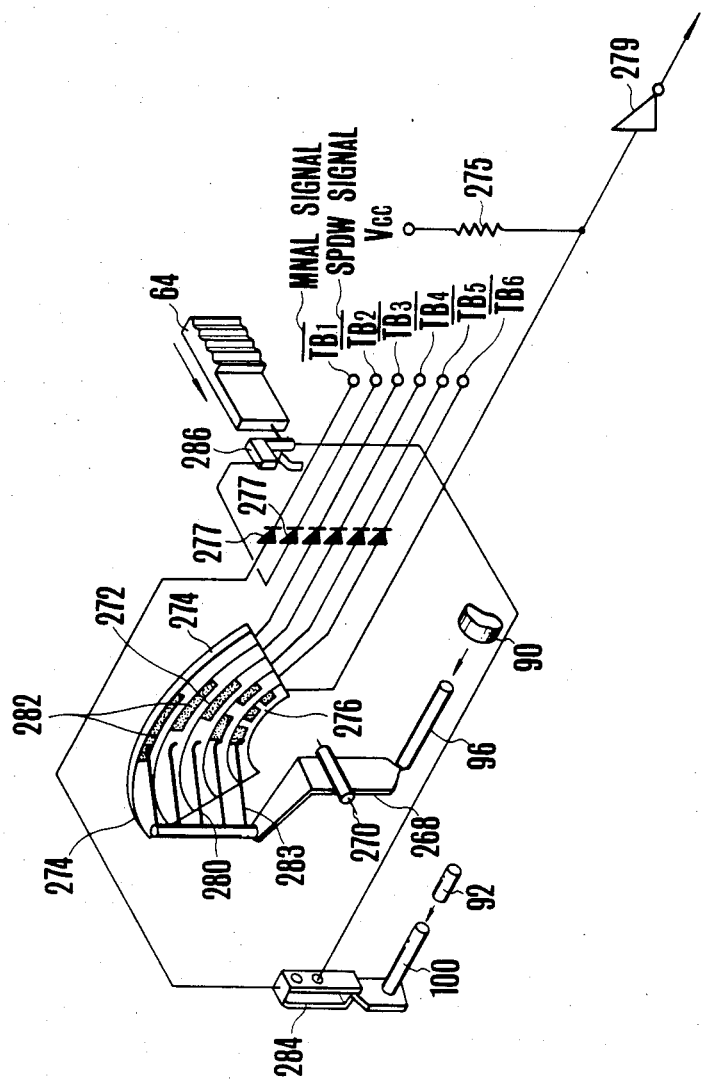
FIG. 14 shows a concrete composition for taking up the informations so as to the smallest aperture value of the lens device 2, the state of the aperture ring and the information as to the diaphragm driving lever.

The composition shown in FIG. 14 is so designed that the above mentioned timing pulses $TB_3$–$TB_6$ are applied to the respective conductor rings 274 through respective diodes 277, whereby when no brush 268 is in contact with the conductive portion 282 extending from any conductor ring 274 to which the timing pulse is applied, the inverter 279 delivers a low level output because the power source voltage Vcc is applied to the inverter 279 through the resistance 275, while when the brushes are in contact with respective conductive portions, the inverter delivers a high level output because the input of the inverter 279 is induced to be at low level through the common ring 276, the common brush 283, the brushes 280, the conductor rings 274 and the diodes 277. Namely the above mentioned inverter 279 delivers the digital value of four figures corresponding to the smallest aperture value of the photographic lens device 2 taken up from the diaphragm opening pin 90 through the smallest aperture value input pin 92 in synchronization with the timing pulses $TB_3$–$TB_6$ from the bit with larger weight in sequence. The first figure of this data of four bits has the weight of "4" while the last figure has the weight "$\frac{1}{2}$".

What plays an important part at the time of taking up the data relative to this smallest aperture value AVo is the difference of the protruding amount relative to the smallest aperture value AVo, of the diaphragm opening pin 90 provided on the lens device 2. Namely it is difficult to precisely read out such small difference of the protruding amount because the protruding amount of the above mentioned diaphragm opening pin 90 can not be altered largely for each smallest aperture value AVo together with the lens device 2 and the camera body 4 due to the problem of space and moreover the lens device 2 is mountable on the camera body 4. Especially when it is desired that a digital data of binary code is read out from the smallest aperture value detecting disc 272 as is shown in FIG. 14 in accordance with the position of the brushes 282, there is a danger for misreading due to the restriction of the precision of the brushes 280 in case the brushes are between the position for a certain data and that for the next data. The then misread data is never taken out as a mean data but a data quite different therefrom. In consequence it is thought out to read out the smallest aperture value AVo of the lens device 2 by means of grey code and not by means of binary code. As is well known the content of such grey code differs only 1 bit between the adjacent digital datas so that it can be applied remarkably efficiently when a digital data corresponding to the displacement amount of the smallest aperture value input pin 96 by means of a mechanism as is shown in FIG. 14. In consequence in case of the camera system in accordance with present invention grey code is applied to the mechanism for taking up the smallest aperture value AVo of the lens device 2 and later converted into binary code as the data for further operation.

Figures 15, 16:
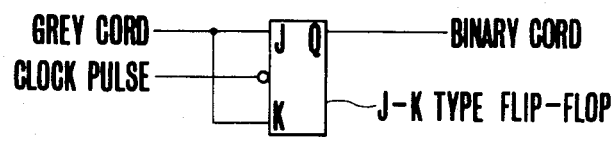
FIG. 15 shows a comparison table of the grey code with the binary code.
FIG. 16 shows a principle of the converter circuit of the grey code into the binary code.

To explain more in detail the content of grey code differs only 1 bit between the adjacent codes, different from the ordinary binary code as is shown in the comparison table shown in FIG. 15 and corresponds to that of decimal or binary code as is shown in the table. However, the relation between this grey code and the binary code is not at random at all. When each figure of binary code is compared with the corresponding figure of grey code, it is found that the content of the figure of binary code corresponding to the figure of "0" of grey code is equal to that of the figure one step higher while the content of the figure corresponding to the figure of "1" of the grey code is equal to the inverted content of the figure one step higher.

In consequence the data in grey code taken up in synchronization with the timing pulses $TB_3$–$TB_6$ from the figures with the larger weight is converted into the data in binary code through the circuit shown in FIG. 16.

Namely the Flip-Flop of J-K type delivers the Q output as is shown in FIG. 17 when the J input is identical with the K input. In short both of the J input and of the K output are "1", the Q output is inverted in synchronization with the next clock pulse, while both of the J input and of the K input are "0" the Q output is kept same in content. Thus the data produced at the Q output terminal in sequence in synchronization with the clock pulse when a grey code is given to the J-K input terminal of the J-K Flip-Flop in sequence from the figures with the larger weight is the data converted into a binary code out of the above mentioned grey code.

As explained above the camera device shown in FIG. 1 takes up the smallest aperture value AVo of the photographic lens device in a digital value corresponding to APEX value through a composition as is explained above.

It is as mentioned afore that this camera device includes a mechanism for transmitting to the camera body 4 the information as to whether the lens device 2 is in the manual mode in which the aperture of the lens device 2 is preset at a value desired by the photographer manually, namely by means of the aperture setting ring 8 or in the automatic mode in which the aperture can be preset from the side of the camera body 4, namely the mark 12 is selected with the aperture setting ring 8.

Namely at the side of the lens device 2 the AE pin 92 which protrudes when the mark 12 is selected with the aperture setting ring 8 is provided, while at the side of the camera body 4 the AE detecting part 100 which detects the protruding AE pin 92 is provided so as to be opposed to the AE pin 92, whereby the AE detecting part 100 is functionally engaged with the switch 284 as is shown in FIG. 14. This switch 284 consists of the contact normally closed, whereby the one terminal is connected to the power source Vcc through the resistance 275 and at the same time to the input terminal of the inverter 279, while to the other terminal the timing pulse $TB_1$ is applied through the diode 277. Namely the state of the switch 284 is sensed by means of the timing pulse $TB_1$ in such a manner that in the closed state of the switch 284 the inverter 279 delivers a high level output because the input of the inverter 279 is induced to be at the low level through the switch 284 and the diode 277, while in the opened state of the switch 284 the inverter 279 delivers the low level output because the power source voltage Vcc is applied to the input terminal of the inverter through the resistance 275. In consequence in the manual mode, namely when the above mentioned AE pin 92 does not protrude the above mentioned inverter 279 delivers a high level output in synchronization with the timing pulse $TB_1$ while in the automatic mode, namely when the above mentioned AE pin protrudes the above mentioned inverter delivers a low level output in synchronization with the timing pulse $TB_1$.

By means of the above mentioned composition the camera system in accordance with the present invention takes up the aperture setting condition by means of the aperture setting ring 8 of the lens device 2, namely the information as to whether the aperture is preset at the side of the lens or at the side of the camera body. Hereby in the following explanation the high level signal delivered from the above mentioned inverter 279 in synchronization of the timing pulse $TB_1$ is called MNAL signal.

Further it is as mentioned afore that the camera device shown in FIG. 1 is so designed that the diaphragm of the lens device 2 can be closed by operating the diaphragm closing lever 64 at the side of the camera body 4, whereby this diaphragm closing lever 64 not only possess the efficiency for mechanically closing the diaphragm of the lens device 2 but also is functionally engaged with the switch for detecting the closed state of the diaphragm of the lens device 2 as is shown in FIG. 14. This switch 286 consists of the contacts normally opened, whereby the one terminal is connected to the power source Vcc through the resistance 275 and at the same time to the input terminal of the inverter 279 while to the other terminal the timing pulse TB$_2$ is applied through the diode 277. Namely the state of the switch 286 is sensed by means of the above mentioned timing pulse TB$_2$, whereby in the opened state the inverter 279 delivers a low level output because the power source voltage Vcc is applied to the input terminal of the above mentioned inverter 279 through the resistance 275, while in the closed state the inverter 279 delivers the high level output because the input of the above mentioned inverter 279 is induced to be at the low level through the switch 286 and the diode 277. In consequence when the diaphragm of the photographic lens 2 is brought into the closed state by operating the above mentioned diaphragm closing lever 64, the above mentioned inverter 279 delivers the high level output in synchronization with the timing pulse TB$_2$.

By means of the above mentioned composition the camera system in accordance with the present invention takes up the information as to whether the diaphragm of the lens device 2 is in the closed state or not. Hereby in the following explanation the high level signal delivered from the above mentioned inverter 279 in synchronization with the timing pulse TB$_2$ is called SPDW signal.

As is clear from the above explanation the inverter 279 shown in FIG. 1 delivers the MNAL signal in synchronization with the timing pulse TB$_1$, the SPDW signal in synchronization with the timing pulse TB$_2$ and the data as to the smallest aperture value AVo of the photographic lens device 2 from the figures with the larger weight in sequence in synchronization with the timing pulses TB$_3$–TB$_6$, whereby the output of the inverter is assorted accordingly in accordance with the above mentioned timing pulses TB$_1$–TB$_6$. The composition hereof will be explained later in detail.

In case of the camera shown in FIG. 1, the dial 34 for setting the shutter speed or the aperture value desired by the photographer on the front surface of the camera body 4 as explained afore. This shutter dial 34 is intended to set the shutter time TV (APEX value) in case of the shutter time priority photography and the aperture value (APEX value) in case of the aperture value priority photography in the digital value, whereby the composition is similar to that for taking up the digital value of the film sensitivity out of the ASA sensitivity setting dial 40. Namely the dial 34 is so designed that as is shown in FIG. 18 the digital data in accordance with the rotation position of the dial is put in the system out of the digital data setting disc 288 rotated together with the dial 34 as is shown in FIG. 18. The above mentioned digital data setting disc 288 consists of a plural number of the concentric conductor rings 292 corresponding to respective bits of the digital value of the shutter time TV or the aperture value AV and on the common ring 294 electrically connected to all of the above mentioned conductor rings 292 through the conductor extending along the radial direction of the data setting disc 288 on an insulated base plate. Hereby the above mentioned common ring 294 is normally in contact with the brush 296, whereby the brush 296 is connected to the power source Vcc through the resistance 297 and at the same time to the inverter 299. Further the data tracks corresponding to respective bits of the digital data of the shutter time TV and the aperture value AV are provided between the conductor rings 292, whereby five brushes 290 are in contact with respective data tracks corresponding to respective bits of the data. The above mentioned data tracks consist of conductive portions 300 extending along the radial direction from the above mentioned conductor rings 256 on the parts in contact with the above mentioned respective brushes 290 in such a manner that the brushes 290 corresponding to the bits with "1" for the digital value of the set dial are brought into an electric contact with the above mentioned conductor rings 292 in accordance with respective set position of the dial 34 for setting the shutter time TV or the aperture value AV.

Hereby the timing pulses play an important part in taking us the shutter time TV or the aperture value out of such composition. The composition shown in FIG. 18 is so designed that out of the above mentioned timing pulses TB$_2$–TB$_6$ are applied to the five brushes 290 through respective diodes 301, whereby when the brush to which a timing pulse is applied is not in contact with the conductive portion 300, the inverter 263 produces a low level output because the power source voltage Vcc is applied to the inverter 299 through the resistance 297, while the brush 290 is in contact with the conductive portion 300, the inverter 299 produces a high level output because the input of the inverter 299 is induced to be at low level through the above mentioned rings 292, the brushes 290 and the diode 301. Namely the above mentioned inverter 299 delivers a digital value with five figures corresponding to the APEX value of the shutter time TV and the aperture value set by means of the above mentioned dial 34 from the bit with the smallest weight in sequence in accordance with the timing pulses TB$_2$–TB$_6$. The weight of the last figures of the data with five bits is "$\frac{1}{2}$", while that of the first figure is "8".

Here it is necessary to determine whether the digital data obtained through the composition as mentioned above by means of the dial 34 is the data relative to the shutter time TV or the aperture time, for which purpose the mode change over switch 38 is provided on the upper surface of the camera body 4. This change over switch 38 is functionally engaged with the switch 302 to be closed when the switch 38 is set at the side of the aperture priority mode. This switch 302 consists of contacts normally opened, whereby the one terminal is connected to the power source Vcc through the resistance 297 and at the same time to the input terminal of the inverter 299, while to the other terminal the timing pulse TB$_1$ is applied to the diode 301. Namely the state of the switch 302 is sensed by means of the above mentioned timing pulse TB$_1$, whereby in the opened state the inverter 299 delivers a low level output because the power source voltage Vcc is applied to the input terminal of the inverter 299 through the resistance 297, while in the closed state the inverter 299 delivers a high level out output because the input of the above mentioned inverter 299 is induced to be at the low level through the above mentioned switch 302 and the diode 301. In consequence the above mentioned inverter 299 delivers a high level output in synchronization of the timing pulse TB$_1$ when the above mentioned mode change over switch 38 is set at the side of the aperture value priority mode while the inverter 299 delivers a low level output when the above mentioned mode change over switch 38 is set at the shutter time priority mode.

By means of the composition as mentioned above the camera system in accordance with the present invention judges whether the data set by means of the dial 34 relates to the shutter time TV or to the aperture value.

Further in the following explanations the high level signal produced by the above mentioned inverter 299 in synchronization with the timing pulse $TB_1$ is called the ASLC signal.

Hereby the present embodiment is so designed that the shutter time TV is selected out of the values by one step by means of the dial while the aperture value is selected out of the values by ½ step. Namely although the datas by ½ step are not necessary in order to set the shutter time by 1 step, it is necessary for the dial 34 to set the aperture value including the datas by ½ step, so that depending upon the setting position of the dial 34 the shutter time including datas of ½ step may be set. In order to provide for this problem in case of this embodiment it suffices to set the data relative to the shutter time with the half of the necessary digital data to be set and to duplicate the digital data read out in accordance with the set position of the dial 34 so as to use it as the digital data TV corresponding to the APEX value relative to the shutter time.

As mentioned above in the case of the camera device shown in FIG. 1 the inventor 299 delivers, in synchronization with the timing pulse $TB_1$, the ASLC signal for judging whether the data set by means of the dial 34 relates to the shutter time or the aperture and further, in synchronization with the timing pulses $TB_2$–$TB_6$, the data set by the dial 34 from the figure with the larger weight in sequence, whereby the output of the inverter 299 is assorted correspondingly in accordance with the afore mentioned timing pulses $TB_1$–$TB_6$. This composition will be explained in detail later.

By means of the above mentioned composition, the camera system in accordance with the present invention takes up the shutter time TV or the aperture value AV set with the dial by the photographer in digital value corresponding to the APEX value.

Further this camera device includes a composition for detecting the largest aperture value of the photographic lens device 2. Namely as is clear from the explanation made in accordance with FIG. 2 the lens device 2 includes the largest aperture value pin 91 presenting a protruding amount corresponding to the largest aperture value of the lens, while the camera body 4 includes a largest aperture value input pin 97 for detecting the protruding amount of the above mentioned largest aperture value pin 91. This largest aperture value input pin 97 is connected to the mechanism for detecting its displacement amount so as to specify to which of a plural number of the aperture values given in advance the largest aperture value of the lens device 2 belongs. Such mechanism is shown in detail in FIG. 19, whereby the one end of the largest aperture value input pin 97 is in contact with the largest aperture value pin 91 so as to be displaced in accordance with the protruding amount of the pin 91 in such a manner that this displacement amount is converted into the rotation amount of the rotation lever 304, with which the above mentioned largest aperture value input pin 97 is in contact, around the shaft 303 as center. This rotation amount is used as the amount for selecting of the aperture value F11, F16, F22, F32, F45, F64 in F number, for which purpose the fan shaped largest aperture value detecting disc 306 with the shaft 303 as center is provided. This largest aperture value detecting disc 306 consists of six electrodes arranged along the circumference of the detecting disc so as to be able to select one of the aperture values F11, F16, F22, F32, F45, F64 in F.number as the largest aperture value on an insulated base plate in such a manner that the electrodes 308 can be selectively brought into contact with the brush 305 provided at the end of the lever 304 in accordance with the rotation amount of the lever 304. At the same time the above mentioned largest aperture value detecting disc 306 includes a common electrode 310 extending along the circumferential direction, whereby the above mentioned brush 305 is normally in sliding contact with the above mentioned common electrode 310 regardless of the position in such a manner that a bridge is formed between one of the above mentioned electrodes and the above mentioned common electrode 310. Further the above mentioned common electrode 310 is connected to the power source Vcc through the resistance and at the same time to the input terminal of the inverter 316, while to the six electrodes 308 the timing pulses $TB_1$–$TB_6$ are respectively applied through the diode 312. In case of such a composition the protruding amount of the largest aperture value pin 91 presenting the protruding amount corresponding to the largest aperture value of the lens device 2 is detected by the largest aperture value input pin 97 at the side of the camera body 4 whereby the above mentioned brush 305 selects one of the above mentioned six electrodes 308 in accordance with the displacement amount of the above mentioned largest aperture value pin 97 in such a manner that a conductive state is established between one of the electrode 308 and the above mentioned common electrode 310. When now no timing pulse is applied to the electrode 308 in contact with the above mentioned brush 305 through the diode 312, the inverter 316 delivers the low level output because the input terminal of the inverter 316 is at high level due to the power source voltage Vcc, while when the corresponding timing pulse is applied to this electrode 308 through the diode 312, the inverter 316 delivers the high level output because the input terminal of the inverter 316 is at low level. Namely the above mentioned inverter 316 delivers a high level output in synchronization of the timing pulse corresponding to the detected largest aperture value, whereby by assorting the output of the above mentioned inverter 316 in accordance with the timing pulses $TB_1$–$TB_6$ it is possible to detect to which of F11, F16, F22, F32, F45, F64 in F number the detected largest aperture value belongs.

As mentioned above, it is possible for the camera device shown in FIG. 1 to take up the largest aperture value AMAX of the photographic lens device 2 to be used, whereby in the following explanations the output signal of the above mentioned inverter 316 is called AMAX'.

As is clear from the above mentioned explanation, the set film sensitivity data SV, the smallest aperture value data AVo of the photographic lens device to be used, the judging signal MNAL of the manual mode or the automatic mode, the lens device diaphragm closing signal SPDW, the shutter time TV or the aperture value AV setting data, the aperture value priority mode selecting signal ASLAC and the largest aperture value detecting signal AMAX and so on are all taken up in synchronization with the timing pulses $TB_1$–$TB_6$.

Figures 20, 21, 22:
FIG. 20 shows a table of the input timing of various datas and informations.
FIGS. 21 and 22 show concrete disposition for taking up the state of various kinds of switches.

Namely as is shown in FIG. 20, the inverter 263 (FIG. 12) delivers the data relative to the film sensitivity SV from the bit $SV_{\frac{1}{4}}$ with the weight "¼" up to the bit $SV_8$ with the weight "8" in sequence in accordance with the timing pulses $TB_1$–$TB_6$. This data relative to the film sensitivity SV is later added with the bit $SV_{\frac{1}{8}}$ with the weight "⅛" so as to be converted into an approximated data with the precision of $\frac{1}{8}$ of the data with the precision of $\frac{1}{8}$ step, which has already been explained. Further the inverter 279 (FIG. 14) delivers the MNAL signal for showing that the aperture value is selected at the side of the lens device 2 in synchronization of the timing pulse $TB_1$, the SPDW signal for showing that the diaphragm of the lens device 2 is in the closed state in synchronization with the timing pulse $TB_2$ and the grey code data AVogc relative to the smallest aperture value AVo of the lens device 2 to be used from the bit $AVo\frac{1}{2}gc$ with the weight of "$\frac{1}{2}$" up to the bit $AVo4gc$ with the weight of "4" in sequence in synchronization with the timing pulses $TB_3$–$TB_6$. This grey code data AVogc relative to the smallest aperture value AVo of the lens device 2 is later converted into the binary code data AVo as is explained afore.

Further the inverter 299 (FIG. 18) delivers the signal ASLC for the aperture value priority mode in synchronization with the timing pulse $TB_1$ and the data relative to the set shutter time TV or the set aperture value AV in synchronization with the timing pulses $TB_2$–$TB_6$. Hereby the data delivered in synchronization with the timing pulse $TB_2$ has the weight of "$\frac{1}{2}$", that delivered in synchronization with the timing pulse $TB_3$ has the weight of "1", that delivered in synchronization with the timing pulse $TB_4$ has the weight of "2", that delivered in synchronization with the timing pulse $TB_5$ has the weight of "4" and that delivered in synchronization with the timing pulse $TB_6$ has the weight of "8", which is due to the fact that the data for the aperture value AV is taken up with the precision of $\frac{1}{2}$ precision. On the other hand the shutter time taken up through the commond dial 34 is set with the precision of "1" step, so that the bit $TV_1$ of the shutter time with the weight of "1" is taken up as the data with the weight of "$\frac{1}{2}$" in synchronization with the timing pulse $TB_2$, the bit $TV_2$ with the weight of "2" is taken up as the data with the weight of "1" in synchronization with the timing pulse $TB_3$, the bit $TV_4$ with the weight of "4" is taken up as the data with the weight of "2" in synchronization with the timing pulse $TB_4$, the bit $TV_8$ with the weight of "8" is taken up as the data with the weight of "4" in synchronization with the timing pulse $TB_5$ and the bit $TV_{16}$ with the weight of "16" is taken up as the data with the weight "8" in synchronization with the timing pulse $TB_6$. In other words the data for the shutter time can be said to be once halved so as to be matched with the precision of the data for the aperture value as the data with the precision of $\frac{1}{2}$ step and set with the common dial 34. In consequence when the data delivered from the inverter 299 in synchronization with the timing pulse $TB_2$–$TB_6$ is used for the shutter time TV, the data is duplicated.

Further the inverter 316 (FIG. 19) delivers the signal AMAX' for showing to which of F11, F16, F22, F32, F45, F64 in F number the largest aperture value of the photographic lens device 2 to be used belongs, whereby the largest aperture value is determined by the one out of the timing pulses $TB_1$–$TB_6$ with which the output AMAX' of the inverter is synchronized.

The camera device shown in FIG. 1 includes other switching mechanisms for setting various operation modes, whereby the switching mechanism functionally engaged with the shutter release button is on of them. This switching mechanism is, as shown in FIG. 21, so designed that the switch S1 is closed by means of the operation of the shutter release button 18 so as to deliver a high level output through the inverter 11 in such a manner that the necessary camera operation after the shutter release are started. Hereby the operations includes those for the lifting of the reflex mirror, the closing of the diaphragm of the lens device 2 down to the preset position, the starting of the front shutter plane of the focal plane shutter and so on. In the following explanation this switching mechanism is called $SW_2$, while the output signal is called SR.

Further the selector lever 22 is functionally engaged with two switching mechanisms. One of them is for the AE locking. This switching mechanism is, as shown in FIG. 21, so designed that when the selector lever 22 is set at the position at which the mark 26 is selected, the switch S1 is closed so as to deliver a high level output through the inverter 11, in accordance with which high level output the measured light amount is maintained. In the following explanation this switching mechanism is called SAELK while its output signal is called AELK. The other one is for setting the self-timer. This switching mechanism is, as shown in FIG. 21, so designed that when the selector lever 22 is set at the position at which the mark 28 is selected, the switch S1 is closed so as to deliver a high level output through the inverter 11, in accordance with which high level output the shutter is released after the elapse of a certain determined time after the operation of the shutter release button 18. Namely the so called self-timer photography is carried out. In the following explanation this switching mechanism is called SSELF while its output signal is called SELF.

Further the camera device shown in FIG. 1 includes other switches or mechanisms for judging various operation modes. First of all the AE charge detecting switching mechanism is provided for detecting whether the AE lever 94 provided at the side of the camera body 4 is in the AEccharge state or not. This switching mechanism is, as shown in FIG. 21, so designed that when the AE lever 94 is in the AE charge state, the switch S is closed so as to deliver the output "1" through the inverter 11. In the following explanation, this switching mechanism is called SAECG, while its output signal is called AECG.

Further the winding up completion detecting switching mechanism is provided for detecting whether the film has been wound up. This switching mechanism is, as is shown in FIG. 21, so designed that when the springs for moving components necessary for film winding up by the winding up lever 14 and shutter releasing have been charged the switch S1 is closed so as to deliver the output "1" through the inverter 11. Hereby the above mentioned switch S1 remains in the closed state until the necessary operation have been done successively and the rear shutter plane of the focal plane shutter has run after the shutter was released. In the following explanation this switching mechanism is called SWAUP while the output signal is called WAUP.

Further the front shutter plane start detecting switching mechanism for detecting whether the front shutter plane of the focal plane shutter has started running. This switching mechanism is, as is shown in FIG. 22, so designed that when the front shutter plane starts to run the closed switch S2 is opened so as to convert the output "1" into the output "0". The output of this switching mechanism is used for counting the shutter time so as to control the starting time of the rear shutter plane. In the following explanation this switching mechanism is called SCTST while its output signal is called CTST.

Figure 23:
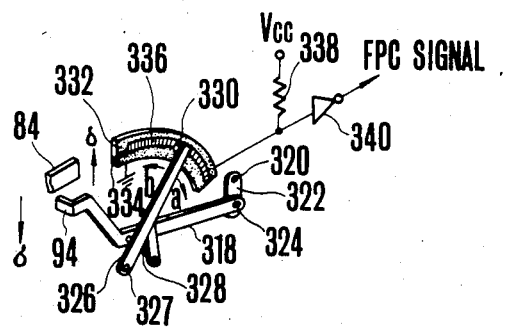
FIG. 23 shows a concrete disposition for detecting the displacement amount of the AE lever 94.

Further the camera device shown in FIG. 1 includes, as already mentioned above, the mechanism for presetting the aperture of the lens device 2 from the side of the camera body 4, whereby the operation mode of this mechanism has already been explained in accordance with FIG. 2. Namely immediately before the shutter release the AE lever 94 is in the state locked at the AE charge position while the lever 84 for presetting the aperture of the lens device 2 is kept at the preset position of the totally opened diaphragm of the lens device 2. Such locked state is released at the time of the shutter release, whereby the AE lever 94 releases the lever 84 urged toward the largest aperture value preset side so that the lever 84 starts to run toward the largest aperture value preset side. At the same time by detecting the displacement amount of the lever 84 by means of a pulse means, the number of the diaphragm preset steps by means of the lever 84 in motion (this number increased with the displacement of the lever 84) is detected in such a manner that by clamping the above mentioned AE lever 94 at the time joint at which the detected step number coincides with the step number for control the lever 84 is made to step at the position at which the lever 84 has been displaced over the distance corresponding to the step number for control. Through the above mentioned operations it becames possible to preset the aperture of the lens device 2 from the side of the camera body 4, whereby what is shown in FIG. 23 is the mechanism for detecting the displacement amount of the lever 84 converted into pulses. The AE lever 94 is composed as one body with the arm 318, whereby this arm 318 is rotatably held on the arm 322 rotatable around the shaft 320 as center by means of a pin 324. By means of this composition the AE lever 94 is displaceable along the direction of the arrow α or δ, being slightly urged along the direction of the arrow α by means of a not shown spring. The lever 326 is born on the shaft, while its one part is rotatably converted with the above mentioned arm 318 by means of the pin 328, whereby this lever 326 serves to obtain pulses where number corresponds to the displacement amount of the above mentioned AE lever 94. The above mentioned lever 326 includes a brush 330 at the end, being rotated along the direction of the arrow b or a around the shaft 327 as center when the lever AE lever 94 is displaced along the direction of the arrow α or δ. The above mentioned brush 330 is normally in the sliding contact with the fan-shaped pulse generating disc 322, whereby the one part is normally in contact with the common electrode 334 whose one part is earthed while the other part is faced with the comb tooth shaped electrode 336 protruding along the radial direction. The teeth of the above mentioned comb tooth shaped electrode 336 are in the conductive state among each other, being connected to the power source Vcc through the resistance 336 and at the same time to the input terminal of the inverter 340. When in this state the AE lever 94 is displaced along the direction of the arrow α or δ, the above mentioned brush 330 is displaced along the direction of the arrow b or a, being in the sliding contact with the above mentioned pulse generating disc 332. At this time the brush 330 is displaced, being repeatedly brought into and out of contact with the above mentioned comb tooth shaped electrode 336, whereby when the brush 330 is in contact with the electrode 336 the inverter 340 delivers a high level output because the level of the inverter 340 is induced to be at low level, being attracted toward the earth side, while when the brush 330 is not in contact with the electrode 336, the inverter 340 delivers a low level output because the input of the inverter 340 is at high level by means of the power source Vcc. In consequence, when the AE lever 94 is displaced out of the lock position in the AE charge state along the direction of the arrow δ, being urged by the lever 84 at the side of the lens device, 2, naturally the brush 330 is also displaced along the direction of the arrow a, whereby the pulse signal corresponding to the displacement amount of the AE lever 94 is obtained from the inverter. Thus by counting the pulse number of this pulse signal, the displacement amount of the AE lever 94, namely the preset position corresponding to the diaphragm closing step number for the lever 84 is detected, whereby by clamping the above mentioned AE lever 94 at the time point at which the detected step number coincides with the desired step number, the aperture can be preset by the lever 84 of the lens device 2.

Hereby it is natural that these takes place the time differences between the operation of the mechanical components such as the AE lever mechanism, the clamping mechanism and so on and that of the electrical components such as for counting the output pulse signal of the inverter 340, whereby it goes without saying that such differences should be compensated mechanically or electrically basing upon experimental datas.

Figure 32:
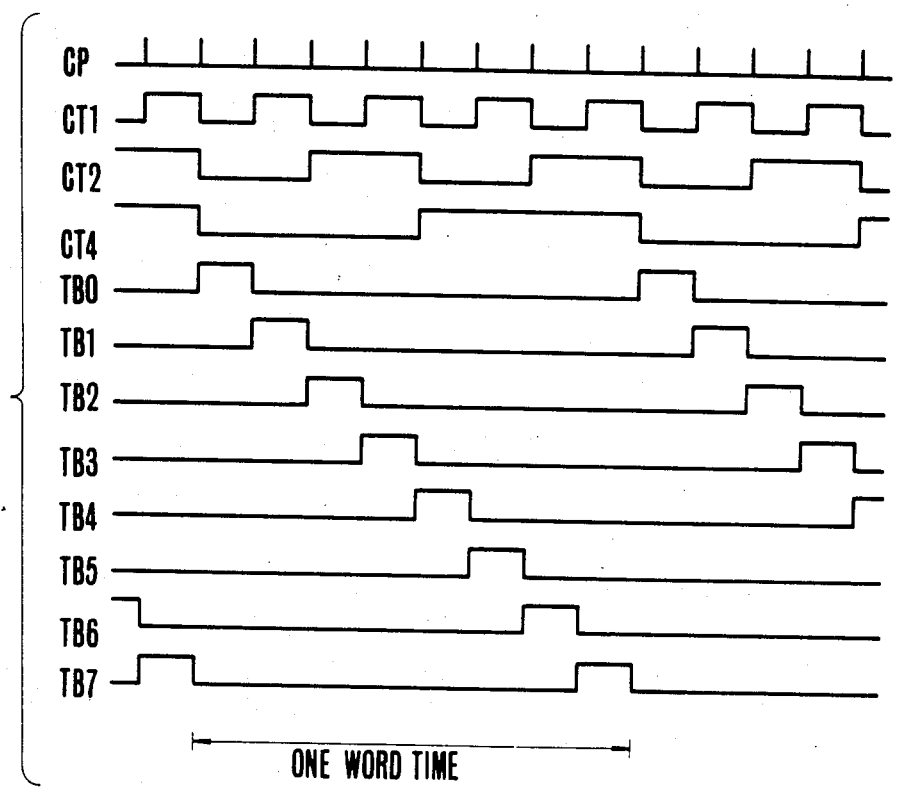
FIG. 32 shows a time chart for showing the wave forms of the output pulses out of the system pulse generator.

Further the wave form of the pulses obtained through the contact mechanism such as the pulse generating disc 332 composed as shown in FIG. 32 is not necessarily suited for the counting, whereby when it is inverted by means of the inverter 340, it is reformed to some extent. However in case it is necessary the wave form could be reformed by means of the wave form reforming means.

This camera system is, as explained above, so designed that the aperture of the lens device 2 can be preset from the side of the body whereby the clamping position of the lever for the aperture presetting is determined by means of a digital means such as the counting of the pulse number so that the preset with remarkably high precision is possible. Hereby in the following explanation the pulse signal for detecting the position of the AE lever 94 including the output of the inverter 340 is called FPC.

When a speed light device is mounted on the camera system in accordance with the present invention, the speed light photography can be carried out automatically as explained afore. Below the operation of the speed light device will be explained in detail in accordance with FIG. 24. In the drawing, 342 is the speed light unit in the automatic light adjusting system, whereby the speed light amount is controlled in accordance with the light reflected from the object to be photographed. Hereby the film sensitivity information from the film sensitivity setting dial 106 and the aperture value information from the aperture setting dial 108 are used as the element for the speed light amount control. The composition of such speed light unit is so much well known that its detailed explanation will be omitted here. In order that the speed light unit 324 operates, it is essential that the not shown discharge condenser should be charged up to a certain determined voltage. With the charge completion of this condenser, this speed light unit 342 is ready for operation, whereby the signal for the charge completion of the discharge condenser is delivered through the signal line 344 in order to tell the photographer that the charge has been completed. This signal is introduced into the current circuit 346, wherby the first current amount signal as the full automatic charge completion signal and the second current amount signal as the semi-automatic charge completion signal can be introduced into this current circuit 346 through the control contact 140 in accordance with the mode of the change over switch 146. Further when the above mentioned first current amount or the above mentioned second current amount becomes deliverable to the control contact 140 from the control terminal 54, this state is detected at the side of the camera and the mode is automatically changed over into the speed light photographic mode, whereby the circuit is changed over into the one by means of which the analog information from the data terminal 56 is converted into the digital information and taken up instead of the analog information from the not shown TTL light measuring system built in the camera body 4. Further as mentioned afore, when the camera device is changed over into the speed light photographic mode by means of the above mentioned first current amount (full automatic charge completion signal) the shutter is automatically controlled with 1/60 sec. no matter at which shutter time is set at the side of the camera body 4, while when the camera device is changed over into the speed light photographic mode by means of the above mentioned second current amount (semi-automatic charge completion signal) the shutter is automatically controlled with 1/60 sec. only when the shutter time shorter than 1/60 sec. is set at the side of the camera body 4. On the other hand the data terminal 56 receives from the data contact 142 as analog information the data relative to the aperture value set by means of the aperture setting dial 108 at the side of the speed light unit through the level setting device 348 directly connected to the above mentioned aperture setting dial 108. This analog information is converted into a digital one so as to be introduced into the camera device and used as the data for the aperture control.

When the shutter is released in the camera device which has been changed over into the speed light photographic mode by means of the full automatic or the semi-automatic charge completion signal from the speed light unit, an operation instruction synchronized with the movement of the shutter of the camera body 4 is given to the speed light unit 342 through the synchronization contacts 52, 138 in such a manner that the speed light unit 342 controls the light amount automatically. On the other hand at the side of the camera device the shutter is released with the shutter time of 1/60 sec. or longer (in case of the semi-automatic mode), while the aperture is controlled with the value set at the side of the speed light unit.

Hereby in the following explanation, the signal for the full automatic charge completion including the first current amount detected through the control terminal 54 is called CSA1 signal, the signal for the semi-automatic charge completion including the second current amount is called CSA2 signal and both of the above two charge completion signals are called CSA signal. Further the data relative to the aperture value taken up through the data terminal 56 are called VSA signal.

When the external light measuring meter is mounted on the camera system in accordance with the present invention, a wider exposure control become possible as is explained afore, whereby the operation of the external light measuring meter will be explained in detail in accordance with the block diagrams of the external light measuring meter shown in FIGS. 25 and 26.

Figure 25:
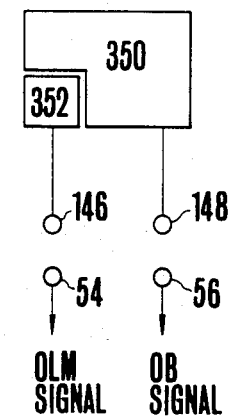
FIG. 25 shows a block diagram of the external light measuring instrument.

In FIG. 25, 350 is the reflexion light system light measuring meter which has the efficiency for directly measuring the light reflected from the object to be photographed without the intermediary of the photographic lens and so on. This external light measuring meter 350 includes the current circuit 352 into which the third current amount as the external light measuring mode signal can be introduced from the terminal 54 at the side of the camera device through the contact 146, whereby the camera device on which this reflexion light system light measuring meter is automatically changed over into the external light measuring mode, detecting when the above mentioned third current amount can be introduced into the contact 146 through the control terminal 54 and the circuit is selected in which the analog information from the data terminal 56 is converted into a digital one instead of the analog information from the not shown TTL light measuring system built in the camera body. At the same time the above mentioned external light measuring meter 350 delivers as analog information the object brightness obtained as the result of the light measurement from the data contact 148 to the data terminal 56, whereby this analog information is converted into a digital information so as to be introduced into the camera device and used as the data for the exposure control.

Figure 26:
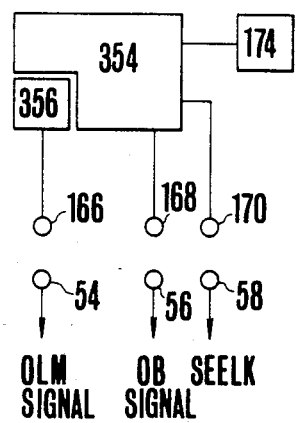
FIG. 26 shows a block diagram of the incident light exposure meter.

Further in FIG. 26, 354 is the incident light system light measuring meter which has the efficiency for directly measuring the illumination of the object. In the same way as in case of the light measuring meter shown in FIG. 25, this external light measuring meter 354 includes a current circuit 356 into which the third current amount as the external light measurement mode can be introduced from the control terminal 54 at the side of the camera device through the contact 166, while the camera device on which this incident light system light measuring meter is mounted is automatically changed over into the external light measuring mode when the above mentioned third current amount is in a position to reach the contact 166 from the control terminal 54, and the circuit is selected in which the analog information from the data terminal 56 is converted into a digital one instead of the analog information from the not shown TTL light measuring system built in the camera body 4. At the same time the illumination information obtained as the result of the light mesurement is given to the data terminal as analog information from the above mentioned external light measuring meter 354 through the data contact 168, which analog information is converted into a digital one so as to be introduced into the camera device and used as the data for the exposure control. Hereby the data taken up at this time at the side of the camera device is the illumination information obtained in accordance with the incident light system, whereby there is no problem in designing the system in advance in such a manner that the above mentioned data can be handled equivalently to the object illumination information obtained in accordance with the reflexion light system.

As is clear from the above mentioned explanation the reflexion light system external light measuring meter can be handled quite equivalently to the incident light system external light measuring meter, whereby a specific difference is that the incident light system light measuring meter includes the AE lock function of the camera device, namely the incident light system light measuring meter 354 is so designed that only while the light measuring button 174 is pushed down the light is measured so as to produce the light measurement data at the terminal 168. Thus it is desired that the camera device would be in the AE lock state when the light measuring button 174 is pushed down and no light measurement data is produced at the terminal 168. Thus the above mentioned light measuring button 174 is functionally engaged with a normally closed switch not shown in the drawing whereby the switch is connected in parallel to the switch SAELK for AE lock built in the camera body 2 through the contact 170 and the AE lock terminal.

As explained above both of the reflection light system external light measuring meter and the incident light system external light measuring meter can be applied to the camera system in accordance with the present invention, whereby in the following explanation the signal for the external light measuring mode including the third current amount detected through the control terminal 54 is called OLM signal, while the data for the measured light amount taken up through the terminal 56 is called OB signal. This OB signal is in APEX value equivalent to the object brightness BV.

By means of the above mentioned mechanisms the camera system in accordance with the present invention takes up various input data, the setting data and the information as to the setting condition operation state.

As is clear from the above explanation, the camera system in accordance with the present invention takes up the datas necessary for the exposure control, the operation conditions and the information as to the operation states through various means, whereby these input information are handled by means of the digital control system to be explained later.

As explained afore the camera system in accordance with the present invention applies the digital control system to the control system in such a manner that the operation control for connecting synthetic system in an organic way is carried out, the compactness and the high precision can be achieved at the time of manufacture in a simple way and the most rational operations can be developed for a number of the input informations.

Figure 27:
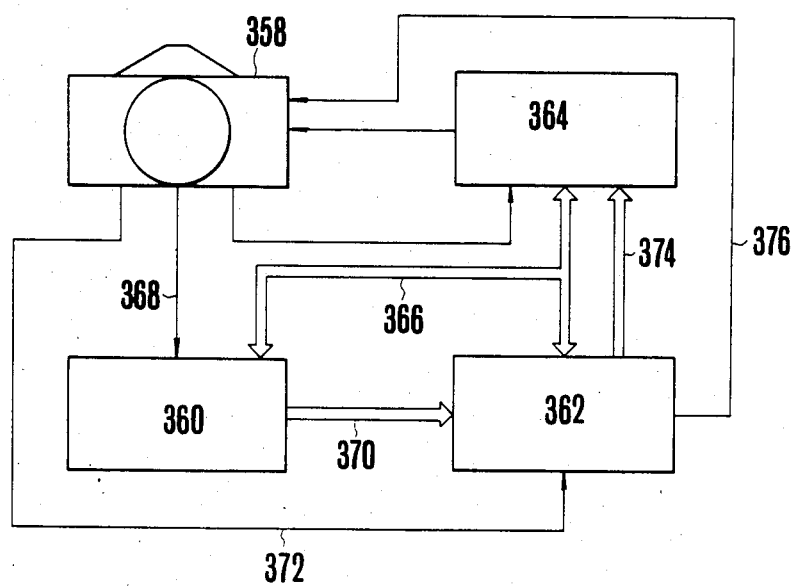
FIG. 27 shows a block diagram of the camera system in accordance with the present invention.

Below an embodiment of the digital control system applied to the camera system in accordance with the present invention will be explained, whereby the rational development of the system is not always made connected with the restriction due to the camera composition of the afore mentioned definition of the operations. The reason is that the camera device applied to this camera system has not yet included an ideal composition remarkably advance as compared with the conception of the conventional camera mechanism while the camera system itself is nearly in a similar situation. FIG. 27 shows an outlined block diagram of the digital control system for realizing the afore mentioned various efficiencies of the camera device shown in FIG. 1, whereby this control system is devided into three large blocks for the mechanical part 358 including the setting efficiency of various numerical datas or operation conditions, the judging efficiency of the operation state of various mechanisms and so on beside the most conventional mechanisms of the camera system, for example, the shutter mechanism, the diaphragm closing mechanism, the mirror up mechanism, the quick return mechanism and so on. These three large blocks are the input control part 360, the central control part 362 and the output control part 364, whereby all of these parts are connected to each other by means of one BAS line 366. Hereby the above mentioned mechanical part 358 includes various exposure control mechanisms and various display mechanism beside the afore mentioned input parts, namely the light measuring part, various data setting parts, various condition setting parts, various operation state judging parts and so on.

The measured light analog data, various condition setting signals and the operation state judging signals are introduced into the above mentioned input control part 360 from the above mentioned mechanical part 358 through the input system 368, whereby the above mentioned datas or signals are converted into digital information most suited for the information processing and transmitted to the central control part 362 through the input BAS line 370.

Various setting datas or various condition setting signals are introduced into the above mentioned central control part 362 from the above mentioned mechanical part 358 through the input system 372, whereby the above mentioned datas or signals are converted into forms most suited for the information processing, operated accordingly together with the digital informations from the above mentioned input control part 360 and then transmitted to the output control part 364 through the output BAS line 374 as the informations necessary for the control of various exposure control mechanisms and various display mechanism included in the above mentioned mechanical part 358. On the other hand the above mentioned central control part 362 delivers the timing signal for taking up various setting datas or various condition setting signal and the timing signal for the dynamic driving of various display mechanisms to the above mentioned mechanical part 358 through the timing line 376.

The above mentioned output control part 364 delivers control signals to various exposure control mechanism of the above mentioned mechanical part 358 as well as necessary information to various display mechanisms basing upon various condition setting signal or various operation state judging signal from the above mentioned mechanical part 358 and the control informations from the above mentioned central control part 362.

Below the efficiencies of the mechanical parts of the camera shown in FIG. 27 will be explained more in detail in accordance with the diagram shown in FIG. 28.

This mechanical part 358 takes part in all of the operations relative to the input, the output and the control display of the camera device, including various setting switches for the input or the detecting switch or the measuring device, various switches for the output or the line, various power source plunger for the control, various display mechanism and so on.

In the drawing 378 is the afore mentioned TTL light measuring means, whose output signal is compressed in a logarithmic way by means of a not shown means so as to produce analog value corresponding to the APEX value of BVo (=BV−AVo−AVc) in case of the light measurement with the totally opened diaphragm and of BVs (=BV−AV−AV″c) in case of the light measurement with the closed diaphragm.

The output analog signal of the above mentioned TTL light measuring means 378 is led to the A-D converter 382 through the signal change over circuit 380 of the input control part 360 so as to be converted into a digital data and introduced into the system. Hereby the above mentioned signal change over circuit 380 is provided in order to make use of the above mentioned A-D converter at the time of converting the analog datas from other light measuring means than the above mentioned TTL light measuring means 378, namely the reflexion light system light measuring meter 350, the incident light system light measuring meter 354 or the speed light device 384 into digital values.

Figure 24:
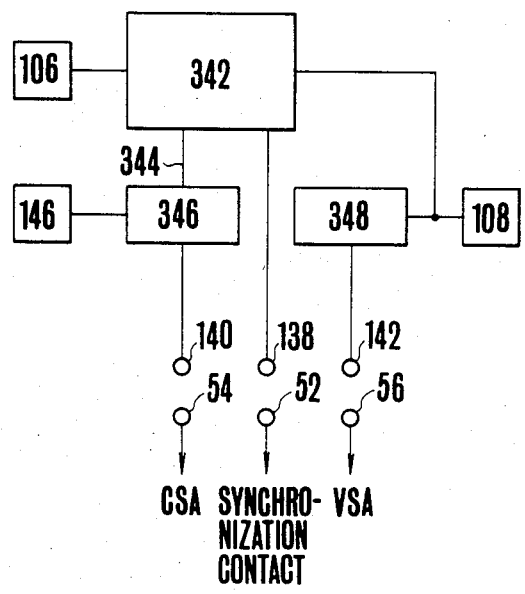
FIG. 24 shows a block diagram of the speed light photographic device.

FIG. 24 shows a block diagram of the speed light device 384 in a simple way, whereby when this speed light device 384 is mounted on the camera body 4, the data contact 142, the control contact 140 and the synchronization contact 138 of the speed light device 384 are respectively connected to the data terminal 56, the control terminal 54 and the synchronization contact 52 provided on the accessory shoe 50 of the camera body 4. When in this state the power source switch 132 (FIG. 5) of the speed light device 384 is closed, the data VSA relative to the aperture value set with the aperture setting dial 108 is led to the signal change over circuit 380 of the input control part 360 through the data contact 142 and the data terminal 56, when in this state the speed light device 384 has not yet completed the charging there is no charge completion signal CSA so that the input of the above mentioned data VSA is in the restricted state in the above mentioned signal change over circuit 380. When the speed light device 384 has been charged a current is ready to reach the charge completion detecting circuit 346 through the control terminal 54 and the data contact 140 at the side of the speed light device 384. Namely the charge completion signal CSA is delivered from the speed light device 384 in form of a negative current signal through the data contact 140 and the control terminal 54 so as to be detected by the current detector 386 provided at the input control part 360. This current detector 386 includes an efficiency for giving a control signal to the above mentioned signal change over circuit 380, when a current is delivered through the control contact 54, so as to apply an analog signal from the terminal 56 to the A-D converter 382 instead of the analog signal from the TTL light measuring means 378 and an efficiency for detecting the intensity of the above current so as to judge the control signal included in the current. Thus when the charge completion signal CSA is delivered from the above mentioned speed light device 384, the above mentioned signal change over circuit 380 delivers the data VSA relative to the aperture value taken up through the terminal 54 in analog value to the A-D converter 382 in such a manner that the data VSA relative to the above mentioned aperture value is converted into a digital value and introduced into the system. On the other hand, the above mentioned current detector 386, which detects the above mentioned CSA signal, delivers the charge completion signal CGUP so as to bring the system into the speed light photographic mode and at the same time judge in which of the full automatic state or the semi-automatic state the speed light photographic mode is in accordance with the current amount of the above mentioned CSA signal to which a current amount is selectively given in two steps by means of the charge completion detecting circuit 346 including an efficiency for switching over the current amount of the charge completion signal with two steps by means of the charge over switch 146, producing the full automatic signal FAT in case the speed light photographic mode is full automatic. Thus the system is brought into the full automatic speed light photographic mode or the semi-automatic speed light photographic mode in accordance the input of the charge completion signal CGUP produced by the above mentioned current detector 386 and the existence of the full automatic signal FAT.

Hereby the speed light device 384 for the speed light photography is triggered by means of the synchronization switch provided at the side of the mechanical part 358, whereby the speed light device 384 is connected to the above mentioned switch 388 through the synchronization contacts 138 and 52. Further, as is well known, this synchronization switch 388 is closed by means of the member 390 for detecting when the front shutter plane has operated in case of the two shutter plane system focal plane shutter.

Figure 24A:
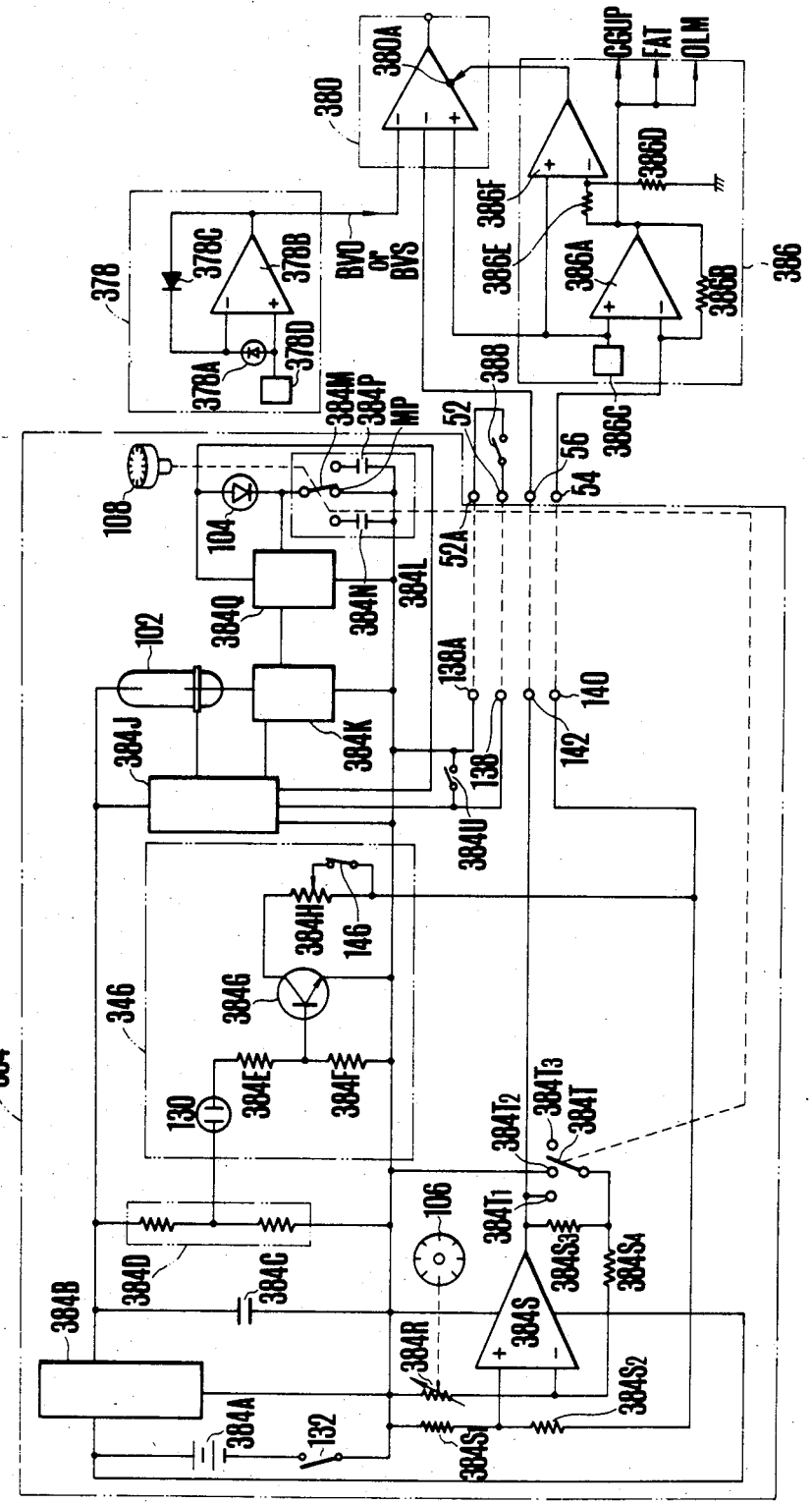
FIG. 24A shows a detailed circuit diagram of the speed light photographic device shown in FIG. 24.

Below the above mentioned speed light device 384 will be explained more in detail in accordance with FIG. 24A. FIG. 24A shows the circuit of the speed light device 384, of the current detector 386, of the signal switching over circuit 380 and of the TTL light measuring circuit 378.

In FIG. 24A, 384A is the power source, 384B the step up circuit for the power source voltage, 384C the main condenser for storing the speed light energy and 384D the voltage detecting circuit for detecting the terminal voltage of the main condenser 384C, consisting of the voltage dividing resistance and so on. 346 is the detecting circuit for producing the charge completion display when the main condenser 384C has been charged up to a certain determined voltage, consisting of the neon tube 130 as display lamp, the resistances 384E and 384F constituting the voltage dividing circuit, the transister 384G and the resistance 384H for setting two steps of the current amount. 146 is the afore mentioned change over switch. 384J is the trigger circuit, 102 the flash tube and 384K the conventional discharge control tube connected to the flash tube 102, consisting of the thyrister, the condenser and so on. 104 is the detecting part consisting of the photocell and so on, sensing the reflected flash light of the flash discharge tube 102. 384L is the integrating circuit for integrating the output of the sensing element 104, at the same time serving as the aperture information setting circuit and 384M is the switch functionally engaged with the above mentioned aperture value setting dial 108 in such a manner that the switch 384M is set at the position MP when the dial 108 is set at M (FIG. 5). 384N and 384P are the capacitors, 384Q is the control circuit for detecting the output level of the above mentioned integrating circuit 384L, so as to deliver the flash light stopping signal to the above mentioned discharge control circuit 384K when the output level has reached a certain determined value. 384R is the resistance whose value is variable in functional engagement of the above mentioned film sensitivity setting dial 106. 384S is the operational amplifier, $384S_1$–$384S_4$ the resistances and 384T the switch functionally engaged with the above mentioned switch 384M so as to be connected to the contact $384T_1$–$384T_3$ selectively. 138, 140 and 142 are the afore mentioned contacts, 138A the contact connected to the negative electrode of the power source 384A through the power source switch 132, and 384U the flash light test switch. 52A is the contact to be connected to the contact 138A, 52, 54 and 56 the afore mentioned contacts and 388 the synchronization switch. 386 is the afore mentioned current detector including the operational amplifier 386A, the resistance 386B, the constant voltage power source 386C, the resistances 386D and 386E and the comparater 386F. 380 is the afore mentioned signal change over circuit including the change over terminal 380A connected to the output terminal of the comparater 386F, the non-inverting input terminal connected to the afore mentioned constant voltage power source 386C, the inverting terminal connected to the contact 56 and the inverting terminal connected to the output terminal of the light measuring circuit 378. 378 is the afore mentioned light measuring circuit including the light sensitive element 378A for sensing the light amount of the object, the operational amplifier 378B, the diode 378C for logarithmically compressing the light amount of the element 378A and the constant voltage power source 378D.

Below the operation will be explained briefly. When the flash light device 384 is mounted on the camera, the terminals are connected as is shown in the drawing. When now an aperture value determined by the speed light device is set with the aperture value setting dial 108, the switch 384M is also selected. When at this time the switch 384M is connected to the contact 384P, the switch 384T functionally engaged with the switch 384M is also connected to the contact $384T_3$. Thus in the feed back circuit of the operational amplifier 384S the resistance $384S_3$ whose value corresponds to a certain determined aperture value set with the aperture value setting dial 108 in advance is inserted in such a manner that the aperture information for the control at the time of the flash light photography is set at the operational amplifier 384S constituting the aperture control signal forming means for the flash light photography. When then the power source switch 132 is closed, the power source 384A is connected to the step up circuit 384B in such a manner that the stepped up voltage of the power source 384A is applied to the main condenser 384C so as to charge the condenser 384C. Further the charge state of this condenser 384C is detected by means of the voltage dividing circuit 384D constituting the detecting circuit, whereby when the main condenser 384C is sufficiently charged for the flash light photography the neon tube 130 in the detecting circuit lights up for displaying the charge completion while at the same time, a base current is delivered to the transister. When the shutter of the camera is released while the neon tube 130 is on as mentioned above, a voltage is applied from the camera to the speed light device through the terminals 54 and 140 of the current detecting circuit 386. At this time, a base current is delivered to the transistor 384, so that the signal voltage from the afore mentioned detecter 386 is applied to the transister 384G through the terminals 54 and 140, the switch 146 as well as the resistance 384H so as to bring the transister 384G in the switched on state. The value of this resistance 384H is set small in comparison with that of the resistances $384S_1$ and $384S_2$ so that the current flowing through the resistance 384H is comparatively large in such a manner that the output level of the operational amplifier 386A of the detecter 386 assumes the value corresponding to that of the resistance 386. Hereby the current flowing through the terminals 54 and 140 at this time is the signal $CSA_1$ for bringing the camera into the full automatic mode. The output level of the afore mentioned amplifier 386A becomes comparatively high so that the comparater 386F is actuated so as to operate the signal change over circuit 380. Thus the signal change over circuit 380 is supplied with the data VSA from the speed light device, namely the data as to the aperture value through the terminal 142 and 56 instead of the output of the light measuring circuit 378. On the other hand, at the terminal 140 the signals $CSA_1$ is produced so that the operational amplifier 386A as the output terminal of the detecter 386 delivers the charge completion signal CGUP and the full automatic mode signal FAT. Further the current flowing through the terminal 140 when the normally closed type switch 146 is in the opened state is smaller than the switch 146 is in the closed state. Namely at this time at the terminal 140 the semi-automatic mode signal CSA2 is produced. It goes without saying that the charge completion signal CGUP is delivered from the output terminal of the detecter 386 while the full automatic mode signal FAT is not delivered, because the output level of the detecter 386 goes down.

When the synchronization switch 388 is closed by means of releasing the shutter of the camera in the above mentioned state the trigger signal is delivered from the trigger circuit 384J so as to trigger the flash tube 102 as well as the discharge control circuit 384K in such a manner that the flash tube illuminate the object (not shown in the drawing).

When the light reflected from the object reaches the light sensitive element 104 the capaciter 384P is charged until the charge level reaches a certain determined value when the control circuit 384Q delivers the flash light stopping signal from the output terminal so that the discharge control circuit 384K stops the operation of the flash tube 102. Further when the mask M is selected with the aperture value setting dial 108, the switch 384M is connected to the contact MP so that whole of the charge stored in the condenser 384 of the speed light device is discharged, whereby the total flash light mode is achieved.

In order to complete the camera system in accordance with the present invention, this synchronization switch 388 is used to obtain the synchronization not only with the speed light device 384 to be mounted on the accessary shoe 50 of the camera body 4 but also with other conventional speed light device or flash light device, for which purpose the switch 388 is also connected to the X contact 64.

FIG. 25 shows a block diagram of the reflection light system light measuring meter 350 in a simple way, whereby when this light measuring meter 350 is mounted on the camera body 4, the data terminal 56 and the control terminal 54 provided on the accessary shoe 50 of the camera body 4 are respectively connected to the contacts 148 and 146 of the light measuring meter 350. At this time a current is ready to reach the contact 146 at the side of the light measuring meter 350 through the control terminal 54. Namely the signal OLM for showing the mounting of the external light measuring meter is delivered in a form of a negative current signal from the light measuring meter 350 through the contact 146 and the control terminal 54, whereby this signal OLM is detected by the current detector 386 provided at the input control part 360. Thus the control signal is given to the above mentioned signal change over circuit 380 from this current detector 386, whereby the data relative to the measured light amount in analog value from the data terminal 56 is introduced into the A-D converter 382 instead of the analog signal from the TTL light measuring means 378 so as to be converted into a digital data and introduced into the system. Hereby this measured light amount data OB is not the one obtained through the photographic lens device so that various compensations are not necessary in such a manner that the obtained signal directly corresponds to the object brightness. On the other hand, the above mentioned current detector 386 judges the above mentioned OLM signal in accordance with the current amount and produces the control signal OLM so as to bring the system into the external light measuring mode. The system carries out operation basing upon the external light measuring data in accordance with the above mentioned control signal OLM.

FIG. 26 shows a block diagram of the incident light system light measuring meter 354, whereby when the coupler (FIG. 7) of the light measuring meter 350 is mounted on the camera body 4, the contacts 168, 166 and 170 of the coupler 156 are respectively brought into contact with the data terminal 56, the control terminal 56 and the AE lock terminal 58 provided on the accessary shoe 50 of the camera body 4. At this time a current is ready to reach the contact 166 at the side of the light measuring meter 354 through the control terminal 54. Namely the signal showing the mounting of the external light measuring meter is delivered in a form of a negative current signal from the light measuring meter 354 through the contact 166 and the control terminal 54, whereby this signal OLM is detected by the current detector 386 provided at the input control part 360. Thus the control signal is delivered to the above mentioned signal change over circuit 380 from this current detector 386, whereby the data OB relative to the measured light amount in analog value from the data terminal 56 is ready to reach the A-D converter 382 instead of the analog signal from the TTL light measuring means 378.

Hereby this incident light system light measuring meter 354 includes a normally closed AE lock switch 392, whereby when the coupler 156 is mounted on the accessary shoe 50 of the camera body 4, the above mentioned AE lock switch 392 short-circuit the ordinary AE lock switch SAELK included in this mechanical part 358 through the contact 170 of the coupler 156 and the AE lock terminal 58 of the accessary shoe 50 in such a manner that this camera device is brought into the AE lock state.

This AE lock switch 392 is functionally engaged with the light measuring button 174 for actuating the light measuring meter 354 so as to be opened by the operation of the button 174 in such a manner that when the light measurement is started at the side of the light measuring meter 354, the camera device is released out of the AE lock state.

At this time the data OB relative to the measured light amount is produced in analog value by the light measuring meter 354 at the contact 168 and introduced into the A-D converter 382 through the data terminal 56 and the signal change over circuit 380 so as to be converted into a digital value and introduced into the system.

Although hereby this measured light amount data OB is the data relative to the illumination quite different from the object brightness information BV because the data OB is not the one obtained in accordance with the reflection light system, the handling in the APEX operation is quite identical with that of the object brightness information BV so that when the analog value produced by the light measuring meter 354 is adjusted properly, the obtained measured light amount data OB can directly correspond to the object brightness BV. On the other hand the above mentioned current detector 386, which judge the above mentioned OLM signal in accordance with its current amount, produces the control signal OLM so as to bring the system into the external light measuring mode. The system carries out operations basing upon the external measured light data in accordance with the above mentioned control signal quite in the same way as in case with the incident light system light measuring meter. Namely with the exception of the serviceability of the AE lock, the operation of this camera system is absolutely same no matter which of the reflection light system light measuring meter or the incident light system light measuring meter is used as adapter for external light measurement.

As is clear from the above explanation, the meaning of the digital signal produced by the A-D converter 382 is specified in accordance with the signal CGUP, FAT and OLM produced by the current detector 386, whereby the operation of the system is also converted into the one in the desired mode in accordance with the output of the above mentioned current detector 386. Hereby in the following explanation the digital signal produced by the above mentioned A-D converter 382.

Further this input control part 360 takes up various conditions and operation state set at the above mentioned mechanical part 358, after having detected them and also the AELK signal for the AE lock, the AECG signal for the AE charge state of the AE lever and so on through the SAELK designed in the same way as the switching mechanism shown in FIG. 21, the winding up completion detecting switch SWHUP and the AE charge detecting switch SAECG. Hereby the above mentioned AE lock switch SAELK is functionally engaged with the selector lever 22 provided on the upper surface of the camera body 4, the above mentioned switch SWHUP with the mechanism operated by the winding up lever 14 and the above mentioned switch AECG with the mechanism mechanically linked with the AE lever 94.

As mentioned above the datas and the condition setting signals taken up into the input control part 360 are, after having been accordingly arranged in the timing, transmitted to the central control part 362 through the BAS line 370.

The above mentioned control part 362 takes up various setting datas and setting conditions from the mechanical part 358. This central control part 362 delivers the timing pulses as is shown in FIG. 13 through the timing line 394, and takes up, in synchronization of their timing pulses, the SV' data relative to the film sensitivity SV, the data AVo (Grey code) relative to the smallest aperture value of the photographic lens device, the MHAL signal for showing that the aperture of the photographic lens device has been set at the side of the lens device, the SPDW signal for showing that the diaphragm of the lens device has been closed, the data relative to the set aperture value AV or the set shutter time TV, the data ASLG for showing that the data relates to the aperture value AV, the signal AMAX for showing the largest aperture value of the photographic lens device and so on.

As mentioned above various datas and signals for setting conditions are taken up through the composition shown in FIGS. 12–19.

This central control part 362, in which various operations are controlled, delivers the data signals for the control of various exposure control mechanisms of the mechanical part 358 and the data signal for the display to the output control parts 364 through the output BAS line 374.

This output control part 364 includes various control efficiency such as the shutter release control for starting the camera operations, the aperture control for controlling the aperture value with the lens device with the set or the operated value, the shutter time control for controlling the shutter time with the set or the operated value and the display control for displaying necessary informations and delivers the control signals for the shutter release means 396, the aperture control means 398, the shutter time control means 400, the digital display means 402 and the twinkling display means 404. On the other hand, this output control part 364 takes up various setting conditions and the operation states of the above mentioned mechanical part 358, after having detected them and takes up the SELF signal for showing that the self-timer has been set, the shutter release SR signal for starting the camera operation after the shutter release and the CTST signal for showing that the front shutter plane of the focal plane shutter has run through the self-timer set switch SSELF designed in the same way as the switch composition shown in FIG. 21, the shutter release switch SW$_2$ and the front plane starting switch SCTST designed in the same way as the switch composition shown in FIG. 22. Further the above mentioned output control part 364 takes up, through the composition as is shown in FIG. 23, the FPC signal obtained by converting into pulses the distance the AE lever 94 has travelled from the AE charge position.

Hereby the above mentioned switch SSELF is functionally engaged with the selector lever 22 provided over the upper surface of the body 4, the above mentioned shutter release switch SW$_2$ with the shutter release button 18 and the above mentioned switch SCTST with the front plane starting detecting member 406.

To the mechanical part 358 of this camera device a mechanical sequence control mechanism and an electrical control mechanism with an electromagnetic solenoid are applied, whereby the above mentioned shutter release means 396, the aperture control means 398 and the shutter time control means 400 are the parts connected with the electrical control.

The above mentioned shutter release means 396 serves to give the triggering for starting the mechanical sequence of the camera device, carrying out the necessary operation by means of a remarkably small electromagnetic solenoid. Hereby the operation of this shutter release means 396 has a close connection with the shutter release signal SR and the self-timer set signal SELF introduced into the above mentioned input control part 360, the winding up completion signal WHUP introduced into this output control part 364 and so on.

In the mechanical sequence started by means of the operation of the above mentioned shutter release means 396, the operation for displacing the AE lever from the AE charge position is included. This AE lever 94 includes, as already mentioned afore, the efficiency for presetting the aperture value of the lens device 2, being clamped at a proper position during the displacement from the charge position toward the discharge position, whereby what decides this clamping position is the displacement amount of the AE lever 94 from the AE charge position. Namely the displacement amount of this AE lever 94 from the AE charge position is, as is clear from the explanation mode in accordance with FIG. 2, corresponds to the preset value of the control diaphragm closing step number of the lens device 2, so that it is possible to preset the aperture at the lens device 2 by detecting the displacement amount of the above mentioned AE lever 94 in such a manner that when the detected amount reaches a value corresponding to the control diaphragm closing step number, the above mentioned AE lever 94 is clamped so as to keep the then displacement amount.

What is introduced into the above mentioned output control part in accordance with the displacement amount of the above mentioned AE lever 94 during such operation is the FPC signal. This FPC signal is the pulse signal whose number corresponds to the displacement amount of the above mentioned lever 94 so that it is possible to learn the displacement amount of the above mentioned lever 94 in a simple way by counting this FPC signal by means of a counter.

The above mentioned aperture control means 398 serves to actuate the mechanism for clamping the above mentioned AE lever 94 when the displacement amount of the above mentioned AE lever 94 from the AE charge position reaches a value corresponding to the diaphragm closing step number given from the above mentioned central control part 362, carrying out the necessary operation also by means of a small electromagnetic solenoid.

Hereby in the mechanical sequence started by means of the operation of the above mentioned shutter release means 396, includes, beside the operation for displacing the above mentioned AE lever 94 from the charge position, such operation as the lifting of the mirror, the closing of the diaphragm of the photographic lens device 2 down to the preset aperture value, the start of the front shutter plane of the focal plane shutter and so on.

Generally the shutter time of the focal plane shutter is controlled by controlling the time from the start of the front shutter plane till the start of the rear shutter plane, whereby this camera device is not the exception. Namely the desired shutter time is obtained by counting the time after the start of the front shutter plane while controlling the start of the rear shutter plane in such a manner that when the time corresponding to the shutter time given by the above mentioned central control part 362 has passed the rear shutter plane is started. Hereby it goes without saying that in this camera device the time is counted by means of an electrical means.

When the above mentioned front shutter plane starts, the mechanical part delivers the signal CTST. The output control part 364, to which this CTST signal is delivered, counts the time basing upon the shutter time data given from the above mentioned central control part 362 in such a manner that when the time corresponding to the above mentioned shutter time has passed the rear shutter plane is started by means of the shutter time control means 400 so designed as to carry out operation also by means of a small electromagnetic solenoid.

As mentioned above, the shutter release means 396, the aperture control means 398 and the shutter time control means 400 are the parts for directly connecting the electrical control system to the exposure control in this camera system, assuming a very important position in the system.

Hereby the mechanical sequence of the camera device itself continues the operation even during the operation of such electrical control means, whereby in the quick return of the mirror after the rear shutter plane has run, the release of the diaphragm closing driving of the lens device and so on the mechanical control mechanisms take part in.

Beside the above this output control part 346 has the display function for displaying the informations necessary for taking a picture to the photographer. The camera device shown in FIG. 1 includes, as is already mentioned, a display means for displaying the necessary information in the view finder 13, whereby this data display means is included in the mechanical parts 358 of the system and shown with 402. This data display device 402 is supplied from the above mentioned output control part 364 with the information of the data to be displayed, namely the code signal for the display and at the same time from the central control part 362 with the timing signal for the dynamic display driving through the timing line 394. This dynamic display driving is a well known display method, whereby the desired data is displayed in the desired display unit by giving to all of the display units constituting a display device the common informations altering with time and at the same time selectively driving the above mentioned units by means of the timing. This method is widely applied because the circuit composition can be simplified while the power consumption can be decreased. This dynamic display driving is especially profitable in case a large power source can not be built in a limited space as of the camera device.

Further on the upper surface of the camera body 4 shown in FIG. 1 a LED lamp 32 is provided, whereby the efficiencies of this LED lamp 32 are also important. Namely the one efficiency is to prove that the battery still has an efficient capacity by lighting up at the time of the battery checking while the other is to prove that the self-time is in operation by lightening up during the photography with self-timer. Also to this LED lamp 32 a control signal is delivered from the above mentioned output control part 364. As mentioned above the mechanical part 358 connects the input control part 360, the central control part 362 and the output control part 364 closely to the input conditions such as the light measurement data, the external input data, the setting data, the setting condition, the judgement state and so on or the control as well as the display of the shutter release, the aperture value, the shutter time and so on.

Figure 28:
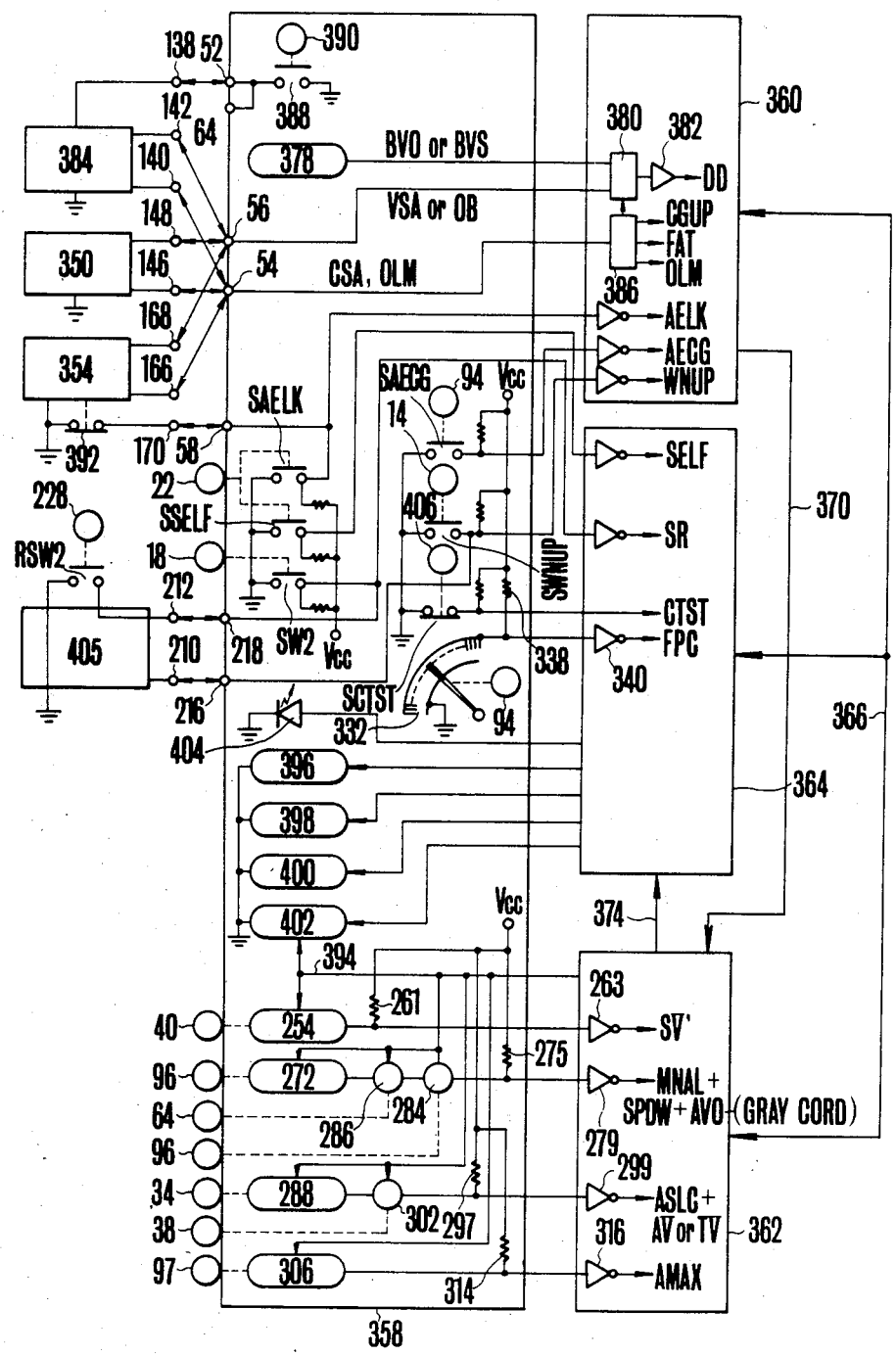
FIG. 28 shows a composition for explaining the efficiency of each mechanism of the camera system shown in FIG. 27.

The motor drive device whose detail is shown in FIG. 8 is shown with 405 in FIG. 28. This motor drive device 405 is connected to the switch SWNUP through the contact 210 and the contact 216 of the camera body. The above mentioned switch SWNUP is kept in the closed state since the completion of the film winding up till the completion of the operation of the rear shutter plane after the shutter release at the side of the camera device as has already been explained and in consequence kept at the high level through the inverter during the above mentioned time interval so as to obtain the WNUP signal. The above mentioned motor drive device is controlled by means of the WNUP signal before passing through the above mentioned inverter, namely the $\overline{\text{WNUP}}$ signal. This WNUP signal is at the high level during other time interval than the above mentioned in the operation cycle of the camera, namely since the ammpletion of the rear shutter plane till the completion of the film winding up in such a manner that the above mentioned motor drive device 405 drives the film winding up motor by means of this $\overline{\text{WNUP}}$ signal. Namely by means of this motor drive device the film winding up operation is started as soon as the rear shutter plane has completed the operation after the shutter release and stops the film winding up operation at the time point when the film winding up operation has been completed so that there is no room for the misoperation while the speedy film winding up operation is possible.

Further as is shown in FIG. 8, this motor drive device 405 includes the shutter release device 220 capable of remote controlling of the shutter release of the camera device, whereby this shutter release device 220 is not always electrically connected to the motor drive device 405. The operation button 228 provided on this shutter release device 358 is functionally engaged with the switch connected in parallel with the shutter release switch SW2 of the mechanical part 358 through the contacts 212 and 218, whereby its efficiency is completely same as that of the shutter release button provided on the upper surface of the camera body 4.

As mentioned afore, the input control part 360, the central control part 362 and the output control part 364 have various efficiencies, whereby their operations are connected to each other through the BAS lines, constituting a rational system together with the mechanical part 358.

The principal operation of this system is to carry out the operation basing upon the external condition (such as the measured light data) in accordance with the data or the conditions set by the photographer and delivers the control datas necessary for the exposure control so as to display to the photographer the necessary control data among the above mentioned data and at the same time controls the exposure basing upon the above mentioned control data. Below the operation of the cover device in various modes will be explained in general.

The digital data DD produced by the A-D converter 382 of the input control part 360 corresponds to either of the measured light data BVo with light measurement with the totally opened diaphragm, the measured light data BVs with the light measurement with the closed diaphragm, the aperture control data VSA from the speed light device 384 and the external measured light data OB from the external light measuring adapters 350 and 354, whereby they are assorted and treated accordingly in accordance with the signals such as the charge completion signal CGUP produced by the afore mentioned current detector 386, the external light measurement mode control signal OLM, the diaphragm closing signal SPDW produced by the switch 286 mechanically linked with the diaphragm closing lever 64 and so on.

Now let us suppose that no speed light device 384 nor external light measuring adapter 350 and 354 is mounted on the accessary shoe 50 of the camera body 4. At this time the camera device is in a position to be in five kinds of the photographic modes (bulb photographic mode is excluded).

As to there five kinds of the photographic modes, either of the aperture value priority AE photographic mode, the shutter time priority AE photographic mode, the manual exposure control photographic mode with light measurement with totally opened diaphragm, the manual exposure control photographic mode with light measurement with closed diaphragm and the aperture value priority AE photographic mode with the light measurement with the closed diaphragm can be selected in accordance with the state of the mode selector 38 provided on the upper surface of the camera body 4, the diaphragm closing lever provided on the front surface of the camera body 4 and the aperture setting ring of the lens device 2 as is shown in FIG. 11, whereby especially in case of the data operation the necessary operation routine is decided into four because the manual exposure adjustment mode with the light measurement with totally opened diaphragm is equal to the aperture value priority or the shutter time priority AE photographic mode.

When now the mode selector 38 is set at the side of the priority on the aperture value, the diaphragm closing lever 64 at the side of the diaphragm opening and the aperture value setting ring 8 of the lens device 2 at the position at which the mark 12 is selected, the system is in the aperture value priority AE photographic mode. The measured light amount BVon relative to the object brightness obtained at this time from the result of the light measurement includes, as mentioned afore, the smallest aperture value AVo of the lens device 2 and the vignetting error AVc, whereby for the actual object brightness data BV the relation (BVo=BV−AVo−AVc) is established as is shown in the relation (3). On the other hand the data SV relative to the film sensitivity, the data AVo relative to the smallest aperture value of the lens device 2, the aperture value AV desired by the photographer and so on are set, whereby the data AVo relative to the vignetting error AVc is also derived from the above mentioned smallest aperture value data AVo. Hereby the system is so designed that this vignetting error AVc is not derived by the operation but selected out of a plural number of the datas as to the vignetting error prepared in advance so as to correspond to the smallest aperture value AVo of the photographic lens device 2.

In case of this camera system, before starting the operation for the exposure control it is investigated whether the aperture value AV set by means of the dial 34 is longer than the smallest aperture value AVo of the photographic lens device 2 but smaller than the largest aperture value ANAX. In case the result of this comparison operation shows that the aperture value set by the dial 34 is smaller than the smallest aperture value AVo, the set aperture value AV is replaced with the smallest aperture value AVo, while the result shows that the aperture value set by the dial 34 is larger than the largest aperture value AMAX the set aperture value AV is replaced with the largest aperture value AMAX.

The reason for the above is that, as mentioned afore, the aperture value AV is set not at the side of the lens device 2 but at the side of the dial 34 and therefore there is a possibility that the set value lies beyond the controllable range of the photographic lens device 2, whereby the smallest or the largest aperture value AVo or AMAX is applied as the aperture value AV for the control.

Hereby the measured light data BVo is introduced into the input control part 362 from the TTL light measuring means provided at the mechanical part 358 through the A-D converter 382 is further introduced into the central control part 362 so as to be operated as follows.

First of all the data SV relative to the film sensitivity is added to the measured light data introduced as mentioned above. Namely the operation $$BVo + SV = BV + SV - AVo - AVc \quad (8)$$

is carried out, whereby the relation (9) corresponds to $$BVo + SV = EV - AVo - AVc \quad (9)$$

in accordance with the relation (2). Then the data AVo relative to the smallest aperture value and that AVc relative to the vignetting error are added to the above mentioned operation results. Namely the operation $$BVo + SV + AVo + AVc = EV \quad (10)$$

is carried out in such a manner that through the above mentioned calculation the proper exposure amount EV is operated for the film to be used basing upon the measured light data.

Hereby this operation is, as mentioned afore, carried out in a digital way, whereby when the operation register is over-flowed with the operations in accordance with the relations (8), (9) and (10), the maximum capacity of the operation register is considered as the operation result.

Then, as mentioned afore, the aperture value AV set with the dial is subtracted from the obtained exposure amount EV, whereby the result is, as is clear from the relation (1), $$EV - AV = TV \quad (11)$$

in such a manner that the shutter time necessary for obtaining the proper exposure for the set aperture value is obtained.

The shutter time TV obtained in this way is the control data for satisfying the exposure amount EV in accordance with the relation (10) for the set aperture value AV, whereby there is a possibility that at times the operation result should be beyond the range of the shutter time of the camera body 4 and in order to provide for such a case it is necessary to tell the fact to the photographer and prevent the misoperation. Such being the situation this camera system is so designed as to investigate whether the shutter time obtained from the operation is shorter than the longest shutter time TMAX but longer than the shortest shutter time TMIN of the shutter mechanism of the camera body 4. In case the result shows that the shutter time obtained from the operation is beyond the longest shutter time or the shortest shutter time, the shutter time TV is replaced with the shutter time of TMAX or TMIN, whereby at the same time the fact is informed to the photographer.

Then the smallest aperture value AVo of the photographic lens device 2 is subtracted from the aperture value AV for the control as follows.

$$AV - AVo = AVs \quad (12)$$

so as to obtain the diaphragm closing step number AVs for the aperture control. Hereby the reason why this camera system applies the diaphragm closing step number to the aperture control is that the step number control mechanism is applied to the control mechanism of the photographic lens device 2 shown in FIG. 2.

By means of the above mentioned operation process, the shutter time TV and the control diaphragm closing step number AVs are derived basing upon the set aperture value.

Further it is possible for the photographer to confirm the result of the above mentioned operation in the view finder 13, whereby the system is so designed that, as is shown in FIG. 10 (a)-(II), the aperture value set with the dial 34 and the shutter time obtained from the operation are displayed. This display mode is already explained afore.

In accordance with the above mentioned operation result, the exposure control of the camera device is carried out after the shutter release, whereby the lens device 2 carries out the preset control of the diaphragm closing step number AVs from the side of the camera body 4 because the aperture setting ring 8 selects the mark 22.

Hereby in case the mark 22 is not selected with the aperture setting ring 8 at the side of the lens device 2, it is impossible to preset the diaphragm closing step number AVs of the lens device 2 from the side of the body 4 and at the time of the actual exposure control the lens device 2 is closed down to the aperture position preset by means of the aperture setting ring 8. Thus in case of this camera system, such a case as mentioned above is made the manual exposure adjustment photographic mode with the light measurement with the totally opened diaphragm, whereby it is possible to control the exposure with the set aperture value and the operated shutter time by presetting the aperture value with the aperture setting ring 8 at the side of the lens device 2 in accordance with the aperture value displayed in the view finder, namely the aperture value set with the dial 34 at the side of the camera body 4. In case of such manual exposure adjustment photographic mode with the light measurement with the totally opened diaphragm, as is shown in FIG. 10 (a)-(III), the character "M" is displayed beside the aperture value set with the dial 34 or the shutter time operated so as to inform the photographer of the necessity to set the aperture value of the photographic lens device 2 in accordance with the display manually as has already been explained. Hereby this manual exposure adjustment photographic mode can be said to be of the character with the priority on the aperture value because what is set with the dial 34 at first is the aperture value. What is especially interesting in case of this manual exposure adjustment photographic mode is the fact that this camera device carries out the aperture value priority AE photographic operation by keeping the aperture value preset or set by closing the diaphragm at the side of the lens device 2 equal to the aperture value set with the dial 34.

When now the mode selector 38 is set at the side of the priority on the shutter speed, the diaphragm closing lever 64 at the side of the total opening and the aperture setting ring 8 of the lens device 2 at the position at which the mark 12 is selected, this system is the shutter time priority AE photographic mode. The measured light amount BVo relative to the object brightness obtained as the result of the light measurement at this time includes, as has already been explained, the smallest aperture value of the lens device 2 and the vignetting error AVc, so that for the actual object brightness data BV the relation BVo=BV−AVo−AVc is established, which has already been explained.

On the other hand the data SV relative to the film sensitivity, the data AVo relative to the smallest aperture value of the lens device 2, the shutter time TV desired by the photographer and so on have been set in the mechanical part 358, while the data AVc relative to the vignetting error AVc has also been derived from the above mentioned smallest aperture value data AVo in the same way as in case of the priority on the aperture value.

The measured light data BVo introduced into the input control part 360 through the A-D converter 382 from the TTL light measuring means 378 provided in the mechanical part is further introduced into the central control part 362 so as to be processed further.

First of all the data SV relative to the film sensitivity is added to the measured light data BVo introduced as mentioned above. Namely the operation BVo+SV(=BV+SV−AVo−AVc) is carried out, whereby the relation corresponds to BVo+SV=EV−AVo−AVc in accordance with the afore mentioned relation (2) in the same way as in case of the priority on aperture value. Then, to the above mentioned operation result the data AVo relative to the smallest aperture value of the lens device and that AVc of the vignetting error are added. Namely the operation BVo+SV+AVo+AVc (=EV) is carried out, whereby the exposure amount EV proper for the film to be used is carried out basing upon the light measurement data.

As has already been mentioned, this operation is carried out in a digital way, whereby when the operation register is over-flowed with a series of the above mentioned operations, the maximum capacity of this operation register is taken for the operation result.

Then the data TV relative to the shutter time set with the dial 34 is subtracted from the exposure amount EV obtained as mentioned above, whereby the result is, as is clear from the relation (1), EV−TV=AV . . . (13), in such a manner that the aperture value necessary for obtaining the proper exposure is obtained for the set shutter time TV.

Hereby the thus obtained aperture value AV is the control data for satisfying the exposure amount EV operated for the set shutter time TV, whereby there is a possibility that at times this operation result should lies beyond the controlable range of the aperture value of the lens device 2. In such a case it is necessary to inform the photographer of the fact in order to prevent the misoperation. For this purpose this camera system is so designed as to investigate whether the obtained aperture value AV is smaller than the largest aperture value AMAX controlable with the lens device 2 but larger than the smallest aperture value AVo. Hereby it goes without saying that when the above investigation result shows that the aperture value AV obtained from the operation in beyond the largest aperture value AMAX or the smallest aperture value AVo this limit value AMAX or AVo is made the aperture value AV for the control instead of the aperture value obtained from the operation and at the same time the fact is informed of to the photographer.

Then the data AVo relative to the smallest aperture value of the photographic lens device 2 is subtracted from the aperture value for the control (AV−AVo=AVs) so as to obtain the diaphragm closing step number AVs for the aperture control. Hereby the reason why this camera system controls the aperture with the diaphragm closing step number AVs is that the step number control mechanism is applied to the control mechanism of the photographic device 2 shown in FIG. 2, which has already been explained.

Thus the control step number AVs is derived basing upon the set shutter time TV through the above mentioned operation process.

Further it is possible for the photographer to confirm the result of the above mentioned operation in the view finder, whereby, as is shown in FIG. 10 (a)-(I), also the aperture value obtained as the result of the operation with the shutter time set with the dial 34 is displayed at the same time. Hereby the display mode is as has already been explained.

The camera device carries out the exposure control after the shutter release basing upon the above mentioned operation result, whereby in the lens device 2 the mark 22 is selected with the aperture setting ring so that the preset control is carried out with the diaphragm closing step number AVs from the side of the camera body 4.

Hereby, because the mark 22 is selected with the aperture setting ring 8 at the side of the lens device 2, the preset control is carried out with the diaphragm closing step number AVs from the side of the camera body 4.

Further it is impossible to preset the diaphragm closing step number AVs of the lens device 2 from the side of the camera body 4 in case the mark 22 is not selected with the aperture setting ring 8 at the side of the lens device 2, whereby at the time of the actual exposure control the lens device 2 is closed down to the aperture position preset with the aperture setting ring 8. Thus in case of this camera system, such a case is made the manual exposure adjustment photographic mode with the light measurement with the totally opened diaphragm, whereby it is possible to control the exposure with the set shutter time and the aperture value preset with the lens device 2 by presetting the aperture value by means of the aperture setting ring 8 at the side of the lens device 2 basing upon the aperture value displayed in the view finder, namely the aperture value derived from the operation result. Hereby as has already been explained, in case of such manual exposure adjustment photographic mode with the light measurement with the totally opened diaphragm the character "M" is displayed in the view finder 13 as is shown in FIG. 10 (a)-(III) in order to inform the photographer of the necessity to manually set the aperture value of the photographic lens device 2 by means of the display.

When then the mode selector 38 is set at the priority on the aperture value, the diaphragm closing 64 is at the side of the diaphragm closing out the aperture setting ring 8 at the position at which a certain determined aperture value is preset, the system in the aperture value priority AE photographic mode. The measured light amount BVs relative to the object brightness obtained from the result of the light measurement includes at this time, as has already been explained, the largest aperture value AV of the lens device 2 and the vignetting error AVc′, whereby it is impossible to obtain the vignetting error because this system does not includes the means for taking up the above mentioned aperture value AV so that the vignetting error is here disregarded. Thus as is clear from the relation (5), the above mentioned measured light amount BVs has the following relation for the actual object brightness $$BVs = BV - AV.$$

On the other hand, at the side of the mechanical part 358, the data SV relative to the film sensitivity is set.

The measured light data BVs with the closed diaphragm introduced into the input control part 360 through the A-D converter 382 from the TTL light measuring means 378 provided in the above mentioned mechanical part 358 is further introduced into the central control part 362 so as to be processed further.

At first the data SV relative to the film sensitivity is added to the measured light data thus introduce. Namely the operation is carried out as follows $$BVs + SV = BV - AB + SV \tag{14},$$

whereby this relation corresponds to the relation $$BVs + SV = EV - AV = TV \tag{15}$$

in accordance with the relations (1) and (2). Thus by means of such operation the shutter time TV necessary for obtaining the proper exposure EV can be derived.

Further the shutter time TV obtained in this way is the control data for satisfying the exposure amount EV of the relation (15) for the aperture value of the closed lens devie 2, whereby there is a possibility that at times the operation result lies beyond the limit of the shutter time given to the camera body 4 and in such a case it is necessary to inform the photographer of the fact in order to prevent the misoperation. For this purpose this camera system is so designed as to investigate whether the shutter time TV obtained from the operation result is shorter than the longest shutter time and longer than the shortest shutter time of the shutter mechanism built in the camera body 4. When the investigation result shows that the shutter time TV obtained from the operation result is beyond the limit of the longest shutter time TMAX or the shortest shutter time TMIN, this limit value of TMAX or TMIN is adopted as the shutter speed TV for the control instead of the shutter time TV obtained from the operation result, whereby it goes without saying that the fact is informed of to the photographer.

Hereby it must be added that in this photographic mode the aperture value set with the dial 34 is disregarded at all.

Thus by means of the above mentioned operation result, the shutter time is derived basing upon the aperture value of the closed photographic lens 2.

Hereby it is possible for the photographer to confirm the above mentioned operation result in the view finder, whereby the display at this time is as is shown in FIG. 10 (a)-(IV). This display mode is as has already been explained.

Hereby in accordance with the above mentioned operation result the camera device controls the exposure after the shutter release, whereby the shutter is controlled with the shutter TV at the side of the camera body 4, while the diaphragm of the lens device 2 is kept in the closed state at the position manually set.

When then the mode selector 38 is set at the side of the priority on shutter time, the diaphragm lever 64 at the side of closing and the aperture setting ring 8 of the lens device 2 at the position at which a certain determined aperture value preset, the system is in the manual exposure adjustment photographic mode with the light measurement with the closed diaphragm. As has already been mentioned, the measured light amount BVs relative to the object brightness obtained from the result of the light measurement at this time includes the aperture value of the lens device 2 with the closed diaphragm and the ignetting error, whereby this system does not include any means for taking up the above mentioned aperture value so that the ignetting error is disregarded. Thus the above mentioned measured light amount BVs has the relation BVs=BV−AV for the actual object brightness, which has already been mentioned. On the other hand at the side of the mechanical part 358 the data relative to the film sensitivity, the shutter time desired by the photographer and so on have been set.

The data BVs of the light measured with the closed diaphragm introduced into the input control part 360 through the A-D converter 382 from the TTL light measuring means 378 provided on the above mentioned mechanical part 358 is further introduced into the central control part 362 so as to be prodessed further as follows.

First of all the data SV relative to the film sensitivity is added to the measured light data BVs introduce as mentioned above. Namely the operation BVs+SV(=BV−AV+SV) is carried out. As has already been explained, this relation corresponds to BVs+SV=EV−AV=TV, so that through this operation the shutter time TV necessary for obtaining the proper exposure EV can be obtained.

Further the shutter time TV obtained in this way is the operation data for satisfying the exposure amount EV for the aperture value AV of the lens device 2 with the closed diaphragm whereby this operation data is not always equal to the shutter time TV' for control set with the dial 34 of the camera body 4. Thus, when the photographer wishes to realize the proper exposure EV it is necessary to adjust the aperture to make the operation data TV' equal to the set data TV' by operating the aperture setting ring 8 of the lens device 2 or alter the data of the set shutter time TV' to make the set data TV' equal to the operation data TV.

In case of this camera system an allowance+K1, −(K2−K1) is set for the operation data TV obtained from the operation, whereby the system is so designed that the manual operation for bringing the shutter time TV set with the dial 34 within the above mentioned allowance is displayed to the photographer to the view finder 13.

Below the operation process will be explained. At first the constant K1 is added to the shutter time data TV obtained from the operation result. In case the data TV+K1 obtained from the result of this addition overflows the capacity of the operation register, the maximum capacity of this operation register is taken as the operation result.

Then the shutter time data TV' set with the dial 34 is subtracted from the data TV+K1 obtained in this way, whereby, when a carrier takes place as the result of the subtraction, the set shutter time data TV' is beyond the allowance. This camera system is so designed as to give to the photographer the instruction for reducing the closing amount of the lens device 2 or reducing the set data of the shutter time data TV' in such a case, In case on the other hand no carrier takes place as the result of this subtraction, the constant K2 is further subtracted from the above mentioned subtraction result TV+K1−TV' as follows.

$$TV+K1-TV'-K2\{=TV-(K2-K1)-TV'\} \quad (16)$$

When a carrier takes place as the result of this subtraction, the set shutter time data TV' is within the allowance +K, −(K2−K1) for the operated shutter time TV, whereby the fact is informed of to the photographer, while when no carrier takes place, the set shutter time TV' is beyond the allowance, whereby this camera system is so designed as to give to the photographer an instruction for increasing the closing amount of the diaphragm of the lens device 2 or for increasing the set data of the shutter time data TV'.

By means of the above mentioned operation process it can be judged whether the closing amount of the diaphragm of the photographic lens device 2 is proper for the set shutter time TV' or not or whether the set shutter time TV' is proper for the closing amount of the diaphragm of the photographic lens device 2 or not.

Hereby it is possible for the photographer to confirm the result of the above mentioned judgement in the view finder 13, whereby the display at this time is as is shown in FIG. 10(a)-(V). The mode of this display has already been explained, whereby it is possible for the photographer to control the most suitable combination of the shutter time TV and the closing amount of the diaphragm of the lens device 2 for obtaining the proper exposure in accordance with such a display.

Hereby in the camera device in this mode, the shutter is controlled at the side of the camera body 4 in accordance with the shutter time TV' set with the dial 34 by the photographer, while the diaphragm of the lens device 2 is kept in the closed state at the position manually set by the photographer.

The display and the manual operation in case of the manual exposure adjustment photographic mode with the light measurement with the closed diaphragm has already been explained, so that the detailed explanation will be omitted here.

All of the above mentioned modes such as the aperture value priority AE photographic mode, the shutter time priority AE photographic mode, the manual exposure adjusting photographic mode with the light measurement with the totally opened diaphragm, the aperture value priority AE photographic mode with the light measurement with the closed diaphragm and the manual exposure adjusting phtographic mode with the light measurement with the closed diaphragm operate in accordance with the light amount measured with the TTL light measuring means 378 provided in the mechanical part 358, whereby, as has already been explained, it is possible to apply the external light measuring adapter to this camera system.

Now let us consider the case when an external light measuring adapter such as the reflection light system light measuring meter 350, the incident light system light measuring meter 354 and so on is mounted on the accessary shoe of the camera body 4. The camera device at this time can assume three kinds of the photographic modes (with the exception of the bulb photographic mode).

These three photographic modes are the aperture value priorityuAE photographic mode, the shutter time priority AE photographic mode and the manual exposure adjusting photographic mode with the external light measurement, each one of which can be selected in accordance with the state of the mode selector provided on the upper surface of the camera body 4, the aperture setting ring of the lens device 2 and the diaphragm closing lever 64.

Below each of the above mentioned mode will be explained, whereby no substantial difference exists from the case when the TTL light measuring means 378 is applied. What especially good case should be taken of is the fact that the measured light amount obtained when the external light measuring adapter is applied is absolutely different from that obtained with the TTL light measuring means 378 in its character, whereby other special operation process becomes necessary.

Namely, no matter which of the reflection light system or of the incident light system is applied, the light amount measured with the external light measuring meter 350, 354 is given as the data corresponding to the object brightness BV. Thus, the measured light amount does not include any factor relative to the smallest aperture value AVo of the photographic lens device 2 to be used, the vignetting error AVc and so on, so that no process for processing the object brightness BV.

When in case this external light measuring adapter is applied, the mode selector 38 is set at the side of the priority on the shutter value, the diaphragm closing lever 64 at the side of the opening and the aperture setting ring 8 of the lens device 2 at the position at which the mark 12 is selected, the system is in the aperture value priority AE photographic mode with the external light measurement. The then obtained light amount directly corresponds to the object brightness BV so that the addition of the smallest aperture value AVo or the vignetting error AVc is not necessary. With the exception of this point, the operation process after then is absolutely identical to that in case of the afore mentioned aperture value priority AE photographic mode. Further the display of the operation result is absolutely identical with that in case of the aperture value priority AE photographic mode as is shown in FIG. 10(a)-(II).

Further, in case the mark 12 is not selected by the aperture setting ring 8 at the side of the lens device 2, it is impossible to preset the diaphragm closing step number AVs of the lens device 2 from the side of the body 4, whereby at the time of the actual exposure control the diaphragm is controlled with the value set with the aperture setting ring 8 at the side of the lens device 2. This means that it is necessary to manually set also at the side of the lens device 2 the same aperture value as is set with the dial 34 of the lens device 2. In this case the light is measured through the external light measuring adapter so that the same operation can be applied no matter whether the diaphragm of the lens device 2 is totally opened or closed. Thus no matter whether the diaphragm of the lens device 2 is totally opened or closed, when the mark 12 is not selected with the aperture setting ring 8 at the side of the lens device 2 this camera system is in light measurement, whereby it is possible to control the exposure with the operated shutter time and the preset aperture value or the set aperture value of the closed diaphragm by presetting the aperture value by means of the aperture setting ring 8 at the side of the lens device 2 in accordance with the aperture value displayed in the view finder, namely the aperture value set with the dial 34 at the side of the camera body 4. Further in case of this manual exposure adjusting photographic mode with the external light measurement, in the view finder 13 the aperture value set with the dial 34, the operated shutter time and the character "M" for showing the necessity for manually setting the lens device 2 are displayed as is shown in FIG. 10(a)-(III) quite in the same way as in case of the manual exposure adjusting photographic mode with the light measurement with the totally opened diaphragm.

Further, when, in case this external light measuring adapter is applied, the mode selector 38 is set at the side of the priority on the shutter time, the diaphragm closing lever 64 at the side of the opening and the aperture setting ring 8 of the lens device 2 at the position at which the mark 12 is selected, the system is in the shutter time priority AE photographic mode with the external light measurement.

The then obtained measured light amount directly corresponds to the object brightness BV so that the addition of the smallest aperture value AVo or the vignetting error AVc is not necessary. With the exception of this point, the operation after then is quite identical with that in case of the afore mentioned shutter time priority AE photographic mode. Further also the display of the operation result is quite identical with that in case of the shutter time priority AE photographic mode as is shown in FIG. 10(a)-(I).

Further, when the mark 12 is not selected with the aperture setting ring 8 at the side of the lens device 2, it is impossible to preset the diaphragm closing step number AVs of the lens device 2 from the side of the camera body 4, whereby at the time of the actual exposure control the diaphragm is controlled with the value set with the aperture setting ring 8 at the side of the lens device 2. This means that it is necessary to manually set at the side of the lens device 2 the aperture value operated in accordance with the shutter time set with the dial 34, the measured light amount and so on. In this case the light measurement is carried out through the external light measuring adapter so that the same operation can be applied no matter whether the diaphragm of the lens device 2 is totally opened or closed. Thus, when the mark 12 is not selected with the aperture setting ring 8 at the side of the lens device 2, this camera system is in the manual exposure adjusting photographic mode with the external light measurement no matter whether the diaphragm of the lens device 2 is totally opened or closed, whereby it is possible to control the exposure with the set shutter time and the operated aperture value by presetting the aperture value with the aperture setting ring 8 at the side of the lens device 2 in accordance with the aperture value displayed in the view finder 13, namely the aperture value obtained from the operation result. Further in case of this manual exposure adjusting photographic mode with the external light measurement, in the view finder 13 the shutter time set with the dial 34, the operated aperture value and the character "M" for showing the necessity for manually setting the lens device 2 are displayed quite in the same way as in case of the manual exposure adjusting photographic mode with the light measurement with the totally opened diaphragm as is shown in FIG. 10(a)-(III).

Further, the character of this manual exposure adjusting photographic mode with the external light measurement is decided into two, namely the one with priority on the aperture value and the other with the priority on the shutter time depending upon whether the mode selector 38 is set at the side of the priority on the aperture value or at the side of the priority on the shutter time, whereby there is no substantial difference between them. However, when the mode selector 38 is set at the side of the priority on the aperture value, this camera device is in the aperture value priority AE photographic mode so far as the aperture value preset at the side of the lens device 2 is always kept equal to that set with the dial 34.

In case the external light measuring adapter is used, the operation routine is, as mentioned afore, same as in case of the photography with the TTL light measuring means with the exception of one part.

FIG. 29 shows the relation between the above mentioned photographic modes with the TTL light measurement and the external light measurement and the corresponding operation routine. The table shows the photographic modes of this camera system due to the state of the aperture setting ring 8 of the lens device 2, of the diaphragm closing lever 64 and to the light measuring system and four operation routines. Further, when the mark 12 is selected with the aperture setting ring 8 of the lens device 2 while the diaphragm closing lever 64 assumes the position at which the diaphragm of the lens device 2 is closed, the alarm clock for the misoperation is carried out as has already been explained.

On the other hand this camera system has an efficiency to operate in close cooperation with the automatic light adjusting speed light device as has already been explained. Below let us consider the case when this speed light device 384 is applied to the photographic purpose. When the above mentioned speed light device 384 becomes ready for operation, namely has been charged after the speed light device 384 is mounted on the necessary shoe 50 of the camera body in such a manner that an electrical connection is established between the speed light device 384 and the camera body 4, this camera device is changed over into the speed light photographic mode.

At this time, 16 photographic modes can be assumed depending upon the setting of the condition of the camera device and of the speed light device as has already been explained, whereby the operation carried out in the camera device in this speed light photographic mode is divided into four routines.

One of these four operation routines is selected accordingly depending upon the state of the aperture setting dial 108 of the speed light device 384 and of the change over switch 146 whereby especially for various factors set at the side of the camera device the corresponding mode is decided and carried out by the corresponding control system. FIG. 11(A) also shows the operation mode which this system assumes in accordance with the set state of the speed light device and the camera device, whereby the above mentioned operation routines correspond to each of the full automatic, the automatic light adjustment, the automatic mode and the semi-automatic mode, the automatic light adjustment, the automatic mode and the full automatic, the total light amount, the manual mode and the semi-automatic mode, the total light amount, the manual mode, whereby other modes are also summarized into the operation in accordance with the operation result by means of the above mentioned four operation routines.

In case of the full automatic, automatic light adjustment, automatic mode, the speed light device 384 is brought into the state capable of automatic light adjusting operation in accordance with the film sensitivity set by means of the film sensitivity setting dial 106 and the aperture value set by means of the aperture setting dial 108, while the data VSA of the analog signal corresponding to the aperture value set by means of the above mentioned aperture setting dial 108 as well as the charge completion signal CSA are given. This charge completion signal CSA includes the control signal relative to the full automatic mode or the semi-automatic mode depending upon the current amount, whereby the full automatic mode takes place when this charge completion signal CSA includes the full automatic mode control signal or the mode selector 38 at the side of the camera device is set at the side of the priority on aperture value.

The aperture value data taken up into the camera device is converted into a digital value by means of the A-D converter 382 and introduced into the central control part 362, whereby the data VSA relative to this aperture value is biased by the constant CST2 from the aperture value to be used for the actual control. The reason is that a corresponding bias is given because the data VSA relative to the aperture value is taken up in an analog value while this analog value includes a number of steps so that there is a danger for misinputting in the range of the small voltage, whereby the digitally converted data DD is also larger than the aperture value data actually used by the amount corresponding to the bias. Thus, at first the following operation $$VSA - CST2 = AV \qquad (17)$$

is carried out in such a manner that the control data AV relative to the aperture value introduced from the side of the speed light device is derived. The aperture value AV obtained in this way is to correspond to that set by means of the aperture setting dial 108 at the side of the speed light device, whereby at times this operation result lies beyond the range of the aperture value controlable at the side of the lens device 2 and hereby the fact has to be informed of to the photographer. In consequence this camera system is so designed as to investigate whether the aperture value AV set at the side of the speed light device 384 is smaller than the largest aperture value AMAX but larger than the smallest aperture value AVo. In case this investigation operation shows that the above mentioned aperture value AV is beyond the largest aperture value AMAX or the smallest aperture value AVo, this limit value AMAX or AVo is taken for the aperture value for the control instead of the aperture value set at the side of the speed light device 384, whereby it goes without saying that the fact is informed of to the photographer.

Then the smallest aperture value AVo of the photographic lens device 2 is deducted from the aperture value data AV for the control in order to obtain the diaphragm closing step number AVs for the aperture control as follows.

$$AV - AVo = AVs$$

Further the above mentioned operation is quite same for the full automatic mode, the automatic light adjusting mode or the manual mode. However in case of this mode the data for the diaphragm closing step number AVs for the aperture control is not used for the aperture control.

Further it is possible for the photographer to confirm the above mentioned operation result in the view finder 13, whereby the display at this time is as is shown in FIG. 10 (c)-(I) and (II) in such a manner that the speed light synchronization shutter speed TSYN; for example 1/60 sec, the "EF" display for showing the speed light photographic mode in which the speed light device 384 has been charged and the aperture value AV used for the control are displayed. Hereby in case of the manual mode, it is necessary for the photographer to manually set at the side of the lens device 2 the aperture value AV displayed in the view finder 13, whereby the character "W" is also displayed as is shown in FIG. 10 (c) (II).

The operation of the camera device as well as of the speed light device 384 at the time of the full automatic, automatic light adjusting, automatic mode as well as of the full automatic, automatic light adjusting and manual mode have already been explained.

Then in case of the semi-automatic, automatic light adjusting, automatic mode, the speed light device 384 is ready for operation in the automatic light adjusting mode with the aperture value set by means of the aperture setting dial 108 and the film sensitivity set by means of the film sensitivity setting dial 106, while the data VSA of the analog signal corresponding to the aperture value set by means of the above mentioned aperture setting dial 108 and the charge completion signal are given to the camera device. This charge completion signal CSA includes the control signal relative to the full automatic mode or the semi-automatic mode depending upon the current amount, whereby, as has already been explained, the semi-automatic mode takes place when the charge completion signal CSA includes the control signal for the semi-automatic mode while the mode selector 38 at the side of the camera device is set at the side of the priority on shutter speed.

In this case at first the speed light synchronization shutter time TSYN of the camera body 4 and the shutter time TV set with the dial 34 of the camera body are operated so as to be compared with each other in such a manner that the slower shutter time is taken up for the shutter time TV for the control.

Then a constant CST2 corresponding to a constant is subtracted from the aperture value data VSA introduced from the speed light device 384 to the camera device and digitally converted so as to obtain the control data AV relative to the aperture value put in from the side of the speed light device. Hereby the aperture value obtained in this way is to correspond to that set by means of the aperture setting dial 108 at the side of the speed light device 384, whereby at times this operation result lies beyond the range controlable in the lens device 2. In such a case the fact has to be informed of to the photographer so as to prevent the misoperation. In consequence this camera system is designed so as to investigate whether the aperture value set at the side of the speed light device 384 is smaller than the largest aperture value AMAX controlable in the lens device 2 but larger than the smallest aperture value. In case such investigation result shows that the above aperture value AV lies beyond the largest aperture value AMAX or the smallest aperture value AVo, this limit value AMAX or AVo is taken up for the aperture value AV for the control instead of the aperture value set at the side of the speed light device 384, whereby it is natural that the fact should be informed of to the photographer at the same time. Then the smallest aperture value AVo of the lens device 2 is subtracted from the aperture value data AV for the control so as to obtain the diaphragm closing step number AVs for the aperture control.

Hereby the above mentioned operation is carried out quite in the same way also for the semi-automatic, automatic light adjusting, manual mode. However in this mode the data for the diaphragm closing step number is not used for the aperture control.

It is possible for the photographer to confirm the above mentioned operation result in the view finder 13, whereby the display at this time is as is shown in FIG. 10 (c)-(V) and (VI). After the afore mentioned investigation operation, the selected shutter time TV for the control, "EF" for showing the speed light photographic mode when the speed light device 384 has been charged and the aperture value AV for the control are displayed. Further in case of the manual mode it is necessary for the photographer to manually set at the side of the lens device 2 the aperture value displayed in the view finder 13, whereby the character "M" is displayed as is shown in FIG. 10(c)-(VI).

Further the operation of the camera device as well as of the speed light device 384 in case of the semi-automatic, automatic light adjusting, automatic mode as well as of the semi-automatic, automatic light adjusting, manual mode have already been explained.

Then in case of the full automatic, total light amount, manual mode the speed light device 384 is in the total light amount mode without setting any aperture value with the aperture setting dial 108, while the data VSA of the analog signal for showing that no aperture value is set with the above mentioned aperture setting dial 108 and the charge completion signal CSA are given to the camera device. This charge completion signal CSA includes the control signal relative to the full automatic mode or the semi-automatic mode depending upon the current amount, whereby the full automatic mode takes place, as mentioned afore, when this charge completion signal CSA includes the control signal of the full automatic mode or the mode selector 38 at the side of the camera device is set at the side of the priority on aperture value.

Hereby as the data VSA taken up into the camera device such an analog amount as overflows the A-D converter at the time of the A-D conversion in order to show that no aperture value is set at the side of the speed light device. Thus in case of the speed light photographic mode the signal for the total light amount mode is introduced into the camera device when the A-D converter 382 is overflowed, whereby no preset control of the aperture of the lens device 2 is carried out from the side of the camera body 4. Thus, in such a case the lens device 2 has to be manually set by means of the aperture setting ring 8.

Such a control routine is carried out quite in the same way also for the full automatic total light amount, largest aperture value mode. However in this mode the mark 12 is selected by means of the aperture setting ring 8 at the side of the lens device 2, the lens device 2 assumes the state equivalent to that in which the lens device 2 is preset at the position of the largest aperture value in such a manner that after all the diaphragm is controlled with the largest aperture value.

Hereby it is possible for the photographer to confirm in the view finder 13 the state of the mode set by means of the above mentioned judging operation, whereby the display at this time is as is shown in FIGS. 10 (d)-(I) and (II). In the view finder the speed light synchronization shutter time, for example 1/60 sec, "EF" for showing the speed light photographic mode when the speed light device 384 has been charged and the character "M" for showing the necessity for the photographer to manually preset the aperture value of the lens device 2 are displayed as is shown in FIG. 10 (d)-(II), whereby in case of the largest aperture value mode the lens device 2 is in the unset state so that no information relative to the aperture value is displayed at all as is shown in FIG. 10(d)-(I) also so as to inform the photographer of the fact.

Further the operation of the camera device as well as of the speed light device 384 in case of the full automatic, total light amount, manual mode as well as of the full automatic, total light amount, largest aperture value mode have already been explained so that the repeated explanation is omitted here.

Then in case of the semi-automatic, total light amount, manual mode, the speed light device 384 is in the total light amount mode by setting the manual mode display without setting any aperture value with the aperture setting dial 108 while the data VSA of the analog signal at the level showing that no aperture value is set with the above mentioned aperture setting dial 108 and the charge completion signal CSA are given to the camera device. This charge completion signal CSA includes the control signal relative to the full automatic mode or the semi-automatic mode depending upon the current amount, whereby the semi-automatic mode takes place, as has already been explained, when this charge completion signal CSA includes the control signal for the semi-automatic mode while the mode selecter 38 at the side of the camera device is set at the side of the priority on shutter time.

In such a case at first the speed light synchronization shutter time TSYN of the camera body 4 and the shutter time set with the dial 34 of the camera body 4 are operated so as to be compared with each other. After this comparison the slower shutter time is taken up for the shutter time for the control.

Then as the data VSA introduced into the camera device from the speed light device 384, such an analog amount as overflows the A-D converter after the A-D conversion is set so as to show that no aperture value is set at the side of the speed light device. In consequence, when the A-D converter 382 is overflowed in case of the speed light photographer mode, the signal for showing the total light amount mode is introduced into the camera device, whereby no preset control of the aperture of the lens device 2 is carried out from the side of the camera body 4. In consequence, in such a case the aperture has to be manually preset by means of the aperture setting ring 8 at the side of the lens device 2.

Further such a control routine is carried out quite in the same way also for the semi-automatic, total light quantity, largest aperture value mode. However in this mode the mark 12 is not selected by means of the aperture setting ring 8 at the side of the lens device 2, so that the lens device 2 assumes the same state equivalent to that in which the lens device 2 is preset at the largest aperture value in such a manner that after all the aperture is controlled with the largest value.

Hereby it is possible for the photographer to confirm in the view finder the state of the mode set by means of the above mentioned judging operation as is shown in FIG. 10 (d)-(V), (VI), whereby after the comparison operation the shutter time TV selected for the control and "EF" for showing the speed light photographic mode when the speed light device 384 has been charged are displayed. In case of the manual mode the character "M" is displayed for showing the necessity for the photographer to manually preset the aperture value of the lens device as is shown in FIG. 10 (d)-(II), whereby in case of the largest aperture mode the aperture of the lens device 2 is in the unset state so that no information as to the aperture is displayed at all as is shown in FIG. 10(d)-(I) also so as to inform the photographer of the fact.

Hereby the operation of the camera device as well as of the speed light device 384 in case of this semi-automatic, total light amount, manual mode as well as of the semi-automatic, total light amount, largest aperture mode have already been explained so that the repeated explanation is omitted here.

Further, when the bulb is selected at the side of the camera body 4 in case of the speed light photographic mode, it is possible to carry out the bulb photography disregarding the control as to the full automatic or the semi-automatic mode, namely the automatic shutter time deciding control.

Thus in case of the speed light photographic mode with the bulb no special operation for this purpose is carried out, but the same operation control as in case of the above mentioned speed light photographic mode is carried out only in order to control the aperture of the photographic mode.

In consequence in case of this camera system, the operation for the exposure control in accordance with the light measurement includes four routine and the operation for the exposure control in accordance with the speed light photography includes four routines, namely altogether light operation control routines are included, whereby each photographic mode is realized by anomaly applying these eight operation control routines.

This camera system including the above mentioned operation routines takes up the set input data, the set condition and the operation state so as to operate and control various mechanism in accordance with the synthetic judgement so that it would be necessary to efficiently arrange the control system applied to such system in accordance with the rational conception.

Namely it is possible to realized the control system capable of setting the control signal as well as the control sequence effective for the mechanical operation of the camera mechanism by automatically assorting and taking up the datas introduced from the outside in order to meet the desire of the photographer for various photographic mode principally in accordance with the above mentioned eight operation routines, detecting the missetting or the misoperation connected with the various mechanical restrictions of the camera mechanism so as to inform the photographer of the fact and to display various informations necessary for various photography.

Figure 30:
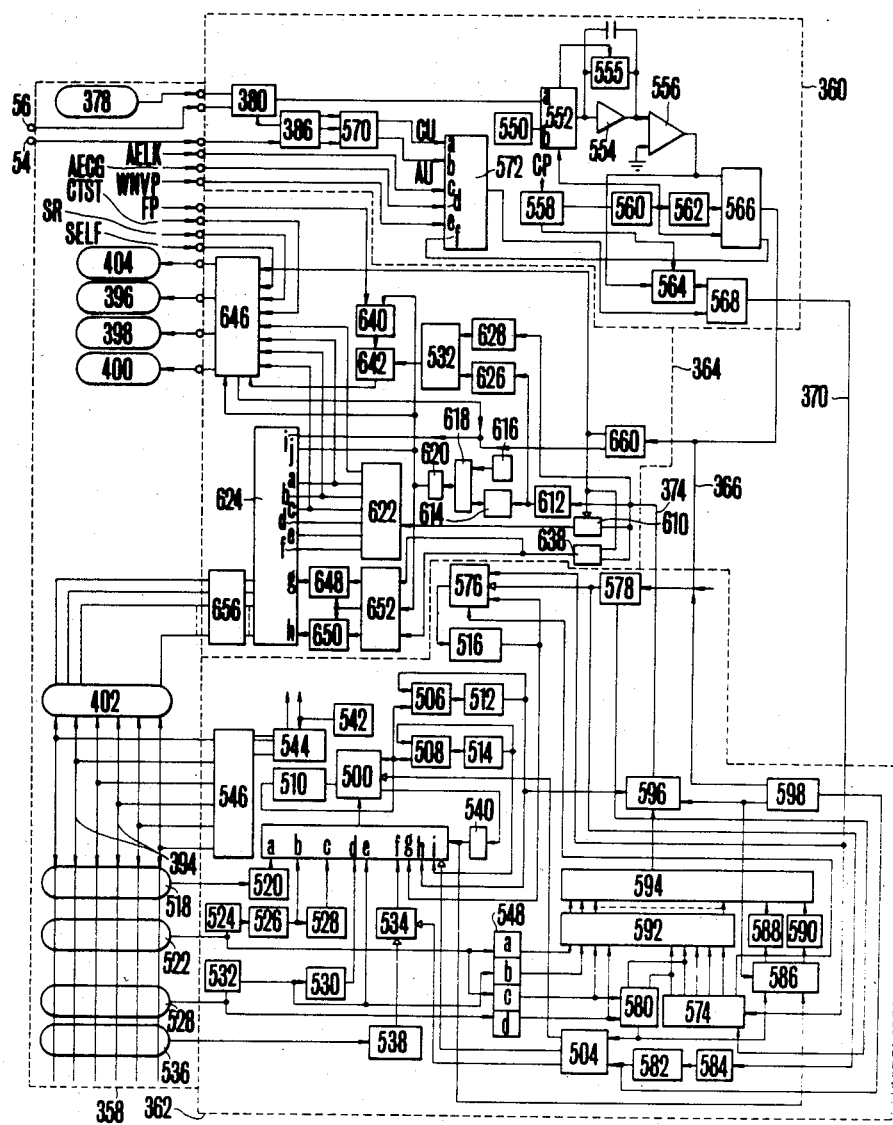
FIG. 30 shows a block diagram of the control circuit of the camera system in accordance with the present invention.

FIG. 30 shows a block diagram of the control circuit constituted upon the above mentioned stand point, whereby the input control part 360, the central control part 362 and the output control part 364 shown in FIG. 28 are shown more in concrete way.

Figure 31:
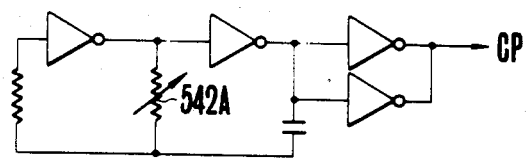
FIG. 31 shows a composition of the generating circuit of the clock pulse.

This system is in principle controlled by means of the clock pulses CP, for which purpose the clock pulse generator 542 is provided in the central control part 362. The clock pulses are distributed to the whole system, whereby this clock pulse generator 542 is concretely realized through the construction as is shown in FIG. 31. The period of these clock pulses CP is considerably important for counting the actual time to be explained later, whereby it is necessary to adjust the generator sufficiently by means of the variable resistance 542A shown in FIG. 31.

The clock pulses CP are introduced into the system pulse generator 544 for producing the system pulses in accordance with the above mentioned clock pulses CP, as is shown in FIG. 32. The system pulses consist of the counter pulses CT1-CT4 and the timing pulses TB0-TB7 and so on, whereby various operations of this camera system are controlled by means of the above mentioned system pulses. Hereby in case of this system the time between the timing pulses TB0-TB7 makes one word.

Figure 33:
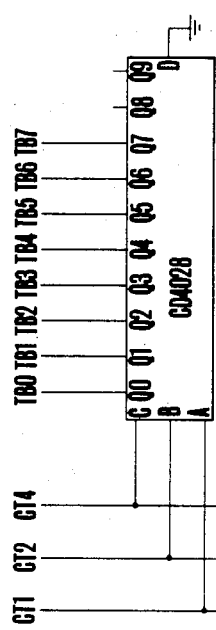
FIG. 33 shows a concrete composition of the system pulse generator.

Further the composition of this system pulse generator 544 is shown in FIG. 33 concretely, whereby a binary up counter in which the integrated circuit element of CD 4029 (manufactured by RCA) is applied is used in order to generate the counter pulses CT1, CT2 and CT4, while the decoder in which the integrated circuit element of CD 4028 (manufactured by RCA) is applied is used in order to generate the timing pulses TB0-TB7.

Figure 34:
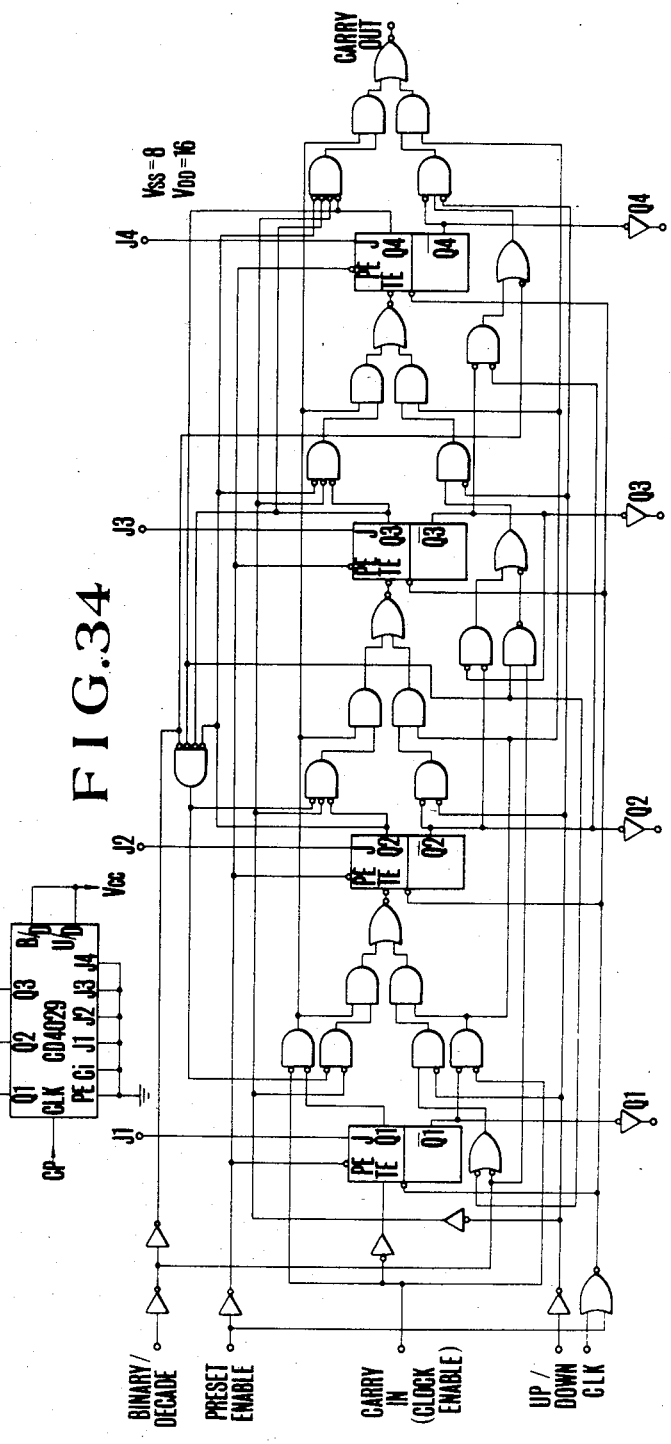
FIG. 34 shows a logic diagram of the I.C. circuit element CD4029.

The logic diagram of the above mentioned integrated circuit element CD 4029 is shown in FIG. 34 in detail, whereby the element is an up/down counter in the function. However in this embodiment the element is used as a binary up counter operating in synchronization with the clock pulses CP. In case of such a composition, by applying the above mentioned clock pulses CP to the clock pulse terminal CLK, the counter pulses CT1-CT4 as shown in FIG. 32 can be obtained respectively from the output terminals Q1-Q3.

Figure 35:
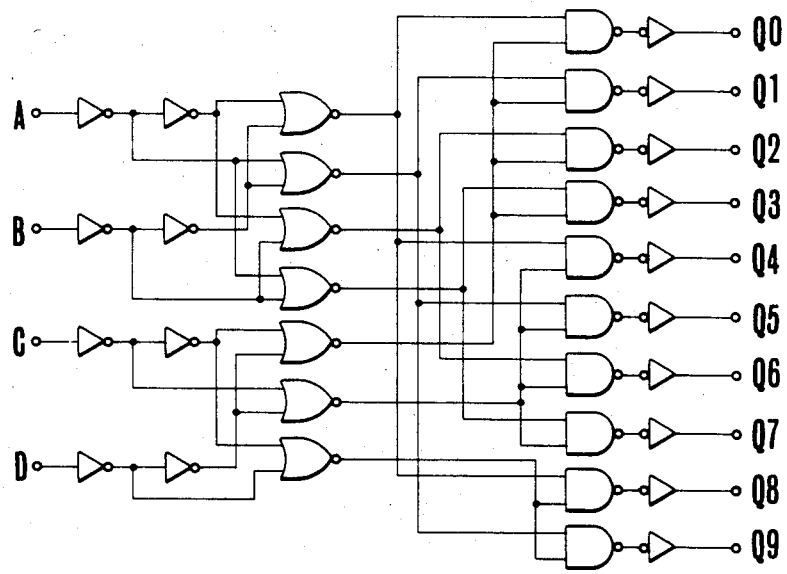
FIG. 35 shows a logic diagram of the IC circuit element CD4028.

Further the logic diagram of the above mentioned integrated circuit element CD 4028 is shown in detail in FIG. 35, whereby the element is a binary decoder in the function. In this system, by applying the above mentioned counter pulses CT1, CT2 and CT4 to the terminals A-C of this element, the timing pulses TB0-TB7 can be obtained from the output terminal Q0-Q7 as is shown in FIG. 32.

The thus obtained timing pulses TB1-TB6 are given to the driver circuits 546, which in turn produces the timing pulses TB1-TB6. The timing pulses TB1-TB6 are given to the digital display means 402 through the timing pulses 394 as the pulses for the figure number for dynamically driving the display means 402 and at the same time to the film sensitivity input mechanism 518, the smallest aperture value MNAL SPDW setting mechanism 522, the AV TV ASLC setting mechanism 528 and the largest aperture value setting mechanism 536 through the timing line 394 as the timing pulses for taking up datas.

Hereby the above mentioned film sensitivity input mechanism 518 is constituted as is shown in FIG. 12, whereby the film sensitivity SV' can be taken out from the last figure in synchronization with the timing pulses TB1-TB6. The details of this operation is as has already been explained. As to the data SV relative to the film sensitivity, the data set with the precision of $\frac{1}{3}$ step is taken up, being approximated with the precision of $\frac{1}{6}$ step. Namely at first the input mechanism 518 of the film sensitivity takes up the data SV' relative to the film sensitivity, whereby "1" takes place respectively in the bit with the weight of $\frac{1}{3}$ step for the weight of $\frac{1}{3}$ step and in the bit with the weight of $\frac{1}{2}$ step for the weight of $\frac{2}{3}$ step as has already been explained. However this does not make the data approximated with the precision of $\frac{1}{6}$ step, it is necessary to take up the data SV' relative to the film sensitivity which has been taken up when "1" takes place in the bit with the weight of $\frac{1}{2}$ step or $\frac{1}{4}$ step as the data approximated with the precision of $\frac{1}{6}$ step when "1" takes place in the bit with the weight of $\frac{1}{6}$ step without condition as has already been explained. This is nothing but the execution of the approximation by the relation (6) and (7).

The set circuit 520 serves to convert the data SV' relative to the film sensitivity SV into the film sensitivity data SV with the precision of $\frac{1}{6}$ step, placing "1" in the bit with the weight of $\frac{1}{6}$ step. In case this set circuit 520 detects "1" in the bit with the weight of $\frac{1}{4}$ of the data SV' as to the film sensitivity introduced from the lower figure in sequence in synchronization with the timing pulses TB1-TB6, namely in the bit of the data introduced in synchronization with the timing pulse TB1 or in the bit with the weight of $\frac{1}{2}$, namely in the bit of the data introduced in synchronization with the timing pulse TB2, "1" is established in synchronization with the timing pulse TB0 for the next word time so as to obtain the film sensitivity data SV with the precision of $\frac{1}{6}$ step in synchronization with TB0-TB6.

Figure 36:
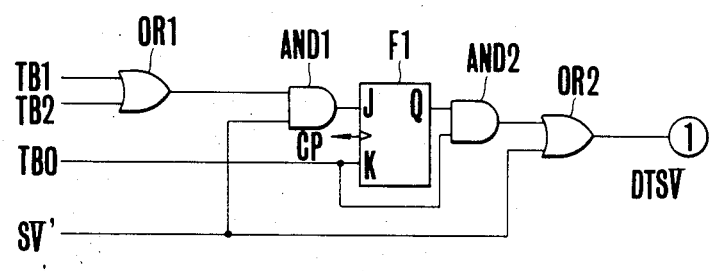
FIG. 36 shows a detailed circuit composition of the set circuit 520.

Hereby such set circuit 520 is shown in detail in FIG. 36, whereby, as is clear from the drawing, the fact that "1" is put in either of the bit with the weight of $\frac{1}{4}$ step synchronized with TB1 or in the bit with the weight of $\frac{1}{2}$ step synchronized with TB2 out of the film sensitivity data SV' introduced from the lower figure in sequence in synchronization with the timing pulses TB1-TB6 is detected through the AND gate AND1 by means of the timing pulse TB1 or TB2 put in through the OR gate OR1 in such a manner that the fact that "1" is put in the bit with the weight of $\frac{1}{2}$ step or $\frac{1}{4}$ step of the input data SV' is detected and memorized, by applying the output of the above mentioned AND gate AND1 to the J input terminal of the Flip-Flop F1. At this time the Q output of the above mentioned Flip-Flop 1 is "1", which is read out through the AND gate AND2 in synchronization with the first timing pulse of the next word time. This output of the AND gate AND2 is delivered in synchronization with the timing pulse TB0 as the bit of the film sensitivity data SV with the weight of $\frac{1}{6}$ step through the OR gate OR2 so that after all the film sensitivity SV is taken out as a data with the precision of $\frac{1}{6}$ step in synchronization with the timing pulses TB0-TB6.

In the following explanation the output 1 of the above mentioned OR gate OR2 is called the film sensitivity setting data DTSV.

Further the above mentioned smallest aperture value: MNAL SPDW setting mechanism 522 is constituted as is shown in FIG. 14, whereby the MNAL signal can be taken out in synchronization with the timing pulse TB1, the SPDW signal in synchronization with the timing pulse TB2 and the data AVo (Grey code) relative to the smallest aperture value of the lens device 2 in synchronization with the timing pulses TB3-TB6 from the higher figures in sequence. The details are as has already been explained.

The smallest aperture value data AVo (Grey code) is delivered from the higher figure in sequence in synchronization with the timing pulses TB3-TB6 from the smallest aperture value MNAL·SPDW mechanism 522 as has already been explained, whereby the information delivered from the above mentioned setting mechanism 522 includes the MNAL signal and the SPDW signal so that it is necessary to sort out the smallest aperture value data AVo (Grey code) only. To this purpose the signal sorting circuit 524. This signal sorting circuit 524 serves to sort out the smallest aperture value data AVo delivered in synchronization with the timing pulses TB3-TB6 in accordance with the timing pulses in such a manner that the data (Grey code) sorted by means of this signal sorting circuit 524 is converted into the smallest aperture value AVo through the next Grey code-binary code-converter 526. The necessity to set the smallest aperture value of the photographic lens device 2 to be used in the Grey code has already been explained, whereby this Grey code-binary code-converter 526 is constituted on the same principle as is shown in FIG. 16, in such a manner that the smallest aperture value data AVo (Grey code) delivered from the higher figures in sequence in synchronization with the timing pulses TB3-TB6 is converted into a binary code so as to produce the data AVo with the precision of $\frac{1}{2}$ step in synchronization with the timing pulses TB2-TB5.

Figure 37:
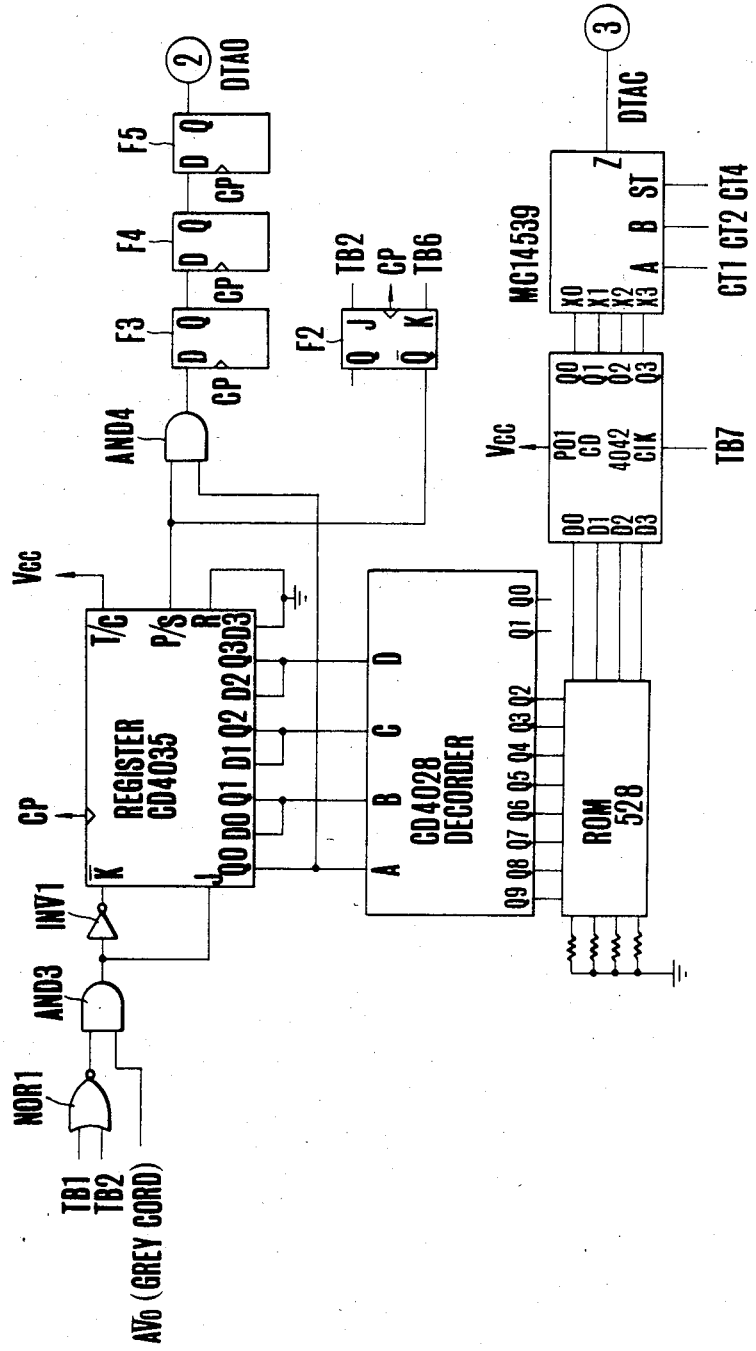
FIG. 37 shows a detailed circuit composition of the grey-binary converter.

Further the above mentioned signal sorting circuit 524 and the Grey code-binary code-converter 526 are shown in detail in FIG. 37, whereby, as is clear from the drawing, the smallest aperture value data AVo (Grey code) delivered from the higher figures in sequence in synchronization with the timing pulses TB3-TB6 is separated from the MNAL signal or the SPDW signal and so on by means of the AND gate AND3 supplied with the output of the NOR gate NOR1 supplied with the timing pulses TB1, TB2 are directly delivered to the J-terminal and through the inverter INV1 to the $\overline{K}$-terminal of the four bit parallel input parallel output shift register CD4035 (manufactured by RCA).

Figure 38:
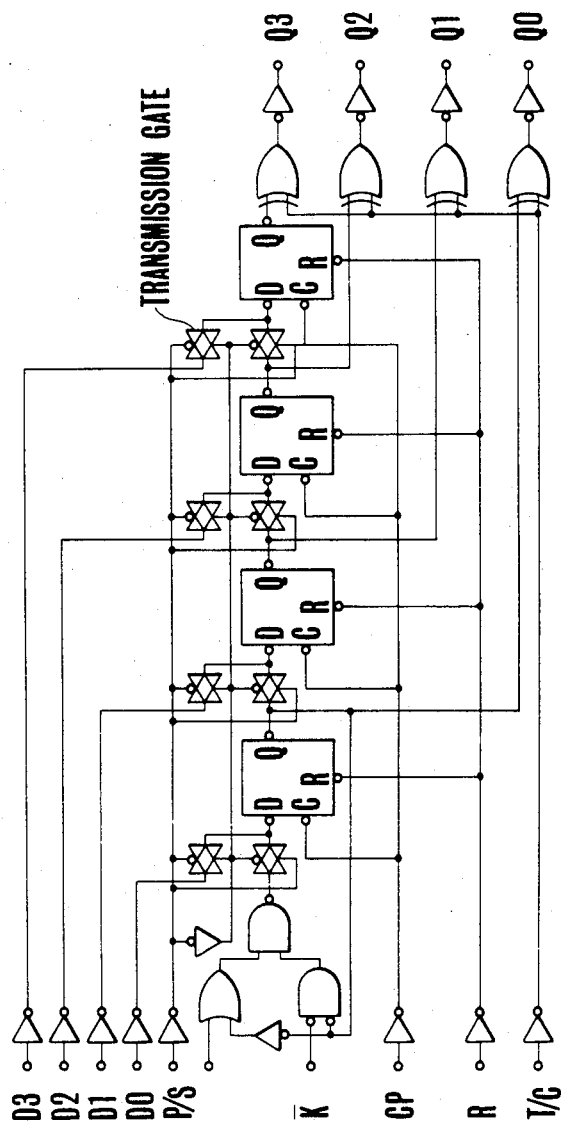
FIG. 38 shows a detailed circuit composition of the I.C. circuit element CD4035.
Figures 39, 40:
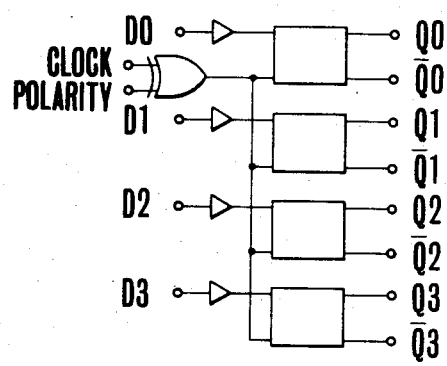
FIG. 39 shows a logic composition of the transmission gate shown in FIG. 38.
FIG. 40 shows a block diagram of the I.C. circuit element CD4042.

The logic circuit composition of this integrated circuit element CD4035 is shown in detail in FIG. 38, while the transmision gate shown in FIG. 38 is shown in detail in FIG. 39.

This CD4035 is so designed as to act as a series shift register when "0" is applied to the P/S terminal and as a parallel shift register when "1" is applied to the P/S terminal, whereby this P/S terminal is supplied with the $\overline{Q}$ output of the Flip-Flop 2 whose J input terminal is supplied with the timing pulse TB2 and where K input terminal is supplied with the timing pulse TB6. Namely this Flip-Flop 2 is set in synchronization with the rising up of the clock pulse CP next to the timing pulse, namely the rising up of TB3, and reset in synchronization with the rising up of the clock pulse CP next to the rising up of TB6, namely the falling down of TB6 in such a manner that "0" is delivered to the P/S terminal of CD4035 during the internal TB3-TB6 during which the smallest aperture value data AVo (Grey code) is delivered so as to make CD4035 act as a series shift register.

In case now the series Grey codes inverted to each other are delivered to the J and the $\overline{K}$ terminal of the above mentioned integrated circuit element CD4035 from the higher figures in sequence while the element CD4035 acts as a series shift register, which is equivalent to the case when the same series data is delivered to the J and the K terminal, the series Grey codes are converted into series binary code and stored. This operation is carried out while the timing pulses TB3-TB6 are produced and the smallest aperture value data AVo (Grey code) is delivered.

After the above mentioned operations the timing pulse TB7 starts to play part, when the Flip-Flop 2 is reset so as to produce the $\overline{Q}$ output of "1" so that the CD4035 whose P/S terminal is supplied with this $\overline{Q}$ output acts as a parallel shift register, whereby this CD4035 delivers Q3 output to D2 input terminal, Q2 output to D1 input terminal and Q1 output to D0 input terminal so that the CD4035 acts as reversed series register so far as "1" is applied to the P/S terminal, namely during the interval TB7-TB2. At this time the smallest aperture value data AVo converted in a binary way from the higher figures in sequence and stored in this register is delivered from the Q0 terminal from the lower figures in sequence in synchronization with the timing pulses TB7-TB2. This data AVo is taken out through the AND gate AND4 supplied with the $\overline{Q}$ output of the Flip-Flop F2 in the reset state during the interval of timing pulses TB7-TB2, whereby this data is different from other in the relation between the weight of bits and the timing pulses. Thus the data is taken out from the Q output terminal of the Flip-Flop F5 as the data in synchronization with the timing pulses TB2-TB6, being delayed by the interval corresponding to three bits through the Flip-Flops F3-F5. In this way the smallest aperture value AVo is taken out as the data with the precision of ½ step in synchronization with the timing pulses TB2-TB6.

In the following explanation the Q output 2 of the above mentioned Flip-Flop F5 is called the smallest aperture value data DTAO.

The smallest aperture value AVo of the photographic lens device 2 obtained as mentioned above has a close connection with the vignetting error AVc at the time of the light measurement with the totally opened diaphragm so that this vignetting error AVc has to be taken into consideration at the time of operating for the exposure control by means of the light measurement with the totally opened diaphragm. This vignetting error AVc can be obtained in accordance with the smallest aperture value AVo of the photographic lens device 2 to be used, whereby, however, in case of the system of the present embodiment, the datas for the vignetting error AVc have been prepared in advance for each of the thinkable smallest aperture value in such a manner that the vignetting error data AVc is selected in accordance with the input smallest aperture value AVo. Such vignetting error datas AVc are stored in the fixed data ROM 528 so as to be selected out in accordance with the input smallest aperture value AVo and delivered from the lower figures in sequence as the data with the precision of ⅛ step in synchronization with the timing pulses TB0-TB5.

How to take out the above mentioned vignetting error is shown in detail in FIG. 37, whereby the data from each terminal Q0-Q3 of the register CD4035 is decoded by means of the decoder CD4028 in such a manner that either of the output Q2-Q9 of this decoder is mode "1". The output of the above mentioned decoder is delivered to the ROM in which a plural number of the vignetting errors AVc have been stored so as to deliver the form bit vignetting error data AVc written in the address corresponding to the above mentioned decoder output. The output of this ROM is delivered to each input terminal D1, D2, D3 and D4 of the timing buffer CD4042. This timing buffer CD4042 is an integrated circuit element manufactured by RCA, whereby it block diagram is shown in FIG. 40. This timing buffer, to whose Pol terminal Vcc is applied, takes up the output of the above mentioned ROM with the timing TB7 and delivers it with other timing than TB7, whereby the above mentioned register CD4035 terminates the binary conversion of the smallest aperture value AVo with the rising up of TB7, when the terminals Q0, Q1, Q2 and Q3 of the register CD4035 begin to deliver in a parallel way the smallest aperture value AVo converted in a binary way, so that the output of the above mentioned ROM becomes the vignetting error AVc corresponding to the input smallest aperture value AVo with the timing TB7 and in consequence the necessary vignetting error AVc is obtained by taking up the then output with the timing TB7.

Figures 41, 42:
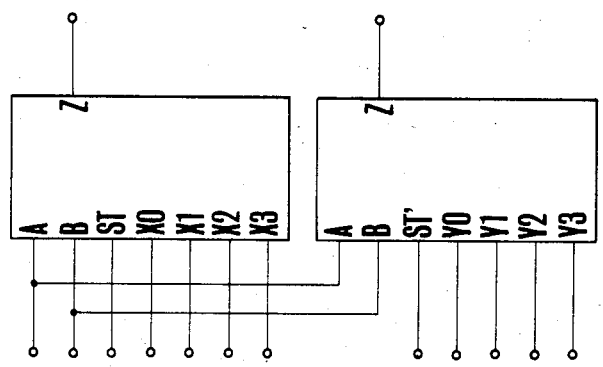
FIG. 41 shows a block diagram of the I.C. circuit element MC14539.
FIG. 42 shows a truth value table of the I.C. circuit element MC14539.
Figure 43:
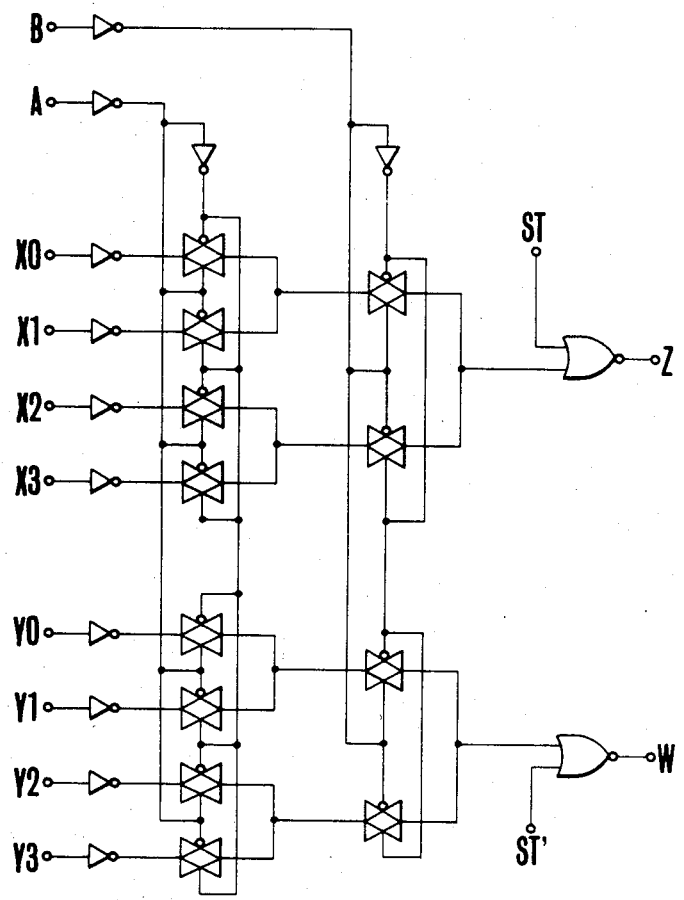
FIG. 43 shows a logic diagram of the I.C. circuit element MC14539.

As mentioned above, the vignetting error data AVc stored in the timing buffer CD4042 is delivered respectively from the terminal Q0, Q1, Q2 and Q3 to the terminals X0, X1, X2 and X3 of the integrated circuit element MC14539 (manufactured by MOTOROLLER) for the conversion of series data. The block diagram of this integrated circuit element MC14539 is shown in FIG. 41, the true value table in FIG. 42 and a concrete logic diagram in FIG. 43, whereby the vignetting error data AVc introduced in parallel through the terminals X0, X1, X2 and X3 is delivered out of the Z terminal as a series data in synchronization with the timing pulses TB0-TB3 in accordance with the counter pulses CT1, CT2 and CT4 respectively applied to the terminals A, B and ST. In this way the vignetting error AVc is delivered from the Z terminal of the integrated circuit element MC14539 as a data with the precision of ½ step in synchronization with the timing pulses TB0–TB3.

In the following explanation the Z terminal output of the above mentioned integrated circuit element MC14539 is called the vignetting error data DTAC.

Further the above mentioned TV·AV·ASLC setting mechanism 528 is constituted as is shown in FIG. 18 so as to deliver the ASLC signal in synchronization with the timing pulse TB1 and the shutter time TV or the aperture value AV set by means of the dial 34 in synchronization with the timing pulses TB2–TB6. The details is as has already been explained.

The data such as the shutter time TV, the aperture value and so on set by means of the dial 34 is taken up through the AV·TV·ASLC setting mechanism 528 in synchronization with the timing pulses TB2–TB6 as has already been explained, whereby whether the data delivered from the setting mechanism corresponds to the shutter time TV or the aperture value AV can not be distinguished. Nevertheless whether the data is taken up as the shutter time or as the aperture value can be distinguished by means of the aperture setting signal ASLC taken up in synchronization with the timing pulse TB1. Hereby the above mentioned data is taken up from the above mentioned AV·TV·ASLC setting mechanism 528 together with the above mentioned aperture setting signal ASLC, whereby the signal sorting circuit 532 serves to sort the above mentioned datas taken up in synchronization with the timing pulses TB2–TB6 out of the output signals from the above mentioned setting mechanism 528. The data sorted out by means of the above mentioned signal sorting circuit 532 can be used directly as the aperture value data AV, while the data has to be duplicated in order to be used as the shutter time data as has already been explained. The reason is that the smallest setting unit of the aperture value AV by means of the dial 34 is ½ step while the smallest setting unit of the shutter time by means of the common dial 34 is 1 step so that the shutter time TV is devided into two in such a manner that the smallest unit of the shutter time data TV corresponds to that of the aperture value AV and duplicated when later the data is used as the shutter time. The duplication circuit 530 is used to realize the above mentioned purpose, whereby the data is delivered as the shutter time data through the above mentioned duplication circuit 530. Further this duplication circuit 530 serves to deliver the datas taken up in synchronization of the timing pulses TB2–TB6 as the datas in synchronization of the timing pulses TB3–TB7, by delaying the datas by an interval for one timing pulse.

As explained above the set shutter time data TV is taken up as the data with the precision of 1 step in synchronization of the timing pulses TB3–TB7 while the set aperture value data AV is taken up as the data with the precision of ½ step in synchronization of the timing pulses TB2–TB6.

Figure 44:
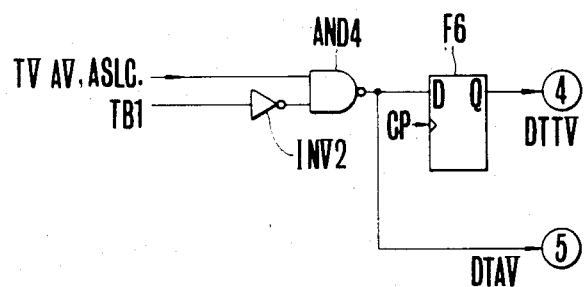
FIG. 44 shows a concrete circuit composition of the signal assorting circuit and the doubling circuit.

The circuit composition of the above mentioned signal sorting circuits 532 and of the above mentioned duplication circuit 530 is shown in FIG. 44, whereby from the output of the TV·AV·ASLC setting mechanism 528 only the signal relative to TV·AV· in synchronization of the timing pulses TB2–TB6 is sorted out by means of the AND gate AND4 supplied with the timing pulse TB1 through the inverter INV 2. The data thus sorted out can directly be used as the information relative to the aperture value but has to be taken out as the data with the precision of 1 step in synchronization with the timing pulses TB3–TB7, being delayed by the clock time by means of the O shaped Flip-Flop F6, in order to be used as the data relative to the shutter time.

In the following explanation the output 4 of the above AND gate 4 is called the aperture setting data DTAV, while the Q output 5 of the above mentioned Flip-Flop F6 is called the shutter time setting data DTTV.

Further the afore mentioned largest aperture value setting mechanism 536 is constituted, as is shown in FIG. 19, so as to deliver the data AMAX' relative to the largest aperture value AMAX of the photographic lens device 2 in synchronization with the timing pulses TB1–TB6 as has already been explained.

This largest aperture value setting mechanism 536 does not produce the largest aperture value itself but selects the desired largest aperture value data AMAX out of a number of the fixed datas stored in the fixed data ROM 534. Namely as to the data AMAX' delivered from the largest aperture value setting mechanism 536 in synchronization of the timing pulses TB1–TB6, as is shown in FIG. 20, F11, F16, F22, F32, F46 and F64 of the actual largest aperture value AMAX corresponds to the timing pulses TB1–TB6 respectively, and in consequence, the datas is introduced in series and stored in the series input-parallel output register 538 from the above mentioned largest aperture value setting mechanism 536, whereby when the bit which produces "1" is found out of the bits of the register 538, which of F11, F16, F22, F32, F45 and F64 the largest aperture value AMAX of the photographic lens device 2 is can easily be determined. In consequence the parallel output of the above mentioned register 538 is led to the fixed data ROM 534, to which the signal for the largest aperture value AMAX is applied from the instruction ROM 504 to be explained later, when the largest aperture value AMAX pointed out by the above mentioned register 538 is delivered.

Further the concrete composition for taking the largest aperture value AMAX out of the fixed data ROM 534 will be explained later in detail.

On the other hand the MNAL signal and the SPDW signal delivered from the above mentioned smallest aperture value MNAL·SPDW setting mechanism 522 in synchronization with the timing pulses TB1 and TB2 is introduced into the condition signal memory circuit 548 and separated from each other in accordance with the timing pulses so as to be stored. As the result the MNAL signal respectively the $\overline{\text{MNAL}}$ signal or the SPDW signal respectively the $\overline{\text{SPDW}}$ signal can be obtained from the above mentioned condition signal memory circuit 548.

Figure 45:
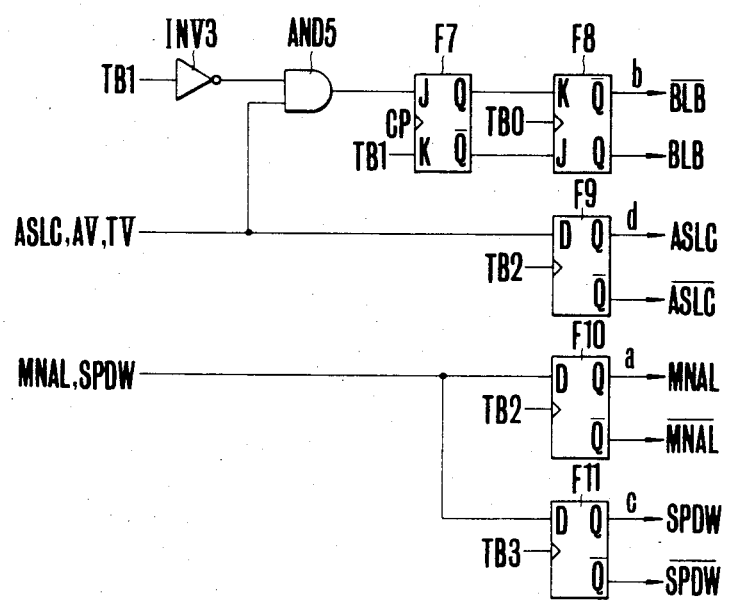
FIG. 45 shows a detailed circuit composition of the condition signal memory circuit.
Figure 46:
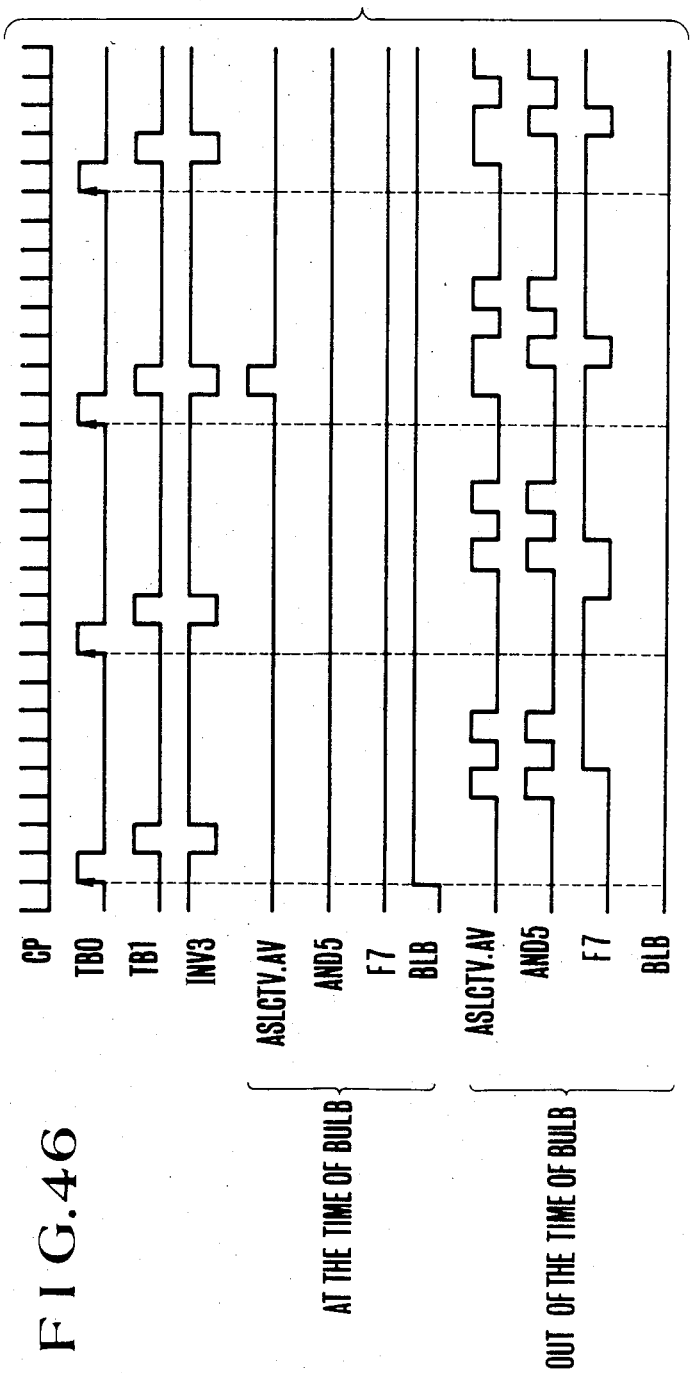
FIG. 46 shows a timing chart for explaining how to detect the bulb signal.

The above mentioned condition signal memory circuit 548 is constituted as is shown in detail in FIG. 45, whereby the MNAL signal out of the MNAL signal and the SPDW signal delivered from the MNAL·SPDW setting mechanism 522 in synchronization with the timing pulses TB1, TB2 is detected and stored by means of the Flip-Flop F10 supplied with the timing pulse TB2, while the SPDW signal is detected and stored by means of the Flip-Flop F11 supplied with the timing pulse TB3.

As the result the MNAL signal is delivered from the Q output terminal of the above mentioned Flip-Flop F10 and the $\overline{\text{MNAL}}$ signal from the $\overline{\text{Q}}$ output terminal, while the SPDW signal is delivered from the Q output terminal of the above mentioned Flip-Flop F11 and the $\overline{SPDW}$ signal from the $\overline{Q}$ output terminal.

Further the ASLC signal delivered from the above mentioned TV·AV·ASLC setting mechanism 528 in synchronization with the timing pulse TB1 is introduced into the above mentioned condition signal memory circuit 548 and sorted in accordance with the timing pulses so as to be memorized. As the result the ASLC signal respectively the $\overline{ASLC}$ signal can be obtained from the above mentioned condition signal memory circuit 548.

The detail for the above is also shown in FIG. 15, whereby the ASLC signal delivered from the TV·AV·ASLC setting mechanism 528 in synchronization with the timing pulse TB1 is detected by means of the Flip-Flop F9 supplied with the timing pulse TB2 so as to be stored, so that the ASLC signal is delivered from the Q outtput terminal of the above mentioned Flip-Flop F9 while the $\overline{ASLC}$ signal is delivered from the $\overline{Q}$ output terminal.

On the other hand the above mentioned condition signal memory circuit 548 has taken up the datas sorted out by means of the above mentioned signal sorting circuit 532 in synchronization with the timing pulses TB2–TB6 so as to judge when the bulb mode is selected by the dial 34. Namely the bulb mode in this system takes place when all the bit of the data set by the dial 34 produce "0" so that the bulb mode is judged by detecting the case only "0" signals are delivered during the time interval of the timing pulses TB2–TB6. Namely the above mentioned condition signal memory circuit 548 serves to detect and memorize the case no "1" output is delivered from the output terminals of the above mentioned signal sorting circuit 532 during the time interval of the timing pulses TB2–TB6. This memory signal is delivered from the above mentioned condition signal memory circuit 548 as the SLB signal for the shutter time being in the bulb mode or the inversed signal $\overline{BLB}$.

The details for the above is also shown in FIG. 45, whereby the datas delivered from the TV·AV·ASLC setting mechanism 528 in synchronization with the timing pulses TB1–TB6, from which data as the ASLC signal in synchronization with the timing pulse TB1 has been excluded by means of the AND gate AND5 supplied with the timing pulse TB1 through the inverter INV 3, is led to the J-input terminal of the J-K Flip-Flop F7. This J-K Flip-Flop F7 is supplied with the clock pulse CP as clock input, while the K-input terminal is supplied with the timing pulse TB1. Further the above mentioned Flip-Flop F8 is supplied with the clock pulse TB0 as clock input.

The Flip-Flop F7 is once brought into the reset state in the above mentioned composition in synchronization with the rising up of the next clock pulse CP at the time point at which the timing pulse TB1 is applied to the K input terminal of the Flip-Flop F7. In case at this time even one "1" output is delivered from the AND gate AND5 during the time interval of the timing pulses TB1–TB6, this Flip-Flop F7 is brought into the set state, whereby its Q output becomes "1". Because this "1" output is led to the K-terminal of the Flip-Flop F8, the Flip-Flop F8 remains in the reset state even if the Flip-Flop F8 is supplied with TB0 as the clock input in such a manner that its Q output is kept "0". In case on the other hand no "1" output is delivered from the AND gate AND5 during the time interval of the timing pulses TB1–TB6, this Flip-Flop F7 remains in the reset state, whereby its $\overline{Q}$ output also remains "1". Because this "1" output is led to the K-input terminal of the Flip-Flop F8, the Flip-Flop F8 is brought into the set state when the Flip-Flop F8 is supplied with TB0 as clock input, whereby its Q output is kept "1". This state is nullified with the next timing pulse TB0 when even one "1" output os delivered from the AND gate AND5 during the time interval of the timing pulses TB2–TB6. As explained above the BLB signal is delivered from the Q output terminal of the above mentioned Flip-Flop F8, while the $\overline{BLB}$ signal is delivered from the $\overline{Q}$ output terminal.

By means of the above mentioned composition the MNAL signal, the $\overline{MNAL}$ signal, the BLB signal, the $\overline{BLB}$ signal, the SPDW signal, the $\overline{SPDW}$ signal, the ASLC signal and the $\overline{ASLC}$ signal are delivered from the above mentioned condition signal memory circuit 548 in accordance with the state of various condition set in the mechanical part 358.

On the other hand the mechanical part 358 delivers various datas, the condition setting signal, the state judging signal and so on to the input control part 360.

The analog output from the TTL light measuring means 378 or the analog signal from the terminal 56 is selectively led to the A-D converter through the signal switching over circuit 380 controlled by the current detector 386, whereby this A-D converter consists of a standard level producing means 550, the A-D converter control circuit 552, the integrater 554, the integrater control means 555, the comparater 556, the counter 558, the Flip-Flops 560, 562 and the buffer register 564.

This A-D converter is the well known one generally called a dual lamp A-D converter, which integrates the input analog data along the positive direction for a certain determined time interval so as to obtain an integral level proportional to the input analog data and then integrates the data for the above mentioned integral level in the negative direction in accordance with a certain predetermined level signal so as to obtain the digitally converted value of the above mentioned input analog data, by counting the standard pulse signals during the time in which the integration of the analog data put in at first in the negative direction terminates.

In case of the A-D converter constituted as mentioned above, the above mentioned integrater 554 serves to integrate the input analog data in the positive direction and the standard level signal in the negatives direction, the above mentioned standard level producing means 550 serves to produce the above mentioned standard level and to clear the integration value remaining in the above mentioned integrater control means 555, the above mentioned A-D converter control circuit 552 serves to change over the signal introduced into the above mentioned integrater 554, namely an analog data and the standard level signal and to change over the lamps of the above mentioned integrater 554 in the positive direction and in the negative direction, the above mentioned comparator 556 serves to compare the output of the above mentioned integrator 554 with the standard level (the earth level in the present embodiment) so as to detect the termination of the integration in the negative direction, the above mentioned counter 558 serves to count a certain determined time for integrating the input analog data in the positive direction for the determined time and to count the time for integrating the standard level signal in the reversed direction, the above mentioned buffer register 564 serves to take up and store the content of the above mentioned counter 558 at the time point at which the integration of the standard level signal by means of the above mentioned integrater 554 in the reversed direction is terminated, the above mentioned Flip-Flop 560 serves to produce the signal for changing over the signal given to the above mentioned integrater 554 through the above mentioned A-D converter control circuit 552 and the signal for changing over the direction of the integration by the above mentioned integrater 554, namely for changing over the lamp and the above mentioned Flip-Flop 562 serves to produce the detection instruction signal for detecting the overflow of the counter as the result of the A-D conversion.

Hereby the comparater 556 is so designed as to produce "1" when there is an input integration value and "0" when the input integration value is below a certain determined level.

At the time of starting the A-D coversion in the above mentioned composition, at first the A-D converter control circuit 552 takes up an analog data through the a input terminal and delivers it to the integrater 554. Because at this time the Flip-Flop 560 still remains in the reset state, the above mentioned integrater 554 is so set as to integrate the data in the positive direction so that the above mentioned input analog data is integrated by the above mentioned integrater 554 in the positive direction, at the same time the counter 558 starts the counting in synchronization with the clock pulse CP. As has already been explained the above mentioned counter 558 serves to control time and to take up the A-D conversion data, whereby the frequency of the input clock pulse CP is divided accordingly so as to produce the standard time to be counted.

When the above mentioned counter 558 is over-flowed after the above mentioned counting operation, namely a certain determined time has elapsed after starting the counting, all of the content of the counter 558 becomes "0", while at the same time the Flip-Flop 560 is set. Namely the fact that the Flip-Flop 560 is set means that a certain determined time has elapsed since the counter started the counting, which means that the integrater 554 has integrated the input analog data for a certain determined time. It goes without saying that the then output of the integrater 554 is proportional to the input analog data.

The output of the above mentioned Flip-Flop 560 is delivered to the A-D converter control circuit 552 in such a manner that the input to the integrater 554 is exchanged for the standard voltage signal from the standard level producing means 550 to be connected to the b terminal of the above mentioned A-D conversion control circuit 552, while at the same time the above mentioned integrater 554 is so set as to integrate the data in the negative direction in such a manner that the above mentioned standard voltage signal is integrated in the reversed direction by means of the above mentioned integrater 554. Thus in accordance with the standard voltage from the b input terminal the data stored in the above mentioned integrater 554 as the result of the data integration is integrated in the reversed direction. On the other hand the counter 558 who was over-flowed and all of whose contents have become "0" continues counting. It goes without saying that the amount counted by the counter 558 is proportional to the amount integrated by the above mentioned integrater 554 in the reversed direction. When as the result of the integration in the reversed direction the output of this integration 554 has reached a certain determined value, namely when the reversed integration corresponding to the integrated amount of the analog data for a certain determined time has completed, the output of the comparator 556 changes from "1" to "0" in such a manner that at this time in accordance with the variation of the output of the comparater 556 the buffer register 564 immediately takes up and memorize the amount counted by the above mentioned counter 558. The amount counted by the counter 558 and stored in the buffer register 564 at this time corresponds to the amount integrated by means of the above mentioned integrater 554 in the reversed direction, namely the analog data having been integrated by means of the above mentioned integrater 554 in the positive direction for a certain determined time. In case of the system of the present embodiment after the above mentioned operation, the amount counted by the counter 558 and stored in the above mentioned buffer register 564 is used as the digital conversion data corresponding to the input analog data.

Further even after the above mentioned operation the above mentioned counter 558 further continues counting until the counter 558 is over-flowed again, when all of the content of the counter 558 becomes "0" and at the same time the Flip-Flop 560 is reset while the Flip-Flop 562 is set. With the reset of the above mentioned Flip-Flops 560, the above mentioned A-D converter control circuit 552 once clears the above mentioned integrater 554 through the above mentioned integrater control means 555, then takes up the analog data delivered to the a input terminal and deliver it to the integrater 554 in such a manner that the above mentioned analog data is integrated from the beginning. Because hereafter this A-D converter repeats the same operation as mentioned above, the system of the present embodiment always takes up a new analog data as the A-D conversion repeatedly so that the content of the buffer register 564 is always renovated into the digital data corresponding to the input analog data.

Hereby it is necessary to always detect the operation state of this A-D detecter, for which purpose the logic circuit 566 is provided. This logic circuit 566 is supplied with the output signal of the above mentioned comparater 556, and of the Flip-Flops 560 and 562 so as to deliver the INT signal for showing that the input analog data is being integrated by means of the integrater 554, the ADC signal for showing that the A-D conversion has completed and the reading out of the A-D conversion data is possible or the ADOF signal for showing that as the result of the A-D conversion the input analog data is so large that the counter 558 is over-flowed.

The analog data introduced into the input control part 360 from the mechanical part 358 as mentioned above is stored in the buffer register 564 as digital conversion data DD, whereby this data DD is transferred to the central control part 362 through the signal switching over circuit 568 in accordance with the instruction from the above mentioned logic circuit 566 as the digital data in synchronization with the timing pulses $TB_0$–$TB_7$ from the lower figures in sequence, being carried on the input BAS line 370.

On the other hand, the INT signal delivered from the above mentioned logic circuit 566 is carried on the BAS line 366 as the signal in synchronization of the timing pulse $TB_7$, while the ADCE signal is carried on the BAS line 366 as the signal in synchronization of the timing pulse $TB_6$. Further, this details will be explained later in detail.

The terminal 54 of the mechanical part 358 is supplied with the charge completion signal CSA, the external light measuring adapter mode signal OLM and so on, whereby these signals are, as has explained afore, classified into the CGUP signal by means of the current detector 386 as to whether the speed light device has been charged or not, the FAT signal for showing the full automatic shutter time control at the time of the speed light photography and the OLM signal for the application of the external light measuring adapter. These signals are further converted into two signals, namely CU and AO by means of the encoder 570. As to the CU signa and the AO signal as is explained in FIG. 47, when the CU signal is "0", the exposure control in the system is carried out in accordance with the light measuring data, whereby when the AD signal is "0", the system is in the TTL light measurement photographic mode, while the AD signal is "1", the system is in the external light measurement photographic mode. Further, when the CU signal is "1", the system is in the speed light photographic mode, whereby when the AO signal is "0", the shutter time is controlled semi automatically while when the AO signal is "1", the shutter time is controlled fully automatically. The CU signal and the AO signal are respectively given to the terminals a and b of the multi-plexer 572.

The above mentioned multi-plexer 572 includes the input terminals a-f, being so designed as to convert the input signals coming through the above mentioned input terminals into the series signals in synchronization with the timing pulses $TB_1$-TB6. The terminals c, d, and e of this multi-plexer 572 are respectively supplied with the AE lock signal AELK, the AE charge signal AECG and the wind up completion signal WNUP and the terminal f is supplied with the A-D conversion over flow signal ADOF from the above mentioned logic circuit 566. As the result this multi-plexer 572 delivers the ADOF signal, the AELK signal, the AECG signal, the WNUP signal, the AO signal and the CU signal in synchronization with the timing pulses $TB_1$-TB6, whereby these series signals are further transferred from the above mentioned signal change over circuit 568 to the central control part 362 in synchronization with the timing pulses $TB_1$-TB6, being carried on the input BAS line in sequence.

Hereby this signal change over circuit 568 is controlled by means of the instruction of the above mentioned logic circuit 566 in such a manner that at the time point at which the transfer of the A-D conversion data becomes possible after the A-D conversion of the input analog data has been completed, the output of the buffer register 564 is given to the input BAS line 370, while in other state than mentioned above, the series output signal of the multi-plexer 572 is given to the input BAS line 370.

Figure 48:
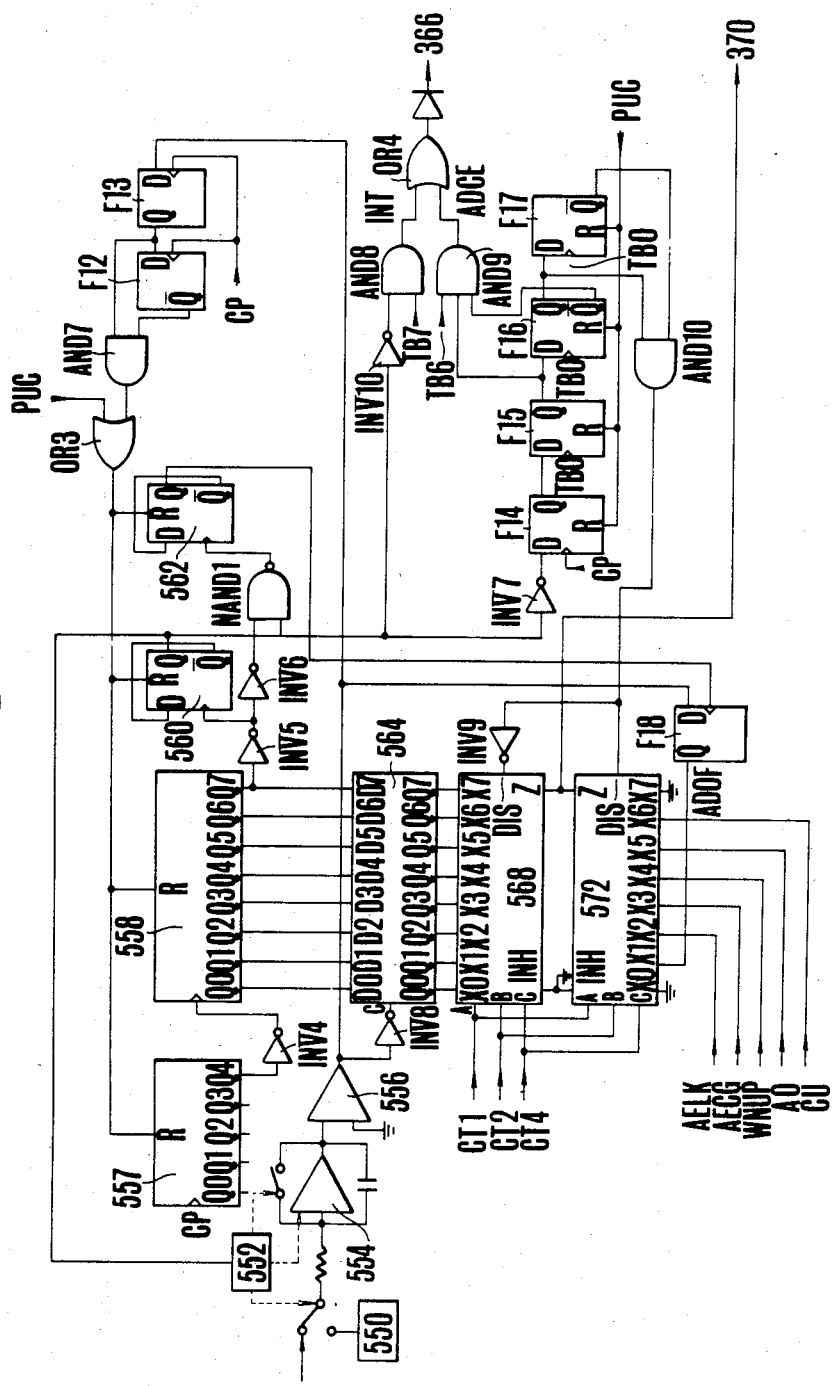
FIG. 48 shows a detailed block diagram of the input control part.

The block diagram of the above mentioned input control part 360 is shown in detail in FIG. 48. In the drawing, 557 is the frequency dividing counter for producing the standard clock for counting by dividing the clock pulse into 32 parts. This standard clock is applied to the clock terminal of the counter 558 through the inverter INV4, so that this counter 558 counts the above mentioned standard clock by dividing the frequency so as to deliver the counting data in eight bits from the terminals $Q_0$-$Q_7$. Hereby the highest bit $Q_7$ of the output data of the above mentioned counter 558 is given to the clock terminal of the Flip-Flop 560 through the inverter INV5. Hereby the $\overline{Q}$ output of this Flip-Flop 560 is the D input of itself so as to constitute 1 bit as the extension of the highest bit of the above mentioned counter 558 in substance. Further the output of the above mentioned inverter INV5 is introduced to the NAND gate NAND1 whose one side input terminal is received the Q output of the above mentioned Flip-Flop 560 in such a manner that the output of this NAND gate NAND1 is given to the clock terminal of the Flip-Flop 562. In the same way as in case of the above mentioned Flip-Flop the $\overline{Q}$ output of this Flip-Flop 562 is the D input of itself so as to constitute the 1 bit as extension of the Flip-Flop 560 of the above mentioned counter 558 in substance.

Figure 49:
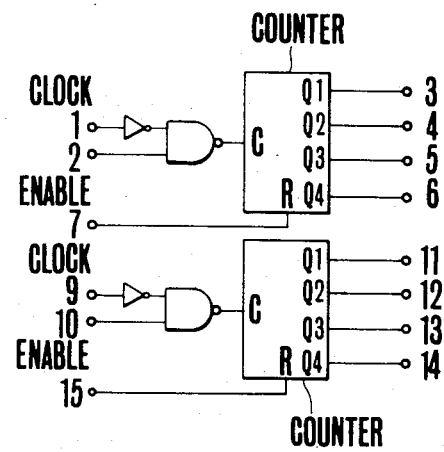
FIG. 49 shows a block diagram of the I.C. circuit element MC14520.
Figure 50:
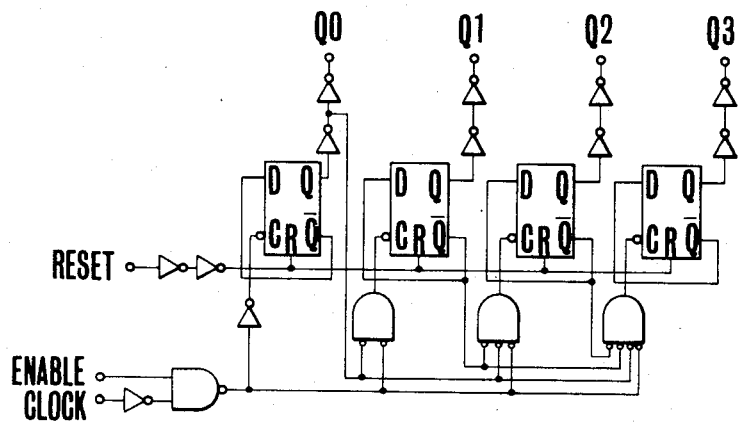
FIG. 50 shows a logic diagram of one of the counters shown in FIG. 49.
Figure 51:
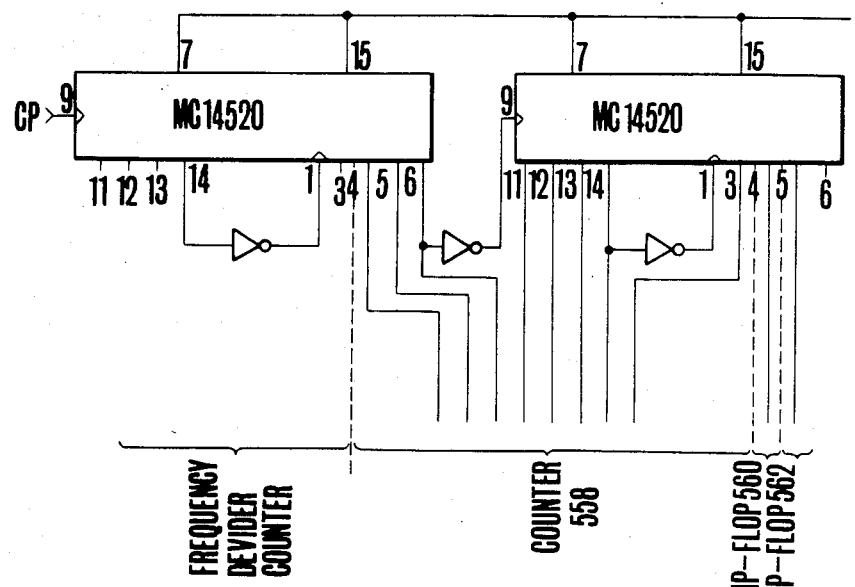
FIG. 51 shows the compositions of the counter 558 and of the Flip-Flops 560 and 562 by means of the I.C. circuit element MC14520 shown in FIG. 49.

Namely as is clear from the above mentioned explanation the frequency dividing counter 577, the counter 558, the Flip-Flops 560 and 562 constitute as a whole a 15 bit frequency dividing counter. In the present embodiment, two integrated circuit element MC14520 (manufactured by MOTOROLLER) are used in order to realize such a 15 bit frequency dividing counter. This integrated circuit element MC14520 is a dual up counter including two 4 bit counter as is shown with a block diagram shown in FIG. 49, one of which is constituted with the logic diagram in FIG. 50. This by combining the above mentioned integrated circuit element MC14520 as is shown in FIG. 15, it is possible to realize the above mentioned 15 bit counter. This is realized by connecting four 4 bit counters in series, whereby in case of the counter composed in this way, the bits from the first to the fifth bit are used as the frequency dividing counter 557, the bits from the sixth to the thirteenth bit are used as the 8 bit counter, namely the counter 558 and the fourteenth and the fifteenth bit are used as the Flip-Flop 560 and 562. The counter composed as mentioned above is immediately reset upon the signal input at the direct reset terminal.

In FIG. 48, the buffer register 564 is constituted with the parallel in parallel out type register so as to store the datas applied to the input terminals $D_0$-$D_∂$ in synchlonization with the input at the clock terminal c and deliver them from the output terminals $Q_0$-$Q_7$. The $D_0$-$D_7$ terminals of the buffer register 564 are respectively supplied with the outputs from the terminals $Q_0$-$Q_7$ of the above mentioned counter 558 in such a manner that the outputs from the terminals $Q_0$-$Q_7$ are respectively given to the input terminals $X_0$-$X_7$ of the signal sorting circuit 568. Further the clock terminal c of this buffer register 564 is supplied with the output of the comparater 556 through the inverter INV8 and in consequence, this buffer register 564 takes up the counting data of the above mentioned counter 558 when the output of the above mentioned comparater 556 is changed from "1" to "0", namely the integration in the negative direction by means of the integrater 554 has been completed.

Figure 52:
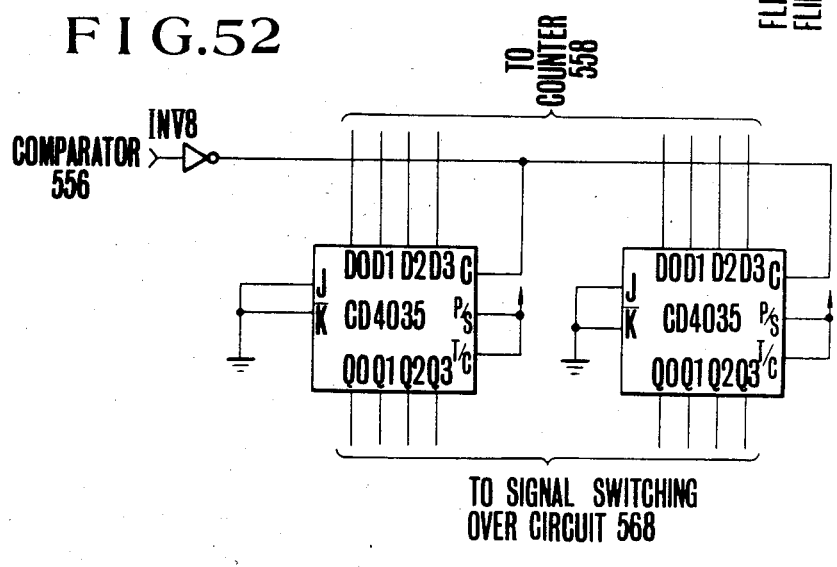
FIG. 52 shows a composition of the buffer register 564 by means of the combination of the I.C. circuit element CD4035.

Further the above mentioned buffer register 564 can concretely and easily realized by arranging two 4 bit parallel in parallel out type shift register, namely two integrated circuit element CD4035 (manufactured by RCA) shown in FIG. 48 parallely as is shown in FIG. 52.

The signal change over circuit 568 and the multi-plexer 572 are both the multi-plexer with the same composition in principle, being realizable with the integrated circuit elements MC14512 (manufactured by MOTOROLLER). This integrated circuit element MC14512 has the composition as is shown with the logic diagram in FIG. 53 and the characteristics as is shown in the fourth value table in FIG.-54. This integrated circuit element MC14512 is supplied with 8 bit series data through the terminals $X_0$–$X_7$, whereby when the counter pulses as is shown in FIG. 32 are given to the terminals A, B and C while "0" signal is being applied to the DIS terminal, the input data is transferred to the change over circuit 568 through the Z terminal in sequence in synchronization with the timing pulses $TB_0$–$TB_7$, whereby the output signals of the buffer registers $Q_0$–$Q_7$ are applied respectively to the terminals $X_0$–$X_7$ while the counter pulses $CT_1$, $CT_2$ and $CT_3$ are applied respectively to the terminals A, B and C. Further the $X_1$ terminal of the multi-plexer 572 is supplied with the ADOF signal for showing that the counter 558 is over-flowed as the result of the A-D conversion, the X2 terminal with the AELK signal, the X3 terminal with the AECG signal, the X4 terminal with the WNUP signal, the X5 terminal with the AO signal, and the X6 terminal with the CU signal, while the terminals A, B and C are supplied respectively with the counter pulses $CT_1$, CT2 and CT4. Further the output terminal Z of the change over circuit 568 and the output terminal Z of the multi-plexer 572 are connected to each other in a wired OR way so as to be connected to the input BAS line 370. In such a composition the DIS terminal of the above mentioned signal change over circuit 568 is supplied with the same signal as the change over control signal applied to the DIS terminal of the above mentioned multi-plexer 572 through the INV9 so that either the data introduced through X0–X7 of the above mentioned signal change over circuit or various signals introduced through X0–X7 of the above mentioned multi-plexer 572 are delivered to the above mentioned input BAS line in synchronization of the timing pulses TB0–TB7 in accordance with the state of the above mentioned change over control signal.

Further the output of the above Flip-Flop 560 is applied to the D terminal of the Flip-Flop F14 in synchronization with the clock pulse CP through the inverter INV7 while the output of the above mentioned Flip-Flop F14 is applied to the D terminal of the Flip-Flop F15 in synchronization with the timing pulse $TB_0$. Further the Q output of this Flip-Flop F15 is applied to the D terminal of the Flip-Flop F16 in synchronization with the timing pulses $TB_0$, while the Q output of this Flip-Flop F16 is applied to the D terminal of the Flip-Flop F17 in synchronization with the timing pulse $TB_0$. The operation of the Flip-Flops F14–F17 in the above mentioned composition will be explained in accordance with the timing chart shown in FIG. 55. When now the output of the Flip-Flop 560 changes from "1" to "0", namely the output of the inverter INV7 changes from "0" to "1", the above mentioned Flip-Flop F14 is set in synchronization with the next clock pulse CP in such a manner that "1" signal is applied to the D terminal of the Flip-Flop F15. Thus the Flip-Flop F15 is set in synchronization with the rising up of the next timing pulse $TB_0$ so as to produce "1" as Q output. This Q output of the Flip-Flop F15 is applied to the D terminal of the Flip-Flop F15 so that the Flip-Flop F16 is set in synchronization with the rising up of the next timing pulse $TB_0$ so as to produce "1" as Q output. By taking up the condition of the Q output of the Flip-Flop F15 and the $\overline{Q}$ output of the Flip-Flop F16, the 1 word time immediately after the output of the above mentioned comparater 556 changes from "0" to "1" can be obtained. The 1 word time obtained in this way makes the base for obtaining the ADCE signal for the A-D conversion completion. The "1" output from the Q output terminal of the above mentioned Flip-Flop F16 is further delivered to the D terminal of the Flip-Flop F17 so that the Flip-Flop F17 is set in synchronization with the rising up of the next timing pulse $TB_0$ so as to produce "1" as the Q output. Namely, by taking up the AND condition of the Q output of the Flip-Flop F16 and the $\overline{Q}$ output of the Flip-Flop F17, the next 1 word time since the output of the above mentioned comparater 556 has changed from "0" into "1" can be obtained. The 1 word time obtained in this way is used for transferring the A-D conversion data during the 1 word time immediately after the 1 word during the output of the ADCE signal for showing the A-D conversion completion is produced.

Further the Q output of the above mentioned Flip-Flop F15 and the $\overline{Q}$ output of the Flip-Flop F16 are delivered to the AND gate AND9 supplied with the timing pulse TB6, whereby, as the result, a signal is produced from the above mentioned AND gate AND9 in synchronization with TB6 during the 1 word time immediately after the Q output of the Flip-Flop 560 has changed from "1" into "0", which signal is carried in the BAS line 366 through the OR gate OR4 as the A-D conversion completion signal ADCE. Namely the change of the Q output of the above mentioned Flip-Flop 560 from "1" into "0" means the change of the lamp of the integrater 554 integrating in the negative direction, namely the complete completion of the A-D conversion. This will be explained in detail later.

Figure 55:
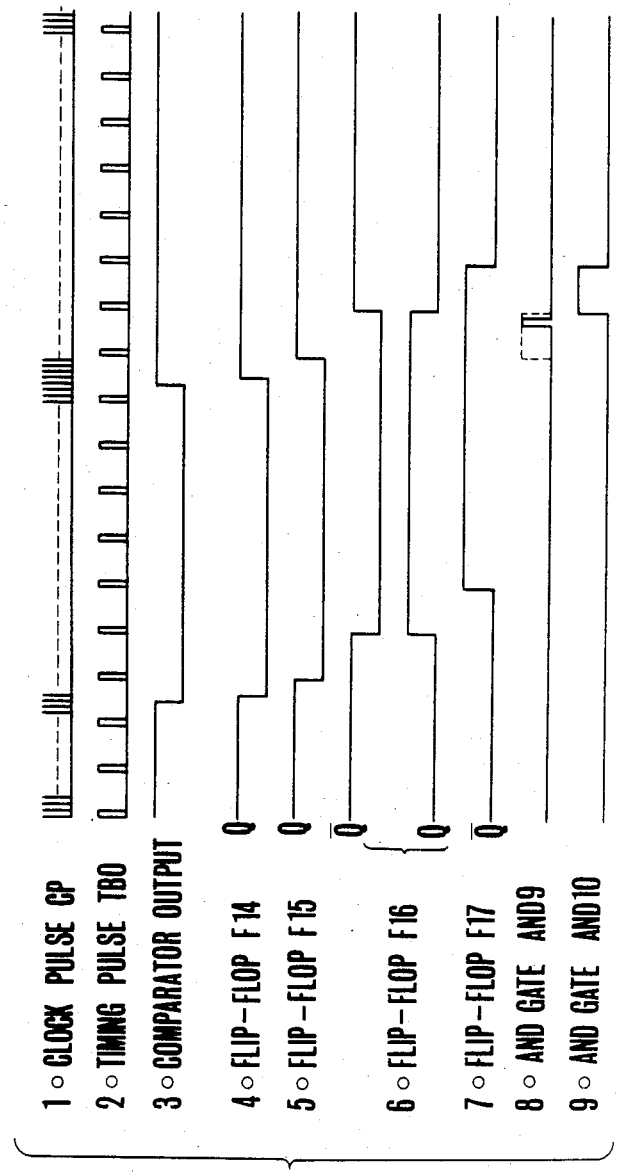
FIG. 55 shows a time chart for explaining the operation of the input control part.

Further the Q output of the above mentioned Flip-Flop F16 and the $\overline{Q}$ output of the Flip-Flop F17 are given to the AND gate AND10, whereby, as the result, as is shown in FIG. 55, a signal which is at high level during the next 1 word time after the above mentioned ADCE signal has been produced in delivered from the AND gate AND10. This output signal of the AND gate AND10 is given to the DIS terminal of the signal change over circuit 568 as the data transfer control signal through the inverter INV9 and at the same time directly to the DIS terminal of the multi-plexer 572. As the result, during the next 1 word time after the above mentioned ADCE signal has been produced, the data in the buffer register 564, namely the digital data obtained through the A-D conversion is delivered into the input BAS line from the lower figures in sequence from the Z terminal of the signal change over circuit 568 in synchronization with the timing pulses TB0–TB7. At this time, "1" signal is applied to the DIS terminal of the multi-plexer 572 from the AND gate AND10 so as to control the output of the Z terminal. Namely in the ordinary state signals such as the AELK signal, the AECG signal, the WNUP signal, the AO signal, the CU signal and so on the delivered into the input BAS line 370 in synchronization with the timing pulses TB1–TB6 from the Z terminal of the multiplexer 572, while when the ADCE signal has been produced after the A-D conversion completion the A-D conversion digital data DD stored in the buffer register 564 is delivered through the signal change over circuit 568 only during the next word time.

On the other hand, the Q output of the above mentioned Flip-Flop 560 is delivered to the AND gate AND8 supplied with the timing pulse TB7 through the inverter INV10. Namely, while the Q output of the above mentioned Flip-Flop 560 is "0", a signal in synchronization with the timing pulse TB7 is delivered from the above mentioned AND gate AND8. This output signal from the AND gate AND8 is carried on the BAS line 360 through the OR gate OR4 as the INT signal for showing that the integrater 554 is integrating the input analog data in the positive direction. Namely, the fact that the Q output of the above mentioned Flip-Flop 560 is "0" means that the above mentioned integrater 554 is integrating the input analog data in the positive direction. This will be explained in detail later.

On the other hand, the output of the above comparater 556 is applied to the D terminal of the Flip-Flop F13 in synchronization of the clock pulse CP. Further the Q output of this Flip-Flop F13 is applied to the D terminal of the Flip-Flop F12 in synchronization with the clock pulse CP. The Q output of the above mentioned Flip-Flop F13 and the $\bar{Q}$ output of the above mentioned Flip-Flop F12 are given to the AND gate AND7, while the output of this AND gate AND7 is given to the direct reset terminal R of the frequency dividing counter 557, the counter 558 and the Flip-Flops 560 and 562 through the OR gate OR3. The reason for the above composition is that in case the lamp has been changed over after the integration by means of the integrater 554 in the negative direction there is a certain time lag (absolutely to the characteristics of the integrater) until a positive output is obtained from the comparater 556 once reset after the integration in the positive direction is started while the counter 558 starts to operate at the same time with the delivery of the positive output from the comparater 556, in such a manner that when the comparater 556 starts to deliver the positive output, the frequency dividing counter 557, the counter 558, the Flip-Flops 560 and 562 are directly reset during the next 1 word time so that the time for starting the counting by the counter 558 and the time for starting the output by the comparater 556 are matched accordingly.

Further the Q output of the Flip-Flop 562 is applied to the clock terminal of the Flip-Flop F18 whose D input terminal is supplied with the output signal of the comparater 556, in such a manner that in case the counter 558 is over-flowed although the output of the comparater 556 has not inverted from "1" into "0" namely the A-D conversion has not completed, while the integrater 554 is integrating in the negative direction, the Flip-Flop 562 is set whereby "1" output is delivered from the Q terminal of the Flip-Flop F18 whose clock pulse is the output from the Q terminal of the Flip-Flop 562. The Q output signal of this Flip-Flop F18 is, after A-D conversion, applied to the $X_1$ terminal of the multiplexer as the ADOF signal for showing that the counter 558 is over-flowed.

Figure 56:
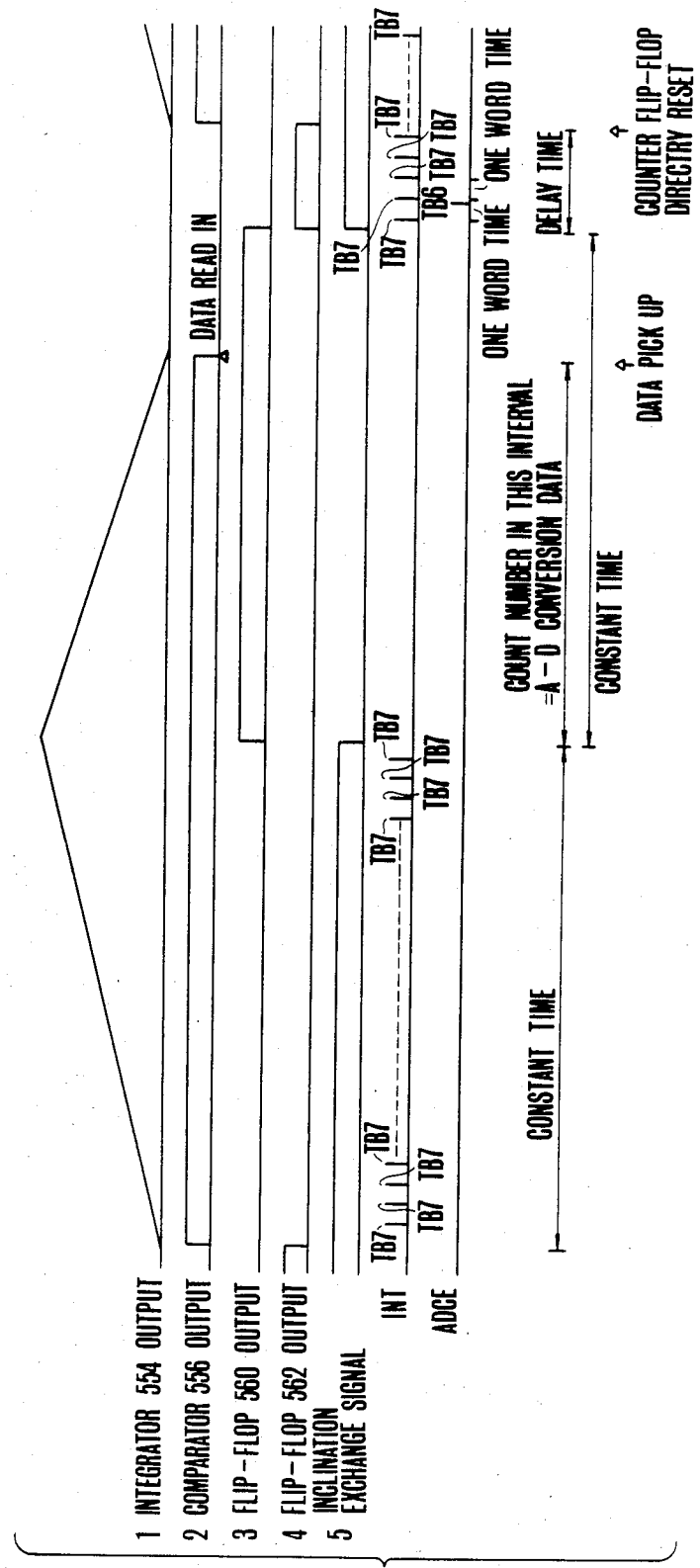
FIGS. 56 and 57 show a time chart for explaining the state of the A-D conversion at the input control part.
Figure 57:
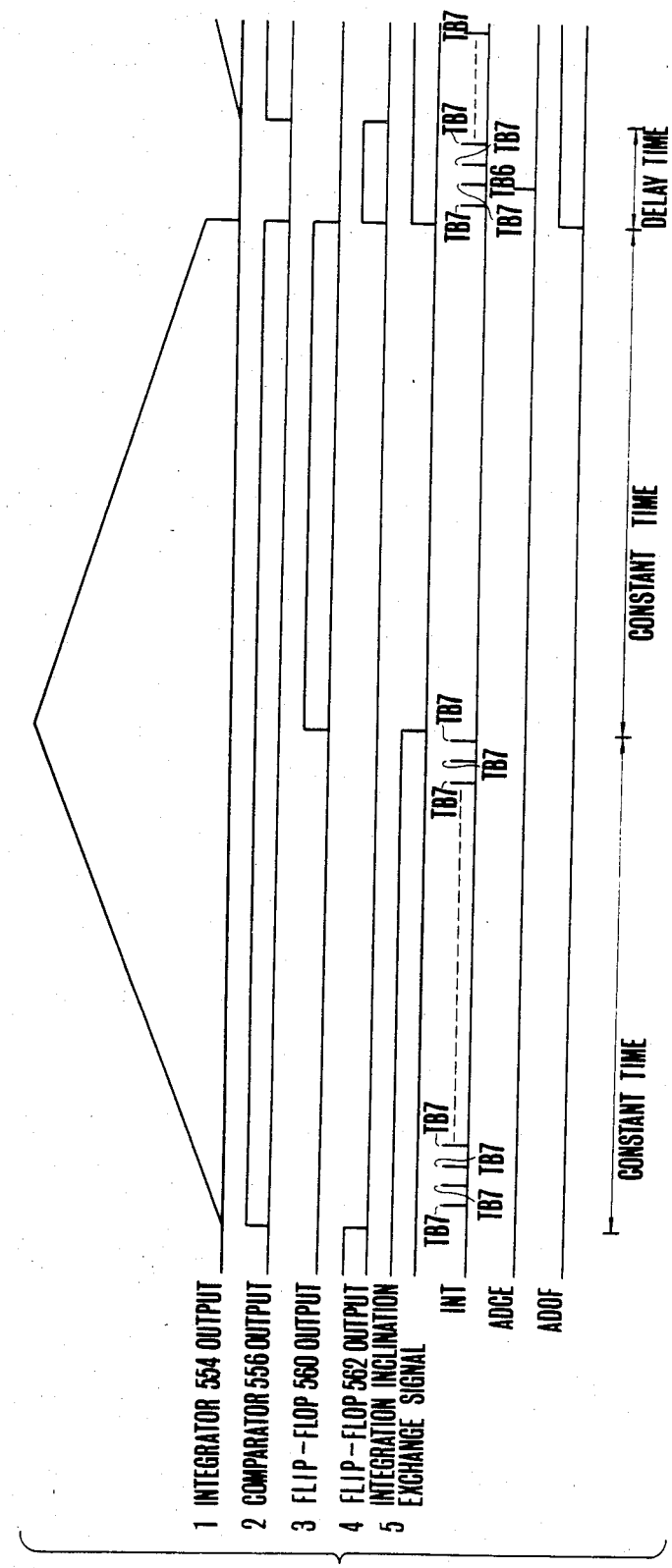

The operations of the input control part 360 constituted as mentioned above will be explained more in detail in accordance with the operation characteristics shown in FIGS. 56 and 57. Hereby 56 shows the case the A-D conversion is carried out in order, while FIG. 57 the overflow takes place as the result of the A-D conversion.

At first, when the power source switch is closed, the clear signal PUC is delivered from the power up clear circuit not shown in the drawing, so as to clear and reset the frequency dividing counter 557, the counter 558, the Flip-Flops 560 and 562, F14, F15 and F17. In this state the Q output of the Flip-Flop 560 is "0" and in consequence the A-D conversion control circuit 552 brings the lamp of the integrater 554 in the positive direction and at the same time delivers the input analog data to the integrater 554. At this time, the output of the comparater 556 becomes "1" and almost at the same time the counter 558 starts the counting up of the output pulse of the frequency dividing counter 557. While this integration is being carried out, the "0" output of the Flip-Flop 560 is given to the AND gate AND8 through the inverter INV10 and in consequence this AND gate AND8 delivers the INT signal for showing that the integrater 554 is integrating the input analog data to the BAS line 366 in synchronization with the timing pulses TB7 through the OR gate OR4.

Hereby, when the counter 558 is over-flowed during the above mentioned operation, the output of the Flip-Flop 560 becaomes "1", while at the same time all the bits of the content of the frequency dividing counter 557 and of the counter becomes "0" so that the counting is starting from "0" again. By means of the "1" output from the Q terminal of this Flip-Flop 560, the A-D conversion control circuit 552 brings the lamp of the integrater 554 in the negative direction and at the same time delivers the standard level signal from the standard level producing means 550 to the integrator 554. At the time point at which this integration in the negative direction is started, the value integrated by means of the above mentioned integrater 554 is in proportion to the above mentioned input analog data. While this integration in the negative direction is being carried out, the Flip-Flop 560 continues to produce "1" output so as to control the output of the AND gate AND8 so that it is natural that no INT signal is produced. When the output signal of the above mentioned integrator 554 has gone down to a certain determined level as the result of the integration by means of the integrator 554 in the negative direction, namely when the integration has been completed, the output of the comparater 556 changes from "1" to "0". As the result at this time point the buffer register 564 whose clock terminal C is supplied with the output signal of the above mentioned comparator 556 through the inverter INV8 takes up and stores the counting data counted by the counter 558 and delivered from the terminals $Q_0$–$Q_7$. The counting data taken up by the buffer register 564 in this way is the digital value corresponding to the input analog data as has already been explained.

Even after the above mentioned operation the counter 558 continues the counting operation, whereby when the counter 558 is over-flowed the Flip-Flop 560 is reset so that the Q output becomes "0" while at the same time the Flip-Flop 562 is set so that the Q output becomes "1". The Q output of the Flip-Flop 562 is given to the clock terminal of the Flip-Flop F18 whereby the output of the comparator applied to the D terminal of this Flip-Flop F18 has become already "0" so that the Flip-Flop F18 is not set.

On the other hand, the Q output of the above mentioned Flip-Flop 560 gives "1" input to the D terminal of the Flip-Flop F14 through the inverter INV7 so that, as is clear from the timing pulses shown in FIG. 55, during the 1 word time after the first timing pulse $TB_0$ after the Q output of the Flip-Flop 560 has become "0" the ADCE signal in synchronization with the timing pulse TB6 is given to the BAS line 366 from the AND gate AND9 through the OR gate OR4. Namely in case of this system the A-D conversion is considered to be completed at the time point at which the counter 558 which continues counting during as well as the integration by means of the integrator 554 in the negative direction is over-flowed, so that the A-D conversion completion is detected at the time point at which the Q output of the Flip-Flop 560 changes from "1" to "0" as has already been explained. Further during the next 1 word time after the above mentioned ADCE signal has been delivered "1" output is delivered from the AND gate AND10 during the 1 word time to the DIS terminal of the multi-plexer 572 so as to control the signal output from the Z terminal of the multi-plexer 572 and at the same time to the DIS terminal of the signal change over circuit 568 as the "0" signal through the inverter INV9 in such a manner that, during the 1 word time during which this "1" signal is produced, the A-D conversion data DD stored in the buffer register 564 is delivered into the input BAS line 370 from the lower figures in sequence through the Z terminal in synchronization with the timing pulses $TB_0$–$TB_7$.

On the other hand, the Q output of the Flip-Flop 560 which has been reset when the counter 558 was over-flowed is given to the A-D conversion control circuit 552, which once clears the above mentioned integrater 554, changes over the lamp into the positive direction and at the same time delivers the input analog data to the above mentioned integrater 554. The integrater 554 whose lamp has been changed over from the negative direction into the positive direction does not always start the integration immediately but after a certain delay time due to the characteristics of the element so that it takes a certain determined time for the comparater 556 to start to deliver "1", the output of the integrater 554 surpassing a certain level. On the other hand, after the counter 558 has been over-flowed, the counter 558 immediately starts the counting operation out of the state in which all the bits are "0" so that there is a danger that the input analog data could not be integrated by means of the integrater 554 exactly. In order to provide for the above the direct reset mechanism consisting of the Flip-Flops F12 and F13 and the AND gate AND7 is provided in such a manner that the comparater 556 starts to deliver "1" at the time of the integration in the positive direction, which is detected so as to once clear and reset the frequency dividing counter 557, the counter 558, the Flip-Flops 560 and 562 so that the counting is started again from the state in which all the bits are "0".

The above mentioned operation is repeated in such a manner that at every A-D conversion cycle the A-D conversion completion signal ADCE and the A-D converted digital data DD are delivered. Further as has already been explained, excepting the word time during which the A-D converted digital data DD is delivered, the AELK signal, the AECG signal, the WNUP signal, the AO signal and the CU signal are delivered from the input BAS line 370 in a repeated way in synchronization with the timing pulses $TB_1$–$TB_6$.

Further in case when the integration is carried out by means of the above mentioned integrater 554 in the negative direction after the integrated value corresponding to the input analog data has been obtained through the integration by means of the integrating 554 in the positive direction, the counter 558 is over-flowed before the output of the above mentioned integrator 554 becomes lower than a certain determined level, namely while the output of the comparater 556 remains "1" so that the Flip-Flop 562 is set, the Flip-Flop F18 whose D input terminal is supplied with the output of the above mentioned comparator 556 is set so as to deliver from the Q output terminal the ADOF signal for showing the over-flow of the A-D conversion result, which signal is given to the $X_1$ terminal of the multi-plexer 572. On the other hand, at the same time with the over-flow of the counter 558 the Flip-Flop 560 is reset so that the A-D conversion control circuit 552 supplied with the Q output of the Flip-Flop 560 clears the integrater 554 in such a manner that the output of the comparator 554 goes from "1" down to "0". In consequence the buffer register 564 whose clock terminal is supplied with the output of the above mentioned comparater 554 through the inverter INV8 takes up the then content of the counter 558, whereby because the counter 558 is over-flowed all of the bits are "0", so that all of the bits of the data taken up by the buffer register 564 are "0".

Hereby even when the result of the A-D conversion overflows, the ADCE signal and the INT signal are delivered into the BAS line in accordance with the output of the above mentioned Flip-Flop 560.

Hereby at the time of the speed light photography the result of the A-D conversion over-flows when the speed light device 384 delivers an analog signal for aperture control as the signal for showing the necessity for the manual setting of the aperture value at the side of the camera device in such amount as over-flows the A-D converter 382. Thus at this time, the data taken up by the buffer register 564 with all of the "0" bits are naturally disregarded in this system.

The analog data and various conditions or the state judging signal taken up by the input control part 360 from the mechanical part 358 as mentioned above are given to the central control part 362 through the input BAS line 370 while the signal ADCE for showing the A-D conversion or the INT signal are carried on the BAS line 366.

Now let us revert to the central control part 362 again.

In the central control part 362 and BAS line 366 is connected to the input BAS selecter 578. The above mentioned BAS selecter 578 serves to judge whether the condition signal or the A-D converter data DD the signal carried on the input BAS line after having detected the ADCE signal delivered to the BAS line in synchronization with the timing pulse TB6 is to as to produce an instruction signal of the treatment of the input signal from the above mentioned input BAS line 370.

On the other hand, the above mentioned input BAS line 370 is connected to the condition register 574 of the central control part 362 and to the signal change over circuit 576. While the above mentioned signal change over circuit 576 normally serves as the circulation circuit of the D register 516 for storing the A-D conversion data.

When the above mentioned condition register 574 is supplied with the instruction signal for taking up the conditions from the above mentioned input pulse selecter 378, it takes up and stores the ADOF signal, the AELK signal, the AECG signal, the WNUP signal, the AO signal and the CU signal carried on the above mentioned input BAS line 370 in accordance with the timing pulses $TB_1$–$TB_6$.

Further the above mentioned signal change over circuit 576 normally makes the content DR of the D register circulate, whereby when it is supplied with the instruction signal for taking up the data from the above mentioned input BAS selector 578, it takes up and stores the A-D conversion data DD carried on the above mentioned input BAS line 370 in accordance with the timing pulses $TB_0$–$TB_7$.

In consequence the above mentioned condition register 574 and the D register 516 normally and repeatedly supplied with the new setting condition or operation state and the A-D conversion data DD through the input BAS line 370 so as to store them, whereby especially the taking up period of the A-D conversion data is same as the A-D conversion period of the above mentioned A-D converter. Further the above mentioned signal change over circuit 576 is supplied with the AELK signal from the above mentioned condition register 574, whereby when it is supplied with this AELK signal, even if it is supplied with the instruction signal for taking up data from the above mentioned input BAS selecter 578, it never takes up the A-D conversion data newly, containing the circulation of the data DR of the D register 516. By means of the above mentioned mechanism the AE lock is carried out in this camera system.

The mechanism how to take up the condition signal and the A-D conversion data DD from the above mentioned input BAS line 370 into the central control part 362 will be explained below more in detail.

In case now the A-D conversion completion signal ADCE is carried on the BAS line in synchronization with the timing pulse $TB_6$ after the A-D conversion has been completed in the input control part 360, the A-D conversion data DD is delivered to the input BAS line from the lower figures in sequence in synchronization with the timing pulses $TB_0$–$TB_7$ during the next word time after the above mentioned ADCE signal is delivered, as has already been explained, in such a manner that also at the side of the central control part 362 the A-D conversion data DD can be stored in the above mentioned register 516 by taking up the input BAS line into the D register 516 in synchronization with the $TB_0$–$TB_7$ during the next word time after the ADCE signal in synchronization with the timing pulse $TB_6$ has been inspected. Further various signals are carried on the input BAS line 370 from the input control part 360 during other word times than the above, so that the condition register 574 has only to take up the signals from the above mentioned input BAS line 370 in accordance with the timing pulses.

In consequence the above mentioned input BAS selecter 578 has only to be so designed as to take up the signal of the BAS line 366, to detect whether the ADCE signal is delivered in synchronization with $TB_6$ and to deliver the instruction signal for taking up the A-D conversion data from the input BAS line 370 during the next 1 word time.

Figure 58:
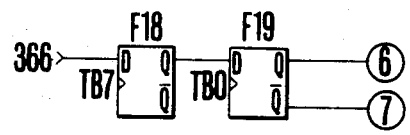
FIG. 58 shows a logic composition of the input pass selector 578.

From the above mentioned view point the above-mentioned input BAS selecter 578 in the present embodiment is constituted as is shown in FIG. 58. Namely as is clear from the drawing, the BAS line 366 is introduced to the D terminal of the Flip-Flop F18 in synchronization with the timing pulse $TB_7$, whereby the Q output of this Flip-Flop F18 is given to the D terminal of the Flip-Flop F19 in synchronization with the timing pulse $TB_0$.

Figure 59:
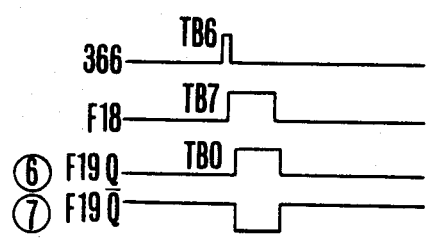
FIG. 59 shows a time chart for explaining the operation of the Flip-Flops F18 and F19 shown in FIG. 58.

In the above mentioned composition, the Flip-Flops F18 and F19 carry out the operation as is shown in FIG. 59. Namely the Flip-Flop F18 in synchronization with the timing pulse $TB_7$ is not set so far as its D terminal input is not "1" at least in synchronization with $TB_6$, namely so far as there is no ADCE signal in the BAS line 366. The Q output of the Flip-Flop F18 at this time is "0", so that the Flip-Flop F19 whose D terminal is supplied with this "0" output in synchronization with the timing pulse $TB_0$ is in the reset state and its $\overline{Q}$ output (7) is "1". This (7) signal is given to the above mentioned condition register 574 in such a manner that the condition register 574 takes up the content of the input BAS line.

Figure 60:
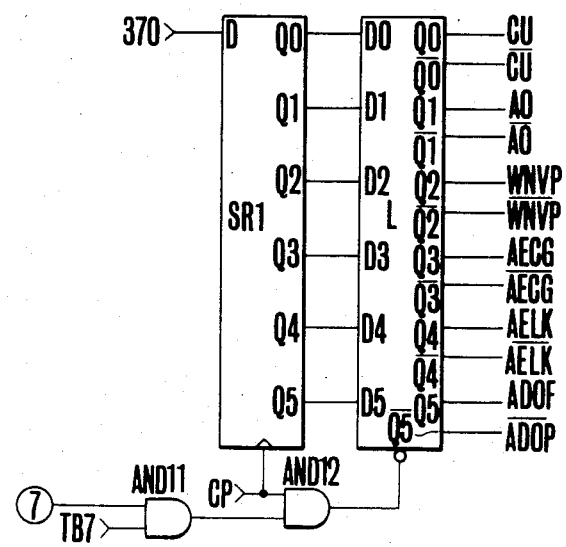
FIG. 60 shows a block diagram of the condition register 574.

Such a condition register 574 is constituted as is shown in detail in FIG. 60, whereby, as is clear from the drawing, the register 574 consists of the shift register $SR_1$ and the latch L taking up in synchronization with the rising up of the clock pulse.

The D terminal of the above mentioned shift register $SR_1$ is connected to the input BAS line 370 so as to take up the data from the input BAS line 370 in synchronization with the clock pulse CP. In case of such composition the signals carried on the input BAS line 370 with respective clock pulses CP are all taken up by this shift register SR in sequence so as to be delivered from the output terminals $Q_0$–$Q_5$ in sequence in synchronization with respective clock pulses CP. Consequently in this state the output datas from the output terminals $Q_0$–$Q_5$ of the above mentioned shift register $SR_1$ are all uncertain datas, whereby during the time during which no A-D conversion data DD is not carried on the above mentioned input BAS line 370, namely during the time of the timing pulse $TB_7$ excepting the next 1 word time after the ADCE signal has been delivered to the BAS line 336 the CU signal, the AO signal, the WNUP signals, the AECG signal, the AELK signal and ADOF signal are delivered respectively from the output terminals $Q_0$–$Q_5$ of the shift register $SR_1$. This is clear from the fact that the above mentioned CU signal is carried on the input BAS line 366 in synchronization with the timing pulse $TB_5$, the AO signal in synchronization with the timing pulse $TB_4$, the WNUP signal in synchronization with the timing pulse $TB_3$, the AECG signal in synchronization with the timing pulse $TB_2$, the AELK signal in synchronization with the timing pulse $TB_1$, and the ADOF signal in synchronization with the timing pulse $TB_0$. In consequence by supplying the latch L, whose terminals $D_0$–$D_5$ are supplied with the outputs from the output terminals $Q_0$–$Q_5$ of the above mentioned shift register $SR_1$ in synchronization of the falling down of the clock pulses, with the signals falling down only during the time during which the timing pulse $TB_7$ is delivered, the latch L can take up and store the signals such as CU, AO, WNUP, AECG, AELK and ADOF. In the present embodiment, by applying the timing pulse $TB_7$ to the AND gate $AND_{11}$ supplied with the signal (7) from the input BAS selector 578, a signal can be obtained in synchronization with the timing pulse $TB_7$ whose output is controlled only during the next 1 word time after the ADCE signal has been delivered, whereby further by applying the obtained signal to the AND gate AND12 supplied with the clock pulse CP a signal in synchronization with the clock pulse CP, namely a signal falling down during the timing pulse $TB_7$ can be obtained so as to be given to the clock terminal of the above mentioned latch L as the taking up signal.

By means of the above mentioned composition, the signal as to the renovated setting condition or operation condition is given to the above mentioned parallel in parallel out register constituting the latch L during each 1 word time excepting the next 1 word time after the ADCE signal has been delivered to the BAS line 366. Hereby the CU signal is delivered from the $Q_0$ terminal of the above mentioned parallel in parallel out register constituting the latch L, the $\overline{CU}$ signal from $\overline{Q}_0$ terminal, the AO signal from the $Q_1$ terminal, the $\overline{AO}$ signal from the $\overline{Q_1}$ terminal, the WNUP signal from the $Q_2$ terminal, the $\overline{WNUP}$ signal from the $\overline{Q_2}$ terminal, the AECG signal from the $Q_3$ terminal, the $\overline{AECG}$ signal from the $\overline{Q_3}$ terminal, the AELK signal from the $Q_4$ terminal, the $\overline{AELK}$ signal from the $\overline{Q_4}$ terminal, the ADOF signal from the $Q_5$ terminal and the $\overline{ADOF}$ signal from the $\overline{Q_5}$ terminal.

Figure 61:
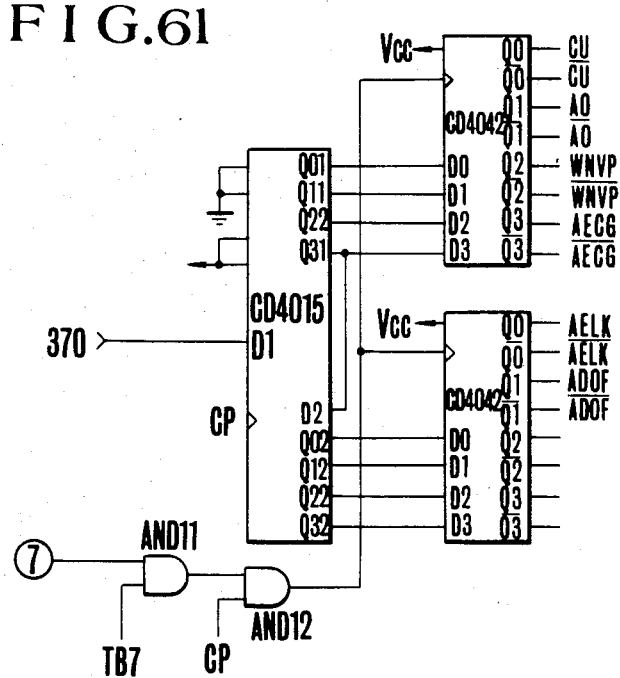
FIG. 61 shows a concrete circuit composition of the circuit shown in FIG. 60 by means of the I.C. circuit element.

Herebe this condition register 574 can be realized with the circuit composition as is shown in FIG. 61. As is clear from the drawing the shift register $SR_1$ shown in FIG. 60 is the integrated circuit element CD4015 while the latch consists of two integrated circuit elements CD4042.

Figure 62:
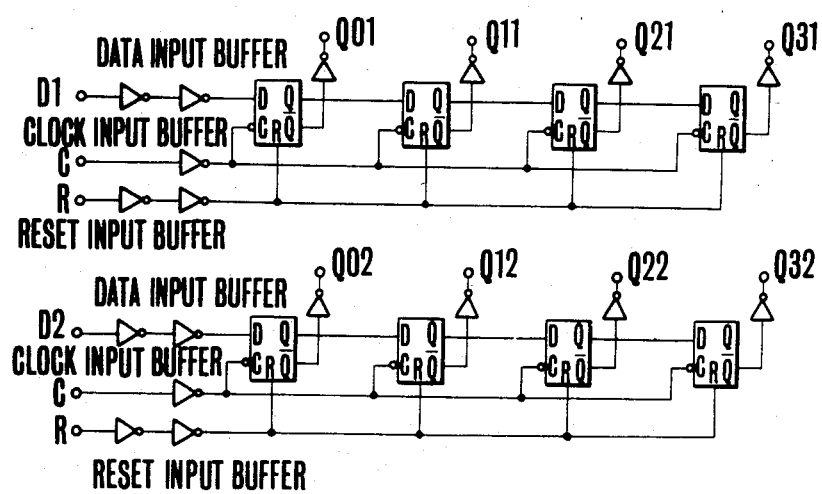
FIG. 62 shows a logic diagram of the I.C. circuit element CD4015.

The above mentioned integrated circuit element CD4015 (manufactured by RCA) is a dual 4 bit static shift register whose logic diagram is shown in FIG. 62, whereby the $Q_{31}$ output is given to the $D_2$ terminal so as to constitute a 8 bit shift register in substance. In this embodiment 6 bits out of the 8 bits are used as a shift register $SR_1$. Further as is clear from the logic diagram shown in FIG. 40, the above mentioned integrated circuit element CD4042 is a 4 bit latch so designed as to take up the datas parallely in synchronization with the falling down of the clock input and keep the datas during the time during which the clock input is "0". Further it is clear that a 8 bit latch can be constituted with two latch CD4042 in parallel. In the present embodiment, 6 bits out of them are used as a latch L.

When on the other hand "1" signal is given to the D terminal of the Flip-Flop F18 shown in FIG. 58 from the BAS line 366 in synchronization with $TB_6$, namely when there is the AECE signal, the above mentioned Flip-Flop F18 is set in synchronization with $TB_7$ so as to produce the "1" Q output. In consequence the Flip-Flop F19 supplied with the above mentioned Q output in synchronization with the timing pulse $TB_0$ is set in synchronization with the rising up of the first timing pulse of the next word time so as to produce the "1" Q output (6). Hereby the Flip-Flop F18 remains in the set state only until the rising up of the next timing pulse $TB_7$ so that the D input of the Flip-Flop F19 has already become "0" at the time of the rising up of the next timing pulse $TB_0$ after this Flip-Flop was set. In consequence the Flip-Flop F19 remains in the set state only during the 1 word time since the rising up of the $TB_0$ still the next rising up of the $TB_0$ so that the Q output (6) is also "1" only during this 1 word time.

This (6) signal is given to the above mentioned signal change over circuit 576 whereby the signal change over circuit 576 supplied with the above mentioned (6) signal stops the circulation of the content of the above mentioned D register 516 so as to introduce the data carried on the above mentioned input BAS line 370 into the D register 516 only during the 1 word from $TB_0$ to $TB_7$. The data introduced during this 1 word time is the A-D conversion data DD carried on the input BAS line 370 during this 1 word time at the side of the input control part 360. Further the data introduced into the D register 516 in this way circulates through the above mentioned signal change over circuit 576 till the introduction of the next data.

Figure 63:
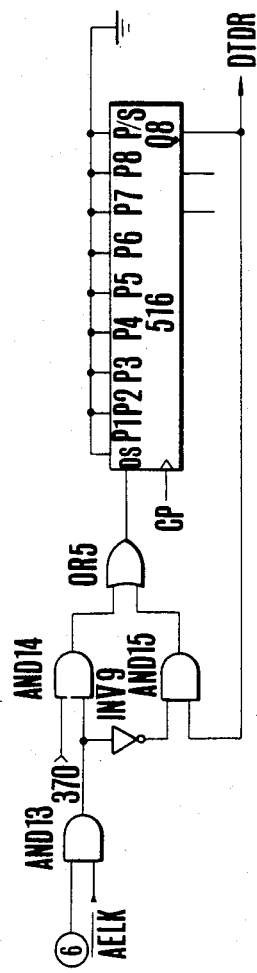
FIG. 63 shows a detailed circuit composition of the signal switch over circuit and D register.
Figure 64:
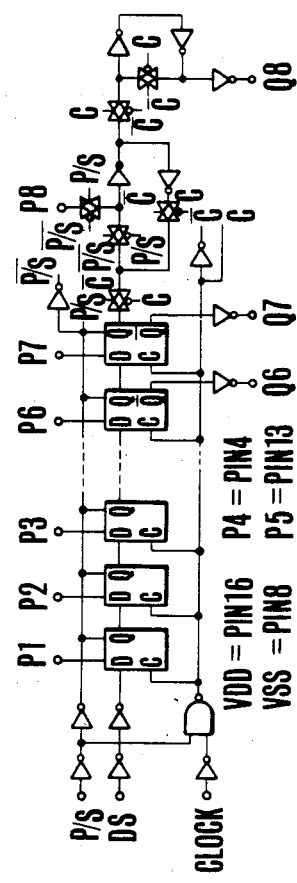
FIG. 64 shows a block diagram of the I.C. circuit element CD4021.

The circuit composition of the above mentioned change over circuit 576 and the D register 516 are as is shown in FIG. 63, whereby as the D register 516 the integrated circuit element CD4021 (manufactured by RCA) of the 8 bit shift register as is shown in block diagram in FIG. 64 is adopted.

In case of the circuit composition shown in FIG. 63, the Q output (6) of the Flip-Flop F19 shown in FIG. 58 and the $\overline{Q_0}$ output $\overline{AELK}$ of the latch L shown in FIG. 60 are applied to the AND gate AND 13 and in consequence when the $\overline{AELK}$ signal is "1" while the instruction signal (6) for taking up the data is "0", the output of this AND gate AND13 is "0". In consequence the output of the AND gate AND14 directly supplied with the output of the above mentioned AND gate AND13 is controlled while the AND gate AND15 supplied with the output of the AND gate AND13 through the inverter INV9 is in the conductive state so that the content DR of the D register 516 circulates through the $Q_8$ terminal, the above mentioned AND gate AND15 and the above mentioned OR gate OR5.

On the other hand, even when the Q output of the above mentioned Flip-Flop F19, namely the instruction signal for taking up the data is "1", the $\overline{AELK}$ signal becomes "0" in the AE lock state and therefore the output of the above mentioned AND gate AND13 is "0" so that the D register 516 does not take up the A-D conversion data from the input BAS line 370, keeping the content DR, namely the A-D conversion data DD taken up before in circulation through the AND gate AND15 and the OR gate OR5.

When on the other hand, the $\overline{AELK}$ signal is "1" while further the Q output (6) of the above mentioned Flip-Flop F19, namely the instruction signal for taking up the data becomes "1", the output of this AND gate AND13 becomes "1" in such a manner that the AND gate AND14 supplied with the output of the above mentioned AND gate AND13 at this time is brought into the conductive state, whereby the output of the AND gate AND15 supplied with the output of the AND gate AND13 through the inverter INV9 is controlled. Thus the A-D conversion data DD carried on the input BAS line 370 only during the time during which the Q output (6) of the above mentioned Flip-Flop F19 is "1" is taken up by the above mentioned D register 516 through the above mentioned AND gate AND14 from the lower figures in sequence in synchronization with the timing pulses $TB_0$–$TB_7$.

By means of the above mentioned composition, the A-D conversion data DD and various conditions or condition signals obtained in the above mentioned input control part 360 are introduced into the central control part 362.

In FIG. 30, 500 is an operation circuit so designed as to carry out the desired operation between the data AR of the A register 510 and the data pointed out by means of the data selector 502 in accordance with the operation instruction from the instruction ROM504. Hereby the operation instruction delivered from the above mentioned instruction ROM504 at this time includes the afore mentioned eight operation control routines in such a manner that an operation control routine is selectively brought into practice in accordance with the respective photographic mode.

The above mentioned operation circuit 500 cooperates with the auxiliary registers such as the B register 512 and the C register 514 beside the A register. Hereby 506 is the gate for making the data BR from the above mentioned B register 512 circulate or taking up the data AR from the above mentioned A register 510, while 508 is the gate for making the data CR from the above mentioned C register 514 circulate or taking up the data AR from the A register 510.

The above mentioned data selector 502 is so designed as to selectively give one of the datas introduced through the nine terminals a, b, c, d, e, f, g, h and i to the above mentioned operation circuit 500 in accordance with the above mentioned instruction ROM504.

The film sensitivity data DTSV is introduced through the terminal a of the above mentioned data selector 502, the smallest aperture value data DTAO through the b terminal, the vignetting error data DTAC through the c terminal, the shutter time data DTTV through the d terminal and the aperture value data DTAV through the e terminal, whereby how these datas such as DTSV, DTAO, DTAC, DTTV and DTAV are obtained is as has already been explained.

Further, out of some fixed datas stored in the fixed data ROM534 the data pointed out by means of the instruction ROM504 is taken up through the f terminal of the above mentioned data selector 502.

The datas stored in the above mentioned fixed data ROM534 are the CSTO all of whose bits are "0", the CSTC, the CSTD and CSTE for other specified data, the CSTF all of whose bits are "1", TMIN for the shortest shutter time obtainable in the camera body 4 without control, the TMAX for the longest shutter time obtainable in the camera body 4 without control, the TSYN for the speed light synchronization shutter time at the time of the speed light photography, the constants $CST_1$ and $CST_2$ for the operation and the largest aperture value AMAX of the photographic lens device 2 and so on, whereby these datas are selectively given to the f terminal of the data selector 502 in accordance with the instruction from the instruction ROM504.

Further a plural number of the data AMAX relative to the above mentioned largest aperture value are stored in the above mentioned fixed data ROM534, whereby these aperture values are accordingly selected and delivered in accordance with the data AMAX' relative to the largest aperture value introduced from the lens device 2 into the camera body 4.

Hereby the fixed datas stored in the above mentioned fixed data ROM534 are the constants for various operations, the restriction due to the mechanism of the lens device 2 or of the camera body 4, for example the upper and the lower limit of the shutter time and so on, whereby they are set correspondingly in accordance with the efficiency of the lens device 2 or of the camera body 4, the operation system, the system of the data setting or restriction and so on.

Further the respective contents DD, BR and CR of the D register 516, the B register 512 and C register 514 are selectively taken up through the terminals g, h and i of the above mentioned data selector 502.

Further through which of the terminals a-i of the above mentioned data selector 502 the datas are introduced into the operation circuit completely depends upon the instruction from the instruction ROM504, whereby all of the datas selected by this data selector 502 are introduced into the operation circuit 500.

The above mentioned operation circuit 500 serves to carry out the operation control operation such as the introduction of the data selected by means of the above mentioned data selector 502 into the A register 510, the storing of the result of the desired operation between the data AR of the above mentioned A register with the data selected by means of the above mentioned data selector 502 into the A register 510, the setting of the carrier Flip-Flop 540 when the result of the above mentioned operation is "carry" or "borrow" or the exchange of the content AR of the above mentioned A register 510 for the content BR of the B register 512 or for the content CR of the C register 514.

Below the instruction ROM504 for giving the operation control instruction to the above operation circuit 500 will be explained.

The instruction ROM504 provided in the central control part 362 includes, as has already been explained, eight operation control routines, whereby these eight routines are selected in accordance with the state of the SPDW signal and the ASLC signal delivered from the condition signal memory circuit 548 as well as of the state of the AO signal and the CU signal delivered from the condition register 574. The program selector 580 serves to determine the operation control routine of the above mentioned instruction ROM504 in accordance with the state of the SPDW signal, the ASLC signal, the AO signal and the CU signal.

The above mentioned instruction ROM504 carries out the routine selected and set by means of the above mentioned program selector 580, being designed so as to produce the control signal for the system, whereby the program counter 582 is provided in order to carry out each routine. To the inhibit terminal of this program counter 582 the latch 584 is connected, whereby this latch is provided in order to restrict the counting operation of the program counter 582 in such a manner that the above mentioned program counter 582 can not be started so far as no A-D conversion data DD is obtained after the completion of the first A-D conversion, whereby the above mentioned restriction is released so as to start the counting operation of the above mentioned program counter 582 at the same time when the first ADCE signal is detected by means of the above mentioned input BAS selector 578.

The above mentioned program counter 582 is so designed as to count up one by one for each timing pulse $TB_0$, whereby in case of this system the operation control operation for one step is carried out by means of the above mentioned instruction ROM504 substantially during the 1 word time of the timing pulses $TB_0$-$TB_7$.

After then the above mentioned program counter 582 repeats the counting operation continuously, delivering a signal every time when the counting operation proceeds to a certain step. This signal means that the above mentioned instruction ROM504 has terminated the operation control for one routine and is given to the logic circuit 598. After a time element being added, this signal is on the one hand delivered as the CALE signal to be carried on the BAS line 366 in synchronization of the timing pulse TB5 for showing the completion of one operation and on the other hand as the RSND signal to be delivered with the next timing pulse $TB_0$ after the above mentioned CALE signal has been delivered, so as to carry the data to transferred on the output BAS line 374.

Now detailed explanations will be made on the set up of such program selector 580, program counter 582, instruction ROM504 as mentioned above.

Figure 65:
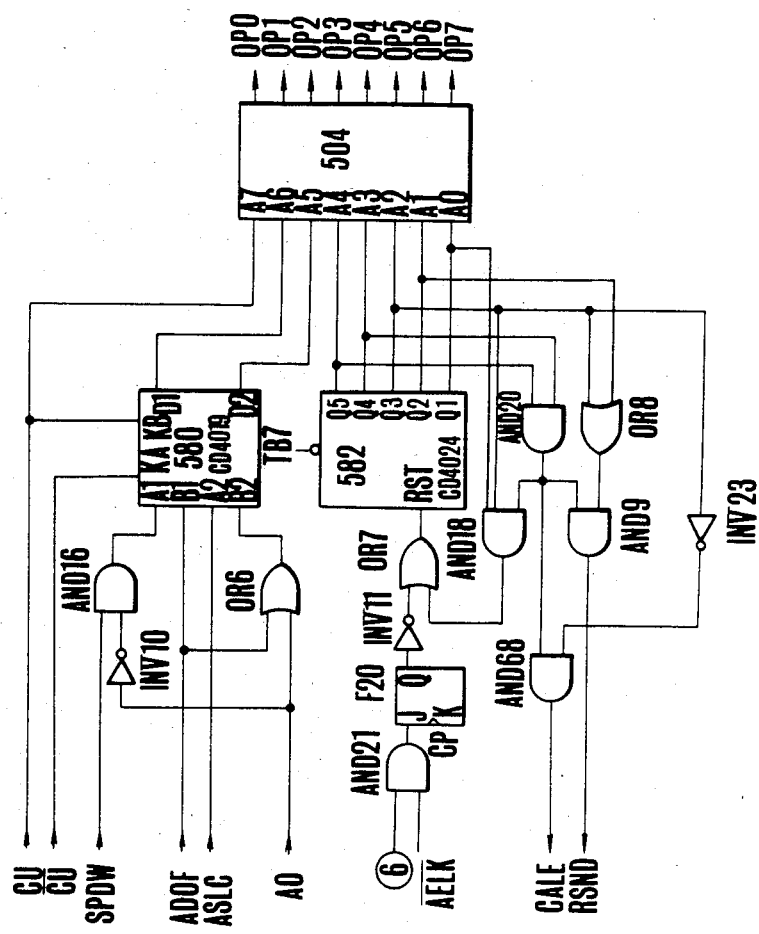
FIG. 65 shows a partial block diagram of the control system of the instruction ROM504 and of the logic circuit 598.

FIG. 65 shows a block diagram for a control system for the instruction ROM504, the logical circuit 598, the latch circuit 584, the program selector 580 and the program counter 582. In said drawing, the program selector 580 consists of integrated circuit element CD4019 (manufactured by RCA), and said integrated circuit element CD4019 is an AND.OR selected gate as having its logic diagram shown in FIG. 66. Also while the program counter 582 consists of integrated circuit element CD4024 (manufactured by RCA), said integrated circuit element CD4024 is a ripple counter as having its logic diagram shown in FIG. 67.

Said program selector 580 has the $\overline{CU}$ signal which is the output of said conditional register 574 inputted in the KA terminal thereof, and has the CU signal inputted into the KB terminal thereof, and the selector 580 is so made that when the system is not set at a speed-light photographing mode each output signal of the terminals $A_1$, $A_2$ is outputted at each of the output terminals $D_1$, $D_2$, while each input signal of the terminals $B_1$, $B_2$ is outputted at each of the output terminals $D_1$, $D_2$ at a time of speed-light photographing mode. While the output of the AND gate AND16 is given to the terminal $A_1$ of said program selector 580, and AND gate AND16 has SPDW signal and $\overline{AO}$ signal which is obtained through the inverter $INV_{10}$ inputted therein. Also ADOF signal is inputted into the terminal $B_1$ of said selector 580, and ASLC signal is inputted into the terminal $A_2$ of the same, while AO signal and ASLC signal are inputted into the terminal $B_2$ of the same through the OR gate OR6.

In the above mentioned set up said program selector 580 can select four computation control programs when the $\overline{CU}$ signal is "1", that is when the system is not set at a speed-light photographing mode and can select four computation control programs when the CU signal is "1" that is at a time of speed-light photographing mode, respectively, thus the eight operation control routines explained before can be designated as a whole.

While said instruction ROM504 can carry out the instructions of $2^8$ (=256) steps by combination of eight input terminals $A_0$ to $A_7$, the system of this example is so made as carrying out eight routines consisting of 32 steps, and by the combinations of the inputs from its terminals A5 to A7 the above mentioned light operation control routines i.e. each routine of 32 steps are carried out following the inputs from the terminals $A_0$–$A_4$. Said instruction ROM504 has CU signal given to its input terminal A7, and receives the signal input from each of the output terminals $D_1$, $D_2$ of said program selector 580 at each of the input terminals A6, A5. Also, each of the input terminals $A_0$ to $A_4$ of said ROM504 receives each of the outputs $Q_1$ to $Q_5$ of the counter 582.

Said program counter 582 has such set up as making count-up one by one in synchronism with each of down rising of the timing pulse $TB_0$. For the start up of the instruction ROM504, some A-D conversion data DD needs to be accumulated at the D register 516 as a result of first A-D conversion, and if said program counter 582 counts up while A-D conversion is not completed after a power source switch is put in and no A-D conversion data DD are accumulated at said D register 516, it may cause erroneous operation. Therefore, this system employs such set up that said program counter 582 first initiates count up operation only after A-D conversions is completed at the input control part 360 in a state wherein AE lock is not done. That is, when first ADCE signal is placed on the BAS line 366 in a state where AE lock is not placed by introducing the Q output (6) of the Flip-Flop F19 (FIG. 58) of the input BAS selector 578 provided at the central control part 362 and the output of the AND gate AND21 receiving such $\overline{AELK}$ signal as showing that the system AE is not in a locked state into the J terminal of the JK type Flip-Flop F20, said Flip-Flop F20, is set to make its Q output as "1". Therefore, the program counter 582, which has the Q terminal output of said Flip-Flop F20 inputted into the direct reset terminal RST through the inverter $INV_{11}$, OR gate OR7, has the input at the direct reset terminal RST made as "0" at the same time when said Flip-Flop F20 is set and starts count-up action in synchronism with down rising of the timing pulse TB7.

Figure 68:
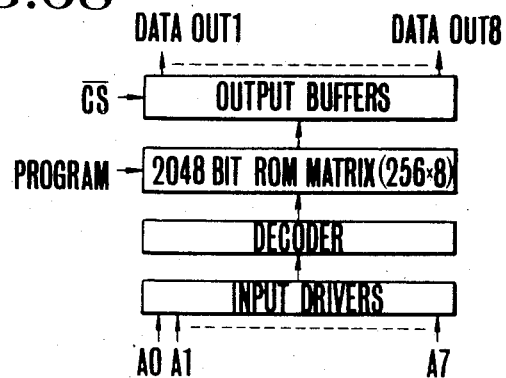
FIG. 68 shows a block diagram of the instruction ROM504.

While said instruction ROM504 has eight output terminals $OP_0$ to $OP_7$, instruction code is constituted by the outputs of 3 bits, OP7 to OP5, and the operand code is constituted by 5 bits, OP4 to $OP_0$. As such instruction ROM504, such integrated circuit element 1702A (manufactured by INTEL) as having its block diagram shown in FIG. 68 is used in this example.

The output code of said instruction ROM504 has such meaning as shown in the code explanation chart of FIG. 69.

Now, explanations will be made on the instruction code.

That is, OP7 is to determine whether an instruction relates to operation or to data exchange, wherein OP7 instructs operation when OP7 is "0", while it instructs data exchange when OP7 is "1".

When OP7 is "0", that is when operation instruction is given, OP6 is to instruct the content of said operation wherein when OP6 is "0", it instructs addition, while when OP6 is "1", it instructs subtraction.

Also at this time OP5 is to instruct the diaposition of the result of said operation, wherein when OP5 is "0" it instructs not to record the operation result in the A register 510, while when OP5 is "1", it instructs to record the operation result in the A register 510.

Contrary to this, when $OP_1$ is "1" that is when data exchange instruction is given, OP6 is to instruct the condition of data exchange, wherein when OP6 is "0", it is invalid as the carry Flip-Flop 540 is in reset state, and when OP6 is "1", it is valid as the carry Flip-Flop 540 is in reset state.

Also at this time, OP5 is to instruct the condition of data exchange, wherein when OP5 is "0" it is invalid as the carry Flip-Flop 540 is in set state, while when OP5 is "1", it is valid as the carry Flip-Flop 540 is in set state.

As what is mentioned above is consolidated and studied individually, it is revealed that when OP7 is "0", OP6 is "0", and when OP5 is "0", the content AR of the A register 510 and the data designated by the operand code are added, but the result thereof is not written in the A register 510, thus it means that nothing is done. Said instruction will be called as NOOP in the explanations given hereinafter.

When OP7 is "0", OP6 is "0", and when OP5 is "1", the content AR of the A register 510 and the data designated by the operand code are added then the result thereof is written in the A register 510, that is so-called addition is instructed. This instruction will be called as ADD in the explanations given hereinafter.

When OP7 is "0", OP6 is "1", and when OP5 is "0", the data designated by the operand code is subtracted from the content AR of the A register 510 and the result thereof is not written in the A register 510, and this operation is to find out whether the carry Flip-Flop 540 is set as a result of operation rather than to obtain the operation result, thus the content of the A register 510 and the data designated by the operand code are compared. This instruction will be called as LT in the explanations given hereinafter.

When OP7 is "0", OP6 is "1", and when OP5 is "1", the data designated by the operand code is subtracted from the content AR of the A register 510 then the result thereof is written in the A register 510, that is so-called subtraction is instructed. This instruction will be called as SUB in the explanations given hereinafter.

When OP7 is "1", OP6 is "0", and when OP5 is "0", it instructs that the exchange of the content AR of the A register 510 and the data designated by the operand code is invalid when the carry Flip-Flop 540 is reset or is set, thus it instructs that nothing is to be done. This instruction will be called as NOOP2 in the explanations given hereinafter.

When OP7 is "1", OP6 is "0", and when OP5 is "1", it instructs that the exchange of the content AR of the A register 510 and the data designated by the operand code is invalid as the carry Flip-Flop 540 is reset, but is valid as the same is set, thus it instructs to conduct data exchange only when the carry Flip-Flop 540 is set. This instruction will be called as SWC in the explanations given hereinafter.

When OP7 is "1", OP6 is "1", and when OP5 is "0", the exchange of the content AR of the A register 510 and the data designated by the operand code is valid as the carry Flip-Flop 540 is reset but said exchange is invalid as it is set, thus it instructs that the data exchange is to be done only when the carry Flip-Flop 540 is reset. This instruction will be called as SWN in the explanations given hereinafter.

When OP7 is "1", OP6 is "1", and when OP5 is "1", it is instructed that the exchange of the content AR of the A register 510 and the data designated by the operand code is valid either when the carry Flip-Flop 540 is reset or set, thus it instructs to conduct data exchange regardless of the state of the carry Flip-Flop 540. This instruction will be called as SWU in the explanations given hereinafter.

In the case of said data exchange when the operand with which the data exchange is to be done by the A register 510 is B register 512 or C register 514, the content AR of the A register 510 can be written in the operand, but when the operand is fixed data or set data, the content AR of the A register 510 can not be written in the operand. Therefore in this case, so-called data read out operation wherein the data of operand is one sidedly written in the A register 510 is done instead of data exchange, but in the system of this example a data exchange instruction and a data read out instruction are not specifically distinguished, and said data exchange instruction works as such only when the operand is a register, while it works as a data read out instruction when the operand is other than the register.

As has been explained above said instruction ROM504 has eight instruction systems mentioned above.

Next, explanations will be made on operand code.

OP4 is to distinguish whether an operand is fixed data or variable data, and when OP4 is "0", an operand is fixed data and the fixed data designated by OP3 to OP$_0$ is designated out of the fixed data ROM534. Also when OP4 is "0", operands are variable data, and the variable data inputted from each of the input terminals a to i of the data selector 502 are to be designated.

When OP4 is "0" that is concerning fixed data, the data designated by OP3 to OP$_0$ will be CST$_0$ data of total bits "0" when OP3, OP2, OP$_1$, OP$_0$ are "0000", and will be the CSTC data of "11100000" when the same are "0010", and will be the CSTD data of "11010000" when the same are "0100", and will be the CSTE data of "00011111" when the same are "0110", and will be the CSTF data of total bits "1" when the same are "0111", also will be the slowest shutter speed TMIN controllable by the body 4 of the camera device when OP3, OP2, OP1, OP$_0$ are "1000", and will be the highest shutter speed TMA4 controllable by the body 4 of the camera device when the same are "1001", and will be the maximum aperture value AMA4 controllable by the lens device 2 when the same are "1010", and will be shutter speed TSYN synchronized with speedlight being controlled by the camera device body 4 when the same are "1011", and will be the first constant CST$_1$ for operation when the same are "1100", and will be the second constant CST2 for operation when the same are "1101".

When OP4 is "1", that is concerning variable data, the data designated by OP3 to OP$_0$ will be the content DR of the D register 516 that is DTPR which is AD conversion data DD when OP3, OP2, OP$_1$, OP$_0$ are "1000", and will be DTSV at the time of "1001", DTTV at the time of "1010", DTAV at the time of "1011", DTAO at the time of "1100", DTAC at the time of "1101", DTBR which is the content BR of the B register at the time of "1110", and DTCR which is the content CR of C register at the time of "1111".

Figure 70A:
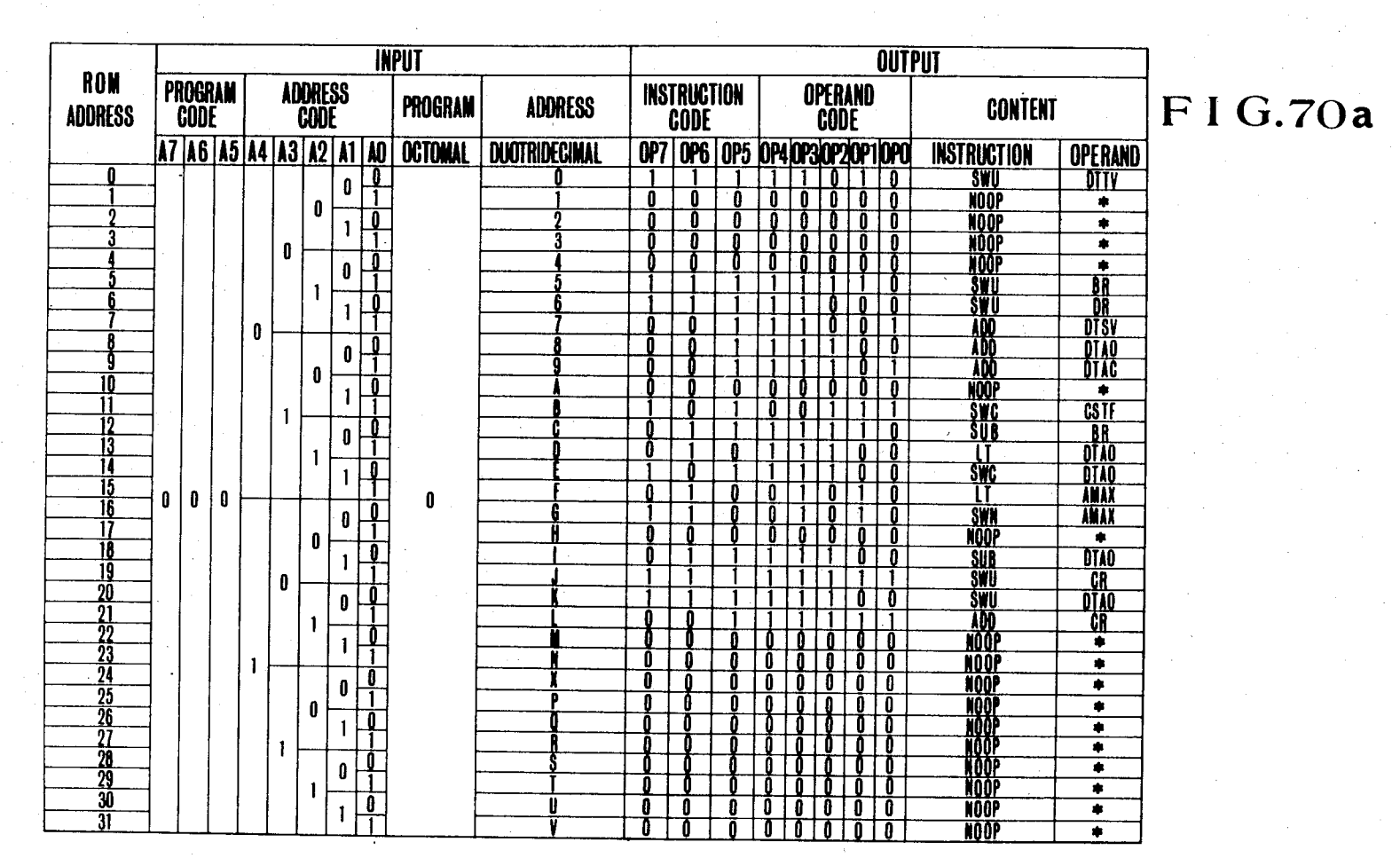
Figure 70C:
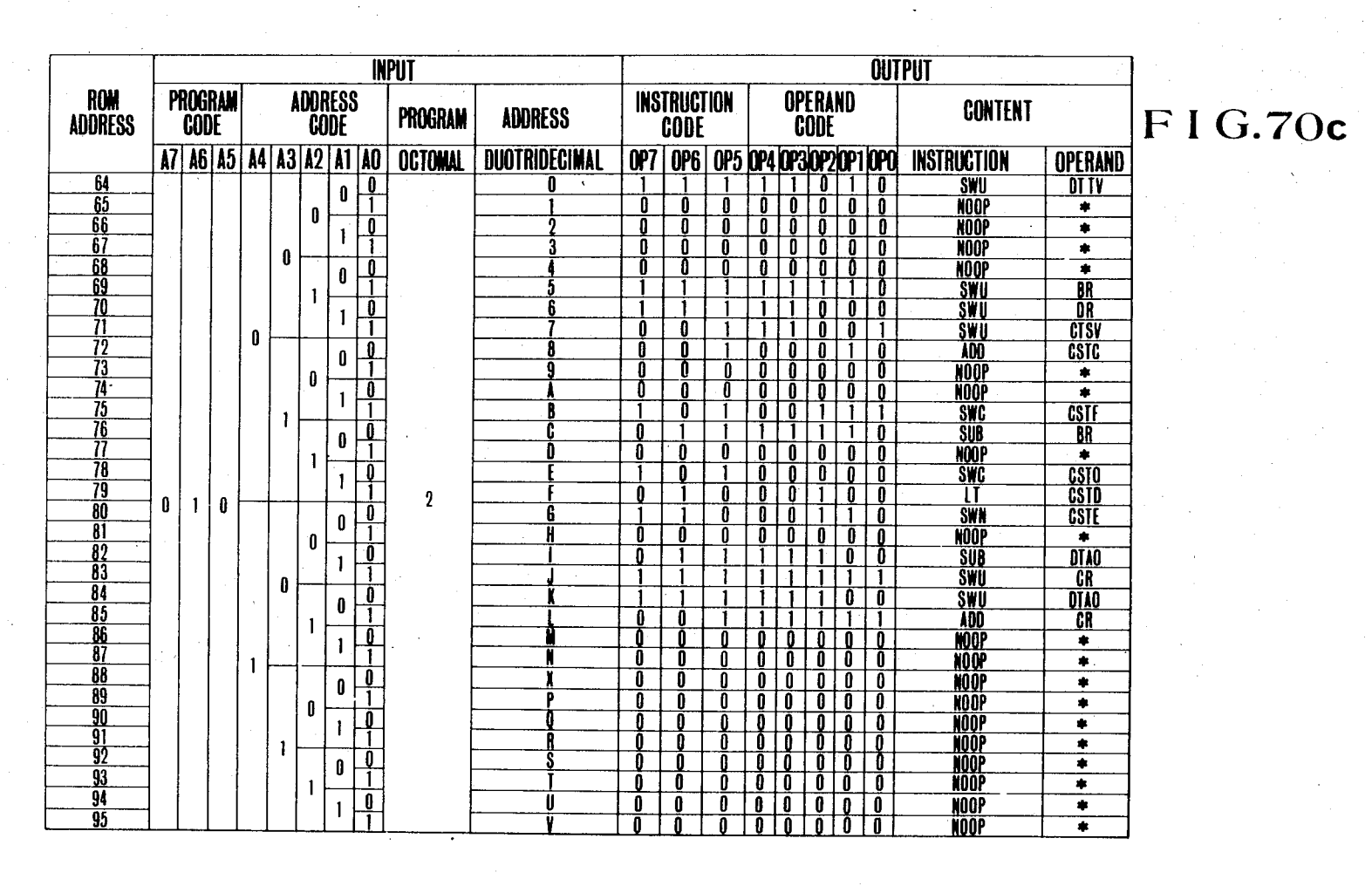

The cross-reference table of the addresses and instructions of said instruction ROM504 and operand code is shown in FIG. 70(*a*) to (*h*).

What are shown in FIG. 70(*a*) are the routines selected in a case when the inputs of the terminals A7 to A5 of the instruction ROM504 are all "0" and are routines applied at a time of non speedlight photographing mode, or at a time when the diaphragm is not closed with a priority on shutter speed, or at a time of external light measuring mode. This corresponds to the third routine shown in FIG. 29.

Also what are shown in FIG. 70(*b*) are routines selected in a case when the inputs at the terminals A7, A6 of the instruction ROM504 are "0" and the input of the A5 terminal is "1", and said routines are applied when the diaphragm is not closed not being in a speedlight photographing mode with a priority on aperture value, or at a time of external light measuring mode. This corresponds to the first routine shown in FIG. 29.

Also what are shown in FIG. 70(*c*) are the routines selected when the inputs at the terminals A7, A5 of the instruction ROM504 are "0" and the input at the terminal A6 is "1", and said routines are applied at a time when speedlight photographing mood is not applied with priority on aperture value and diaphragm is closed not being under external light measuring mode. This corresponds to the second routine shown in FIG. 29.

Also what are shown in FIG. 70(*d*) are routines selected when the input at the terminal A7 of the instruction ROM504 is "0" and the inputs at the terminals A6, A5 are "1", and said routines are applied when speedlight photographing mode is not applied with a priority on shutter time and diaphragm is closed not being under external light measuring mode. This corresponds to the fourth routine shown in FIG. 29.

What are shown in FIG. 70(*e*) are routines selected when the input at the terminal A7 of the instruction ROM504 is "1", and the inputs at the terminals A6, A5 are "0", and said routines are applied when the charging at a speedlight is completed and a speedlight photographing mode is set then the aperture value of the lens device 2 is set at the speedlight device side, and at the same time the shutter speed at a camera device side is controlled semi-automatically. Said routines will be called as the fifth routine in the explanations given hereinafter.

Also what are shown in FIG. 70(f) are routines selected when the inputs at the terminals A7, A5 of the instruction ROM504 are "1" and the input at the terminal A6 is "0", and said routines are applied when the aperture value of the lens device 2 is set at the speedlight device side and at the same time the shutter speed at the camera device side is controlled in a totally automatic manner. Said routines will be called as sixth routine in the explanations given hereinafter.

Also what are shown in FIG. 70(g) are the routines selected when the inputs as the terminals A7, A6 of the instruction ROM504 are "1" and the input at the terminal A5 is "0", and said routines are applied when the aperture value of the lens device 2 is set at the camera device side and at the same time the shutter speed at the camera device side is controlled semi-automatically. Said routines will be called as seventh routine in the explanations given hereinafter.

Also what are shown in FIG. 70(h) are the routines selected when the inputs at the terminals A7, A6, A5 of the instruction ROM504 are "1", and said routines are applied when the aperture value of the lens device 2 is set at the camera device side, and at the same side the shutter speed at the camera device side is controlled in a fully automatic manner. Said routines will be called as eighth routine in the explanations given hereinafter.

Now, at a time of photographing using an external light measuring adapter, the above mentioned first or third routine is employed depending on the state of ASLC signal, and in that case unnecessary operation steps will not be carried out. That is in a case of light measuring using an external light measuring adapter, the fully opened aperture value AVo of the photographing lens device 2 and vignetting error AVe at a time of light measuring need not be considered against TTL light measuring, therefore the steps of conducting correction operation for the fully opened aperture value AVo and the vignetting error AVc may be disregarded in carrying out said first and third routines. Here, said steps in the first and third routines are ADD-DTAO at the eighth step and ADD-DTAC at ninth step as being apparent from FIGS. 70(a), (b).

Also when the A-D converter is overflowed especially as the fifth and eighth routines are carried out, the signal ADOF showing that works as the signal to show the necessity to manually set the aperture value of the lens device 2 at a time of speedlight photographing, but when the A-D converter 382 is overflowed as the first to eighth routines are carried out, the signal ADOF showing that is to show that the data obtained as a result of light measuring are too big, Therefore, in that case some warning needs to be issued, further, the content of the register which is overflowed and has its content becoming unknown needs to be made as the maximum capacity of said register, that is the total bits "1". This operation can be regarded as totally equivalent with the overflow of the A register 510 in a case when the film sensitivity SV, the fully-opened aperture value AVo, the vignetting error AV, etc. are added to BVo, the light measuring result. Therefore, this example is so made that when the A-D converter 382 is overflowed at a time not being in a speedlight photographing mode, direct-set signal is given to the carry Flip-Flop 540 in a step next to the above mentioned addition step that is in the A step out of the steps to carry out first to fourth operation routines, for setting said carry Flip-Flop 540.

Also, when the aperture value or shutter speed obtained as a result of operation exceed the maximum or minimum limit of the aperture value of the lens device 2 or the limit of the shutter speed controllable by the body 4, a warning to show the same needs to be made.

This can be easily realized by flickering the display device 402. Such procedure is a step to distinguish whether the operation result falls within the limit value for the aperture value or shutter speed after the same is introduced as a result of operation, and the flickering display signal AVFL for aperture value or the flickering signal TVFL for shutter speed display may be generated based on the set or reset state of the carry Flip-Flop 540, thus the output of the carry Flip-Flop 540 may be observed at the E step and G step of the first to fourth operation routines.

As has been mentioned above what generates the signals for displaying aperture value of shutter speed of the digital display device 402 in a case when the overflow generated as a result of A-D conversion, the overflow generated as a result of addition of various data to the light measuring data and the aperture value or shutter speed obtained as a result of operation exceed the maginal value of control is a theory circuit 586.

The theory circuit 586 receives the output of said carry Flip-Flop 540 and the output of said program selector 580, and distinguishes the output of said carry Flip-Flop 540 at the specific address designated at the program selector 580 and issues signal to flicker the shutter speed or aperture value displayed at the digital display device 402.

The flickering signal TVFL for shutter speed outputted from said theory circuit 586 is given to the multiplexer 594 after once being memorized at the Flip-Flop 588, while the flickering signal AVF for aperture is given to the multiplexer 594 after once being memorized at the Flip-Flop 590.

Now, since the condition for flickering the shutter speed or aperture value displayed at the digital display device 402 have been previously explained the explanation for the same will be omitted here. And detailed explanations will be made for under what state such flickering signal will be generated in this system.

Also said theory circuit 586 receives RSND signal from the theory circut 598 and said Flip-Flops 588, 590 are reset by said RSND signal.

The theories for generating such signal as disregarding the eighth and ninth steps when the external light measuring adapter is used, for directly setting the carry Flip-Flop 540 by the ADOF signal generated at other times than speedlight photographing mode, and for giving flickering signal to the digital display device 402 against the AD conversion overflow, the overflow generated as a result of adding various data, and the average of the marginal value for the aperture value or shutter speed obtained as a result of operation, are all having close relationship with the output of the program selector 580.

Figure 72:
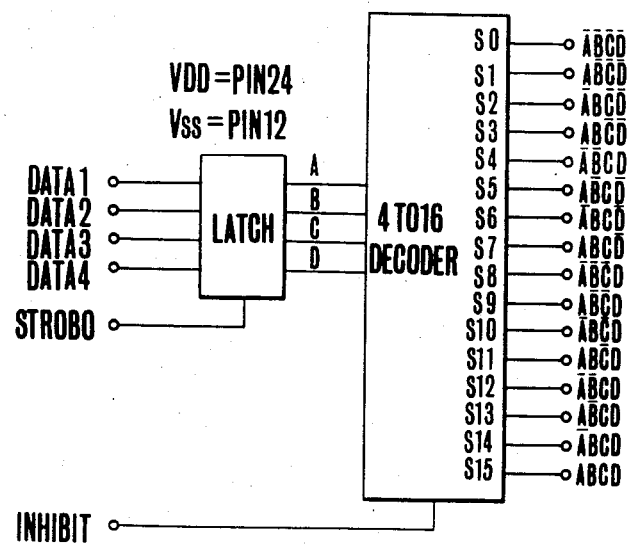
FIG. 72 shows a block diagram of the I.C. circuit element MC14514.
Figure 74:
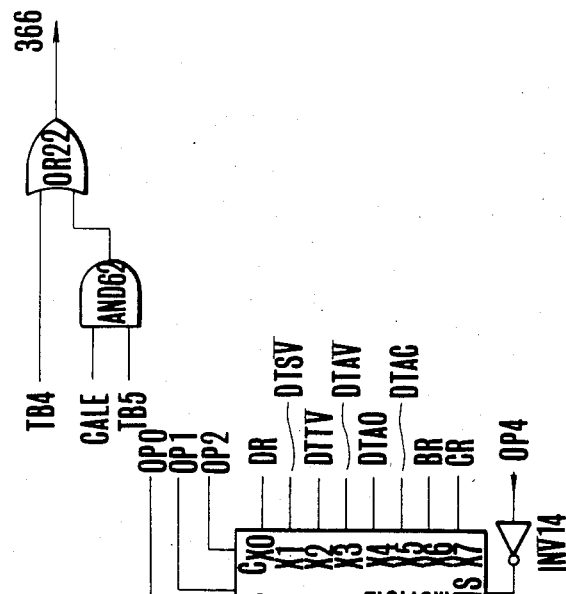
FIG. 74 shows a logic diagram of the logic circuit 598.

While the circuit arrangement diagram to realize said theories is shown in FIG. 71, and what is identified by 600 in said drawing is to show the decoder of 4 bit latch-16 lines consisting of integrated circuit element MC14514 (manufactured by Motollora). Said integrated circuit element MC14514 has such set up as shown in the block-diagram of FIG. 72 and the logic diagram of FIG. 72, and is so made as decode outputting the data of 4 bits being inputted from D1 to D4 at the 16 output lines of S0 to S15.

In the set up shown in FIG. 71 the outputs Q1 to Q4 out of the outputs Q1 to Q5 of the program selector 580 are inputted in the terminals D1 to D4 of the decoder 600. In the same drawing, the AND gate AND27 is detect the ignth step and ninth step in the first or third routine at a time of external light measuring mode for outputting the performance control signal 8 of program, and is so made as receiving input of the signal to show external light measuring mode obtained by giving CU signal and A0 signal to the AND gate AND30, and at the same time receiving the inversion signal of the Q5 output of said program counter 580 by the inverter INV12 and the signal of the outputs S8, S9 of said decoder 600 through OR gate OR9, and outputting the signal 8 following the AND theory of the signal to show that the system is at external light measuring mode and of the signal to show that the output of said program counter 580 is at eighth step or ninth step.

Also the AND gate AND28 is to detect the 10th step at the first to fourth routines when the result of A-D conversion by the A-D converter 382 overflows at a time when the system is not at a speedlight photographing mode and to output the set signal 9 to directly set the carry Flip-Flop 540, and is so made as receiving the input of the signal to show that the A-D converter 382 overflows at the time when the system is not at a speedlight photographing mode being obtained by giving CU signal and ADOF signal to AND gate AND29, and at the same time as receiving the inversion signal of the Q5 output of said program selector 580 by the inverter INV12 and the input of the output S10 of said decoder 600, and as outputting the signal 9, following the AND theory of the ADOF signal at a time when the system is not at speedlight photographing mode and of the signal to show that the output of said program selector 580 is at the 10th step.

The AND gate AND25 is to give input to the J terminal of the Flip-Flop 590 to output the signal AVFL for flickering the display aperture value of the digital display device 402, and the AND gate AND26 is to give input to the J terminal of the Flip-Flop 588 to output the signal TVFL for flickering the display shutter speed of the digital display device 402. The AND gate AND24 has ASLC signal and CU signal inputted therein and is to perform the signal output to show that aperture value is selected with priority at a time when the system is not at speed-light photographing mode, and said output is inputted directly into said AND gate AND26 and into said AND gate AND25 through the inverter INV13. This is done because what is obtained by operation at a time when aperture priority mode is selected is shutter speed, thus it is to prevent the signal which directs flickering from reaching the J terminal of the Flip-Flop 590 for outputting the AVFL signal as said signal comes, and contrary to this at a time not being at aperture priority mode that is as shutter priority mode is selected what is obtained by operation is aperture value, thus it is to prevent the signal which directs flickering from reaching the J terminal of the Flip-Flop 588 for outputting, TVFL signal.

Said signal to direct flickering is given from the OR gate OR11 to both of the AND gates AND25, AND26, and said OR gate output contains the two conditions to output said signal to direct flickering.

One is a first condition outputted through the AND gate AND22, making it as the condition that the carry Flip-Flop 540 is set, wherein said AND gate AND22 receives the input of the set signal CA from said carry Flip-Flop 540.

The other one is a second condition outputted through the AND gate AND23, making it as the condition that the carry Flip-Flop 540 is reset, wherein said AND gate AND23 receives the input of reset signal CA from said carry Flip-Flop 540.

Said AND gate AND22 has the S11, S14 outputs of said decoder 600 inputted therein through the OR gate OR10, and at a same time has the Q5 output of said program selector 580 inputted therein through the inverter INV12, therefore it is so made as receiving the input of CA signal from the carry Flip-Flop 540 and producing output "1" at a time when the program step by said program counter 580 is B step and E step.

Also said AND gate AND23 has the S0 output of said decoder 600 and the Q5 output of said program selector 580 inputted therein, therefore it is so made as producing the output "1" at a time when the input of CA signal is received from the carry Flip-Flop 540 and the program step by said program selector 580 is G step.

Also detailed explanations will be made later on the condition for producing the carry signal CA from said carry Flip-Flop 540.

Now, each of said Flip-Flops 588, 590 receives the input of the inversion signal of the clock pulse CP and the timing pulse TB by the inverter INV14. That is, said two Flip-Flops 588, 590 are in synchronism with the up rising of first clock pulse CP of the time of the timing pulse TB7.

Also each of said Flip-Flops 588, 590 receives the input of RSND signal at its K terminal. Said RSND signal is such that since each routine being proceeded by the program processing output of the program counter 580 is as being apparent from FIG. 70 at L step, being common to eight rountines, as the output of said program selector 580 comes to M step and further the CALE signal to show completion of operation is outputted, then the signal to direct the transfer of each of data obtained as the results of operation thereafter will be outputted, and the very signal just mentioned is the RSND signal.

Said CALE signal and RSND signal are obtained through such logic set up of the theory ciruit 596 as shown in FIG. 65.

Said CALE signal is outputted from the AND gate AND68 which receives the output of the AND gate AND20 receiving the Q5, Q4 outputs of said program counter 582 and the inversion output of the Q3 output of aid program counter 582 by the inverter INV23. Said CALE signal is at high level among the 4 words from X step to R step of the program step as being apparent from FIG. 70.

Also said RSND signal is outputted from the AND gate AND 9 which has the Q2, Q3 outputs of said program counter 582 inputted therein through the OR gate OR8 and the output of said AND gate AND20, that is the signal which is at high level among 8 words from X step to V step, i.e. the last step of the program step inputted therein. Therefore said RSND signal will be outputted as the signal being so set as being at high level among 6 words from Q step to V step, i.e., the last step of the program step as being apparent from FIG. 70.

But the AND condition signal of the output of the AND gate AND18 that is the Q3, Q0 output of said program counter 582 and the output of said AND gate AND20 is given to the direct reset terminal RST of said program counter 582 through the OR gate OR7. At this time the output of said AND gate AND18 is so set as being at high level for 1 word of T step of the program step as being apparent from FIG. 70. But since said program counter 582 is directly reset as the output of said AND gate AND18 becomes to have high level, the output of said AND gate AND18 comes down to low level at a moment of up-rising.

Similarly, since said RSND signal comes down to low level at a moment when the program step comes into T step, said RSND signal will be outputted as the signal being at high level among 3 words virtually from Q step to S step.

Also, said CALE signal is inputted into the AND gate AND62, instituting the partial theory circuit. Since said AND gate AND62 receives the input of the timing pulse TB5, it produces output of "1" signal being synchronized with the timing pulse TB5 while the CALE signal is at high level. The CALE signal being in synchronism with said timing pulse TB5 is placed on BAS line 366 for 4 words through the OR gate OR22. On the other hand said theory circuit 598 places the timing pulse TB4 unconditionally on the BAS line 366 from the OR gate OR22.

Therefore, "0" signal will be placed for 4 bits being in synchronism with the timing pulse TB0 to TB3 on the BAS line 366, and "1" signal will be placed on the same in synchronism with the timing pulse TB4, and CALE signal will be placed on the same in synchronism with the timing pulse TB5, ADCE signal in synchronism with the timing pulse TB6, and INT signal in synchronism with the timing pulse TB7.

Next, explanations will be made on the detailed circuit set up in taking in the data selector 502 and fixed data ROM534 shown in FIG. 30 also the maximum aperture value AMAX of the lens device 2 used following the circuit set up diagram shown in FIG. 75.

Said fixed data ROM534 and 11 data, CSTO, CSTC, CSTD, CSTE, CSTF, TMIN, TMAX, AMAX, TSYN, CST1, CST2 housed in series and consists of six of said series data arranged in parallel. But, the data AMAX only relating to the maximum aperture value of the photographing lens device 2 is different in each of the six parallel data, and houses the data relating to the values of F11, F16, F22, F32, F45, F64 in F number. Said fixed data ROM 534 can be basically made of such integrated circuit element 1702A as shown in FIG. 68.

In such data arrangement, said fixed data ROM534 receives the outputs of OP3 to OPO of the instruction ROM504 at its A3–A6 input terminals, and has specific data of said series data designated. Therefore, by inputting the counter pulses CT1 to CT4.at A0 to A2 terminals respectively, six data being exactly same except AMAX will be outputted consecutively from the lower unit in synchronism with the timing pulses TB0 to TB7 from the output terminals Q0 to Q5 of said ROM 534.

While the output of sid Q0 to Q5 will be inputted into the AND gates AND31 to AND36 respectively, said AND gate AND31 to AND36 will be selectively conductive by the maximum aperture value of the photographing lens device 2 used. The outputs of this AND gates AND31 to AND36 are integrated in the OR gate OR12, and the fixed data designaed by the instruction ROM504 will be outputted from said OR gate OR12.

On the other hand, data relating to the maximum aperture value AMAX of the photographing lens device 2 used are taken into the central control part 362 from the maximum aperture value setting mechanism 530 and are taken into the shift register 358 of 6 bits. Said shift register 538 can be made by using 6 bits of the integrated circuit element CD4015 having its logic diagram shown in FIG. 62. The outputs of Q1 to Q6 of said shift register 538 are always given to the input terminals D1 to D6 of the buffer register 602, and the content of said shift register 538 is taken in the buffer-register 602 and memorized in synchronism with the up rising of the timinig pulse TBO being given to said buffer register 602 as clock. That is, the data AMAX' being taken in said shift register 538 is in synchronism with TB1 to TB6, therefore since the AMAX' is in a state being completely taken in said shift register 538 at a timing of TB7, content of the shift register 538 is taken in the buffer register 602 and memorized in the up rising of TB0.

The Q1 to Q6 outputs of said buffer register 602 are given to said AND gates AND31 to AND36 and make one out of the AND gates AND31 to AND36 selectively conductive.

Here, said fixed data ROM534 receives the OP output of the instruction RM504 at its CS terminal, and as being apparent from the column OP4 of operand code shown in FIG. 69, outputs the data designated by the instruction ROM504 through Q0 to Q5 terminals only when said OP4 is "0".

Figure 76:
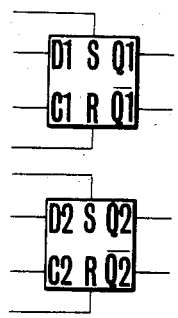
FIG. 76 shows a block diagram of the I.C. circuit element CD4013.

Also, said buffer register 602 can be made by combining three of integrated circuit elements CD4013 (manufactured by RCA). And said integrated circuit element CD4013 is D type Flip-Flop of dual type as being shown in the block diagram of FIG. 76.

When the fixed data housed in said fixed data ROM 534 are designated as operand by the instruction ROM504 in the above mentioned set up, the fixed data designated against the signal line 10 will be outputted consecutively from lower unit in synchronism with the timing pulses TB0 to TB7 from the wired OR gate OR13 receiving the output of said OR gate OR12.

On the other hand the output of the data selector 502 will be given to said wired OR gate OR13. Said data selector 502 is 8 channel data selector consisting of integrated circuit element MC14512 (manufactured by Motollora) having its logic diagram shown in FIG. 53 and is so made that the data inputted from its X0 to X7 terminals are outputted selectively from Z terminal following the input signal from the terminals A, B, C. Each output of OP0, OP1, OP2 is inputted into each of the terminals A, B, C from the instruction ROM504, and as being apparent from FIG. 69, each of the various data, DR, DTSV, DTTV, DTAV, DTAO, DTAC, BR, CR are selectively outputted the Z terminal by combination of the output OP0, OP1, OP2. Also, this data selector 502 receives the input of the OP4 signal at its DIS terminal through the inverter INV14, and receives the input of the OP3 signal through the inverter INV15 at its INH terminal, but as being apparent from the columns of said OP4, OP3 of the operand code shown in FIG. 69, said data selector 502 outputs out of the Z terminal the variable data inputted from the X0 to X7 terminals only when said OP4, OP3 are "1", and outputs the same at the signal line 10 through the wired OR gate OR13.

When the variable data selected by said data selector 502 are designated as operand at the instruction ROM504 through such set up as having being mentioned above, the variable data designated to the signal line 10 are outputted consecuting from lower unit in synchronism with the timing pulses TB0 to TB7 from the wired OR gate OR13 receiving the Z terminal output of said data selector 502.

Also, the theoretical circuit 592 receives the inputs of MNAL signal, $\overline{\text{MNAL}}$ signal, BLB signal, SPDW signal, $\overline{\text{SPDW}}$ signal, $\overline{\text{ASLC}}$ signal from said condition signal memorizing circuit 548, and at a same time receives the inputs of, $\overline{\text{AECG}}$ signal, WNUP signal, C signal from said condition register 574. Said theory circuit 592 distinguishes the above mentioned various signals based on a certain logic and forms display control signal of the digital display device 402 against the output control part 364 and the control signal of the output control part 364.

From said theory circuit 592, WNUP signal to show completion of film wind up, the display instruction signal EDSP for the warning signal, "EEEEEE", the display instruction signal BDSP for "bulb" display, the display instruction signal EFDS for "EF" to show completion of speedlight charging at a time of speedlight photographing mode, and the display instruction signal MDSP for "M" to show the necessity for manually setting the aperture of the lens device 2 are outputted.

Said EDSP signal is generated when there is handling error of a camera device, and this output is made based on the two states, that is, of a case when the closing of the lens device 2 by the closing down lever 64 is done in a state wherein the mark 12 is selected in the lens device 2 as has been mentioned above, and of a case wherein the mark 12 is selected in the lens device 2 in such state as completing the wind up of film and the AE lever 94 at the body 4 side is in a state of AE discharge in a state wherein the closing of the lens device 2 by the diaphragm closing lever 64 is not done.

That is, said EDSP signal is outputted in a state satisfying the following theoretical equation:

$$\text{EDSP} = \text{SPDW} \cdot \overline{\text{MNAL}} + \overline{\text{SPDW}} \cdot \overline{\text{MNAL}} \cdot \text{WNUP} \cdot \overline{A} \cdot \overline{\text{ECG}} \quad (18).$$

Also BDSP signal is the signal outputted when the bulb signal BLB is "1".

Also EFDS signal is the signal outputted when CU signal is "1".

Also, said MDSP signal is outputted in such two states that the closing of the lens device 2 by the diaphragm closing lever 64 is not done in a state wherein aperture value is set by the aperture setting ring 8 of the lens device 2, or the diaphragm closing by the diaphragm closing 64 is done at a time of shutter priority mode. That is, MDSP signal is outputted in such state as satisfying the following theoretical equation:

$$\text{MDSP} = \overline{\text{SPDW}} \cdot \text{MNAL} + \text{SPDW} \cdot \text{MNAL} \cdot \overline{\text{ASLC}} \quad (19).$$

Figure 77:
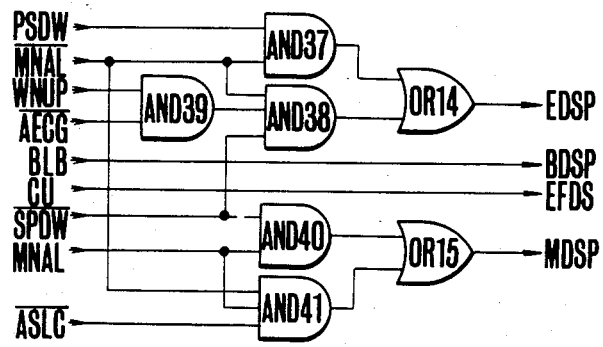
FIG. 77 shows a logic diagram of the logic circuit 592.

Said theory circuit 592 has its logic diagram shown in FIG. 77. In said drawing, AND gates AND 37, AND38, AND39 and the OR gate OR14 are theoretical set up to satisfy said equation (18), and EDSP signal is obtained from OR gate OR14. Also the AND gates AND40, AND41 and OR gate OR15 are theoretical set up to satisfy said equation (19), and MDSP signal is obtained from the OR gate OR15.

The output of said theory circuit 592 and the outputs TVF, AVF of the Flip-Flops 588, 590 are then given to the multiplexer 594 and are converted to such signal as synchronized with the timing pulses TB0 to TB7.

Figures 53, 54:
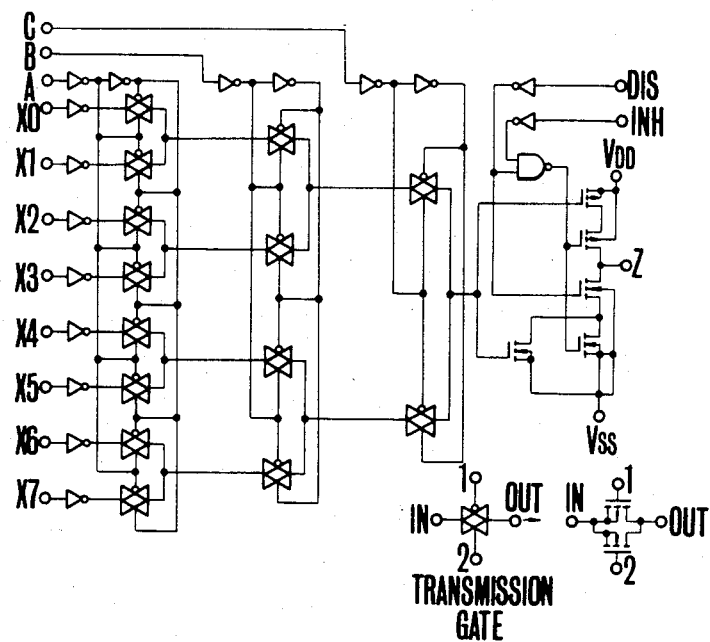
FIG. 53 shows a logic diagram of the I.C. circuit element MC14512.
FIG. 54 shows the trouth value table of the I.C. circuit element shown in FIG. 53.
Figure 78:
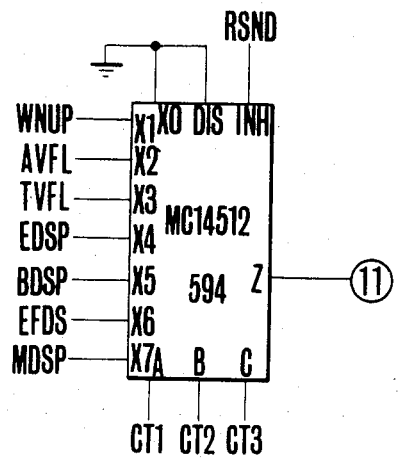
FIG. 78 shows a block diagram of the multiplexer 594.

FIG. 78 is a block diagram of said multiplexer 594, and the integrated circuit element MC14512 having its detailed logic diagram shown in FIG. 53 can be applied to said multiplexer. Said multiplexer has the input terminals X0 to X7, and the X0 terminal is grounded, and its X1 terminal receives the input of WNUP signal, and its X2 terminal receives the input of AVFL signal, its X3 terminal receives the input of TVFL signal, its X4 terminal receives the input of EDSP signal, its X5 terminal receives the input of BDSP signal, its X6 terminal receives the input of EFDS signal, and its A7 terminal receives the input of MDSP signal. These input signals are outputted in series to the signal line 11 from the Z terminal as the signal being synchronized with the timing pulses TB0 to TB7 by the counter pulses CT1, CT2, CT4 being inputted in each of the terminals A, B, C.

As has been mentioned above WNUP signal is outputted at the signal line 11 in synchronism with the timing pulse TB1, AVFV signal is outputted at the same in synchronism with the timing pulse TB2, TVFL signal with the timing pulse TB3, EDSP signal with the timing pulse TB4, BDSP signal with the timing pulse TB5, EFDS signal with the timing pulse TB6, and MDSP signal with the timing pulse TB9.

Here, said multiplexer 594 receives the input of RSND signal at its INH terminal, and has the signal output from its Z terminal controlled while the RSND signal is outputted.

Figure 79:
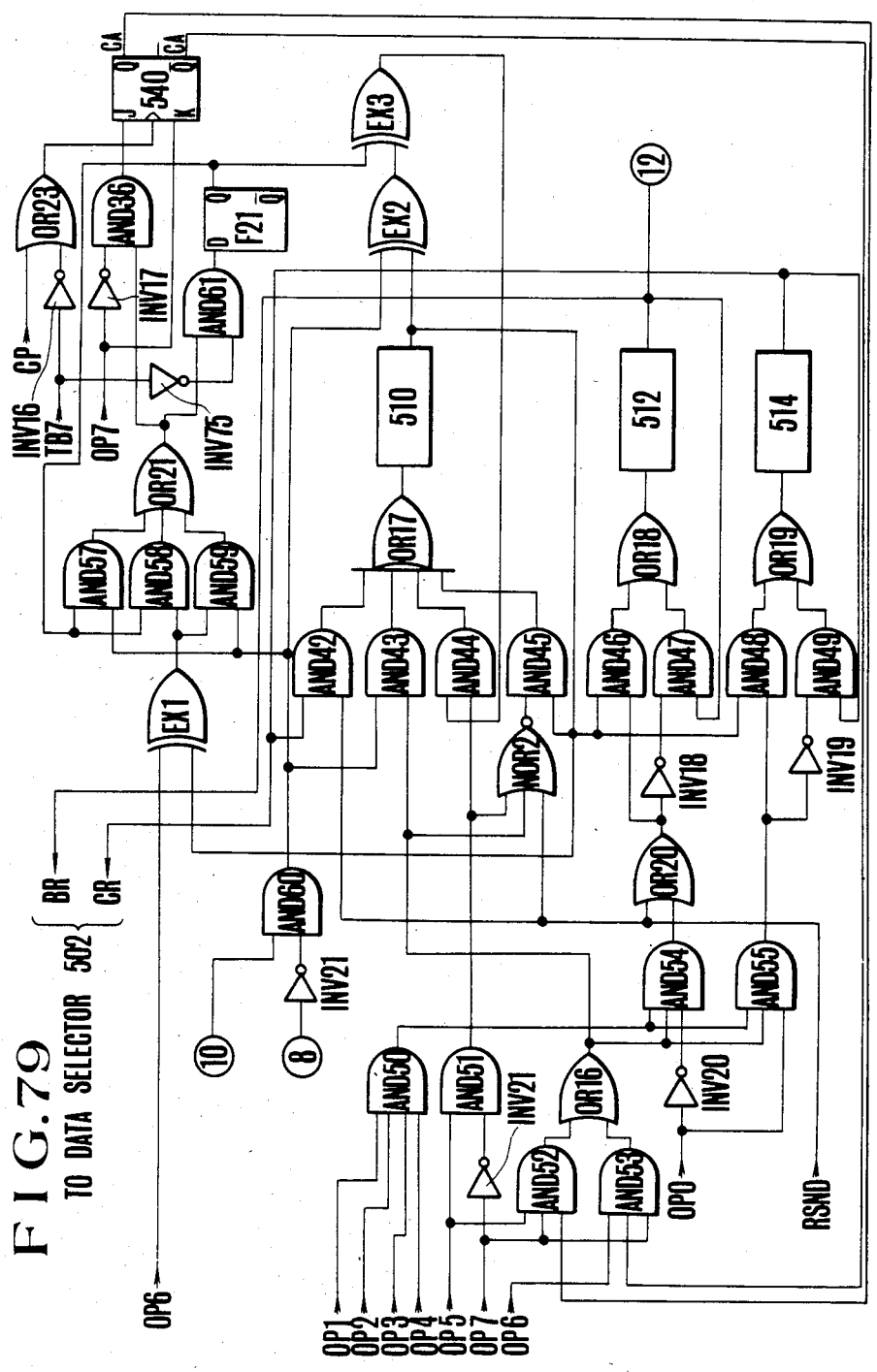
FIG. 79 shows a logic diagram of the operation circuit 500.

FIG. 79 is a logic diagram of the operation circuit 500 shown in FIG. 30, and the AND gate AND45 in said drawing is to show a circulating gate for A register 510, and the AND gate AND47 is to show a circulating gate for B register 512, while the AND gate AND49 is to show a circulating gate for C register 514, respectively. The A register 510, B register 512, C register 514 circulate the contents AR, BR, CR, respectively thereof, through each of said AND gates AND45, AND47, AND49.

This operation circuit 500 is controlled by the operation control instructions OP0, OP1, OP2, OP3, OP4, OP5, OP6, OP7 from said instruction ROM504. While the output of said instruction ROM504 is divided into the instruction codes OP7, OP6, OP5 and the operand codes OP4, OP3, OP2, OP1, OP0 as shown in FIG. 69, each of said codes is decoded to conduct required operation and control action in said operation circuit 500.

Figure 75:
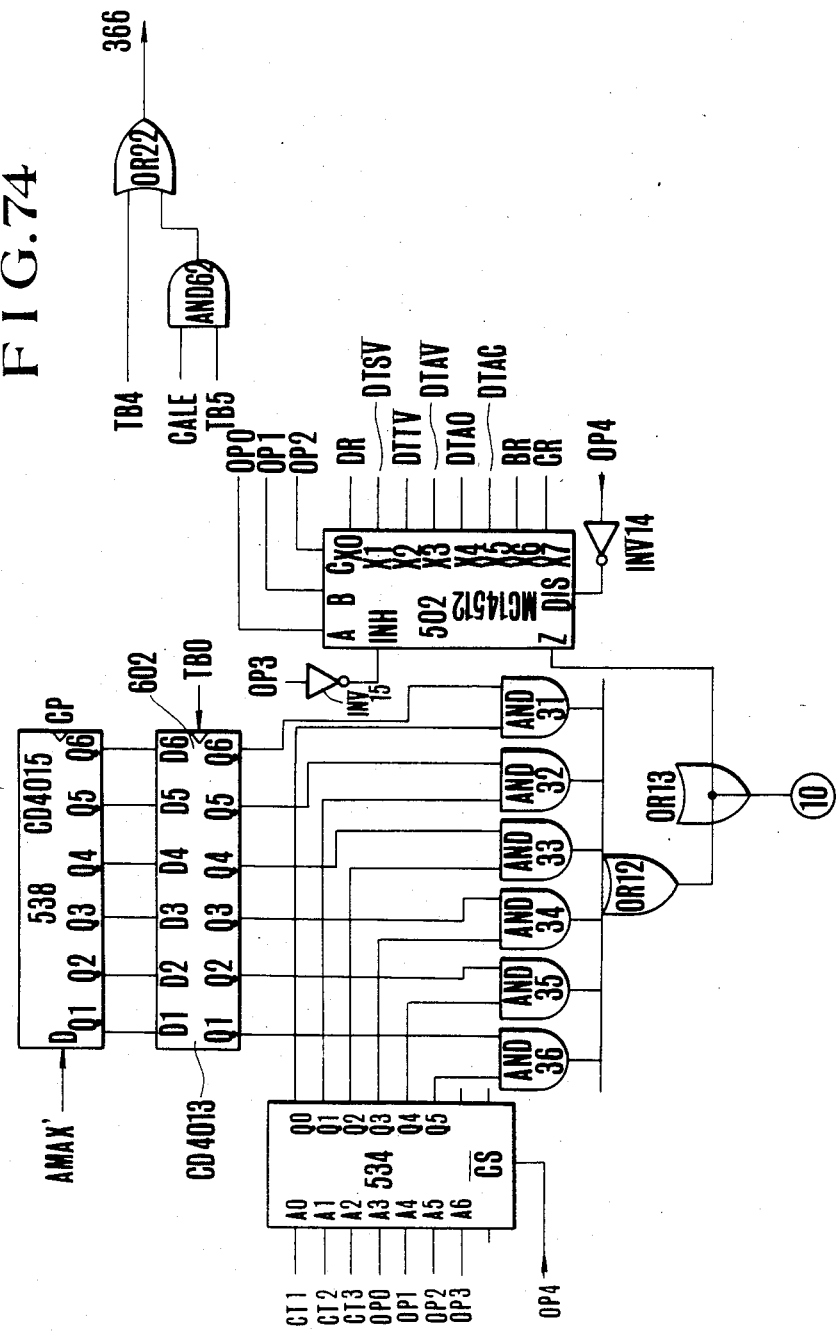
FIG. 75 shows a detailed circuit composition of the data selector 502 and the fixed tenter ROM534 as well as the circuit for taking up the largest aperture value AMAX of the photographic lens 2 to be used.

Also while this operation circuit 500 takes in various fixed data and variable data through the data selector 502, these data are taken in the AND gate AND60 from the output signal line 10 of the circuit shown in FIG. 75. While this AND gate AND60 takes in the signal of the output signal line 8 of the circuit shown in FIG. 71 through the inverter INV21, this is done for controlling the taking in of the data of designated operand only during the step unnecessary operation at a time of external light measuring mode so that virtually unnecessary operation will not be done. The output of said AND gate AND60 is given to the AND gate AND43, the EXCLUSIVE OR gate EX2 and the AND gates AND57, AND59, wherein said AND gate AND43 is used in directly taking the data of operand into the A register 510, while said EXCLUSIVE OR gate EX2 and AND gates AND57, AND59 are used when the data AR of A register 510 and the data of operand are operated.

In FIG. 79, the EXCLUSIVE OR gates EX1, EX2, EX3 and the AND gates AND57, AND58, AND59, AND61, and OR gate OR21, the Flip-Flop F21 constitute an operating part. Said set up of the operating part is well known addition subtraction circuit which functions as an addition circuit when OP6, the input of the EXCLUSIVE OR gate EX1 is "0" and functions as a subtraction circuit when OP6 is "1". This is a set up following such instruction system that addition is done when OP6 is "0" while the substraction is done when OP6 is "1" as shown in the column for OP6 in FIG. 69. While the Flip-Flop F21 is a carry Flip-Flop to memorize the carry generated from the OR gate OR21 and is ordinarily to memorize the carry in operation, and the carry generated in operation of the last unit that is the carry outputted from the OR gate OR21 with the timing of TB7 is controlled by the AND gate AND61 which receives the timing pulse TB7 through the inverter INV15. The carry outputted from said OR gate OR21 is given to J terminal of the carry Flip-Flop 540 through the AND gate AND56, and since this carry Flip-Flop 540 has the invertion signal by the inverter INV16 of the timing pulse TB7 and the OR condition signal by the OR gate OR23 of the clock pulse CP being inputted as its clock input, said Flip-Flop 540 sets or resets in synchronism with the up-rising of the first clock pulse CP of the timing of TB7. That is said carry Flip-Flop 540 is set by the carry generated in the timing pulse TB7 that is the carry generated in the last step of operation.

Also since OP7 of instruction code becomes "1" at a time not being at operation mode, as being apparent from FIG. 69, the AND gate AND56 receiving the input of OP7 through the inverter INV17 has its output controlled.

As has been mentioned above the carry generated as a result of operation is detected and memorized by the carry Flip-Flop 540, then is outputted as $\overline{CA}$ signal from its Q output and as CA signal from the $\overline{Q}$ output terminal.

Now, the operation result obtained by the above mentioned addition subtraction circuit is outputted through the EXCLUSIVE OR gate EX3 and is given to the AND gate AND44. Since the output of said AND gate AND44 is given to the A register 510 through the OR gate OR17, if said AND gate AND44 is conducted through, said operation result will be introduced into and memorized by the A register 510. As has been mentioned the operation result is taken in the A register 510, as being apparent from FIG. 69, at a time when the system is at operation mode and the instruction signal of the A register ON is issued. That is, when OP7 is "0" and OP5 is "1", the AND gate AND45 for data circulation may be come non-conductive while the AND gate AND44 for taking in the operation result may become conductive, and what are provided for that end are AND gate AND51, the inverter INV21, and NOR gate NOR2. Said AND gate AND 51 receives the input of the inversion signal of OP5 and OP7 obtained through the inverter INV21, and is so made as conducting the "1" output only when OP7 is "0" and OP5 is "1", that is, when the output instruction from the instruction ROM504 is ADD or SUB. Said "1" output of the AND gate AND51 is given to the AND gate AND44 making said gate 44 conductive and is given to the AND gate AND45 after being inversed through the NOR gate NOR3 prohibiting said gate 45.

Operation results are introduced into A register 510 through the above mentioned set up.

The AND gate AND43 is a gate provided to take the fixed or variable data inputted through the AND gate AND60 into A register 510, and the other input terminals receive the output of the AND gates AND52 and AND53 through the OR gate OR16. Said AND gates AND52 and AND53 will not be conducted through unless at least OP7 is "1" that is at a time of data exchange mode as being apparent from FIG. 69. Said AND gate 53 also receives the output CA of the carry Flip-Flip 540 and the input of OP5, and, as being apparent from FIG. 69, is to produce "1" output when OP5 is "1" and the carry CA is "1". Also said AND gates AND52 receives the $\overline{Q}$ output CA of said carry Flip-Flop 540 and the input of OP6, and as being apparent from FIG. 69, produces "1" output when OP6 is "1" and the carry CA is "0". The output of the AND gate AND52 becomes "1" through the above mentioned set up when SWC instruction or SWU instruction is transmitted, and the output of the AND gate AND53 becomes "1" when SWN instruction or SWU instruction is transmitted.

If the output state of the carry Flip-Flop 540 matched with the condition outputted from the instruction ROM504 at a time of data exchange mode through the above mentioned set up, "1" output is produced from the OR gate OR16, making the AND gate AND43 conductive, thus the variable or fixed data of operand being introduced through the AND gate AND60 will be taken in and memorized by A register 510. Also at this time the "1" output of said OR gate OR16 is given to the AND gate AND45 as "0" signal through NOR gate NOR2, therefore the circulation of A register 510 by said gate AND45 will be prohibited.

On the other hand, while the output of A register 510 is given to the AND gates AND46 and AND48, this is done to taken in the data of operand into A register 510 when the data of operand is B register BR or C register CR at a time of data exchange mode and at a same time to shift the data which have been memorized so far in A register 510 to operand.

When B register 512 or C register 514 is selected as operand, as being apparent from FIG. 69, the OR4, OP3, OP2, OP1 out of operand codes will all become "1". This will be detected by the AND gate AND50. On the other hand when OP0 is "0" at this time, B register 512 is selected while C register 514 is selected when OP0 is "1", thus OP0 is directly given to the AND-gate AND55 and at a same time is given to the AND gate AND54 through the inverter INV20. Since the output of said AND gate AND50 and of said OR gate OR16 are given to said AND gate AND54, B register 512 is designated as operand in data exchange mode, and said AND gate AND54 produces "1" output only when the condition for data exchange is satisfied, and said "1" output is given to said AND gate AND46 through OR gate OR20. Therefore, said AND gate AND46 becomes conductive, thus the data of A register 510 will be taken into B register 512 through said AND gate AND46, OR-gate OR18. Also since "1" output of OR gate OR20 is given to the AND gate AND47 through the inverter INV18 at this time, the AND gate AND47 for circulating the data BR of B register 512 will be prohibited. Also since the output of said AND gate AND50 and the output of said OR gate OR16 are given to said AND gate AND50 beside OP0 signal, said AND gate AND55 produces "1" output and give the same to said AND gate AND48 only wnen C register 514 is designated as operand in data exchange mode and the condition for data exchange is satisfied. Therefore, said AND gate AND46 becomes conductive, thus the data of A register 510 will be taken in C register 514 through said AND gate AND48, OR gate OR19. Now, since the "1" output of the AND gate AND55 is given to the AND gate AND49 through the inverter INV19 at this time, the AND gate AND49 for circulating the data CR of C register 514 will be prohibited.

Here, since said carry Flip-Flop 540 receives the input of OP7 at its K terminal, it is placed in reset state in synchronism with the up-rising of first clock-pulse CP of the time of the first timing pulse TB7 in data exchange mode, and the instructed data exchange will be completed at a time as entering into the timing of said TB7.

Said operation circuit 500 is to conduct necessary operation or data exchange following the instruction from the instruction ROM504 through the above mentioned set up, and the controlled aperture value for display in the digital display device 402 or the data relating to aperture value are obtained finally at the A register 510 regardless of the fact whether they are obtained as a result of operation or are originally set by activating said operation circuit 500 following each routine shown in FIG. 70, and the control data relating to shutter speed for display or control will be obtained at B register 512 regardless of the fact whether it is obtained as a result of operation or is originally set, while the control data to control the diaphragm closing step number of the lens device 2 is obtained at C register 514.

While RSND signal is outputted from the theory circuit 598 which receives the output from the program counter 582 as the operation by said operation circuit 500 is completed as has been mentioned above, said RSND signal is at high level during the 3 words after the operation is completed.

Said RSND signal is given to the AND gate AND42, NOR gate NOR2, OR gate OR20 of the operation circuit 500 shown in FIG. 79, therefore the AND gates AND42, AND46 will become conducted, while AND gates AND45, AND47 will be prohibitted. Therefore, the output of C register 514 is directly coupled with A register 510 through the AND gate AND42, OR gate OR17, and the output of A register 510 is directly coupled with B register 512 through the AND gate AND46, OR gate OR18, therefore, the data AR, BR, CR of each of said registers A, B, C will be outputted consecutively in the order of the content BR of B register 512, the content AR of A register 510, the content CR of C register 514, during 3 words wherein the signal of RSND is "1", from the signal line (12).

The output of the signal line (11) of the multiplexer 594 shown in FIG. 78 and the output of the output line (12) of the operation circuit shown in FIG. 79 will be given to the output theory circuit 596. While said output theory circuit 596 has such set up as having its logic diagram shown in FIG. 80, said output theory circuit 596 performs such role as placing the timewise controlled data and signal on the output BAS line 374.

Said output theory circuit 596 has OR gate OR24 at its output terminal to the output BAS line 374, and the output of the signal line (11) and each of the outputs of AND gates AND64, AND63 will be given to said OR gate. The output of the signal line (11) is WNUP signal, AVFL signal, TVFL signal EDSP signal, BDSP signal, EFDS signal, MDSP signal being in synchronism with the timing pulses TB1 to TB7 from the multiplexer 594, and is, as it is, placed on the output BAS line 374 through the OR gate OR24. The output of this multiplexer 594 has its output controlled during 3 words during which RSND signal is at high level as has been mentioned before.

On the other hand when said RSND signal becomes to have high level, said high level signal makes the AND gate AND65 which receives the output of the signal line (12) from said operation circuit 500 conductive. While the output of said AND gate AND65 is given to the AND gate AND64, said AND gate AND64 receives the output of NAND gate NAND3 which has the signal BLB to show bulb mode inputted from the set condition memorizing circuit 548 and has the signal $\overline{CU}$ to show that the system is not at a speed-light photographing mode inputted from the condition register 574, therefore, said AND gate AND64 will be conductive unless the system is at speed-light photographing mode and the bulb is set as shutter speed. Therefore, the content BR, AR, CR of the B register 512, A register 510, C register 514, respectively of the operation circuit 500 will be placed on the output BAS line 374 consecutively from the OR gate OR24 in synchronism with the timing pulse during 3 words during which RSND signal is "1", through said AND gate AND64.

On the other hand, in a state wherein the system is not at a speed-light photographing mode and the bulb is set as shutter speed, the output of said NAND gate NAND3 will become "0", therefore the AND gate AND64 will be prohibitted. Therefore, the data outputted to the signal line (12) from the operation circuit 500 will not be placed on the output BAS line 374.

But at a time of such bulb photographing mode as has been mentioned before aperture value is controlled in fully opened state and the fully opened aperture value AVO of the lens device 2 is displayed at the digital display device 402.

Therefore while the data to control diaphragm step number may be all bit "0", the fully opened aperture value AVO of the lens device 2 must be transferred to the output control part 360 for display of the fully opened aperture value AVO. For that end the fully opened aperture value AVO of the lens device 2 used may be placed on the BAS line 374 in a same timing as the controlled aperture value that is the data AR of A register 510 are placed on the BAS line 3. Said AND gate AND62 has the Q5 output of the program counter 582 and the S11 output of the decoder 600 inputted therein, therefore, this AND gate AND62 will be made as "1", only for such 1 word period as being same as that the data AR of A register 510 is outputted from the operation circuit 500 to the output line (12). AND gate AND63 has the output of said NAND gate NAND3 inputted therein through the inverter INV22, and at a same time has the output of said AND gate AND62 and (2) signal from the circuit shown in FIG. 37 that is DTA0 given thereto, therefore when bulb is selected at a time not being at speed-light photographing mode, the fully opened aperture value data AVO of the lens device 2 used will be placed on the output BAS line 374 through OR gate OR24 in a same timing that the data AR of A register 510 is outputted from the operation circuit 500.

Figures 80, 81:
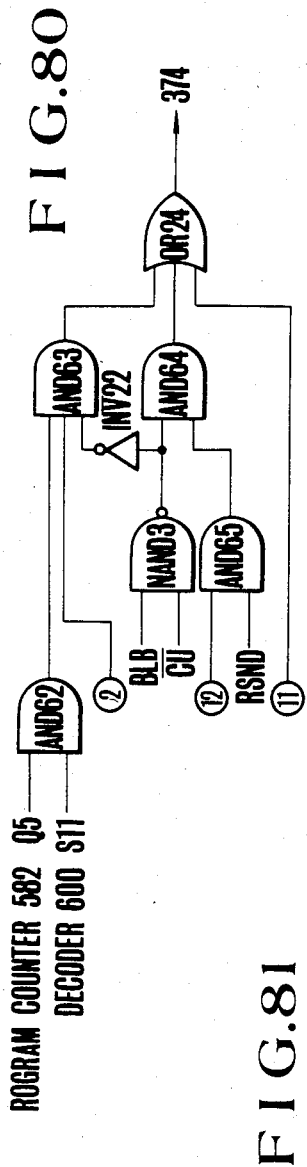
FIG. 80 shows a logic diagram of the operation circuit 596.
FIG. 81 shows a table for explaining the signal and the data of the BAS line, the input BAS line and the output BAS line.

FIG. 81 is a schematic diagram to consolidatedly show what has been explained above about the signal and data placed on the BAS line 366, the input BAS line 370 and output BAS line 374.

That is, "0" signal is placed on the BAS line 366 during the timing of the timing pulses TB0 to TB3, and CALE signal is placed thereon in synchronism with the timing pulse TB5, and ADCF signal in synchronism with the timing pulse TB6, and INT signal in synchronism with the timing pulse TB7, wherein said signals of BAS line 366 have important role for determining the timing for data transfer at each part of the input control part 360, the central control part 362, the output control part 364.

Also the input BAS line 370 plays important role in transferring various signal and data from the input control part 360 to the central control part 362 based on the timing pulses TB0 to TB7 and as various signals are transferred it has ADOF signal placed thereon in synchronism with the timing pulse $TB_1$, similarly has AELK signal in synchronism with the timing pulse TB2, AECG signal in synchronism with the timing pulse TB3, WNUP signal in synchronism with the timing pulse TB4, AO signal in synchronism with the timing pulse TB5, and CU signal in synchronism with the timing pulse TB6, while in the case of data (in this case A-D conversion data DD), data with an accuracy of $\frac{1}{8}$ step will be placed thereon consecutively from lower unit in synchronism with the timing pulses TB0 to TB7.

Also the output BAS line 374 plays important role in transferring various signals and data from the central control part 362 to the output control part 364 based on the timing pulses TB0 to TB7, and at a time of transferring various signals, it has WNUP signal placed thereon in synchronism with the timing pulse $TB_1$, and has TVFL signal placed thereon in synchronism with the timing pulse TB2, similarly AVFL signal in synchronism with the timing pulse TB3, EDSP signal in synchronism with the timing pulse TB4, BDSP signal in synchronism with the timing pulse TB5, EFDS signal in synchronism with the timing pulse TB6, and MDSP signal in synchronism with the timing pulse TB7. And in the cases of data for example, shutter speed TV, aperture value AV, fully opened aperture value AVo, controlled diaphragm step number AVs, etc., the data with an accuracy of $\frac{1}{8}$ step are placed thereon consecutively from lower unit in synchronism with the timing pulses TB0 to TB7.

Next, explanations will be made on the output control part 364. The output control part 364 has two major functions. One is display control function, and the other is exposure control function.

Various condition signals and various data are inputted in said output control part 364 from the central control part 362 through the output BAS line 374. Since these signals and data are inputted under timewise control into the output BAS line 374, the time at which the signals and data are placed on the output BAS line 374 need to be found out in order to find out what signals or data are inputted into said output BAS line 374.

A synchronization circuit 660 which receives the signal input from the BAS line 366 is provided to obtain such time.

Figure 82:
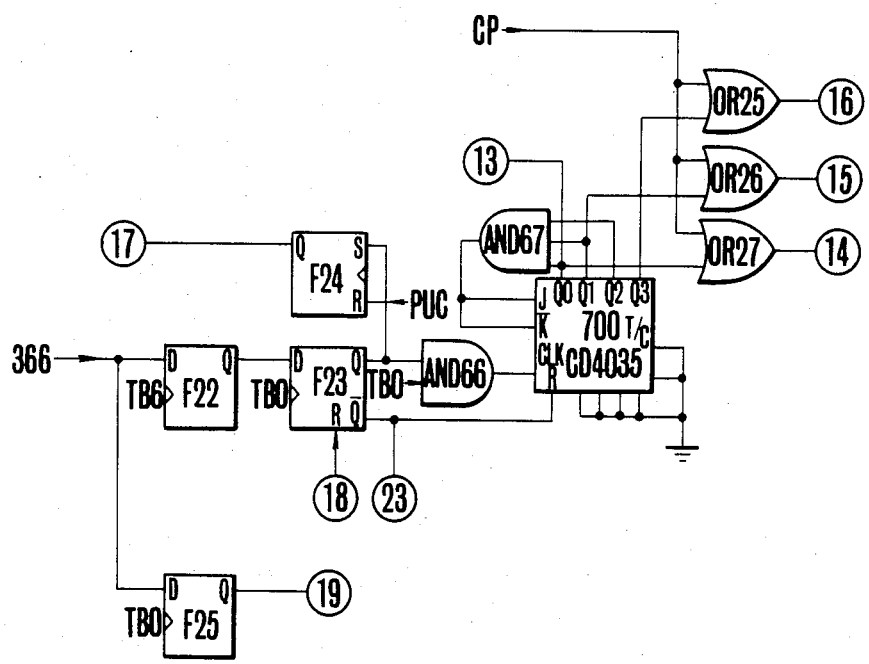
FIG. 82 shows a detailed circuit diagram of the synchronization circuit 660.

While detailed circuit set up diagram of said synchronization circuit 660 is shown in FIG. 82, what is shown as 700 in said drawing is a ring counter. Said ring counter 700 may be made by such integrated circuit element CD4035 as having its logic diagram shown in FIG. 38.

Since the BAS line 366 is inputted into the D terminal of the Flip-Flop F22 in synchronism with the timing pulse TB6, CALE signal placed on the BAS line 366 in synchronism with the timing pulse TB5 is detected at said Flip-Flop F22. The Q output of said Flip-Flop F22 is given to the D terminal of the Flip-Flop F23 which is synchronized with the timing pulse TB0. The Q output of said Flip-Flop F23 will be inputted in the clock terminal CLK of said ring counter 700 through the AND gate AND66 which has the timing pulse TB0 inputted therein. Said ring counter 700 returns its Q0, Q3 outputs to J and $\overline{K}$ terminals through the AND gate AND67.

Also, the Q0 output of said ring counter 700 is outputted at the signal line (13) and at a same time is outputted at the signal line (14) through the OR gate OR27 which receives the input of the clock pulse CP, while the Q1 output is outputted at the signal line (15) through the OR gate OR26 which receives the input of the clock pulse CP, and Q3 output is outputted at the signal line (16) through the OR gate OR25 which receives the input of the clock pulse CP.

Also the Q output of said Flip-Flop F23 is inputted into the S terminal of the Flip-Flop F23, while Q output of the same is outputted at the signal line (17). Power up clear signal PUC is given to the R terminal of said Flip-Flop F24.

Also direct reset signal is inputted from the signal line (18) explained later to the direct reset terminal R of the Flip-Flop F23.

Explanations will be made on the function of the set up mentioned above following FIG. 83.

Now, when CALE signal which is synchronized with the timing pulse TB5 is placed on the BAS line 366, the Flip-Flop F22 which is synchronized with the timing pulse TB6 is set and its Q output becomes "1". Since said CALE signal is outputted for 4 words, said Flip-Flop F22 continues "1" output during the 4 words.

Since the Q output of said Flip-Flop F22 is inputted in the D terminal of the Flip-Flop F23 which is synchronized with the timing pulse TB0, said Flip-Flop F23 is set in synchronism with the up-rising of next timing pulse TB0, and its output becomes "1". Since said Flip-Flop F22 is at set state during the 4 words, said Flip-Flop F23 also continues set state for the 4 words similarly.

Since the Q output of said Flip-Flop F23 is inputted into the AND gate AND66 which has the timing pulse TB0 inputted therein, such signal output as synchronizing with TB0 will be issued from said AND gate AND66 for 4 words after said Flip-Flop F23 is placed in set state.

Figure 83:
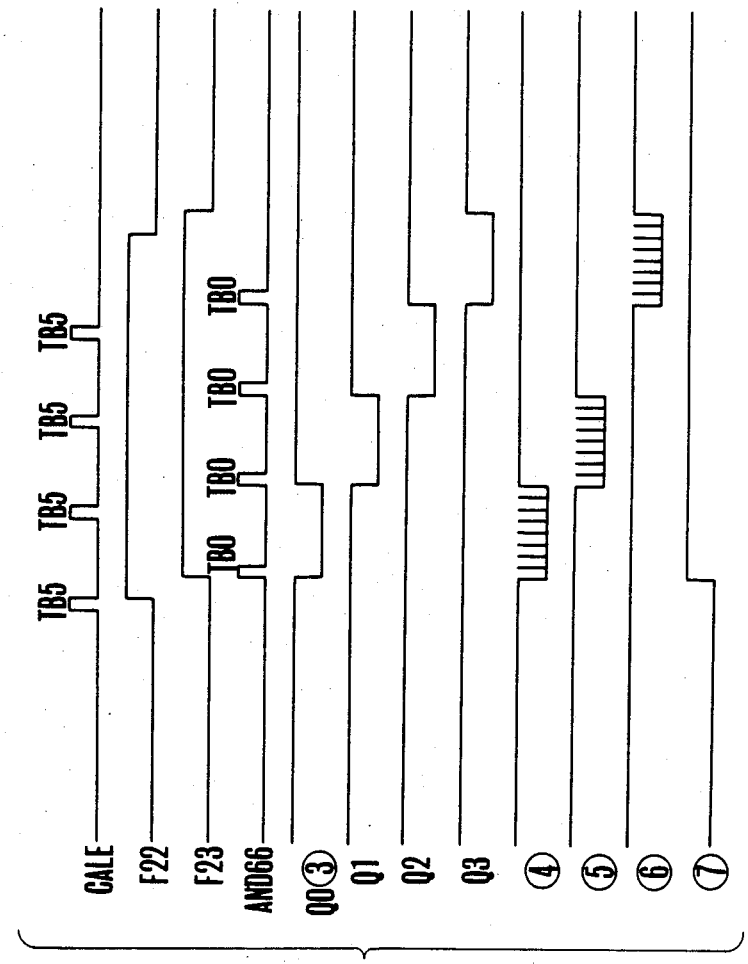
FIG. 83 shows an output timing chart of the synchronization circuit shown in FIG. 82.

Since the output of said AND gate AND66 is given to the clock terminal CLK of the ring counter 700, said ring counter 700 produces such outputs as shown in FIG. 83 from Q0, Q1, Q2, Q3 output terminals in synchronism with each up-rising of the timing pulse TB0. Also, the Q0, Q1, Q2 outputs of said ring counter 700 are inputted in the AND gate AND67, and the output of said AND gate AND67 is inputted in the J and $\overline{K}$ terminal for issuing count output from Q0 terminal at a time of count starting. Also the output polarity of said ring counter 700 is ordinarily "1" and is "0" at the time of count output because such output polarity is obtained by grounding T/C terminal.

Therefore such signal output as becoming to have "0" level only for next one word period after CALE signal is first detected will be produced at the signal line (13).

Also such pulse outputs as having up-rising characteristics at each up-rising time of the timing pulses TB0 to TB7 will be outputted from the OR gates OR14, OR15, OR16 as shown in FIG. 83 from the signal lines (25), (26), (27), respectively. Here, it is apparent from the relationship among the sending out times of various signals and data mentioned above that the down-rising output of the signal line (14) corresponds to the word time during which various signals are placed on the output BAS line 366, and the down-rising output of the signal line (15) corresponds to the word time during which the shutter speed data TV is placed on the output BAS line 366, while the down-rising output of the signal line (16) corresponds to the word time during which control aperture step number data AVS is placed on the output BAs line 366.

On the other hand, while the Flip-Flop F24 is set by the Q output of the Flip-Flop F23, the output signal from the Q terminal of the Flip-Flop F24 to the signal line (17) is used to prevent the action of the camera mechanism after shutter release from being done unless the first operation is completed. This Flip-Flop F24 receives the power up clear signal PUC at its reset terminal R. Also this BAS line 366 is inputted in the D terminal of the Flip-Flop F25 which is synchronized with the timing pulse TB0, and this Flip-Flop F25 is used for detection of INT signal placed on the BAS line 366 during the period of the timing pulse TB7, that is the signal to show that the A-D converter of the input control part 360 is in integration of inputted analog data, and its Q output is placed on the signal line (19).

While the Flip-Flop F23 of said synchronizing circuit 660 receives the input of the direct reset signal from the signal line (18) at its direct reset terminal R, this is for so prohibiting the setting action of the Flip-Flop F23 that the taking in of data, etc. into the output control part 364 will not be done at any time except the time before shutter release is done and the time during which a self-timer is in action after shutter release is done. This is to prevent the hindrance to proper exposure control action by inputting of such other data as receiving the effect of diaphragm closing and mirror up particularly when TTL light measuring is done, after shutter release is done and each mechanism of the camera device starts action.

The various signals and data placed on the output BAS line 366 are separated under timewise judgement by the output from the above mentioned synchronization circuit 660 and the timing pulses TB0 to TB7, and are taken into such functional parts of said output control part 364 as corresponding respectively.

The various signals in said output BAS line 366 will receive separation based on the timing pulses TB0 to TB7 by the demultiplexer 610 and are accumulated at the output control register 622.

Figure 84:
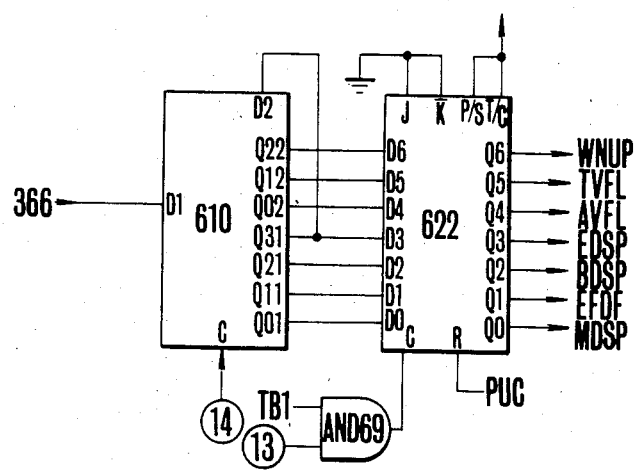
FIG. 84 shows a detailed circuit composition including the multiplexer 610 and the output control register 622.

The set up containing such demultiplexer 610 and the output control register 622 has its detailed arrangements shown in FIG. 84, and the integrated circuit element CD4015 having its logic diagram shown in FIG. 62 is used as the demultiplexer 610, and two of the integrated circuit element CD4035 having its logic diagram shown in FIG. 38 are used as the output control register 622.

In such set up, the demultiplexer 610 receives the input of the output of signal line (14) of the circuit 660 shown in FIG. 82 at its clock terminal C, and the output control register 622 has the AND condition signal of the timing pulse $TB_1$ and the output of the signal line (13) of the synchronization circuit 660 shown in FIG. 82 inputted in its clock terminal C through the AND gate AND69. That is as has been explained each signal of WNUP, TVFL, AVFL, EDSP, BDSP, EFDS, MASP is inputted in the output BAS line 374 as shown in FIG. 81 in synchronism with the timing pulses TB1 to TB7 in the word time next to that when CALE signal, which is synchronized with the timing pulse TB5, is placed on the BAS line 366, therefore the demultiplexer 610 takes in said various signals the output of the signal line (14) as timing pulse during said word time. As the output of the signal line (13) becomes from low level to high level the AND gate AND69 conducts the signal output being synchronized with the timing pulse TB1, therefore each output of Q01, Q11, Q21, Q31, Q02, Q12, Q22 of said demultiplexer 610 is taken in and accumulated at the output control register 622 from the D0 to D6 terminals of said register. As a reset each signal of MDSP, EFDS, BDSP, EDSP, AVFL, TVFL, WNUP is outputted from each output terminal of Q0 to Q6 of said output control register 622.

On the other hand, each of the data of shutter speed TV, aperture value AV, control diaphragm step number AVs being placed on the output BAS line 374 will have different handling between the data for control of each mechanism of camera device and the data for display.

Now, explanations will be made on the taking in of the data for display. The data used for display in the output BAS line 374 are the two, shutter speed data TV and aperture value data AV. These signals are rounded off to the next higher integer by counting fractions of 0.5 and over as a whole number and disregarding the rest through the display control circuit 652, and are converted to such shape as suitable to display of the digital display device 402, also after being adjusted to such degree as reducing the intervals between data taking in for eliminating flickering to prevent the flickering of the digital display device by the variation in sudden change in data, the display aperture value is taken in the aperture value display register 648 while the display shutter speed TVDS is taken in the shutter speed display register 650 respectively based on the word time during which each of the data is placed on the output BAS line 374 and is memorized.

Figure 85:
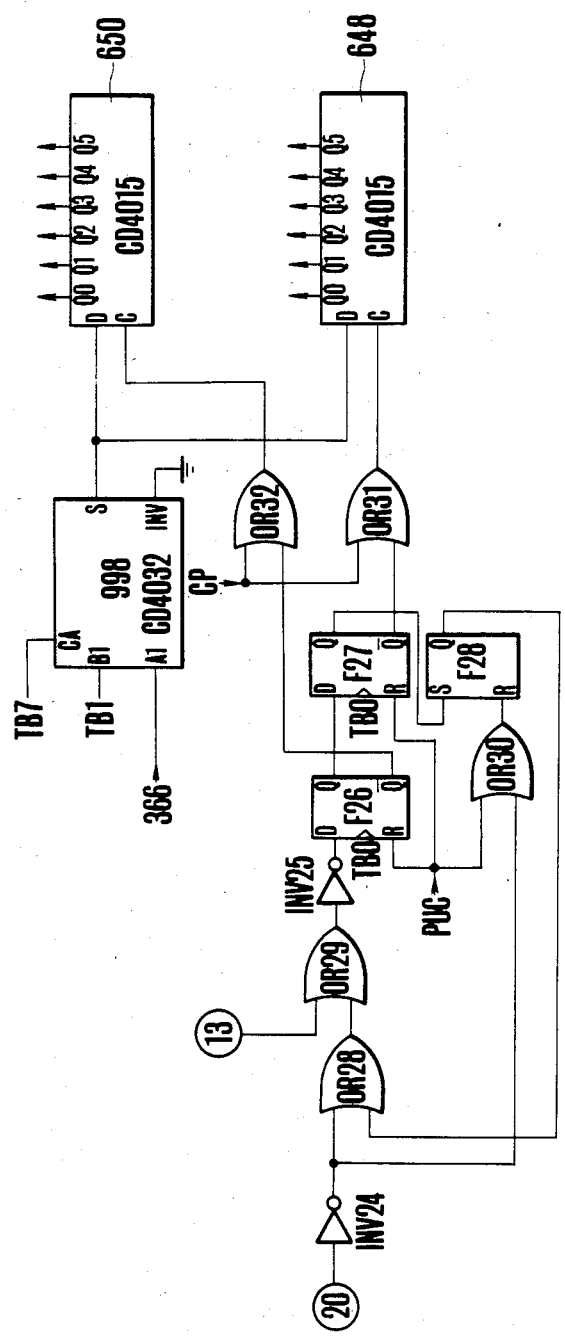
FIG. 85 shows a detailed logic composition of the circuit for taking up the data for display.

Detailed logic set up diagram for the data take in circuit for such display is shown in FIG. 85.

Figure 86:
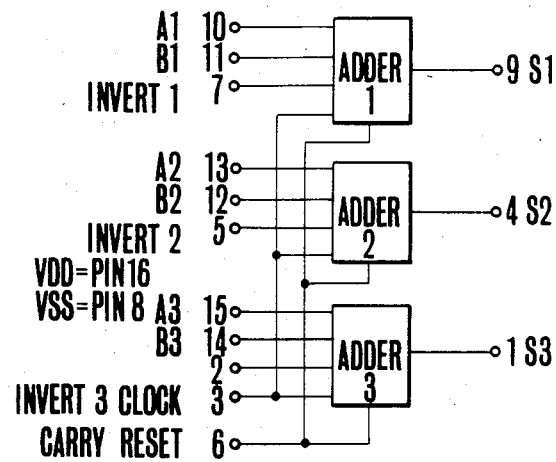
FIG. 86 shows a block diagram of the I.C. circuit element CD4032.
Figure 87:
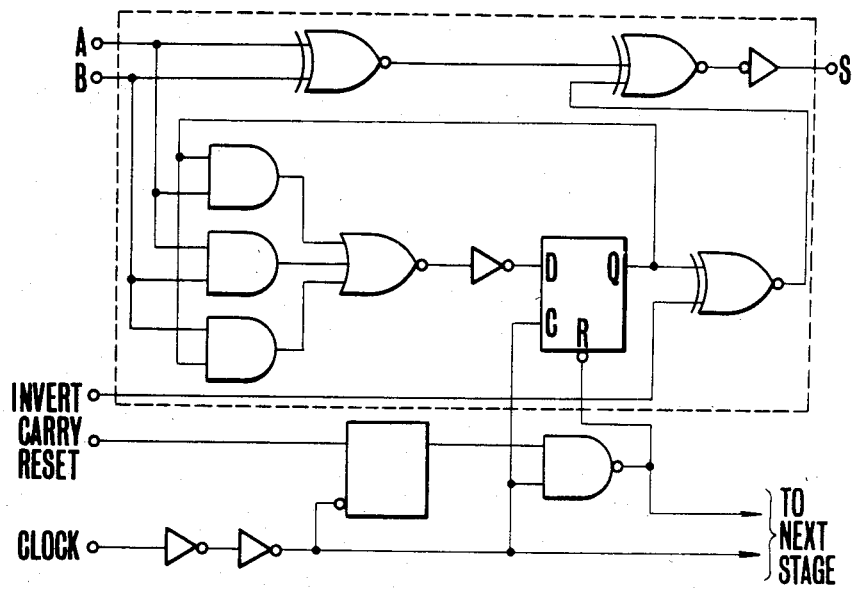
FIG. 87 shows a logic diagram of the I.C. circuit element CD4032.

In said drawing, what is shown as 998 is a circuit for rounding off to round off the data inputted from the output BAS line 374 by counting fractions of 0.5 and over as a whole number and disregarding the rest, and is made by the integrated circuit element CD4032 (manufactured by RCA). Said integrated circuit element CD4032 is constituted three pieces of series adders having their block diagram shown in FIG. 86 and having their logic diagram shown in FIG. 87, but in FIG. 85 only one piece thereof is shown. Said rounding off circuit 998 receives the output data of the output BAS line 374 at its $A_1$ terminal, and receives the input of the timing pulse $TB_1$ at $B_1$ terminal. Also it receives the input of the timing pulse TB7 at the carry terminal CA.

When the data are inputted in the $A_1$ terminal from the output BAS line 374 in such set up, the bit of $\frac{1}{4}$ step accuracy is inputted with the timing of $TB_1$, and the timing pulse $TB_1$ is inputted in $B_1$ terminal with same timing as above. That is, "1" is added only to the bit of $\frac{1}{4}$ step accuracy, and if "1" is placed at said bit with $\frac{1}{4}$ step accuracy, carry will reach the bit with $\frac{1}{2}$ step accuracy and carry will be done, also when "0" is placed at the bit with $\frac{1}{4}$ step accuracy of data, carry will not be done to the bit with $\frac{1}{2}$ step accuracy. Therefore, as long as the output data from the S terminal of said rounding off circuit 998 are so observed as viewing the upper units than the bit with $\frac{1}{2}$ step accuracy, said output data will become data with $\frac{1}{2}$ step accuracy having rounding off by counting fractions of 0.5 and over as a whole number and disregarding the rest with the bit with ¼ step accuracy.

As has been explained above the data converted to the data with ½ step accuracy suitable to display and outputted from its S terminal in said rounding off circuit 998 are given to the D terminal at each of the aperture value display register 648 and the shutter speed display register 650. Also the judgement as to what the data being rounded off in said rounding off circuit 998 and converted to have ½ step accuracy is related needs to be done by timewise judgement, therefore each of said registers 648, 650 takes in data corresponding thereto respectively following the control pulse inputted in the clock terminal C thereof, respectively. Also said mounting off circuit 998 is reset by receiving the input of the timing pulse TB7 at its carry terminal CA.

Said aperture display register 648 receives the $\overline{Q}$ output of the Flip-Flop F27 and the input of OR condition of the clock pulse CP through the OR gate OR31 at its clock terminal C, while said shutter speed display register 650 receives the $\overline{Q}$ output of the Flip-Flop F26 and the input of OR condition of the clock pulse CP through the OR gate OR32 at its clock terminal C. The Q output of said Flip-Flop F26 becomes D input of said Flip-Flop F27, while the output of the OR gate OR29 is received through the inverter INV25 at the D input of said Flip-Flop F26. On the other hand, the Q output of said Flip-Flop F27 is given to the terminal S of the Flip-Flop F28, while its Q output is given to the OR gate OR28. Said OR gate OR28 receives the ON-OFF signal of 2 Hz from the signal line (20) connected with signal source explained later through the inverter INV24 on the other hand, and the output signal of said OR gate OR28 is given to said OR gate OR29. Said OR gate OR29 on the other hand receives the signal output from the singal line (13) which is the Q0 terminal output of the ring counter 700 shown in FIG. 82. Also the ON-OFF signal of 2 Hz from said signal line (20) is given also to the reset terminal R of the Flip-Flop F28 through the OR gate OR30. Power up clear signal PUC is also inputted in the reset terminal R of said Flip-Flop F28 through said OR gate OR30. On the other hand, power up clear signal PUC is inputted also in each directly reset terminal R of said Flip-Flops F26, F27.

Figure 88:
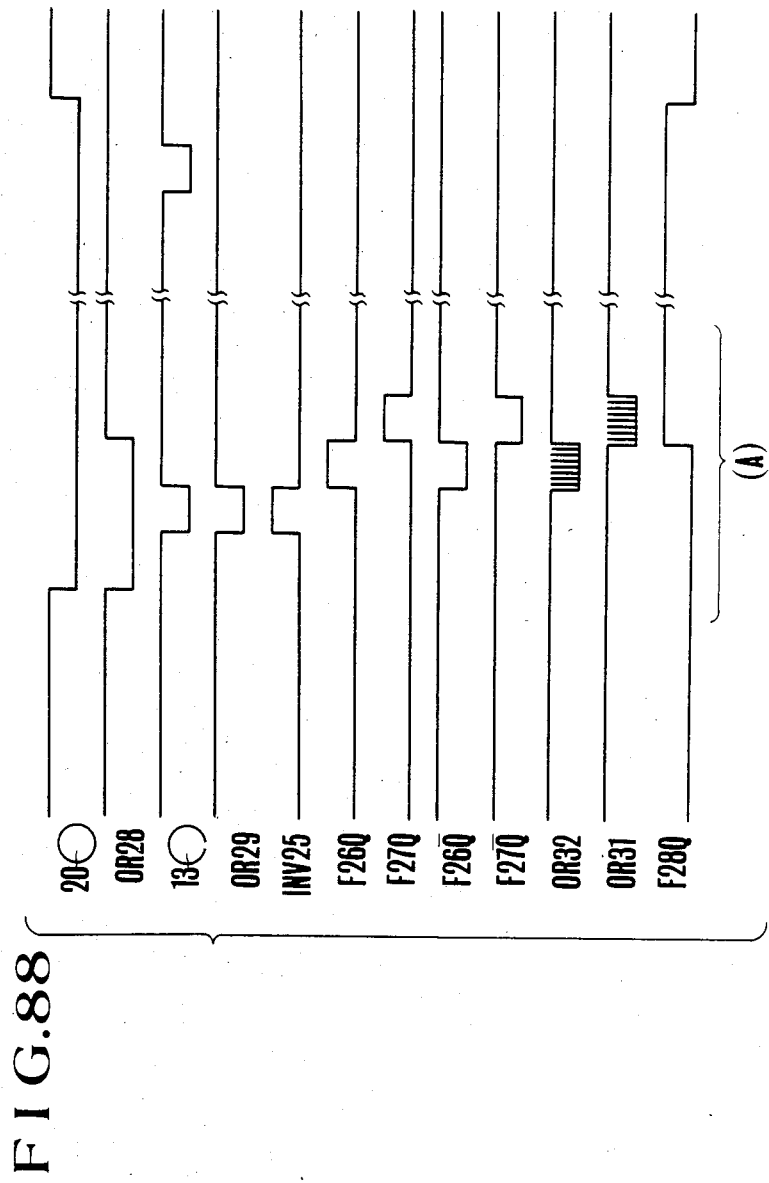
FIG. 88 shows an operation timing chart of the circuit shown in FIG. 85.

In such set up, explanations will be made on its function following the timing chart shown in FIG. 88. Now, when the 2 Hz signal being sent from the signal line (20) becomes to have high level, the output of the inverter INV24 becomes to have low level. Since the Flip-Flop F28 in this state is in reset state and its Q output is "0", the output of the OR gate OR28 is "0" therefore the OR gate OR29 can output the Q0 output of the ring counter 700 being inputted from the signal line (13), that is the signal which is ordinarily "1" and becomes "0" only during next one word of the CALE signal. Since the output of said OR gate OR29 is given to the D terminal of the Flip-Flop F26 which is synchronized with the timing pulse TB0 through the innverter INV25, said Flip-Flop F26 is placed in set state only during the period of next one word after "1" output is made from said inverter INV25 for the period of one word. Therefore, since the length of period during which said Flip-Flop F26 is set corresponds to the same during which the shutter speed data TV is placed on the output BAS line 374, the display shutter speed TBDS from said rounding off circuit 998 is taken in and memorized at said register 650 by giving the clock pulse for data taking in to the shutter speed display register 650 through the OR gate OR32 which receives the $\overline{Q}$ output of said Flip-Flop F26 and the input of the clock pulse CP. On the other hand, since the Q output of said Flip-Flop F26 is inputted in the D terminal of the Flip-Flop F26 being synchronized with the timing pulse TB0, said Flip-Flop F27 is placed in set state only during the period of one word next to the one word during which said Flip-Flop F26 is set. Therefore since the length of period during which said Flip-Flop F26 is set corresponds to the length of period during which the aperture value data AV is placed on the output BAS line 374, the display aperture value AVDS from said rounding off circuit 998 is taken in and memorized at said register 648 by giving the clock pulse for data taking in to the aperture value display register 648 through the OR gate OR31 which receives the $\overline{Q}$ output of said Flip-Flop F27 and the input of the clock pulse CP.

Also since the Q output of said Flip-Flop F27 is given to the set terminal of the Flip-Flop F28, said Flip-Flop F28 is also set along with the setting of the Flip-Flop F27 and the Q output thereof becomes "1". Since said Q output is given to the OR gate OR28 making its output "1", the output of the OR gate OR28 becomes "1" and is given to the OR gate OR29. The signal from the signal line (13) does not pass through OR gate OR29 and both Flip-Flops F26, F27 retain their reset state, therefore renewal of taking in of corresponding data will not be done in the shutter speed display register 650 and the aperture value display register 648.

Since said Flip-Flop F28 has the inversion signal of the 2 H$_z$ signal from the signal line (20) by the inverter INV24 is putted therein through the OR gate OR30, it is reset as said 2 H$_z$ signal becomes to have low level. On the other hand, since said 2 H$_z$ signal becoming to have low level gives "1" signal to said OR gate OR28 through the inverter INV24, making its output "1", it keep the state in which the signal from the signal line (13) can not be accepted.

Next, since the output of said Flip-Flop F28 becomes "0" when the 2 H$_z$ signal from the signal line (20) becomes to have high level, it is placed in a state in which the signal from the signal line (13) can not be accepted. Therefore new display shutter speed TVDS will be taken in and memorized at the shutter speed display register 650 while new display aperture value AVDS will be taken in and memorized at the aperture value display register 648 in a method being similar to that mentioned above.

Since both shutter speed and aperture value will have then data for display taken in every 2 H$_z$ by the above mentioned set up, tickering or error in reading out by variation in delicate data within the digital display device 402 can be prevented, thus very effective method of data taking in or display can be provided for digital display system.

As has been mentioned above the display aperture value AVDS and display shutter speed TVDS which are taken in as the data with ½ step accuracy with 2 H$_z$ interval into the aperture value display register 648 and the shutter speed display register 650, after being rounded off, will be displayed at the digital display device 402 through the next display control circuit 624 and the display driver 656.

Said display control circuit 624 is not to conduct merely the display of aperture value or shutter speed, instead it needs to conduct the display of signs and flickering control for display as shown in FIG. 10 corresponding to the operating mode and working state of the camera device. Therefore various signals, TVFL, AVFL, EDSP, BDSP, EFDS, MDSP, etc. being taken in and accumulated at said output control register 622 from the output BAS line 374 will have bearings.

Figure 89:
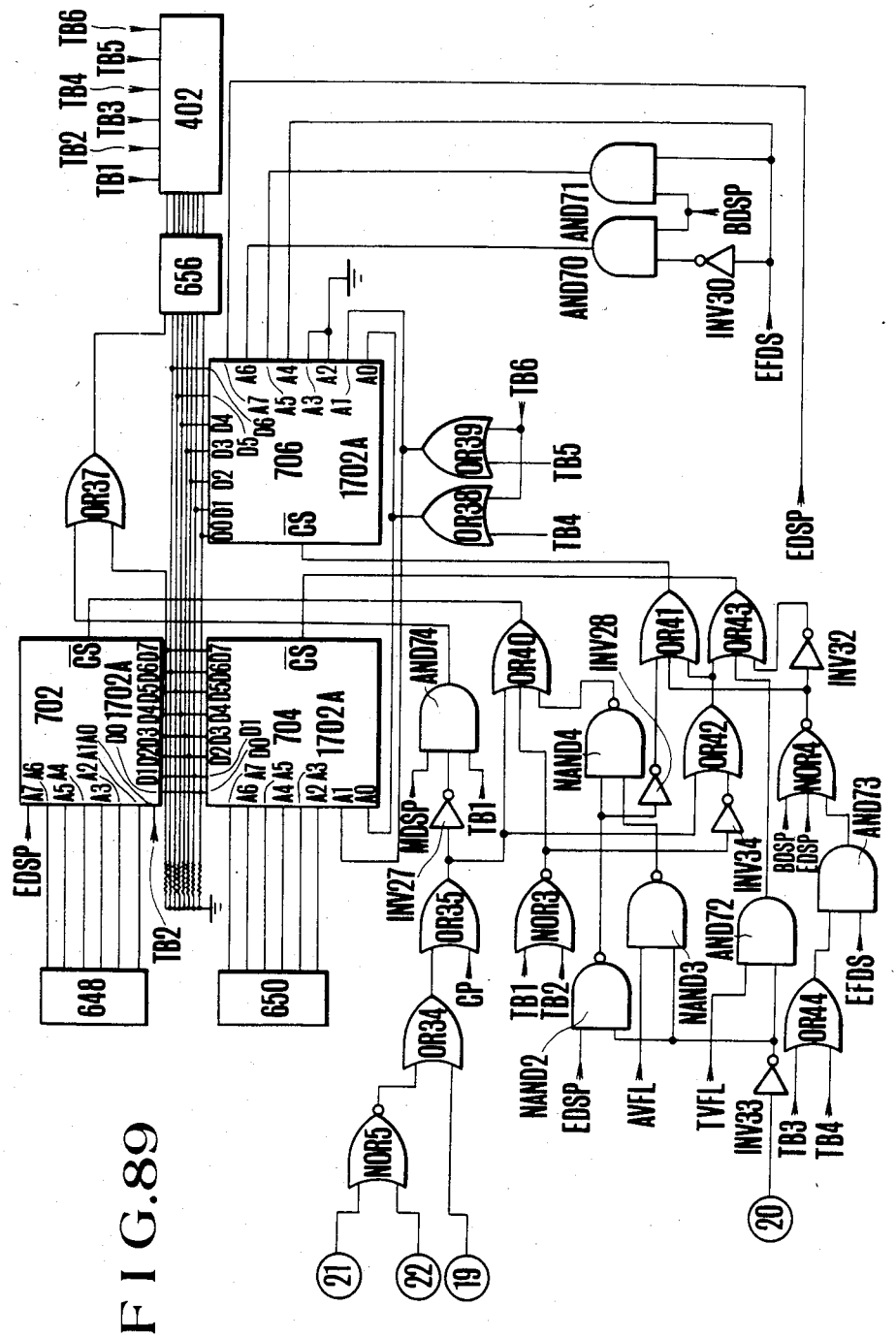
FIG. 89 shows a detailed block diagram of the display control circuit 624.

Said display control circuit 624 has its detailed block diagram shown in FIG. 89, and in said drawing what is identified as 702 is a decoder ROM for aperture value display and is to conduct the display of aperture value and such signs as "oP", "cL'", "oo", "EE", etc. for the second display part 250 of the display device within the finder shown in FIG. 9, while 704 is a decoder ROM for shutter speed display to conduct the display of the shutter speed for a first display part 244, and 706 shows a decoder ROM for sign display to conduct display of such signs as "EEEE", "bulb", "bEF", "EF", etc. for the first display part 244.

Figure 90:
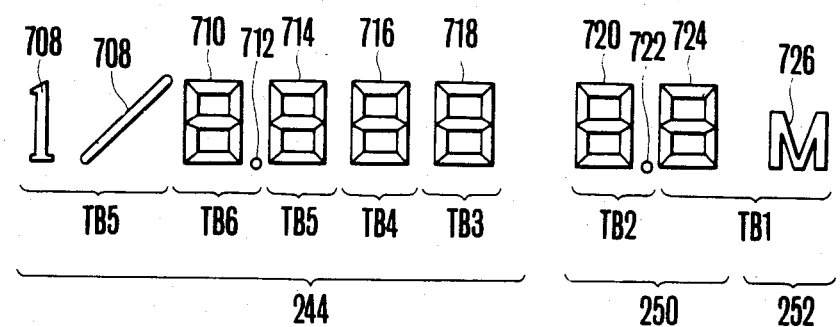
FIG. 90 shows a plane view of the digital display device 402.

While the digital display device 402 has dynamic driving given thereto based on such timing pulse TB1 or TB6 as mentioned before, the details of the same will be explained following the plan of the digital display device shown in FIG. 90.

In said drawing, the first display part 244 consists of a display element 708 for fraction display, four 7 segment display elements 710, 714 for displaying shutter speed and signs, and a decimal point display element 712. And a 7 segment display element 718 is display driven with the timing of the timing pulse TB3, and a 7 segment display element 716 is display driven with the timing of the timing pulse TB4, while the 7 segment display element 714 and the fraction display element 708 are display driven with the timing of the timing pulse TB5, and the 7 segment display element 710 and the decimal point display element 712 are display driven with the timing of the timing pulse TB6.

Also the second display part 250 in the same drawing consists of 7 segment display elements 720, 724 and a decimal point display element 722, while a third display part 252 consists of a display element 726 for displaying "M". Said 7 segment display elements 724 and the "M" display element 726 are display driven with the timing of the timing pulse TB1, and the 7 segment display element 720 and the decimal point display element 722 are display driven with the timing of the timing pulse TB2.

Therefore, this digital display device 402 can have dynamic driving given thereto by giving time sharing display signals being synchronized with the timing pulses TB0 to TB7 in 7 lines and in parallel with each of said 7 segment display elements 710, 714, 716, 718, 720, 724 and by giving such display signals as being synchronized to each of the timing pulses TB1, TB2, TB6, TB5, respectively in 1 line to said "M" display element 726, the decimal point display elements 722, 712 and the fraction display element 708. As for the indicator 402, R7A-122-9 (manufactured by BOW RAR) may be used.

Said aperture value display decoder ROM702 consists of integrated circuit element 1072A having such set up as having its block diagram shown in FIG. 68, and its input terminal A0 receives the input of the timing pulse TB2, also the input of the aperture value display register 648 is received at the input terminals A1 to A6 thereof, while the input of EDSP signal from said output control register 622 is received by the input terminal A7 thereof. Also the output of the NOR gate NOR3 which receives the inputs of the timing pulses TB1, TB2 is inputted into the $\overline{CS}$ terminal thereof through the OR gate OR40.

Therefore, said aperture value display decoder ROM702 has its output restrained except at least with the timing of TB1, TB2. Therefore, the input at its A0 terminal will be "0" with the timing of TB1, and the A0 terminal input thereof with the timing of TB2 will be "1". Thus, the output of 8 lines for display driving of the 7 segment display element 724, 7 element display element 720, and the decimal point display element 722 of the digital display device 402 will be done from the output terminals D0 to D7 with each of the timings of the timing pulses TB1, TB2, corresponding to the input datta from the aperture value display register 648.

Now the output of 7 lines, D0 to D6 of said decoder ROM702 will be used for segment selection of said 7 segment display elements 720, 724, while the output of 1 line, D7 of said decoder ROM702 will be used for selected driving said decimal point display element.

Said shutter speed display decoder ROM704 consists of integrated circuit element 1702A having such set up as shown in the block diagram of FIG. 68, and the output of the OR gate OR38 which receives the inputs of the timing pulses TB4, TB6 is received at the input terminal A0 thereof, while the output of the OR gate OR39 which receives the inputs of the timing pulses TB5, TB6 is received at the input terminal A1. Also the output of the shutter speed display register 650 is received at the input terminals A1 to A7 thereof. And the output of the NOR gate NOR3 which receives the inputs of the timing pulses TB1, TB2 is received at the $\overline{CS}$ terminal thereof through the inverter INV34, OF gate OR42 and OR gate OR43. Therefore, said shutter speed display decoder ROM704 has its output restrained at least in the timing of TB1 and TB2. Therefore, the output of said decoder ROM704 will have meaning at the timings of TB3 or TB6, and when the timing pulses TB4, TB5, TB6 are not inputted, that is at a timing of TB3, the inputs at the A0, A1 terminals thereof will both become "0", and when the timing pulse TB4 is inputted the input at the A0 terminal only thereof becomes "1", also when the timing pulse TB5 is inputted the input at the A1 terminal only thereof will become "1", while when the timing pulse TB6 is inputted, the inputs at both A0 and A1 terminals thereof become "1". Thus corresponding to the output from the shutter speed display register 650, outputs of 8 lines for display driving of the 7 segment display element 718, 7 segment display element 716, 7 segment display element 714, fraction display element 708, 7 segment display element 710 and decimal point display element 712 of the digital display device 402 will be issued from the output terminals D0 to D7 with each of the timings of the timing pulses TB3 to TB6. Also the 7 line outputs, D0 to D6 of said decoder ROM704 will be used for segment selection for said 7 segment display elements 710, 714, 716, 718, while the 1 line output D7 of said decoder ROM702 will be used for selected driving of said fraction display element 708 and said decimal point display element 722.

The above mentioned display decoder ROM706 consists of integrated circuit elements 1702A having such set up as shown in the block diagram of FIG. 68, and the inputs of the timing pulses TB4, TB6 are received at the input terminal A0 thereof through said OR gate OR38, while the inputs of the timing pulses TB5, TB6 are received at the input terminal A1 thereof through said OR gate OR39. Also the signals to direct the display of "EF", "bEF", "bulb", "EEEE" are inputted respectively in the input terminals A4 to A6. Further, the output of the NOR gate NOR3 which receives the inputs of the timing pulses TB1, TB2 is inputted in the $\overline{CS}$ terminal thereof through the inverter INV34, OR gate OR41. Therefore said shutter speed display decoder ROM706 has its output restrained at least under the timings of TB1, TB2. Thus the output of said decoder ROM706 will have meanings at the timings of TB3 to TB6, and now when the timing pulses TB4, TB5, TB6 are all not inputted that is at the timing of TB3, both inputs at A0, A1 terminals thereof become "0", while when the timing pulse TB4 is inputted the A0 terminal input only thereof will become "1". And when the timing pulse TB5 is inputted, the A1 terminal input only thereof becomes "1", while when the timing pulse TB6 is inputted, the inputs at both A0, A1 terminals thereof become "1". Thus said decoder ROM706 conducts the output of 7 lines for display driving of the 7 segment display element 718, 7 segment display element 716, 7 segment display element 714, 7 segment display element 710 respectively of the digital display device 402 from the output terminals D0 to D6 with each of the timings of the timing pulses TB3 to TB6, corresponding to the inputs at A4 to A7 terminals thereof. The 7 line outputs, D0 to D6 of said decoder ROM706 will be used for segment selection for said 7 segment display elements, 710, 714, 716, 718.

Now each of the D0 to D6 outputs of each of said decoder ROMs 702, 704, 706 is integrated respectively and is given to the display driving circuit 656 as the 7 line signal as a whole. Also each of the outputs D7 of said decoder ROMs 702, 704 is united to one and is given to said display driving circuit 656 through the OR gate OR37. As for the indication driving circuit 656, two of 75491 (manufactured by TI) may be used.

On the other hand, the signal to display the "M" sign display element 726 can be obtained by outputting MDSP signal by the AND gate AND74 in synchronism with the timing pulse TB1. The output of said AND gate AND74 is given to said display driving circuit 656 together with each of D7 outputs of the decoder ROMs 702, 704 through the OR gate OR37.

Also said decoder ROMs, 702, 704, 706 have their outputs restrained by various factors. Especially each of the outputs of the decoder ROMs 704 and 706 is outputted in synchronnism with the timing pulses TB3 to TB6, either one thereof needs to be selected for output. Also, when the display data for shatter speed needs to be flickered, the output of the decoder ROM704 needs to be controlled with a certain cycle, and when the display data for aperture value needs to be flickered, the output of the decoder ROM702 needs to be controlled with a certain cycle. Further, when the display "EE EEEE" for error warning needs to be flickered, the output of the decoder ROMs 702, 706 need to be controlled with a certain cycle, and when the input analog data are integrated in the A-D converter at the input control part 360, that is when INT signal is inputted there is such fear that the emittance of light by the digital display device 402 within a finder badly affects the TTL light measuring system, therefore it is necessary to control the outputs of all decoder ROMs 702, 704, 706 to make the digital display device 402 inactive. Further when the camera device mechanism is conducting action for exposure there is such fear that emittance of light by the digital display device 402 within a finder badly affects exposure, and to prevent meaningless consumption of battery by unnecessary action of the digital display device 402 during the operation of a self-timer or when photographing is done with long exposure time, it is necessary to conduct output control of all decoder ROMs, 702, 704, 706 to make the digital display device inactive.

In FIG. 89, while signal input is made to the NOR gate NOR5 from the signal line (21), the signal which becomes "1" before the exposure control mechanism of the camera device starts action will be inputted from the signal line (21), and the signal which becomes "1" after the exposure control mechanism of the camera device completes action will be inputted from the signal line (22). Therefore the signal output which becomes "1" when the exposure control mechanism of the camera device is in action will be made from said NOR gate NOR5. Said output of the NOR gate NOR5 is given to the OR gate OR34. On the other hand the INT signal showing that integration is in progress will be inputted from the signal line (19) into said OR gate. Therefore, the output of said OR gate OR34 performs a function as a blanking signal to eliminate all of the displays of the digital display device 402. Since the output of said OR gate OR34 is inverted from the OR gate OR35 by the inverter INV27 and is given to the AND gate AND74 as "0" signal, the AND gate AND74 will have its output controlled, thus blanking will be done on the selection display signal for "M" indication.

On the other hand, since the output of said OR gate OR35 is given to the $\overline{CS}$ terminal of the decoder ROM702 through the OR gate OR40, and to the $\overline{CS}$ terminal of the decoder ROM704 through the OR gates OR42, OR43, further to the $\overline{CS}$ terminal of the decoder ROM706 through the OR gates OR42, OR43, therefore blanking will be done over each of the outputs of said decoder ROMs 702, 704, 706, thus the display of the digital display device 402 will be controlled.

Now, the block pulse CP is given to the OR gate OR35, and at a time when the output of said OR gate OR34 is "0", such signal as being synchronized with the clock pulse CP is always outputted, and the signal being synchronized with the clock pulse CP will be used for issuing the blanking so that unnecessary data display will not be made at the digital display device 402 when the output content of each of the decoder ROMs 702, 704, 706 varies.

Now, when the digital display part 402 is made to conduct the display of shutter speed at the first display part 244, and to conduct the display of aperture value of such signs as "cL", "oP", "oo" etc. at its second display part 250, further if necessary to conduct "M" display at its third display part 252, BDSP signal, EDSP signal, EFDS signal are naturally "0", therefore blanking signal is impressed on the $\overline{CS}$ terminal of the decoder ROM 702 at other time when TB1 and TB2 are mentioned above and blanking signal is impressed to the CS signal of the decoder ROM704 with the timing of TB1 and TB2 as has been mentioned above. On the other hand, the output signal of the AND gate AND73 which receives the input of BDSP signal, EDSP signal and EFDS signal is inputted in the $\overline{CS}$ terminal of said decoder ROM706, thus the output of the NOR gate NOR4 what has its output becoming "1" is given as blanking signal through the OR gate OR41, thus the output of this decoder ROM76 is controlled.

Therefore, said digital display device 402 makes display of shutter speed at its first display part 244 based on the output from the decoder ROMs 702, 704 and makes display of aperture value or of such signs as "cL", "oP", "oo", etc. at its second display part 250, further if necessary makes "M" display at its third display part 252.

While it has been already mentioned that "1" is outputted as AVFL signal for flickering the display of aperture value when the aperture value obtained as a result of operation exceeds the limit controllable by the lens device 2 in such display state, in this case said AVFL signal is given to the NAND gate NAND3 which has ON-OFF signal of 2 $H_z$ given thereto, from the signal line (20) having the ON-OFF signal of 2 $H_z$ placed thereon, through the inverter INV33, therefore, the ON-OFF signal of 2 $H_z$ is outputted from said NAND gate NAND3 and is inputted in the NAND gate NAND4. On the other hand, while said NAND gate NAND4 receives the input of the NAND gate NAND2, since the EDSP signal out of the outputs to said NAND gate NAND3 is "0", the output thereof is "1", therefore said NAND gate NAND4 conducts output of ON-OFF signal of 2 $H_z$. The output of said NAND gate NAND4 is inputted in the $\overline{CS}$ terminal of the decoder ROM702 and places blanking with 2 $H_z$ on the output of said ROM. Therefore, the aperture value display made at the second display part 250 of the digital display device 402 by said decoder ROM702 will be flickered with 2 $H_z$.

Also, while it has already been explained before that when the shutter speed obtained as a result of operation exceeds the limit which can be controlled with the body 4, "1" is outputted as TVFL signal to flicker the display of shutter speed, in this case said TVFL signal is given to the AND gate AND72 to which the ON-OFF signal of 2 $H_z$ is given through the inverter INV33 from the signal line (20) on which the ON-OFF signal of 2 $H_z$ is placed, therefore the ON-OFF signal of 2 $H_z$ will be outputted from this AND gate AND72. The output of said AND gate AND72 is inputted in the $\overline{CS}$ terminal of the decoder ROM704 through the OR gate OR43, placing the blanking with 2 $H_z$ on the output of said ROM. Therefore, the shutter speed display displayed at first display part 244 of the digital display device 402 is flickered with said decoder ROM704.

Next, while it has been mentioned before that "1" signal is outputted as EFDS signal from the central control part when the charging completion signal is given to the input control part 360 in a speedlight photographing mode, at this time the display of "EF" showing the shutter speed controlled and charging completion is made at the first display part as shown in FIGS.. 10(*c*) (*d*).

Also the shutter speed controlled is displayed by the fraction display element 708, the 7 segment display elements 710, 714 and the decimal point display element 712, wherein the decoder ROM704 and the timing pulses TB5, TB6 are related, also "EF" display to show charging completion is done by the 7 segment display elements 716, 718, wherein the decoder ROM706 and the timing pulses TB3, TB4 are related.

Now, when "1" is inputted as EFDS signal is inputted in the A4 terminal of the decoder ROM706 shown in FIG. 89, and the signal outputted from said decoder ROM706 to between the timing pulses TB3, TB4 is made "EF" display at the 7 segment display elements 716, 718 at the first display part.

On the other hand, the signal for the display of the shutter speed outputted will be made to the decoder ROM704 from the shutter speed display register 650. Also, since the shutter speed at this time is slower than the shutter speed synchronized with speedlight (for example 1/60 second), it will not exceed the scope of display by the 7 segment display elements 710 and 714 at the first display part.

Since EFDS signal is inputted in the AND gate AND73 in such state, said AND gate AND73 receives the input of the timing pulses TB3, TB4 through the OR gate OR44, therefore said AND gate AND73 is to make "1" output with the timing of TB3, TB4. Since said "1" output is inputted in the NOR gate NOR4 making its output "0", blanking will be placed only for the timing of TB3, TB4 on the decoder ROM704 which has the output of said NOR gate NOR4 inputted in the $\overline{CS}$ terminal through the OR gate OR43 after being inverted through the inverter INV32, also the decoder ROM706 which has the output of said NOR gate NOR4 inputted in the $\overline{CS}$ terminal through the OR gate OR41 will have blanking placed thereon during the period of timing other than TB3, TB4 that is for the timing of TB5, TB6. Therefore, in a speedlight photographing mode the display of shutter speed and "EE" will be made on the first display part 244 of the digital display device. On the other hand, at the second display part 250 of said digital display device 402, the output of aperture value data will be made from the aperture value display register 648 unless the speedlight is at total light emitting mode, and the signal output of the display aperture value will be made from the decoder ROM702 following said data, and the aperture value display will be made. Also "M" display will be made as MDSP signal is made as "1" as the third display part 252 of the digital display device 402.

While it has been explained before that when bulb is selected as shutter speed, "1" signal is outputted as BDSP signal, at this time display of "buLb" will be made at the first display part as shown in FIG. 10(*b*). While this "1" signal is inputted in the AND gates AND70, AND71, said AND gate AND70 has EFDS signal inputted therein through the inverter INV30, while said AND gate AND71 has EFDS signal directly inputted therein, therefore, as long as EFDS signal is "0", the output of the AND gate AND70 will become "1" and is inputted into the input terminal A6 of the decoder ROM706. As a result signal output is made from said decoder ROM706 to make the display of "buLb" at the first display part 244 of the digital display part 402. Since BDSP signal is inputted in the NOR gate NOR4 under said state, making its output "0", the decoder ROM704, which has the output of said NOR gate NOR4 inputted into the $\overline{CS}$ terminal through the OR gate OR43 after being inverted through the inverter INV32, wil have blanking placed thereon, while the decoder ROM706, which has the output of said NOR gate NOR4 inputted in the $\overline{CS}$ terminal through the OR gate OR41, will make the signal output for displaying "buLb". Therefore the first display part 244 of the digital display device 402 will make the display of "buLb" in a bulb photographing mode. On the other hand the fully opened aperture value of the lens device 2 used will be displayed at the second display part 250 of said digital display device 402, following the output signal from the aperture display register 648 as long as MDSP signal is not "1", and if MDSP signal is "1", the display of aperture value will not be made, instead the display of "M" will be made at the third display part 252. Also this is shown in FIG. 10(*b*).

While it has been already explained above that when bulb is selected as shutter speed, "1" signal is outputted as EFDS signal and as BDSP signal, respectively, the display of "bEF" will be made at the first display part as shown in FIGS. 10(c), (d). When "1" is inputted as EFDS signal and BDSP signal, the output of the AND gate AND71 which receives both inputs will become "1" and is inputted in the A5 terminal of the decoder ROM706. As a result signal output will be made from said decoder ROM706 to make the display of "buLb" at the first display part 244 of the digital display device 402. Since BDSP signal is inputted in the NOR gate NOR4 under such state, making its output "0", the decoder ROM704, which has the output of the NOR gate NOR4 inputted in the $\overline{CS}$ terminal through the OR gate OR43 after being inverted through the inverter INV32, will have blanking placed thereon, while the decoder ROM706, which has the output of the NOR gate NOR4 inputted in the $\overline{CS}$ terminal through the OR gate OR41, will make the signal output for displaying "bEF". Thus the display of "bEF" will be made at the first display part 244 of the digital display device 402 in speedlight photographing mode and under bulb photographing mode. On the other hand the output of aperture value data will be made at the second display part 250 of the digital display device 402 from the aperture value display register 648 as long as the speedlight is not under total light emitting mode, and the signal output for display o aperture value will be made from the decoder ROM702 following said data, thus aperture value display will be made. Also "M" display will be made at the third display part 252 of the digital display device 402 as long as MDSP signal becomes "1".

Also when "1" signal is inputted as EDSP signal, the flickering display of "EEEE EE" will be made at the first and second display parts 244, 250 of the digital display device.

Thus, when "1" signal is inputted as EDSP signal, EDSP signal is inputted in the A7 terminal of the decoder ROM702 for having the display of "EE" made, and at a same time EDSP signal is inputted in the A7 input terminal of the decoder ROM706 to make the signal output for displaying "EEEE". On the other hand since said EDSP signal is given to the NAND gate NAND2 which has the ON-OFF signal of 2 H$_z$ given thereto through the inverter INV33 from the signal line (20) having the ON-OFF signal of 2 H$_z$ placed thereon, the ON-OFF signal of 2 H$_z$ is outputted from said NAND gate NAND2 and is inputted in the NAND gate NAND4. On the other hand, while said NAND gate NAND4 receives the input of the NAND gate NAND3, the output of said NAND gate NAND3 is "1" as long as the AVFL out of the inputs thereinto is "0", therefore said NAND gate NAND4 makes ON-OFF signal output of 2 H$_z$, and said signal is inputted in the $\overline{CS}$ terminal of the decoder ROM702 through the OR gate OR40, placing the blanking over the output of said ROM 702 with 2 H$_z$. Therefore, the "EE" display placed at the second display part of the digital display device 402 by said decoder ROM702 will be flickered with 2 H$_z$. Also the ON-OFF signal of 2 H$_z$, being the output of said NAND gate NAND2 is inverted through the inverter INV28 and has phase matched with that of the ON-OFF signal of 2 H$_z$ which is the output of said NAND gate NAND4, then is inputted in the $\overline{CS}$ terminal of the decoder ROM706, placing the blanking with 2 H$_z$ over the output of said ROM706. Therefore the "EEEE" display placed at the first display part 244 of the digital display device 402 by said decoder ROM706 will be flickered with 2 H$_z$. On the other hand since said EDSP signal is inputted in the NOR gate NOR4, said NOR gate NOR4 will make "0" output, and the decoder ROM704, which has the "0" output of the NOR gate NOR4 inputted in its $\overline{CS}$ terminal through the OR gate OR43 after being inverted through the inverter INV32, will have its output completely controlled. As has been mentioned above when "1" signal is inputted as EDSP signal the flickering display with 2 H$_z$ intervals of "EEEE EE" will be made at the digital display device 402.

Next, detailed explanations will be made on how the taking in of data for control is made from the output BAS line 374.

While the data for control being placed on the output BAS line 374 are the data TV for shutter speed control and the data AVs for control of diaphragm closing step number, said shutter speed control data TV is placed on the output BAS line 374 in the next one word period after the CALE signal is placed on the BAS line 366 as the data of ⅛ step accuracy being synchronized with the timing pulses TB0 to TB7 as mentioned above. Also said diaphragm closing step number control data AVs is, as mentioned before, placed on the output BAS line 374 in one word period which is the third word after the CALE signal is placed on the BAS line 366 as the data with ⅛ step accuracy being synchronized with the timing pulses TB0 to TB7. That is, said shutter speed control data TV is synchronized with the output of the output signal line (15) of the synchronization circuit 660 shown in FIG. 82, while the diaphragm closing step number control data AVs is synchronized with the output of the signal line (16). That is, while the shutter speed control data TV may be taken in from the output BAS line 374 in synchronism with the output of said signal line (15), since said shutter speed control data TV corresponds to APEX value, that is the logarithmically compressed value of reciprocal of actual shutter time, some operartion step will be needed to obtain the data corresponding to actual shutter time from the shutter speed data TV corresponding to APEX value. That is, in order to make said shutter speed data as the signal with such size as corresponding to actual shutter time, it is necessary to substract said shutter time control data from the APEX value of the reference shutter speed. The data obtained from said subtraction corresponds to the step number corresponding to the APEX value of controlled shutter time, and actual time can be obtained by exponentially expanding thus obtained data based on the standard shutter speed. As has been mentioned above in order to obtain actual time from such shutter speed as corresponding to APEX it is necessary to subtract the shutter speed data TV from the standard shutter speed, and an operation circuit 612 is provided for that end.

As has been mentioned above the controlled shutter speed data TVs obtained through the operation circuit 612 is inputted in the shutter time control registers 614 and 626, and each of said registers 614, 626 separates said shutter time control data TV from the output BAS line 374 and takes in and accumulates the same based on the control signal to designate the taking in time of shutter speed data from said synchronization circuit 660. Here, said shutter time control register 614 is provided for memorizing the integer part of said shutter time data TV, while said shutter control register 626 is provided for memorizing the fraction part of said shutter time data TVs.

On the other hand, the diaphragm closing step number control data AVs may be taken in from the output BAS line 374 in synchronism with the output of said signal line (16), while said diaphragm closing step number control data AVs is separated from the output BAS line 374 and is taken in and memorized at the diaphragm closing step number control register 628 based on the control signal to designate the taking in time of said data AVs from said synchronization circuit 660.

Figure 91:
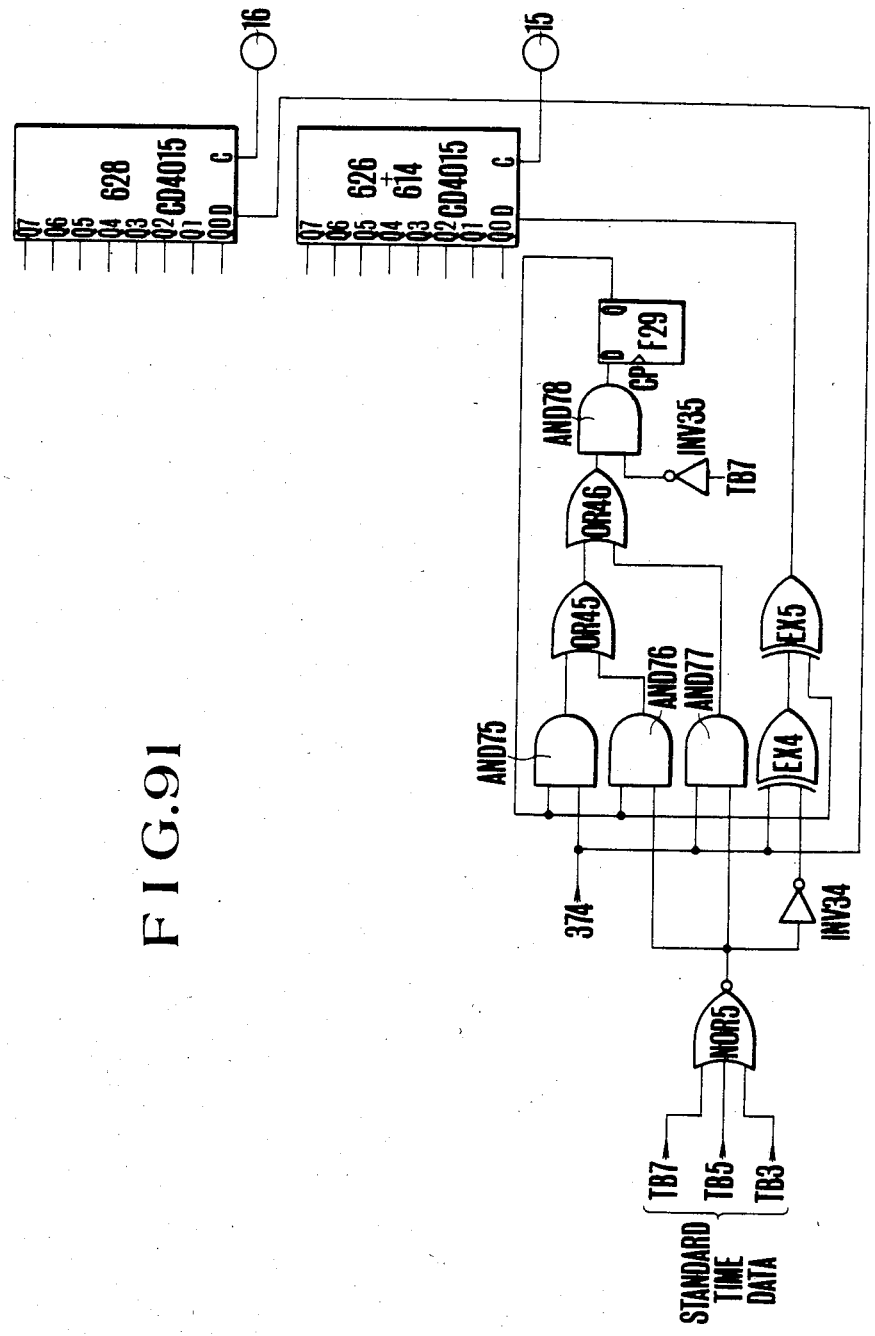
FIG. 91 shows a detailed logic diagram for taking up the data for control.

The set up to take in the above mentioned data for control data TV and diaphragm closing step number control data AVs has its detailed logic diagram shown in FIG. 91.

As being apparent from FIG. 91 the shutter time control registers 614 and 626 are concentrated in the integrated circuit element CD4015 which uses the output of the signal line (15) shown in FIG. 82, while the diaphragm closing step number control register 628 is made of the integrated circuit element CD4015 which uses the output of the signal line (16) shown in FIG. 82 as clock terminal C input.

Said integrated circuit element CD4015 has its detailed logic diagram shown in FIG. 62.

In the set up shown in FIG. 91, a well known subtraction circuit is made of AND gates AND 75, AND76, AND77, AND78, OR gates OR45, OR46 EXCLUSIVE OR gates EX4, EX5, inverter INV35, Flip-Flop F29, NOR gate NOR5, and the data being inputted in the output BAS line 374 in synchronism with the timing pulses TB0 to TB7 are subtracted from the data inputted in the NOR gate NOR5 in synchronism with the timing pulses TB0 to TB7, then the result thereof is outputted from the EXCLUSIVE OR gate EX5 in synchronism with the timing pulses TB0 to TB7. Here, the timing pulse TB9 is inputted in the AND gate AND78 through the inverter INV35 to prevent the carry generated at the last stage of operation for preventing the jumping in of the carry into the operation in the next TB0 to TB7.

While APEX equivalent value of shutter time which constitutes the standard for shutter time control will be inputted in the NOR gate NOR5, since the maximum speed of 1/2000 second is used as the standard shutter time in this example, such binary code datum as corresponding to the shutter time for 1/2000 second will be inputted in the NOR gate NOR5. Said datum is, as will be shown later also, "10101000", thus when this datum is synchronized with the timing pulses TB0 to TB7, "1" input will be given to said NOR gate NOR5 with the timing pulses TB7, TB5, TB3. To realize such set up, in this example, the input with the timing pulses of TB3, TB5, TB7 is made to said NOR gate NOR5.

While the output data from the EXCLUSIVE OR gate EX5 of the subtraction circuit having the above mentioned set up will be given to the input terminal D of the shutter time control registers 614+626, it is not unknown whether said data are actually corresponding to the controlled shutter time TV or not. Therefore, in this example said shutter time control registers 614+626 distinguish the shutter time control data TVs out of the outputs of said subtraction circuit 612 and take in and accumulate the same by inputting the signal outputted from the output signal line (15) of said synchronization circuit 660 in the clock terminal of said registers 614+626 in same word time as that the data TV on the shutter speed is placed on the output BAS line 374.

The shutter time control data TVs are outputted in parallel from upper unit to lower unit out of each terminal of Q0 to Q7 of said shutter time control registers 614+626 through the above mentioned procedure, wherein Q0 to Q4 outputs thereof correspond to integer part while Q5 to Q7 correspond to fraction part.

On the other hand, while the diaphragm closing step number control register 628 receives the output BAS line 374 at the input terminal D, the signal outputted from the output signal line (16) of said synchronization circuit 660 is inputted in the clock terminal of said register with same word time as that the diaphragm closing step number control data AVs are placed on the output BAS line 374, therefore said register 628 distinguishes the diaphragm closing step number control data AVs out of the data of said output BAS line 374 and take in and accumulate the same. The diaphragm closing step number control data AVs will be outputted in parallel from upper unit to lower unit out of each output terminal of Q0 to Q7 of said diaphragm closing step number control register 628 through the above mentioned procedure.

As has been mentioned above the exposure control action at the mechanism part 358 of this camera system will be done based on the shutter time control data TV accumulated at the shutter time control register 614+626 and the diaphragm closing step number control data AVs accumulated at the diaphragm closing step number control register 628, and now explanations will be made on the camera mechanism part 358 and the functional sequence thereof.

While it has been explained before that this camera system has its action controlled through the three electro-magnetic mechanical conversion means that is the shutter release means 396, the diaphragm control means 398 and the shutter speed control means 400 provided at the mechanical part 358, now explanations will be made on the action of each control means mentioned.

Major portion of the mechanism of this camera system is not different at all from conventional camera mechanism.

Said shutter release means 396 is an electro-magnetic solenoid shown in German Patent Application Laid-Open No. 2,461,151, linked with a trigger mechanism which runs the mechanical sequence of the camera device by being electrified for a certain period of time, and by power supply in pulse shape to this electro-magnetic solenoid such mechanical sequence mechanisms as start to running of AE lever 94 for presetting the aperture value from the body 4 side, diaphragm closing driving of the lens device 2, jump up of a mirror, start of leading screen of a focal plane shutter.

Also said diaphragm closing control means 398 is an electro-magnetic solenoid shown in German Patent Application Laid-Open No. 2,461,151 to bias the clamping mechanism of the AE lever 94 to clamp releasing side by being electrified, and by power supply to said electro-magnetic solenoid said AE lever 94 can make running action in a clamp released state, and is clamped by suspension of power supply. In such mechanism before the camera mechanism starts running of mechanical sequence, said diaphragm control means 398 is electrified to retain the clamping mechanism of the AE lever 94 at a clamp releasing side to place the AE lever 94 in a state wherein it can start running along with the start of running of mechanical sequence of the camera mechanism.

Next, when the AE lever 94 starts running following the mechanical sequence the amount of its run is detected and the clamping mechanism of said AE lever 94 is returned to clamping position by suspending power supply to said diaphragm control means 398 as said amount of run reaches a prescribed value to clamp said AE lever 94. The aperture value of the lens device 2 can be preset as mentioned above, and this has been explained before.

Also said shutter speed control means 400 is an electro-magnetic solenoid shown in German Patent Application Laid-Open No. 2,461,151, to control the start of running of the follower screen of a focal plane shutter by being electrified, and by power supply to this electro-magnetic solenoid said shutter follower screen will be placed in a state wherein its running is restrained while the restraining of the running of said shutter follower screen is released by suspension of power supply. In such set up at a same time as the start of running of mechanical sequence of said camera mechanism said shutter speed control means 400 is electrified to restrain the running of the shutter follower screen, and after said shutter follower screen runs, time counting is started and as the time counted thereby reaches a prescribed value the power supply to said shutter speed control means 400 is stopped, thereby releasing the restraining of the running of the shutter follower screen to have the shutter follower screen start running, thus the control of exposure time can be effected.

Also when the running of the shutter follower screen is completed the mechanical sequence mechanism performs return action for the mirror and the diaphragm closure driving lever 98. etc.

Said shutter release means 396, diaphragm control means 398, shutter speed control means 400 need to have their operation timing and functioning time precisely controlled, and for that end the signal for precise sequence control obtained, under various conditions will be needed, and a control signal generation circuit 646 is provided for that purpose. Driving control signal will be given from said control signal generation circuit 646 to said shutter release means 396, diaphragm control means 398 and shutter speed control means 400 with such timing as having proper exposure control action and for proper length of time, and said control timing as well as time are made based on the operating time of a self-timer, the timing by which the AE lever 94 runs through the diaphragm closing step numbers accumulated in the diaphragm closing step number control register 628, the timing at which the actual time corresponding to the shutter time data accumulated at the shutter time control registers 614, 626 passes, and the time to compensate the mechanical delay of mechanical sequence mechanism, etc.

The output data of said shutter time control register 626 and the output data of said diaphragm closing step number control register 628 are inputted in the data selector 632 and are given to the down counter 642 selectively based on the instruction from said control signal generation circuit 646.

On the other hand, the output data of said shutter time control register 614 and the output data of a constant generation circuit 616 provided to generate such constant data as corresponding to the time for various timewise control are inputted in the select-gate 618 and are given selectively to the frequency dividing circuit 620 based on the instruction from said control signal generation circuit 646.

Also said down counter 642 has the pulse signal FPC which is inputted along with the running of the AE lever 94 and the output pulse signal of said frequency dividing circuit 620 inputted in the clock terminal thereof through the select-gate 640, and the data inputted from said data selector 632 are subtraction counted based on the pulses being inputted through said select gate 640, then the carry generated as a result of such subtraction count is given to said control signal generation circuit 646.

Now, when diaphragm closing step number control is done in such set up the diaphragm closing step number control data AVs is given from said diaphragm closing step number control registor 628 to the down counter 642 through said data selector 632. On the other hand, the pulse signal FPC which is outputted corresponding to the amount of run by the AE lever 94 is inputted through the select gate 640 to the clock terminal of the down counter 642.

When the AE lever 94 runs at this time the diaphragm closing step number control data AVs are subtracted by said pulse signal FPC in the down counter 642. When carry in outputted from said down counter 642 through such procedure, said carry is to show that the number of input pulses of the pulse signal FP matches with said diaphragm closing step number control data AVs and show that the position to which the AE lever 94 runs at that time is the preset position for the diaphragm closing step number of the lens device 2. Therefore, the control signal generation means 646 in which said carry is inputted clamps said AE lever 94 through said diaphragm control means 398, thereby the diaphragm closing step number of the lens device 2 can be preset to the same value as that of said diaphragm closing step number control data AVs.

When shutter time control is done, the data for below the decimal point out of the shutter time control data TV will be given from the shutter time control registor 626 to the counter 640 through said data selector. Said down counter 642 adds "1" to said data below decimal point making it as the data being eight folded, then said data are taken in. On the other hand the output pulse of said frequency dividing circuit 620 is inputted in the clock terminal of said down counter 642 through said select gate 640. At this time the frequency dividing circuit 620 takes in the data for integer part out of the shutter time control data TV through the select gate 618 out of said shutter time control register 614, then frequency divide and pulse output the same by the pulse signal of ⅛ of the standard time, wherein the data taken in said down counter 642 are subtracted based on the output pulse of said frequency dividing circuit 620. When carry is outputted from said down counter 642 through the above mentioned procedure, said carry is to show that the output pulse number of said frequency dividing circuit 620 matches with the data relating to the shutter time control below the decimal point, and to show that the actual time corresponding to said shutter time control data.

Therefore, the control signal generation means 646 in which said carry is inputted starts the running of the shutter follower screen through said shutter speed control means 400, thereby the shutter time can be controlled to such actual time as corresponding to said shutter time control data TV.

Now further detailed explanations will be made on the shutter time control. Said shutter time control data TV is given in data with ⅛ step accuracy, and said data are now represented by $$TV = P + \alpha/8 \tag{18}$$

wherein P, α therein are integer values. Said data corresponds to the actual exposure time represented by the following equation against the standard time Y:

$$TR = Y \times 2^{(P+\alpha/8)} \quad (19)$$

But as the digital circuit to operate $2^{(X+\alpha/8)}$ will become very complicated circuit, in this example, It is proximated by the following equation:

$$2^{P+\alpha/8} \approx 2^P(1+\alpha/8) \quad (20)$$

Therefore actual exposure time TR will be represented by $$TR = Y \times 2^P \times (1+\alpha/8) \quad (21)$$

Also, since said equation can be replaced by the equation:

$$TR = Y/8 \times 2^P \times (8+\alpha) \quad (22)$$

actual exposure time TR for shutter time can be obtained by making such frequency dividing pulse as $Y/8 \times 2^P$ by frequency dividing P step of the pulse signal Y/8 being ⅛ of the standard time Y by the frequency dividing circuit 620 and by subtraction counting the data, 8+α being taken in the down counter 642.

Now, the data to specify self timer time, the data to compensate the action delay in mechanical sequence and to determine the function time of said shutter release means 396, and the data to generate the ON.OFF signal of 2 Hz which has been explained before are outputted out of said constant generation circuit 616 and each one of them is frequency divided and is converted to actual time, then is given to said control signal generation circuit 646 and is used as the standard for the output control signal against said shutter release means 396, diaphragm control means 398, and shutter speed control means 400.

Next, explanations will be made on the detailed function of said output control part 364 and the detailed circuit set up to realize the same.

The control state of a camera device is divided into eight states in the camera system of this example.

This is done as the function of the camera device consists of various sequences and the function of electric control circuit needs to correspond to such sequence.

Figure 92:
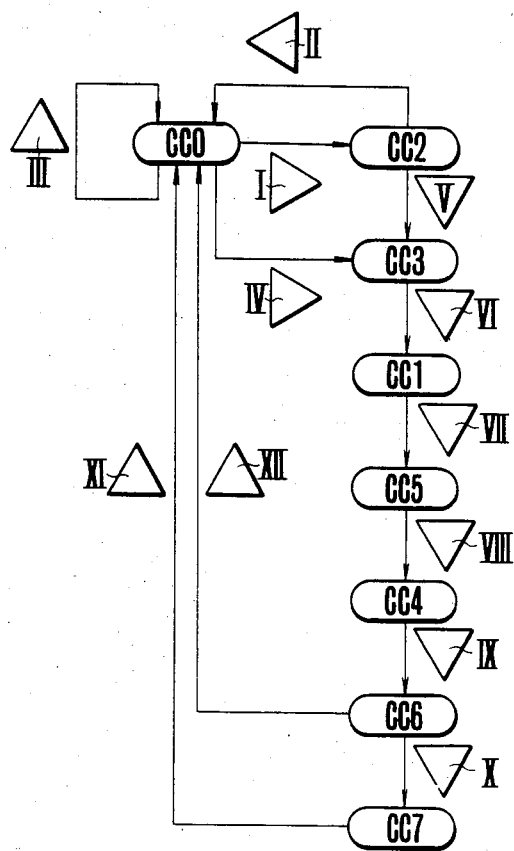
FIG. 92 shows a flow chart for explaining the operation of the output control part.

While the signal CC0 to CC7 are made to specify said eight control state in this camera system, explanations will be made on the function of the camera device corresponding to each of the signals CC0 to CC7 following FIG. 92.

The state of CC0 signal is a cycle to repeat the light measuring by the input control part 360 or taking in the analog data and A-D conversion, operation by the central control part 362, and the display of various data by the output control part 364, and the CC0 signal will be retained with the loop of (III) until the shutter release button 18 is pressed. A photographer can confirm the display of various data by the digital display device 402 within the finder 13 in this state and can perform change of set data, etc. Said CC0 signal is retained unless EDSP signal is "1" or the first CALE signal after a power switch is put is outputted.

The state of CC2 signal is a cycle corresponding to the time during which the self timer is in operation, and while the display of various data by the digital display device 402 is stopped, the light measuring by the input control part 60 or taking in of analog data and A-D conversion and the operation by the central control part 362 will be repeated, and during said period LED lamp 32 is flickered to notify a photographer that the self-timer is in action. The shifting from the state of CC0 signal to the state of CC2 signal will be done when the shutter release button 18 is pressed and the SR signal becomes "1" at a time when SELF signal is "1" (I). Also, in the state of CC2 signal as SELF signal becomes "0" or EDSP signal becomes "1", the camera device is returned from the state of CC2 signal to the state of CC0 signal (II).

The states of the signals CC3–CC6 are shifted completely in parallel with the shifting of mechanical sequence of the camera device mechanism part 358, and the shifting is done to the state of CC3 signal, power supply to the diaphragm control means 398 is started and the clamp mechanism of the AE lever 94 is biased to clamp releasing side, placing in a state to allow the AE lever 94 to run.

Here, the state of said CC3 signal is obtained by shifting from the state of CC2 signal when the state of CC2 signal in which a self-timer is in action (V), or by directly shifting from the state of CC0 signal when SELF signal is "0" at a time when the shutter release button 18 is pressed.

Also said state of CC3 signal is retained for a predetermined period of time, then shifting is made to the state of CC1 signal.

At said state of CC1 signal the shutter release means 396 of the camera device mechanical part 358 is electrified and a trigger mechanism for starting the running of mechanical sequence is activated. Said state of CC1 signal is also retained for a predetermined length of time and is shifted to the next state of CC5 signal (VII), then the mechanical sequence of the camera device starts runnig by the action of said trigger mechanism.

Said state of CC5 signal is a diaphragm control cycle and such actions as mirror up, running of AE lever 94, etc. are done by said mechanical sequence. In said state of CC5 signal, substraction counting of said diaphragm closing step number control data AVs by the pulse signal FPC outputted corresponding to the amount of run made by the AE lever 94, and the shifting from said state of CC5 signal to the state of CC4 signal (VIII) is made when the number of pulse of said pulse signal FP matches with said data AVs or if it does not match after an elapse of a predetermined period of time, and at this time power supply to said diaphragm control means 398 is stopped and the AE lever 94 is clamped and its running is controlled. That is in said state of CC5 signal, diaphragm presetting is made from the body 4 side of the lens device 2.

And the shifting to the state of CC4 signal, after said state of CC5 signal is completed upon an elapse of a predetermined period of time, is done when the pulse number of the pulse signal FPC does not match with said data AVs, and the same is applied to a case when diaphragm presetting is manually made at the lens device 2 side or a case when the aperture value AMAX of the minimum aperture is automatically selected.

Also when said state of CC5 signal is reached power supply to the shutter speed control means 400 is started to control the running of the shutter rear screen.

Also at said state of CC5 signal, the presetting of aperture and the diaphragm closing action of the lens device 2 by the diaphragm driving lever 98 are done in parallel.

Next as shifting from CC5 signal to the state of CC4 signal is made the shutter leading screen starts running by the progress of mechanical sequence. Since the exposure onto a film surface is not done immediately by said start of running of shutter leading screen and there is a mechanical delay time, said state of CC4 signal is set for a purpose of compensation of said time also.

Next while CTST signal is inputted by the start of the shutter leading screen, said state of CC4 signal is shifted to the state of CC6 signal (IX).

The state of CC6 signal is a shutter speed control cycle and the counting of actual time based on the shutter time control data TVs and the standard time Y is made after entering into the state of CC6 signal, and after an elapse of such period of time as corresponding of the shutter time control data TVs the state of CC6 signal is shifted to the state of CC7 signal (X).

In said state of CC7 signal power supply to the shutter speed control means 400 which is previously electrified is stopped and the shutter follower screen is started to stop the exposure on the film surface. Also after the running of the shutter follower screen is completed the mechanical sequence conducts the quick return of the mirror and the diaphragm driving lever. Here, in the state wherein BDSP signal is "1", as long as the signal SR from the switch SW2 which is linked with the shutter release button 18 is "1", the state of CC6 signal is retained, and when said SR signal becomes "0", return to the state of CC0 signal from the state of CC6 signal is made (XII). This is a function provided in view of the fact that the release button 18 is used for directly controlling shutter speed in manual manner in bulb photographing mode.

Also the state of CC7 signal is a state wherein so-called post display is made, that is data which constitute the basis for the exposure control already performed can be confirmed within the finder 13 after photographing is completed. As entering into said state of CC7 signal the action control for the digital display device 402 is released and the display of various photographing information is done, wherein said photographing information relates to the exposure control already performed. Also said state of CC7 signal is a state existing when the signal SR is "1" as the state of CC6 signal is shifted to the state of CC7 signal that is as the shutter release button 18 is kept pressed, and when said signal SR becomes "0", the state of CC0 signal is immediately resumed (XI).

Also when the film wind up is done by the motor drive device mentioned before or by manual action even if the shutter release button 18 is kept being pressed in the state of CC7 signal, the system is returned from the state of CC7 signal to the state of CC0 signal. This is an important function to retain the shutter release button 18 is a pressed state when continuous photographing is done by the motor drive device.

As has been mentioned above in the camera system of this example the output control part 364 is placed in the eight control state of said CC0 signal to CC7 signal.

The sequence of each of the signals CC0 to CC7 mentioned above and the state of power supply state to the electro-magnetic solenoids of the shutter release means 396, the diaphragm control means 398, and the shutter control means 400 in the state of each of said signals will be shown in the schematic sequence diagram of FIG. 93.

In FIG. 93, "FC1", "FC2", "FC3" are signals which constitute the basis to obtain said signals CC0 to CC7.

Now, before explanations are made on said control signal generation circuit 646 and the CC0 to CC7 signals, the function which constitutes the basis for control based on the diaphragm closing step number data AVs and the shutter time control data TV and the function for obtaining other timewise control signal will be explained.

Figure 66:
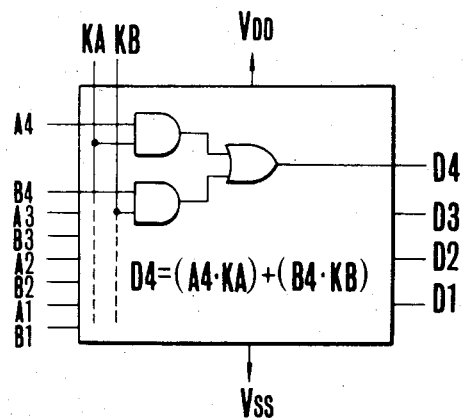
FIG. 66 shows a logic diagram of the I.C. circuit element CD4019.
Figure 67:
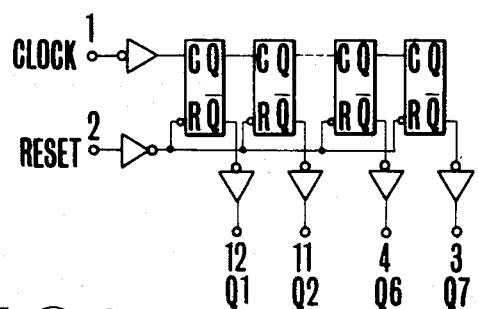
FIG. 67 shows a logic diagram of the I.C. circuit element CD4024.
Figure 95:
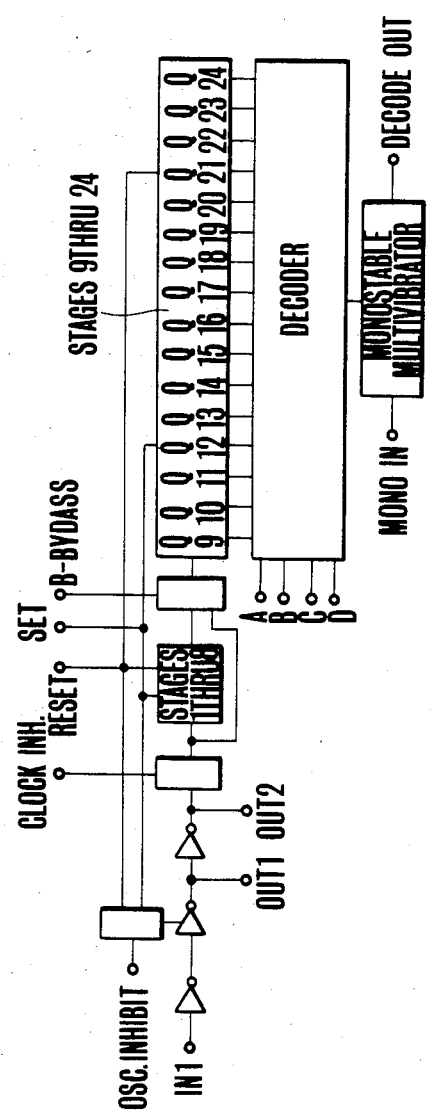
FIG. 95 shows a block diagram of the I.C. circuit element MC14536.

FIG. 94 is to show detailed set up of the shutter time control register 614, the constant generation circuit 616, the select-gate 618, the frequency dividing circuit 620, and what are shown by 618A to 618D in said drawing are select-gates consisting of integrated circuit elements CD4019 having its detailed logic diagram shown in FIG. 66, and four of the same constitute the select-gate 618 shown in FIG. 30. Also the frequency dividing circuit 620 consists of integrated circuit elements MC14536 (manufactured by MOTOROLA). Also said integrated circuit element MC14536 is a programmable timer having its block diagram shown in FIG. 95. Said programmable timer can conduct frequency dividing up to 24 steps as a whole and is so made as frequency dividing the pulse signal inputted from In terminal and outputting the same from DO terminal based on the 4 bits data inputted from each of the terminals A, B, C, D and the signal inputted from the terminal 8b. Said input data from each of the terminals A, B, C, D are to conduct frequency dividing up to the 16th step, while said terminal 8b is to conduct frequency dividing for further 8 steps. In FIG. 94, the Flip-Flop F39 is to frequency divide the clock-pulse and to input its Q output into the In terminal of said frequency dividing circuit 620. While the pulse signal of 64 KHz is used as clock pulse in the system of this example, the ON pulse of 32 KHz will be impressed to the In terminal of said frequency dividing circuit 620 through the above mentioned set up.

Said pulse of 32 KHz constitutes the basis for making the $\frac{1}{8}$ time of the standard time Y explained previously, and said frequency dividing circuit 620 is so made that when the inputs in its input terminals A, B, C, D are all "0" and the input in the terminal 8b is "1", the pulse signal of 6 KHz that is the pulse signal with such cycle as corresponding to Y/8 which is obtained by multiplying the standard time of 1/2000 second by $\frac{1}{8}$ times, is outputted from the DO terminal of the same. That is, this frequency dividing circuit 620 is to frequency divide the pulse signal of 16 KHz based on the input data from the input terminals A, B, C, D and the input signal into the terminal 8b and to output the same from its D, O terminals to the signal line (30). And said frequency dividing circuit 620 has a reset terminal R and is reset following the input signal from the signal line (29) explained later.

Said select-gate 618A has the lower 4 bits of the integer part of the shutter time control data inputted in its terminals A1 to A4 from the Q1 to Q4 of the shutter time control registers 614, and has the data to obtain the self times of 8 seconds that is the data "1010" inputted in the terminals B1 to B4, also has CC6 signal explained later inputted in the terminal Ka and has the input of CC2 signal, explained later, at the terminal Kb.

That is, said select-gate 618A outputs the data relating to selftime from its terminals D1 to D4 at the time of CC2 signal, and outputs the lower 4 bits of integer part of the shutter time control data TV at the time of CC6 signal.

Also the select-gate 618B has the fixed data to designate the time of CC3 and CC4 signals, explained later, inputted in its terminals A1 to A4, also has the fixed data to designate a certain time as the size of CC5 signal, explained later, inputted in its terminals B1 to B4. Also the time of 2 m sec. is used as said time of CC3 and CC4 signals, thus the data of "0110" are inputted in said terminals A1 to A4.

Also the time of 30 m sec. is used as the time of said CC5 signal in view of the running time of the AE lever 94, etc., thus the data, "1010" are inputted in said terminals B1 to B4.

Also said select-gate 618B receives the inputs of the signals CC1, CC3 through the OR gate OR57 at the terminal Ka, and receives the input of CC5 signal at the terminal Kb. That is, this select-gate 618B outputs the data relating to the time of 2 m sec. from its terminals D1 to D4 at the time of the signals CC1 to CC3, and outputs the data relating to 30 m sec. from its terminals D1 to D4 at the time of CC5 signal.

Also the select-gate 518C has the D1 to D4 outputs of said select-gate 618A inputted in its terminals A1 to A4 and has the D1 to D4 outputs of said select-gate 618B inputted at its terminals B1 to B4, also has CC2 signal and CC6 signal inputted through the OR gate OR55 in the Ka terminal and has the CC1 signal, CC3 signal and CC5 signal inputted through the OR gates OR56, OR57 at the terminal Kb.

That is, said select-gate 618C is to output the D1 to D4 terminal outputs of said select-gate 618A from its D1 to D4 terminals at the time of CC2, CC6 signals and outputs the D1 to D4 terminal outputs of said select-gate 618B from its terminals D1 to D4 at the time of CC1, CC3, CC5 signals.

Also the select-gate 618D has the D1 to D4 outputs of said select-gate 618C inputted at its terminals A1 to A4, and has the data to make the signal of 2 Hz that is the data "1101" inputted in its terminals B1 to B4, also has the signals CC1, CC2, CC3, CC5, CC6 inputted in its terminal Ka through the OR gates OR54, OR55, OR56, OR57 at its Ka terminal, and has the inverted signal of the input at said terminal Ka through the inverter INV47 inputted in its terminal Kb.

That is, this select-gate 618D is to output the D1 to D4 terminal outputs of said select-gate 618C from its terminals D1 to D4 at the time of each of signals CC1, CC2, CC3, CC5, CC6, and to output the data relating to said 2 Hz signal from its D1 to D4 terminals at the other times than above that is at the time of each of signals CC0, CC4, CC7.

The D1 to D4 outputs of said select-gate 618D are inputted in each of the terminals A to D of said frequency dividing circuit 620.

On the other hand, the Q0 terminal output of said shutter time control register 614 that is the highest bit of the shutter time control data TV is inputted in the terminal D of said frequency dividing circuit 620 through the inverter INV45, the OR gate OR53 from the NAND gate NAND29 which receives the input of CC6 signal.

Also the output of said NAND gate NAND29 is inputted in the terminal 8b of said frequency dividing circuit 620 through the AND gate AND91 which has CC2 signal inputted therein through the inverter INV46.

In the above mentioned set up explanations will be made on the state of A to D inputs of the frequency dividing circuit 620 and the input at the terminal 8b for every state of each of CC0 to CC7.

In the time of the signals CC0, CC4, CC7, since the input in the terminal Kb of the select-gate 618D becomes "1" also the input in the terminal 8b of the frequency dividing circuit 620 becomes "1", each input at each of the input terminals A, B, C, D of the frequency dividing circuit 620 and at the terminal 8b becomes "1", "0", "1", "1", "1", respectively, that is such pulse output as frequency dividing the pulse of 16 KHz by "110" steps that is the pulse output of 2 Hz will be made from the terminals D, O of said frequency dividing circuit 620.

In the time of CC2 signal, since the inputs in the terminals B1 to B4 of the select-gate 618A are inputted in the terminals A, B, C, D of the frequency dividing circuit 620 through the select-gates 618C, 618D and the input in the terminal 8b becomes "0", each input in each of the input terminals, A, B, C, D at the frequency dividing circuit 620 and in the terminal 8b becomes "0", "1", "0", "1", "0", respectively, therefore such pulse output as frequency dividing the pulse of 16 KHz by "1010" steps plus 8 steps. That is a pulse output of 16 second cycle will be made to the signal line (20) from the DO terminal of said frequency dividing circuit 620.

Said pulse of 16 seconds cycle uses the time when said pulse first up-rises from "0" to "1" that is the time when 8 seconds elapse after frequency dividing is started as the time when self-timer time is completed.

Next in the time of signals CC3 and CC1, since the inputs at the terminals A1 to A4 of the select-gate 618 are inputted in the terminals A, B, C, D of the frequency dividing circuit 620 through the select-gates 618C, 618D and the input at the terminal 8b of the frequency dividing circuit 620 becomes "1", each input at the input terminals A, B, C, D of the frequency dividing circuit 620 and the input terminal 8b becomes "0", "1", "1", "0", "1", respectively, therefore, such pulse output as frequency dividing the pulse of 16 KHz by "0110" steps that is the pulse output of 4 m sec. cycle will be made to the signal line (30) from the DO terminal of the frequency dividing circuit 620. Said pulse of 4 m sec. cycle uses the time when said pulse first up-rises from "0" to "1", that is the time when 2 m sec. elapse from the frequency dividing is started as the time when the signals CC3 or CC1 are completed.

In the time of CC5 signal, since the outputs at the terminals B1 to B4 of the select-gate 618B are inputted in the terminals A, B, C, D of the frequency dividing circuit 620 through the select-gates 618C, 618D also the input in the terminal 8b of the frequency dividing circuit 620 becomes "1", each input at the input terminals A, B, C, D of the frequency dividing circuit 620 and at the terminal 8b becomes "0", "1", "0", "1", "1", respectively, therefore such pulse output as frequency dividing the pulse of 16 KHz by "1010" steps that is the pulse output of 64 m sec. cycle will be made to the signal line (30) from the terminal DO of said frequency dividing circuit 620. Said pulse of 64 m sec. cycle uses the time when said pulse first up-rises from "0" to "1" that is the time when 32 m sec. elapse after frequency dividing is started as the time of completion of CC5 signal.

In the time of CC6 signal, the inputs at the terminals A1 to A4 of the select-gate 618A that is the lower 4 bits of integer part of the shutter time control data TV are inputted in the terminals A, B, C, D of the frequency dividing circuit 620 through the select-gates 618C, 618D, also when the highest bit of integer part of the shutter time control data TV is "0", the input at the terminal 8b of the frequency dividing circuit 620 becomes "1", and when the highest bit of integer part of the shutter time control data TV is "1", the input at the terminal D of the frequency dividing circuit 620 becomes "1" and the input at the terminal 8b becomes "0".

Therefore, such pulse signal as corresponding to the above mentioned $Y/8 \times 2^P$ of the equation (22), being obtained by frequency dividing the pulse signal of 16 KHz based on the shutter time control data TV is outputted from the terminal DO of the frequency dividing circuit 620.

Also said pulse signal is used to down count such data as corresponding to the above mentioned $8+\alpha$ in the equation (22) at a later stage, and the fact that the actual time of shutter time has elapsed is detected by the time when said down counting is completed.

Figure 96:
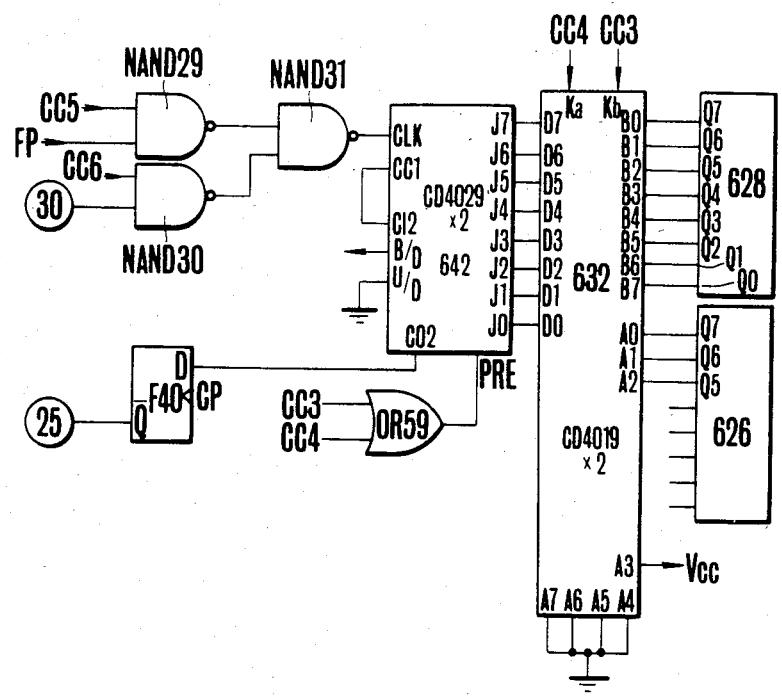
FIG. 96 shows a detailed composition of the shutter time control register 626, the diaphragm closing step number control register 628, the data selector 632, the down counter 642 and the select gate 640.

FIG. 96 is to show detailed set ups of the shutter time control register 626, the diaphragm closing step number control register 628, the data selector 632, the down counter 642, the select-gate 640 shown in FIG. 30, the data selector 632 in said drawing consists of a select gate which employs two of integrated circuit elements CD4019 having its detailed logic diagram shown in FIG. 66 arranged in parallel, and has the outputs at the terminals Q0 to Q7 of the diaphragm closing control register 628 inputted in its terminals B7 to B0, also has the outputs at the terminals Q5 to Q7 of the shutter time control data TV that is the 3 bits portion below decimal point of the shutter time control data TV inputted in its terminals A2 to A0. Also said data selector 632 has "1" signal inputted in its terminal A3, and has the terminals A4 to A7 grounded. That is, said data selector 632 receives the input of the data $8+\alpha$ shown in the equation (22) at the terminals A0 to A3, and receives the input of the diaphragm closing step number control data AV. Also, said data selector 632 has CC4 signal inputted in its terminal Ka and has CC3 signal at the terminal Kb. Therefore, in the time of CC3 said data selector 632 outputs the diaphragm closing step number control data from its terminals D0 to D7, while outputs the data $8+\alpha$ of the equation (22) from its terminals D0 to D7.

The outputs at D0 to D7 of said data-selector 632 are inputted in J0 to J7 of the down counter 642, and at a time when CC3 signal or CC4 signal is inputted through OR gate OR59 in the PRE terminal, said down counter 642 takes in and memorizes the output data of the terminals D0 to D7 of said data-selector 632.

Now, this down counter 642 is made by using two of the integrated circuit elements CD4029 having its detailed logic diagram shown in FIG. 34, and subtraction counts the data inputted from said terminals J0 to J7 and memorized based on the input CLK at its clock terminal, and outputs the signal to show that from the terminal CO2 when carry (borrow) is generated as a result. Said output signal at CO terminal is ordinarily "1" and becomes "0" when carry is generated, and this signal is inputted in the terminal D of the Flip-Flop F40 being synchronized with the clock pulse CP, therefore when subtraction counting by said down counter 642 is completed the signal synchronized with the clock pulse CP is outputted at the signal line (25).

On the other hand, said down counter 642 receives the input of the signal FPC at its clock terminal CLK through the NAND gates NAND31, NAND29 in the time of CC5 signal, also receives the D0 terminal output of the frequency dividing circuit 620 that is the signal output of the signal line (30) through the NAND gates NAND31, NAND30 in the time of CC6. Therefore, the function of this down counter 642 will be explained based on the sequence shown in FIG. 93.

Said down counter 642 taken in the output data of the diaphragm closing step number control register 628 from J0 to J7 terminal through the data selector 632 in the time of CC3 signal. Then as shifted to the time of CC5 signal, FPC signal is inputted through NAND gates NAND30, NAND31 and the diaphragm closing step number control data AVs memorized in the time of CC3 signal are down counted, and, as a result, when the subtraction counting is completed, the output signal at CO2 terminal is shifted from "1" to "0". At this time the AE lever 94 will have run to such position as presetting the amount of diaphragm closing corresponding to the diaphragm closing step number control data AVs. Of course, the amount of run at this time has suitable amount of compensation given thereto considering the mechanical delay time until the clamping of the AE 94 by the diaphragm control means 398 is done. The fact that the output signal at the CO2 terminal becomes "0" at this time is detected by the Flip-Flop F40, and such signal output is made as being synchronized with the clock pulse CP to show that the AE lever 94 runs to such position as corresponding to the diaphragm closing step number control data AVs.

Also said down counter 642 takes in from the terminals J0 to J3 through the data selector 632 such data as placing "1" at the bit corresponding to the lowest bit of integer part in addition to the output data at the terminals Q5 to Q7 of the shutter time control register 626 that is the data below decimal point of the shutter time control data TV, virtually as integer data that is as the data, $8+\alpha$, multiplying 8 times in the time of CC4 signal. Then, as shifted to the time of CC5 signal while the D0 terminal signal output of the frequency dividing circuit 620 will be inputted into the clock terminal CLK from the signal line (30) through the NAND gates NAND30, NAND31, such pulse output having pulse cycle of $Y/8 \times 2^P$ as frequency dividing the pulse signal of 16 KHz, the obtained by multiplying the standard time Y by ⅛ time will be made at this signal line (30) in the time of CC6, as has been explained above. Therefore, the $8+\alpha$ memorized at the time of CC4 signal is down counted following the pulse signal with the cycle of $Y/8 \times 2^P$, and as a result as the subtraction counting is completed the CO2 terminal output signal is shifted from "1" to "0". At this time, such length of time as $Y/8 \times 2^P \times (8+\alpha)$ has elapsed after entering into the time of CC6, and approximate actual time corresponding to the shutter time control data TV ($=P+\alpha/8$) is obtained. The fact that the output signal at C02 terminal becomes "0" is detected by the Flip-Flop F40 and such signal output as synchronized with the clock pulse CP will be made to show the fact that such actual time as corresponding to the shutter time control data TV has elapsed after entering into the state of CC6 signal.

Figure 97:
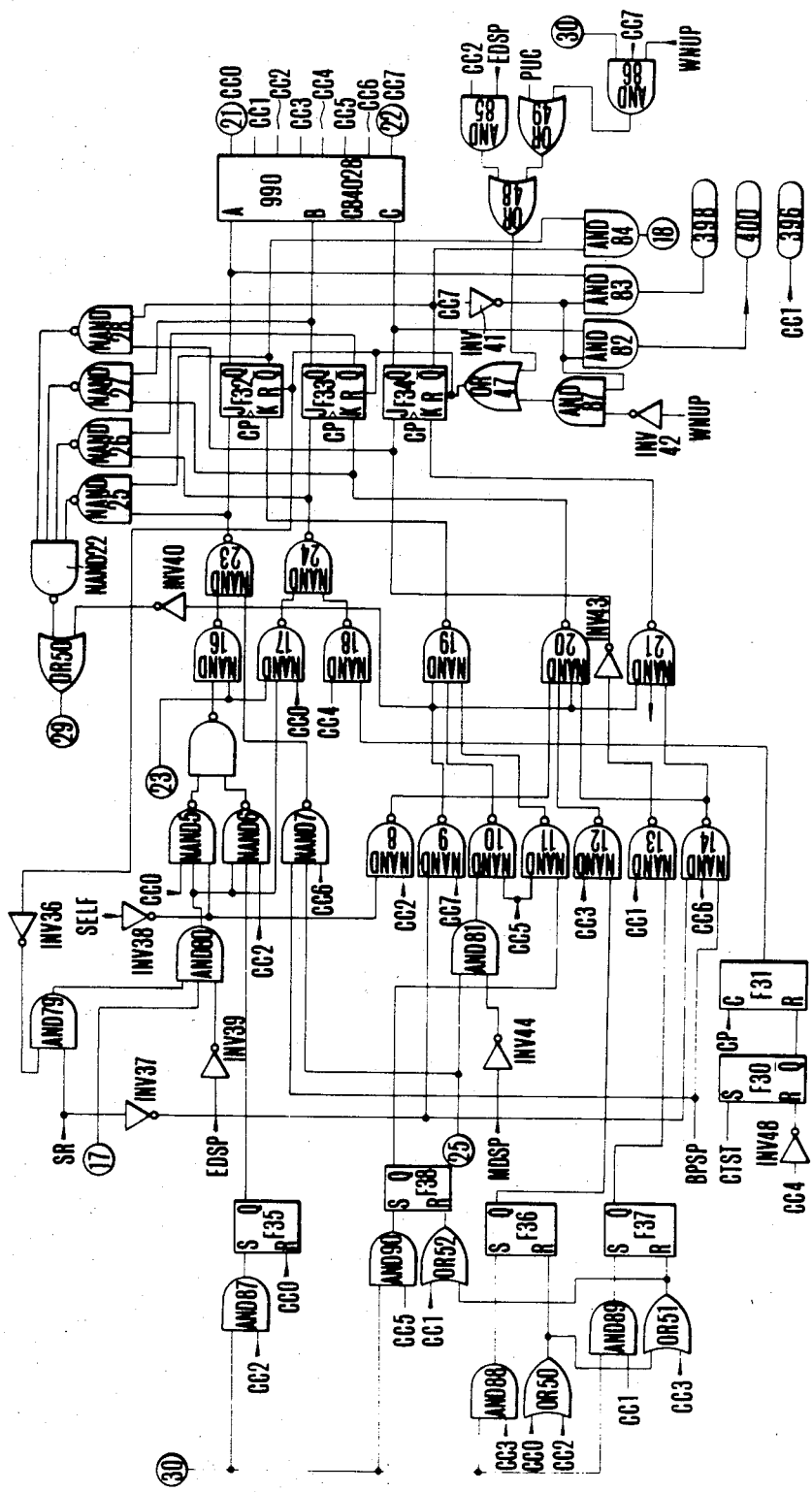
FIG. 97 shows a detailed circuit composition of the control signal generator circuit 646.

FIG. 97 shows a detailed circuit diagram of the above mentioned control signal generation circuit 646 and constitutes a theory circuit to obtain the above mentioned control signals CC0 to CC7.

What is shown as 990 in said drawing is a decoder made of integrated circuit element having its detailed logic diagram shown in FIG. 35, and is to decode FC1, FC2, FC3 which represents each Q output of the Flip-Flop F32, F33, F34 and outputs the same as the signals CC0 to CC7. Here each of said signals FC1, FC2, FC3 is as shown in FIG. 93 and is outputted from the Q output terminals of the Flip-Flops F32, F33, F34. These Flip-Flops F32, F33, F34 are synchronized with the clock pulse CP.

Now the setting condition for the Flip-Flop F32 is represented by SFC1, the resetting condition of the same by RFC1, and the setting condition for the Flip-Flop F33 is represented by SFC2, the resetting condition of the same by RFC2, while the setting condition for the Flip-Flop F34 by SFC3, the resetting condition therefor by RFC3, and the direct resetting condition for all of said Flip-Flops F32, F33, F34 is represented by FDR.

The fact that said condition FDR is satisfied means that the Flip-Flops F32, F33, F34 are reset without any relationship with the clock pulse CP, Therefore "1" output is made from the decoder 990 as the CC0 signal. That is the system will be placed in or returned to the state of CC0 signal.

Said condition FDR is satisfied when the power up clear signal PUC is inputted, or at the state of CC2 signal that is the EDSP signal becomes "1" during the action of self-timer, or at the state as not being in the state of CC7 signal and that the wind up of film is not completed and WNUP signal is "0", or when the wind up is completed and the WNUP signal becomes "1", further such time as corresponding to 2 Hz has elapsed in the state of CC7 signal.

Now, the FDR is satisfied when CCP signal is "1", and the WNUP signal is "1", further the 2 Hz signal is "1", because film wind up is completed in a state wherein the shutter release button 18 is kept pressed and then after an elapse of such period of time that next operation result is taken into a register for display the system enters into next control state, and it is an important condition for conducting continuous photographing in a state wherein the shutter release button 18 is kept pressed, using a motor driving device.

And AND gates AND85, AND86, AND87, OR gates OR47, OR48, OR49 and the inverter INV42 relate to satisfy said condition FDR.

The fact that the condition for CC2 signal is satisfied means that the Flip-Flop F33 is placed in a set state and the Flip-Flops F32, F34 are placed in reset state, and for that end the condition SFC2 needs to be satisfied.

That is, in order to create the state of CC2 signal, it is necessary that the condition SFC2 is satisfied as the shutter release button 18 is pressed and the SR signal becomes "1" when the EDSP signal is "0" under the state of CC0 signal and the condition FDR is not satisfied, and the signal from the signal line (17) is "1", that is the operation at the central control part 362 is completed and the signal from the signal line (23) is "1", that is when the transfer of data from the central control part 362 to the output control part 364 is not done.

When the SELF signal is "0" at this time for having the condition SFC1 also satisfied simultaneously, the system will be shifted from the state of CC0 signal to the state of CC3 signal without going through the state of CC2 signal.

When the SECF signal becomes "0" and the SR signal becomes "0" under the state of said CC2 signal, the condition RFC2 is satisfied as the self-timer photographing is regarded as completed and the system will be returned to the state of CC0.

On the other hand, under the state of CC2 signal, when the signal of the signal line (30) becomes "1", that is "1" output is made from the D0 terminal of the frequency dividing circuit 620 and the signal of the signal line (23) is "1", the condition SFC1 is satisfied and the system is shifted to the state of CC3 signal.

The system is shifted from the state of CC3 signal to the state of CC1 signal when the signal of the signal line (30) becomes "1", that is when 2 m sec. have elapsed thereby satisfying the condition RFC2.

The shifting from the state of the CC1 signal to the state of the CC5 signal is made when the signal of said signal line (30) becomes "1", that is 2 m sec. have elapsed, thereby satisfying the condition SFC3.

The shifting from the state of CC5 signal to the state of CC4 signal is made when MDSP signal is "0" and the signal of signal line (25) becomes "1", that is when the AE lever 94 runs as much as such amount as corresponding to the diaphragm closing step number control data AVs or when the signal of said signal line (30) becomes "1" that is 30 m sec. have elapsed, thereby satisfying the condition RFC1.

The shifting from the state of CC4 signal to the state of CC6 signal is made when the shutter leading screen starts running and CTST signal becomes "1", satisfying the condition of SFC2.

The shifting from the state of CC6 signal to the state of signal CC7 is made when BDSP signal is "0" and the output of signal line (25) becomes "1", that is counting of actual time corresponding to the shutter time control data is completed, thereby satisfying the condition SFC1.

When BDSP signal is "1" and SR signal becomes "0" under the state of CC6 signal, the conditions RFC2 and RFC4 are satisfied and the system is returned to the state of CC0 signal.

Also when the SR signal becomes "0" under the state of CC7 signal the conditions RFC1, RFC2 and RFC4 are satisfied and the system is returned to the state of CC0 signal.

Now, what is related to SFC1 is a logic set up by AND gates AND79, AND80, AND87, NAND gates NAND5, NAND6, NAND7, NAND16, NAND23, inverters INV36, INV37, INV38, INV39, and Flip-Flop F35.

Also what is related to RFC1 is a logic set up by AND gates AND81, AND90, NAND gates NAND8, NAND9, NAND10, NAND11, NAND19, inverter INV44, Flip-Flop F31, OR gates OR50, OR51, OR52.

Also what is related to SFC2 is a logic set up by NAND gates NAND17, NAND18, NAND24, Flip-Flops F30, F31 and inverter INV48.

Also what is related to RFC2 is a logic set up by NAND gate NAND12, NAND14, NAND20, NAND8, NAND9, Flip-Flop F36, AND gates AND81, AND88, OR gates OR50, inverters INV37, INV38, INV44.

Also what is related to SFC3 is NAND gate NAND13, AND gate AND89, OR gate OR51, inverter INV43 and Flip-Flop F37.

Also what is related to RFC3 is a logic circuit by NAND gates NAND9, NAND14, NAND21 and inverter INV37.

And said control signal generation circuit 646 gives the direct reset signal to the direct reset terminal R of the frequency dividing circuit 620 through the signal line (29).

The condition for the output "1" being done at said signal line (29) is that it is made when the SR signal becomes "0" under the state of CC7 signal and during the one bit of the first clock pulse CP after the conditions SFC1, SFC2, RFC2, SFC3 are satisfied, wherein the content of the above mentioned frequency dividing circuit 620 is totally cleared by said direct reset signal.

What is related to making "1" output at said signal line (29), is a logic set up made by NAND gates, NAND9, NAND22, NAND25, NAND26, NAND27, NAND28, inverters INV37, INV40 and OR gate OR50.

While power supply signals are given by said control signal generation circuit 646 to the shutter release means 396, the diaphragm control means 398, and the shutter speed control means 400, the power supply signal is given to the shutter release means 396 at the time of CC1 signal, and power supply signal is given to the diaphragm control means 398 at the time of CC3, CC1 and CC5 signals, while power supply signal is given to the shutter speed control means 400 at the time of CC5, CC4 and CC6.

To realize said actions, CC1 signal is given directly to the shutter release means 396, and the inverter signal by the inverter INV41 of FC1 signal and CC7 signals are given to the diaphragm control means 398 through the AND gate AND82, while the FC3 signal and the output signal of the inverter INV41 are given to the shutter speed control means 400 through the AND gate AND82.

Also direct reset signal is given by said control signal generation circuit 646 through the signal line (18) to the direct reset terinal R of the Flip-Flop F23 shown in FIG. 82.

This is done to prohibit that new operation data are inputted to the output control part 364 from the central control part 362 during exposure control action, and said signal will become "1" when the AND condition for each $\bar{Q}$ output of the Flip-Flops F32, F34 is satisfied through the AND gate AND84.

Figure 98:
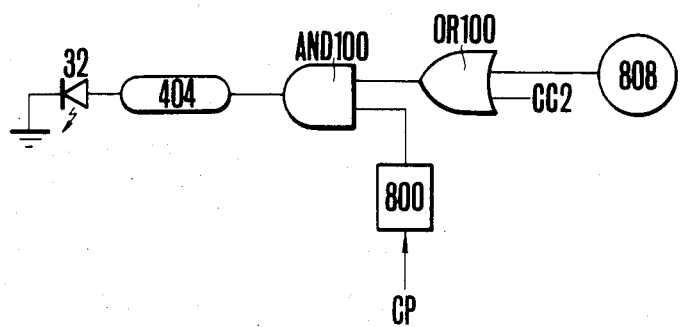
FIG. 98 shows a circuit composition of the drive control circuit for the LED display device.

To provide further explanations, while control signal is issued from said control signal generation circuit 646 to the driving circuit 404 to flicker the LED display device 32 which shows that a self timer is in action and a power source is normal, the set up of the driving control circuit of said LED display device 32 is shown in FIG. 98.

What is shown as 800 in the drawing is a frequency dividing circuit of 15 steps, which frequency divides the clock pulse CP of 64 KHz by 15 steps to generate ON-OFF signal of 2 Hz. Said 2 Hz signal is given to the AND gate AND100.

Also what is shown as 808 is a well-known battery check circuit being so made as outputting "1" signal when the balance in the battery is sufficient as the battery is checked.

The output of said battery check circuit 808 is given to said AND gate AND100 through OR gate OR100 together with said CC2 signal and the output signal of said AND gate AND100 is given to the LED driving circuit 404.

When the CC2 signal for the self-timer in action is "1" or the balance of battery is sufficient as a result of battery check in such set up as mentioned above, ON-OFF signal of 2 Hz is given to said LED driving circuit 404, thus the LED display device 32 makes flickering display.

While the explanations given so far are not necessarily sufficient, the set up of the camera system of this example is as mentioned above.

The reference table of FIG. 99 shows in what form each of the data is used in operation. In this table, binary codes of 8 bits with $\frac{1}{8}$ step accuracy corresponding to each APEX series of object brightness BV, film sensitivity SV, shutter speed TV, aperture value AV, fully opened aperture value AVo, the aperture value of most closed diaphragm AMAX, exposure EV, and the set aperture value from the speedlight side are corresponded and binary codes of 8 bits with $\frac{1}{8}$ step accuracy are similarly corresponded as the converted digital values against the analog data when A-D conversion is made at the input control part.

Also the vignetting error ROM528 shown in FIG. 37 is to output the binary code data for such vignetting error AVc as shown in FIG. 100 against the given fully opened aperture value AVo.

Figure 101:
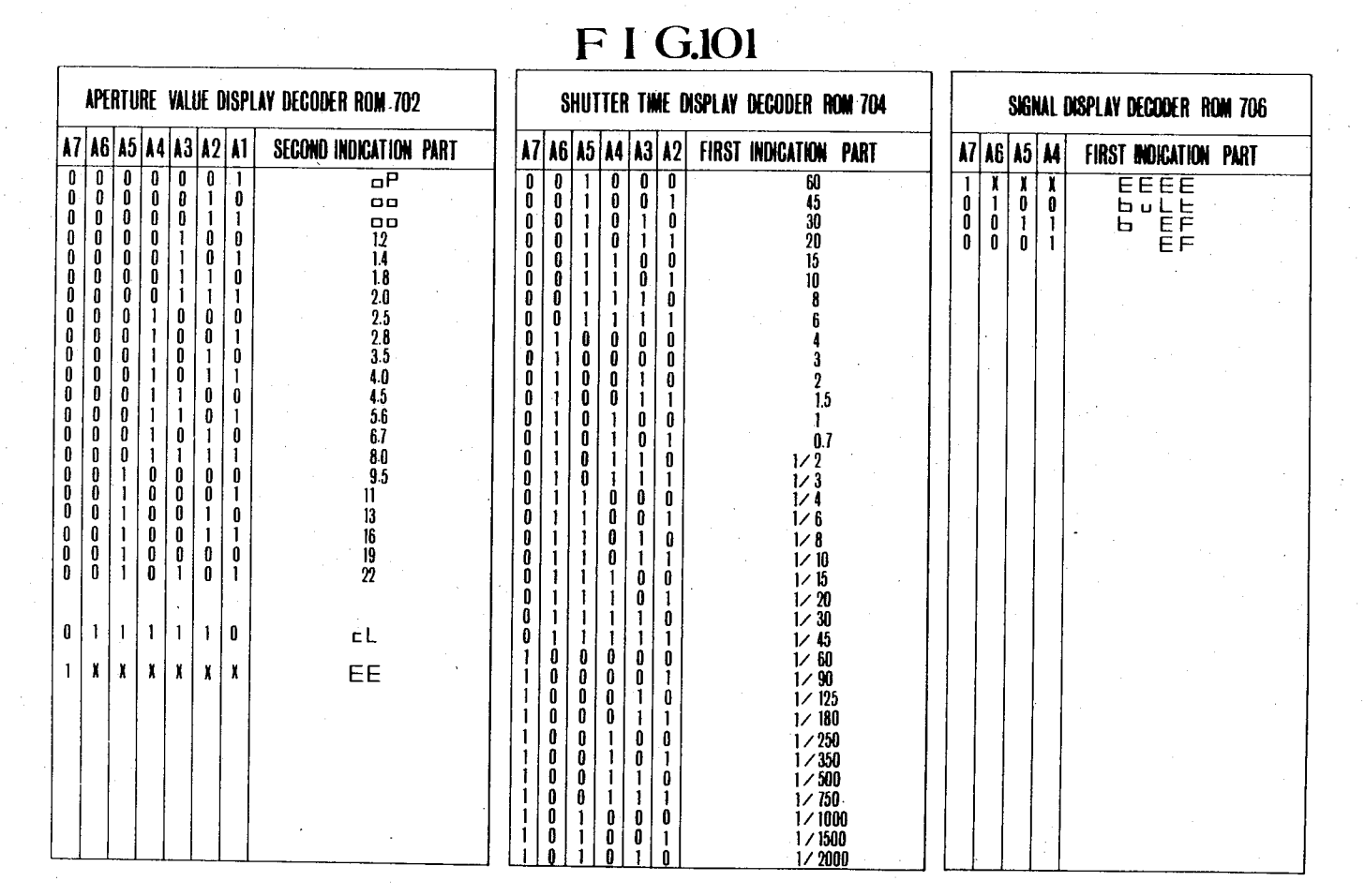

A reference table for the binary code for each input of the aperture value display decoder ROM702, the shutter speed display decoder ROM704, the sign display decoder ROM706 shown in FIG. 89 is shown in FIG. 101.

In the system of this example, data are handled in such binary codes as shown each of the reference tables of FIG. 99, FIG. 100, FIG. 101, and each operation routine shown in FIG. 70 is all made based on such binary data as shown in said reference tables.

Thus, it is deemed that ones with ordinary skill in the art can easily understand the portions in this specification where explanations are not sufficient or as to what actions will be made by the operation circuit shown in the block diagram of FIG. 79, following the operation instructions shown in FIG. 69 by referring to each operation routine shown in FIG. 70 and FIGS. 99, 100, 101 and in addition to all other drawings attached.

While the camera system of the present invention provides a number of advantages in picture taking, etc., they will be listed below:

1. While exposure control mechanism in a conventional camera device is made of chiefly by analogic electric circuits and mechanical linking mechanisms, the camera system to which the present invention is applied can have its circuits digitallized and large scale integration of circuits can be done therefore a compact set up with little erroneous operations can be obtained, and it is suitable for application to a camera device with limitation in its housing space.

2. While an automatic exposure control function used conventionaally in a camera device of TTL light measuring system has such case that the intention of a photographer can not be sufficiently satisfied because either one system out of aperture value priority or shutter time priority can be selected, in the camera system of the present invention the aperture priority and shutter time priority can be freely selected by change over of a switch, thus the application field for automatic exposure photographing is widened.

3. While a technique to concentratedly display various information within a finder of a camera device has been well known, in the camera system of the present invention is so made that information necessary for photographing is displayed within a finder digitally and in a very efficient manner, thus a photographer can obtain various information in photographing through a finder so that most proper camera operation can be done based on said information.

4. Since any one of the modes of automatic exposure photographing, manual exposure photographing, speedlight photographing, external light measuring photographing can be freely selected in a camera system of the present invention, the photographing mode needed by a photographer can be most properly selected.

5. While an ordinary camera device employs such set up conventionally that shutter speed is selected and set by a shutter dial and aperture value is selected and set by a diaphragm ring, respectively, in a camera system of the present invention, shutter speed and aperture value can be set by a common dial, therefore its handling characteristics can be greatly enhanced.

6. Since all controls in a camera device to which a camera system of the present invention is applied can be electrically done, for example a shutter which constituted heretofore a mechanical closing and opening mechanism can be replaced with an electric switch, therefore the adjustment of shutter button pressing power for shutter release can be done with very simple set up, thus the hand shakings at a time of shutter button pressing can be sufficiently overcome.

7. A camera system of the present invention is so made that when self time or exposure time is converted to actual time the time data corresponding to APEX value can be converted to actual time data in a very simple circuit set up and actual time is obtained by a standard time clock with electric generation type, therefore very accurate self time and exposure time can be obtained.

8. Since self time is digitally controlled in a camera system of the present invention the setting of self time can be freely and variably done, further self times does not have to be set every time shutter release is done, thus troublesome handling for self time setting will become unnecessary. Also since mechanical spring mechanism as in a conventional system is not used there will be no operating noise and setting is easy, further the extent for setting time can be made wide.

Also since display of action can be made with electric display means, such advantage can be secured that the action state of the system can be viewed from a distance.

9. Since exposure time is digitally controlled in a camera system of the present invention, the setting range for exposure time can be widened, particularly a mechanical governor is not used for a low speed shutter, long shutter time can be set freely without being restricted by mechanical arrangement, further action noise accompanying to the action of a low speed shutter can be eliminated. Also exposure time can be obtained with very high level of accuracy by using such oscillator with high level of accuracy as a crystal oscillator, thus accurate exposure can be made.

10. Compensation of vignetting error for the amount of light measured by TTL system generated near fully opened side of a lens device is not done by a mechanical linking system in a camera system of the present invention, instead said system is so made as selecting plural number of vignetting error data which have been memorized beforehand based on the fully opened aperture value of a photographing lens device used, therefore, mechanical errors can be minimized.

11. In a camera system of the present invention, unless a shutter release is done, light measuring and operation therefor will be repeated and every time aperture value and exposure time are obtained as the results of operation said values are memorized in registers, and displayed within a finder, thus not only a photographer can learn the information concerning photographing beforehand, but the aperture value and exposure time actually obtained in photographing can be obtained always for new conditions and new object, even when the set condition is changed, therefore photographing condition for an object can be freely selected. Also since the direction of error in the set aperture value or exposure time against appropriate exposure is displayed in a finder, a not only photographer can adjust the appropriate exposures in an accurate manner, but such effect as high key or low key, etc. can be assumed.

12. Since the control in a camera system of the present invention is made in such manner that as long as a shutter release is done, light measuring and A-D conversion are done repeatedly and the result of said A-D conversion is memorized in a registor every time the conversion is completed, said A-D conversion data memorized in the registor can be easily retained, thus AE locking mechanism, which has been constituted conventionally by mechanical clamping mechanisms or analogical capacitors, etc., can be obtained with very simple circuit set up, further it has such special feature that since it has such set up as memorizing and retaining the A-D conversion data of amount of light measured such conditions as the set aperture value, the set shutter speed value, and the film sensitivity etc. which constitute the basis for operation can be freely changed, thus extent of freedom at a time of AE locking can be largely widened compared to that in a conventional AE locking system in which the result of operation based on the amount of light measured is retained.

13. A camera system in the present invention employs such set up that the digital display within a finder is put out when a camera device is in an exposure control action including a self-timer action for greatly reducing power consumption of a battery power source, thus a camera device can be operated in a stable manner for a long time, also economy in use is improved.

14. While in such set up as conducting digital information display by LED display device within a finder there is such fear that light emittance by said LED display device within a finder badly affects the light measuring information as TTL light measuring is done, such set up is used in a camera system of the present invention as taking in the light measuring information within a certain length of time with very quick cycle and putting out the LED display device in between, therefore the LED display device is put out in every prescribed period of time with very quick cycle. Therefore, there will be no such troubles as flickering of display, etc. yet the bad effect which may be given to TTL light measuring by the LED display device is eliminated, thus allowing very accurate light measuring.

15. While frequent changes in the display data in digital display cause tickering or flickering in display, etc. making it difficult to read out or distinguish the same, and sometimes there may be a fear for erroneous read out, a camera system of the present invention has such set up that the renewal of digital display is done with such degree of cycle as can be distinguished by a photographer without relationship with the cycle of change in the data to be displayed, thus read of digital display simple and a risk of erroneous readout is reduced.

16. While as digital data with comparatively high level of accuracy are used as the data for operation and control in exercising exposure control, even if data with similarly high level of accuracy are used in digital display of data, it may cause unnecessary confusion for a photographer, and there is a fear for lowering photographing efficiency, in a camera system of the present invention although digital data with comparatively high level of accuracy are used as the data for operation and control, in digital display of data the accuracy is reduced by conducting rounding off by counting a fraction of 0.5 or over as a whole number and disregarding the rest, etc., that is the data are rounded off for data display, thus the efficiency in reading out data is enhanced allowing smooth photographing action.

17. While there is a necessity to manually set aperture value at a camera device side as an automatic light adjusting speedlight is used in speedlight photographing, the aperture at a camera device side can be automatically controlled from a speedlight side in a camera system of the present invention, thus speedlight photographing can be made quite efficient.

18. Also while shutter speed at a camera device side needs to be manually matched with the shutter speed synchronized with the speedlight or lower shutter speed when speedlight photographing is done in a conventional system, resulting in such fear as having erroneous handling in speedlight photographing, in a camera system of the present invention such signal is issued from a speedlight side in speedlight photographing as controlling the shutter speed at camera side to the shutter speed synchronized with the speedlight, allowing automatic control of the shutter speed of camera device to the shutter speed synchronized with the speedlight. Such set up may be also possible that such control will not be applied only when a shutter speed at lower side than that synchronized with the speedlight is selected at a camera device side, thus the extent of freedom in automatic speedlight photographing is enlarged.

19. While various conditions or data need to be set manually based on the result of light measuring when photographing is done based on the result of external light measuring for example spot light measuring or incident light measuring in a conventional automatic exposure control camera of TTL light measuring type, automatic exposure control based on the result of light measuring can be done when external light measuring is done in a camera system of the present invention, thus field of application of automatic exposure control is greatly enhanced.

As has been listed above numbers of advantages which can be obtained as a camera system of the present invention is employed and mechanical and electrical problem incidental to exposure control can be consolidatedly eliminated, thus it has great practical value.

Said technical thought of a camera system of the present invention is not limited to the above mentioned example instead there may be various modifications thereof and it is quite natural as a camera system of the present invention intends to establish an efficient total system in a photographic system.

Now, while explanations were not made in the above example, various additional function or modifications which are conceivable for making a camera system of the present invention to have further usefulness will be explained below.

A. While power source is supplied to all functional parts during operation of a camera device in the above example, there may be parts not requiring power supply depending on the functioning state of a camera. For example, while a camera device is doing exposure control action a parts actually requiring power supply is an output control part only, but an input control part, and a central control part do not need power supply. Therefore, such set up may be employed that when a camera device is in exposure control action that is between the sequences CC3, CC1, CC5, CC4, CC6, CC7 signals shown in FIG. 93, power supply to an input control part and a central control part is stopped for saving power.

B. While the above example has such set up that when a self setting is released as a camera device is in a state of self timer action, the system is returned to a state of waiting for shutter button, on the other hand it may have such set up that exposure control is done at a same time when a self setting is released. This can be effectively applied to a case when photographing needs to be done immediately during operation of a self timer, thus a photographer can respond at once to shutter changes. Such set up can be realized by replacing the output of NAND gate NAND8 in the circuit shown in FIG. 97 with the input of NAND gate NAND15.

C. While the above example has such set up that the brightness of a digital display device is always controlled to a constant value, the reading out of display may become easier as the brightness of display is changed depending on the brightness of object field of view, as long as such digital display is done within a finder. That is the brightness of display may be increased for bright object field of view, while the brightness of display may be reduced for dark object field of view. Such control may be effected by controlling the voltage for driving a digital display device or changing the duty of pulse voltage based on the light measuring information.

D. While the above example has such set up that newal of data of a digital display device is done with a certain time interval, for example when brightness in object field of view suddenly changes there is a possibility that extremely by deviation is generated between the control state of a camera device and display content by a display device. A set up may be employed to renew the display data in a display device without relationship with the renewal cycle of display data of a display device when extremely big deviation takes place between display data and control data.

E. While the operating time of a self timer in the above example is a predetermined constant time, such set up may be employed as making the operating time of a self timer variable so that a photographer can select free self time. Such set up may be realized easily by inputting variable data in the input at B1 to B4 of the digital selector shown in FIG. 94 through a digital switch, etc.

F. While the above example has such set up that even when an automatic light adjusting speedlight is used film sensitivity is set at a speedlight side in speedlight photographing mode and control data for controlled aperture value are inputted in a camera device, such set up may also be used that controlled aperture value is operated at a camera device side following film sensitivity set at a camera side based on the control data being sent from a speedlight side to a camera device side, as far as film sensitivity is concerned. Such set up may be easily realized by adding such routine as adding film sensitivity to operation routines at a time of speedlight photographing.

While a camera system of the present invention can employ various kinds of modified embodiments as have been mentioned above, there will be no specific explanations made here as to the scope or extent which can be easily presumed by extended thought for obtaining a realistic system allowing reasonable and efficient picture taking, but those having ordinary skill in the cast can have good understanding on this matter.

What is claimed is:

1. A photographic camera for flash photography generated by a flash device, the camera comprising:
   (a) first signal producing means for producing a first electrical signal corresponding to an exposure time suitable for flash photography;
   (b) shutter release means;
   (c) shutter control means responsive to actuation of said shutter release means and functionally connected to said first signal producing means to control an exposure time according to the first electrical signal from said first signal producing means when a charge completion signal is generated by said flash device;
   (d) setting means for manually setting a shutter speed;
   (e) second signal producing means associated with said setting means and producing a shutter speed signal corresponding to a shutter speed selected by the setting means; and
   (f) data control means functionally connected to said first signal producing means and said second signal producing means and which compares said first electrical signal with said shutter speed signal and, when the shutter speed signal represents an exposure time longer than that of the first electrical signal, controls the shutter control means so that the shutter control means controls the exposure time in response to the selected shutter speed signal.

2. A photographic camera according to claim 1, wherein said setting means includes a shutter speed dial mounted on the camera body.

3. A photographic camera according to claim 2, wherein said second signal producing means includes:
   (a) timing pulse generating means including a plurality of output terminals for transferring a plurality of timing pulses of phases differing from each other;
   (b) a single data output line;
   (c) a digital data plate including patterns corresponding to shutter speed selected by said shutter speed dial, each of the patterns of said digital data plate having a plurality of conductive means arranged to denote one of said shutter speed values;
   (d) contact means including a plurality of electrical brushes connected to corresponding output terminals of said timing pulse generating means contacting with corresponding conductive means of said digital data plate; and
   (e) conductive connection means connected to said single data output line and to the conductive means of said digital data plate to transfer, to said single data output line, output digital signals corresponding to the states of the conductive means of said digital data plate in contact with the brushes.

4. A photographic camera according to claim 1, wherein said data control means includes:
   (a) subtracting circuit means connected to said first and second signal producing means for subtracting said shutter speed signal from said first electrical signal.

5. A shutter speed selection circuit of a camera, comprising:
   a first signal generating circuit for receiving a totally automatic mode signal and a semi-automatic mode signal from a computer type flash unit and for generating a totally automatic mode signal and semi-automatic mode signal corresponding to each of said signals from the flash unit, and
   a second signal generating circuit for generating signals indicating shutter speed synchronized with the flash unit in response to the totally automatic mode signal from said first signal generating circuit and at the same time for generating signals corresponding to a shutter speed being manually set in response to the semi-automatic mode signal.

6. A photographic camera usable with an electronic flash unit, comprising:
   (a) first signal producing means for producing a semi-automatic mode signal in response to a signal supplied from an electronic flash unit;
   (b) second signal producing means for producing a signal representative of a shutter speed synchronized with the flash unit;
   (c) third signal producing means for producing a signal corresponding to a shutter speed being manually set;
   (d) comparison means for comparing the signal produced by said second signal producing means with the signal from the third signal producing means in response to the semi-automatic mode signal;
   (e) fourth signal producing means for producing the signal corresponding to a shutter speed being manually set when the shutter speed manually set is lower than the shutter speed synchronized with the flash unit and producing the signal representative of the shutter speed synchronized with the flash unit when the shutter speed being manually set is higher than the shutter speed synchronized with the flash unit, in response to the output of said comparison means; and
   (f) shutter speed control means for controlling the shutter opening time in response to the output from said fourth signal producing means.

7. A photographic camera comprising:
   (a) first generating means for generating a signal for a semi-automatic flash photographic mode;
   (b) computation order generating means for successively generating orders to perform the semi-automatic flash photographic mode in response to the signal for semi-automatic flash photographic mode;
   (c) second generating means for generating digital data corresponding to a shutter speed synchronized to the flash;
   (d) third generating means for generating digital data of a manual shutter speed corresponding to a manually set shutter speed;
   (e) comparison means for comparing the digital data generated from said second generating means in response to the orders from said computation order generating means with the digital data from said third generating means;
   (f) fourth generating means for generating the digital data of the manual shutter speed in response to the order from said computation order generating means when the manually set shutter speed is slower than the flash synchronized shutter speed and for generating digital data corresponding to the flash synchronized shutter speed when the manually set shutter speed is higher than the flash synchronized shutter speed; and
   (g) shutter speed control means for controlling a shutter opening time in response to the output from the fourth generating means.

8. A photographic camera comprising:

(a) first generating means for generating a signal for a semi-automatic flash photographic mode;

(b) computation order generating means for successively generating orders to perform the semi-automatic flash photographic mode in response to the signal for semi-automatic flash phtographic mode;

(c) second generating means for generating digital data corresponding to a shutter speed synchronized to the flash;

(d) third generating means for generating digital data of a manual shutter speed corresponding to a manually set shutter speed;

(e) comparison means for comparing the digital data generated from said second generating means in response to the orders from said computation order generating means with the digital data from said third generating means;

(f) fourth generating means for generating the digital data of the manual shutter speed in response to the order from said computation order generating means when the manually set shutter speed is slower than the flash synchronized shutter speed and for generating digital data corresponding to the flash synchronized shutter speed when the manually set shutter speed is higher than the flash synchronized shutter speed; and (g) indicating means for indicating the output data from the fourth generating means.

9. A photographic camera according to claim 8, wherein said indicating means includes a numeric digital indicating member.

* * * * *